US011789561B2

(12) United States Patent
Vaze et al.

(10) Patent No.: US 11,789,561 B2
(45) Date of Patent: Oct. 17, 2023

(54) ARCHITECTURE FOR DIFFERENTIAL DRIVE AND SENSE TOUCH TECHNOLOGY

(71) Applicant: Apple Inc., Cupertino, CA (US)

(72) Inventors: Sagar R. Vaze, San Jose, CA (US); Marduke Yousefpor, San Jose, CA (US); Amit Nayyar, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/933,783

(22) Filed: Sep. 20, 2022

(65) Prior Publication Data
US 2023/0100129 A1 Mar. 30, 2023

Related U.S. Application Data

(60) Provisional application No. 63/364,338, filed on May 6, 2022, provisional application No. 63/261,620, filed on Sep. 24, 2021.

(51) Int. Cl.
G06F 3/041 (2006.01)
G06F 3/044 (2006.01)

(52) U.S. Cl.
CPC .......... G06F 3/04164 (2019.05); G06F 3/044 (2013.01); G06F 3/0443 (2019.05);
(Continued)

(58) Field of Classification Search
CPC .... G06F 3/04164; G06F 3/044; G06F 3/0443; G06F 3/0445; G06F 3/0448;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 102375603 A 3/2012
EP 0706147 A2 4/1996
(Continued)

OTHER PUBLICATIONS

Advisory Action received for U.S. Appl. No. 12/851,401, dated Apr. 25, 2017, 3 pages.
(Continued)

Primary Examiner — Darlene M Ritchie
(74) Attorney, Agent, or Firm — Kubota & Basol LLP

(57) ABSTRACT

Differential driving and/or sensing can reduce noise in a touch screen. In some examples, the touch screen can include column and row electrodes routed vertically in the active area. In some examples, the touch electrodes and/or routing traces can be implemented using metal mesh in first and second metal layers. To improve optical performance, overlapping portions of metal mesh can be designed to provide an appearance of uniform width/area. In some examples, a dielectric layer can have an increased thickness and/or a reduced dielectric constant, and/or metal mesh in the first metal layer can be flooded with a transparent conductive material. In some examples, routing traces can be disposed beneath touch electrodes and/or metal mesh for touch electrodes can be flooded with a transparent conductive material without flooding metal mesh for routing traces. In some examples, touch electrodes can be interleaved within a touch node to improve differential cancelation.

20 Claims, 45 Drawing Sheets

(52) U.S. Cl.
CPC .......... *G06F 3/0445* (2019.05); *G06F 3/0448* (2019.05); *G06F 3/0412* (2013.01); *G06F 3/0446* (2019.05); *G06F 2203/04107* (2013.01); *G06F 2203/04112* (2013.01)

(58) Field of Classification Search
CPC .................. G06F 3/0412; G06F 3/0446; G06F 2203/04107; G06F 2203/04112
See application file for complete search history.

(56) References Cited

U.S. PATENT DOCUMENTS

| | | | |
|---|---|---|---|
| 5,574,262 | A | 11/1996 | Petty |
| 5,579,036 | A | 11/1996 | Yates, IV |
| 5,825,352 | A | 10/1998 | Bisset et al. |
| 5,835,079 | A | 11/1998 | Shieh |
| 5,844,506 | A | 12/1998 | Binstead |
| 5,847,690 | A | 12/1998 | Boie et al. |
| 5,880,411 | A | 3/1999 | Gillespie et al. |
| 6,057,903 | A | 5/2000 | Colgan et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,373,474 | B1 | 4/2002 | Katabami |
| 6,690,387 | B2 | 2/2004 | Zimmerman et al. |
| 6,847,354 | B2 | 1/2005 | Vranish |
| 7,015,894 | B2 | 3/2006 | Morohoshi |
| 7,184,064 | B2 | 2/2007 | Zimmerman et al. |
| 7,248,249 | B2 | 7/2007 | Kong et al. |
| 7,327,352 | B2 | 2/2008 | Keefer et al. |
| 7,570,064 | B2 | 8/2009 | Roziere |
| 7,663,607 | B2 | 2/2010 | Hotelling et al. |
| 8,149,002 | B2 | 4/2012 | Ossart et al. |
| 8,159,213 | B2 | 4/2012 | Roziere |
| 8,479,122 | B2 | 7/2013 | Hotelling et al. |
| 8,654,083 | B2 | 2/2014 | Hotelling et al. |
| 8,770,033 | B2 | 7/2014 | Roziere |
| 8,880,204 | B2 | 11/2014 | Frei et al. |
| 8,917,256 | B2 | 12/2014 | Roziere |
| 8,923,014 | B2 | 12/2014 | Kim et al. |
| 9,035,903 | B2 | 5/2015 | Binstead |
| 9,671,886 | B2 | 6/2017 | Yoo et al. |
| 10,101,838 | B2 | 10/2018 | Zhang et al. |
| 10,114,504 | B2 | 10/2018 | Yan et al. |
| 10,739,904 | B2 | 8/2020 | Blondin et al. |
| 10,845,930 | B2 | 11/2020 | Krah et al. |
| 2002/0000977 | A1 | 1/2002 | Vranish |
| 2005/0110772 | A1 | 5/2005 | Kong et al. |
| 2005/0219230 | A1 | 10/2005 | Nakayama et al. |
| 2005/0237439 | A1 | 10/2005 | Mai |
| 2006/0026521 | A1 | 2/2006 | Hotelling et al. |
| 2006/0097733 | A1 | 5/2006 | Roziere |
| 2006/0197753 | A1 | 9/2006 | Hotelling |
| 2006/0266640 | A1 | 11/2006 | Halsey et al. |
| 2008/0062139 | A1 | 3/2008 | Hotelling et al. |
| 2008/0284261 | A1 | 11/2008 | Andrieux et al. |
| 2009/0146945 | A1 | 6/2009 | Cho |
| 2009/0184937 | A1 | 7/2009 | Grivna |
| 2009/0231300 | A1 | 9/2009 | Kyle |
| 2009/0231301 | A1 | 9/2009 | Chang et al. |
| 2010/0052700 | A1 | 3/2010 | Yano et al. |
| 2010/0315374 | A1 | 12/2010 | Chen et al. |
| 2011/0063247 | A1 | 3/2011 | Min |
| 2011/0169783 | A1 | 7/2011 | Wang et al. |
| 2011/0285661 | A1 | 11/2011 | Hotelling |
| 2012/0044662 | A1 | 2/2012 | Kim et al. |
| 2012/0187965 | A1 | 7/2012 | Roziere |
| 2012/0188200 | A1 | 7/2012 | Roziere |
| 2013/0033450 | A1 | 2/2013 | Coulson et al. |
| 2013/0135247 | A1 | 5/2013 | Na et al. |
| 2013/0307776 | A1 | 11/2013 | Roziere |
| 2014/0043292 | A1 | 2/2014 | Hashimoto |
| 2014/0132335 | A1 | 5/2014 | Rauhala et al. |
| 2015/0035792 | A1 | 2/2015 | Roziere et al. |
| 2015/0054803 | A1 | 2/2015 | Yashiro et al. |
| 2015/0068897 | A1 | 3/2015 | Neel et al. |
| 2016/0117012 | A1* | 4/2016 | Wang .................. G06F 3/0446 345/174 |
| 2016/0342265 | A1 | 11/2016 | Geaghan |
| 2017/0285806 | A1 | 10/2017 | Xie et al. |
| 2018/0217696 | A1 | 8/2018 | Binstead |
| 2018/0224967 | A1 | 8/2018 | Church et al. |
| 2020/0257390 | A1 | 8/2020 | David et al. |
| 2020/0326828 | A1 | 10/2020 | Otagaki et al. |
| 2021/0373711 | A1 | 12/2021 | Smith et al. |
| 2023/0099369 | A1 | 3/2023 | Vaze et al. |
| 2023/0118216 | A1 | 4/2023 | Smith et al. |

FOREIGN PATENT DOCUMENTS

| | | |
|---|---|---|
| EP | 2267791 A2 | 12/2010 |
| EP | 2420918 A2 | 2/2012 |
| FR | 2756048 A1 | 5/1998 |
| FR | 2949008 A1 | 2/2011 |
| JP | 2000-163031 A | 6/2000 |
| JP | 2002-342033 A | 11/2002 |
| KR | 10-2016-0105465 A | 9/2016 |
| WO | 2015/030404 A1 | 3/2015 |

OTHER PUBLICATIONS

Advisory Action received for U.S. Appl. No. 12/851,401, dated Mar. 21, 2014, 3 pages.
Final Office Action received for U.S. Appl. No. 12/851,401, dated Dec. 5, 2013, 19 pages.
Final Office Action received for U.S. Appl. No. 12/851,401, dated Feb. 7, 2017, 6 pages.
Non-Final Office Action received for U.S. Appl. No. 12/851,401, dated Mar. 2, 2015, 18 pages.
Final Office Action received for U.S. Appl. No. 12/851,401, dated Feb. 15, 2018, 19 pages.
Final Office Action received for U.S. Appl. No. 12/851,401, dated Oct. 20, 2015, 19 pages.
Non-Final Office Action received for U.S. Appl. No. 12/851,401, dated Oct. 4, 2012, 15 pages.
Non-Final Office Action received for U.S. Appl. No. 12/851,401, dated Apr. 21, 2016, 23 pages.
Non-Final Office Action received for U.S. Appl. No. 12/851,401, dated Apr. 30, 2012, 15 pages.
Non-Final Office Action received for U.S. Appl. No. 12/851,401, dated Jul. 11, 2017, 19 pages.
Non-Final Office Action received for U.S. Appl. No. 12/851,401, dated Jul. 24, 2014, 21 pages.
Advisory Action received for U.S. Appl. No. 12/851,401, dated Jun. 25, 2018, 2 pages.
Non-Final Office Action received for U.S. Appl. No. 12/851,401, dated May 22, 2013, 16 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Non-Final Office Action received for U.S. Appl. No. 17/326,249, dated Feb. 2, 2022, 24 pages.
Notice of Allowance received for U.S. Appl. No. 17/326,249, dated Aug. 19, 2022, 14 pages.

* cited by examiner

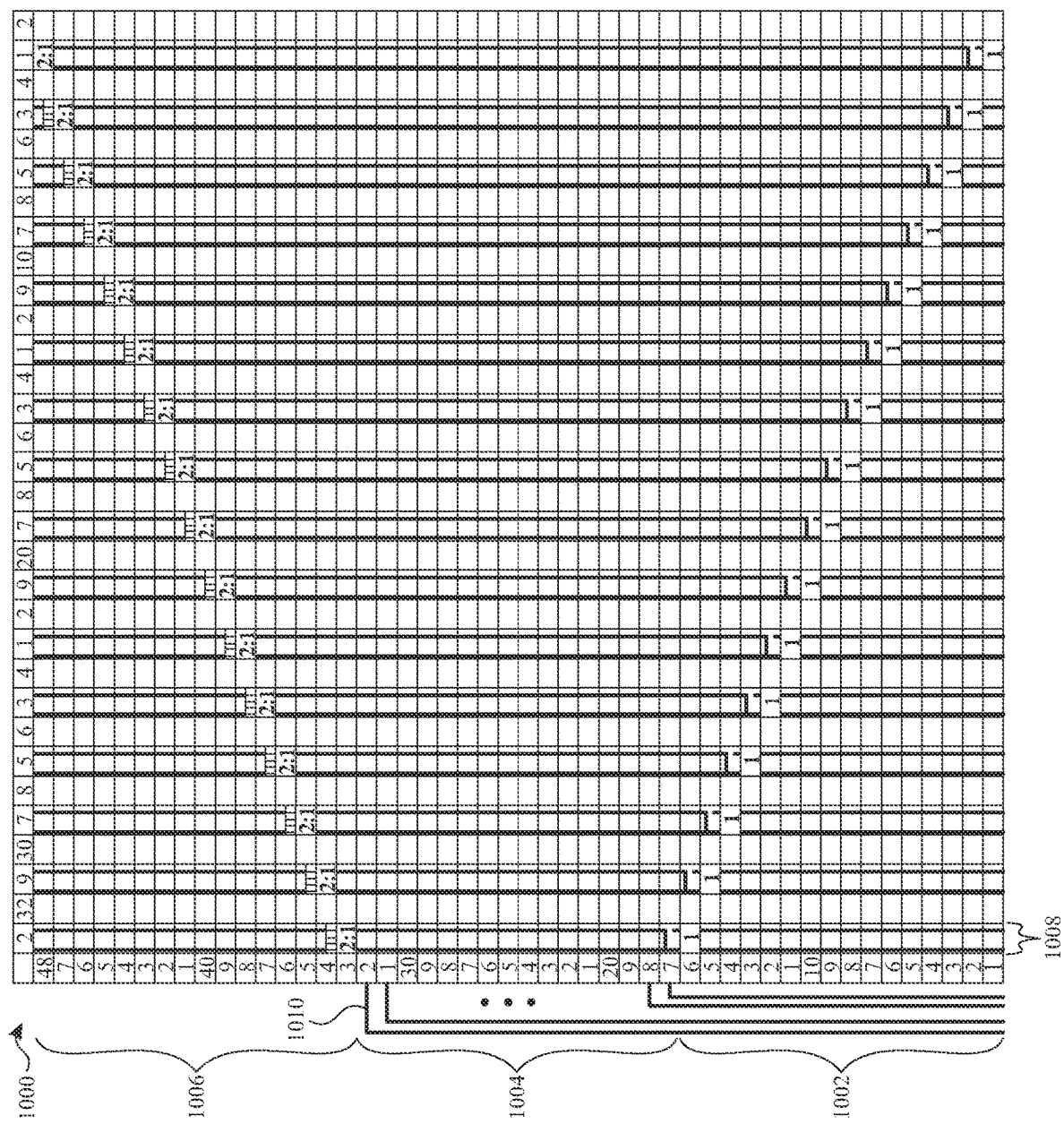

ARCHITECTURE FOR DIFFERENTIAL DRIVE AND SENSE TOUCH TECHNOLOGY

CROSS-REFERENCE TO RELATED APPLICATIONS

This application claims the benefit of U.S. Provisional Application No. 63/261,620, filed Sep. 24, 2021, and U.S. Provisional Application No. 63/364,338, filed May 6, 2022, the contents of which are incorporated herein by reference in their entireties for all purposes.

FIELD OF THE DISCLOSURE

This relates generally to touch sensor panels/screens, and more particularly to touch sensor panels/screens with differential drive and/or sense.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates to touch sensor panels (or touch screens or touch-sensitive surfaces) with improved signal-to-noise ratio (SNR). In some examples, a touch sensor panel can include a two-dimensional array of touch nodes formed from a plurality of touch electrodes. For example, the two-dimensional array of touch nodes can be arranged in rows and columns. Each column (or row) of touch nodes can be driven with a plurality of drive signals. For example, a first drive signal can be applied to first column electrodes within a column of touch nodes and a second drive signal can be applied to second column electrode with the column of touch nodes. Each row (or column) of touch nodes can be sensed by sense circuitry (e.g., differentially). For example, a first row electrode within a row of touch nodes can be coupled to a first input and a second row electrode within the row of touch nodes can be coupled to a second input, such that a first input and second input can be differentially sensed. Differential driving (e.g., using complementary drive signals) and/or differential sensing can reduce noise in the touch and/or display systems of the touch screen.

The column electrodes can be routed vertically (e.g., overlapping the two-dimensional array of touch nodes) to a first edge of the touch sensor panel to couple the column electrodes to drive circuitry. In some examples, row electrodes can be routed from a second edge of the touch sensor panel (e.g., perpendicular to the first edge) in a border region around the two-dimensional array of touch nodes. In some examples, the row electrodes can also be routed vertically (e.g., overlapping the two-dimensional array of touch nodes) to the first edge of the touch sensor panel. In some examples, the routing traces can be formed from metal mesh.

In some examples, a touch sensor panel can be divided into three banks of rows (e.g., more generally for a plurality of banks of rows). In some examples, the routing traces for rows can be implemented using four routing tracks (also referred to herein as a set of one or more routing trace segments) per column for the three banks. In some examples, to improve optical characteristics (e.g., reduce visibility of the metal mesh), the four routing tracks can extend the vertical length of the touch sensor panel (e.g., the length of the column of touch nodes). In some examples, routing traces implemented in the four routing traces using electrical connections and/or discontinuities within the routing tracks can be used to improve characteristics of the routing. For example, a discontinuity in a routing track after an electrical connection to a row electrode can reduce the capacitive loading of a routing trace to the row electrode. The discontinuity can also allow for other routing trace segments within the routing track to be used for another routing trace to reduce the resistance of the routing trace. In some examples, the utilization of the routing tracks for routing traces can be optimized to reduce routing trace resistances.

In some examples, the interconnections between routing traces and row electrodes can have a chevron pattern to reduce maximum routing trace resistance and/or to balance routing trace resistance across the touch sensor panel. In some examples, the interconnections between routing traces and row electrodes can have an S-shape pattern (also referred to as diagonal or zigzag) to reduce row-to-row differences in resistance (and reduce discontinuities in bandwidth for the touch sensor panel). In some examples, the interconnections between routing traces and row electrodes can have a hybrid pattern, in which upper and lower rows can have the diagonal pattern similar to the S-shape pattern, and intermediate rows can have border area routing outside of the area of the two-dimensional array of touch nodes. The hybrid pattern can provide for increased usage of routing tracks for longer routing traces (e.g., most distant from the sensing circuitry).

In some examples, differential sense routing can be implemented to reduce cross-coupling within the touch sensor panel. For example, the routing traces for row electrodes that are used for a differential measurement can be routed in pairs such that cross-coupling becomes common mode and cancels out in the differential measurement. In some examples, staggering the differential drive signals and reduce parasitic signal loss for a differential drive and sense measurement. For example, rather than applying complimentary drive signals to different touch nodes within a column, complimentary drive signals can be applied in an adjacent column. In some examples, the complimentary drive signals can be applied to diagonally adjacent touch nodes.

In some examples, routing traces for a touch sensor panel can be implemented in an active area (at least partially). In some examples, the touch electrodes and routing traces can be implemented using metal mesh in a first metal layer and using bridges in a second metal layer to interconnect conductive segments of the metal mesh forming the touch electrodes. In some examples, the touch electrodes can be implemented using metal mesh in a first metal layer and using bridges in a second metal layer to interconnect conductive segments of the metal mesh forming the touch electrodes, and the routing traces can be implemented using metal mesh in the first metal layer and using metal mesh in the second metal layer. In some examples, the touch electrodes and/or routing traces can be implemented using metal mesh in a first metal layer and using metal mesh in a second metal layer.

In some examples, portions of metal mesh for a touch electrode and/or routing trace overlapping and in parallel between the first metal layer and the second metal layer. In some examples, to improve optical performance, the overlapping, parallel portions can be aligned. In some examples, to improve optical performance, the width of the metal mesh in the first layer can be greater than the width of the metal mesh in the second layer for the overlapping, parallel portions. In some examples, to improve optical performance, the metal mesh in the first metal layer and the metal mesh in the second metal layer for a touch electrode can be non-parallel (e.g., orthogonal), such that overlapping portions can have a substantially uniform area across the touch electrode (e.g., within a threshold such as 2 microns-squared or 1.5 microns-squared).

In some examples, to improve SNR and touch sensor panel bandwidth, a dielectric layer between the first metal layer and the second metal layer can reduce capacitive coupling therebetween (e.g., parallel plate capacitance). For example, the dielectric layer can have an increased thickness and/or a reduced dielectric constant to reduce the capacitive coupling. In some examples, to improve SNR and touch sensor panel bandwidth, the metal mesh in the first metal layer can be flooded, filled or otherwise augmented with a transparent conductive material electrically coupled to the metal mesh (optionally separated from the first metal layer by a dielectric layer).

In some examples, to reduce cross-talk in a non-differential operating mode (e.g., stylus or self-capacitance), routing traces can be disposed in a second metal layer beneath touch electrodes implemented in the first metal layer (and optionally also in the second metal layer). In some examples, to reduce cross-talk in a non-differential operating mode and to improve SNR and touch sensor panel bandwidth, the metal mesh for touch electrodes in the first metal layer can be flooded, filled or otherwise augmented with a transparent conductive material electrically coupled to the metal mesh, without flooding, filling or otherwise augmenting the metal mesh for routing in the first metal layer with the transparent conductive material.

In some examples, a stack-up of a display and touch sensor can include at least one encapsulation layer, over which components of the stack-up are disposed or otherwise formed. Display components formed on a substrate can be covered by a first encapsulation layer formed using either a selective or blanket deposition method (e.g., using an ink-jet printing process). A display-noise shield or sensor can be formed on the first encapsulation layer using an on-cell process. In some examples, the use of the on-cell process can improve alignment of structures of the shield or sensor to the display components (and thereby can improve manufacturing yield for the stack-up).

In some examples, a display-noise sensor can detect signals corresponding to electrical interference from the display components. In such examples, the display-noise sensor can include one or more metal layers that can be patterned such that rows and columns of display-noise sensor electrodes are substantially aligned with rows and columns of the display components. During readout of touch signals at a touch screen formed over the display components, display-noise sensor signals of the display-noise sensor can simultaneously read out and subtracted from the touch signals to reduce or remove electrical interference of the display from the touch signals.

In some examples, a display-noise shield can mitigate signals corresponding to electrical interference from the display components from passing through the stack-up to the touch sensor. In such examples, the display-noise shield can be a layer of metal mesh formed across all the display components (e.g., a global mesh structure). In other examples, the display-noise shield can be a flood of solid transparent conductive material formed across all the display components (e.g., a global fill, or solid metal layer structure). In further examples, the display-noise shield can be a combination layer of metal mesh and solid transparent conductive material, together formed across all the display components (e.g., alternating sections of metal mesh and/or patches of the transparent conductive material).

In some examples, a second encapsulation layer can be formed over the display-noise shield/sensor. In some examples, a dielectric layer can be formed over the second encapsulation layer to mitigate the impact of any parasitic capacitances between the shield/sensor and a touch screen in the stack-up. The second encapsulation layer can be formed using an ink-jet printing deposition process. A touch sensor can be formed above the second encapsulation layer, according to an on-cell manufacturing process (e.g., to improve alignment and/or avoid a lamination of a discrete touch sensor to a display stack-up).

In some examples, readout circuitry can be configured to simultaneously read out touch signals from the touch sensor and signals from the display-noise sensor to produce a noise-corrected touch signal (e.g., to reduce or eliminate electrical interference caused by the display). In some examples, a display-noise shield can be biased to a fixed voltage level (e.g., a ground voltage level, or a non-zero voltage level).

In some examples, a touch electrode architecture for differential drive without differential sense can be implemented. Differential drive can still reduce the touch-to-display noise. The touch electrode architecture for differential drive can simplify the touch electrode architecture design because fewer routing traces and fewer bridges are required compared with some of the differential drive and differential sense touch electrode architectures described herein.

In some examples, one or more touch nodes in a touch electrode architecture each include a differential pair of row electrodes and a differential pair of column electrodes. For example, a touch node can include a portion of first row electrode Rx0+ and a portion of a second row electrode Rx0− (e.g., corresponding to differential inputs for touch sensing), and a portion of a first column electrode Tx0+ and a portion of a second column electrode Tx0− (e.g., corresponding to differential, complimentary outputs of touch driving). The arrangement of the first and second row electrodes and the first and second column electrodes can result in two dominant mutual capacitances that are in-phase. Additionally, because the touch node includes portions of the first and second row electrodes and the first and second column electrodes, the differential cancelation occurs on a per touch node basis rather than across two touch nodes. Additionally, the non-dominant (minor) parasitic capacitance can be reduced by reducing routing lengths and increasing separation between electrodes that generate parasitic mutual capacitances.

In some examples, the touch electrode architecture includes fully differentially interleaved row and column electrodes within a touch node. In some examples, the touch electrode architecture differential for row (or column) electrodes and pseudodifferential for column (or row) electrodes.

In some examples, common mode noise can be reduced using spatial separation and spatial filtering. The spatial separation between touch signal and common mode noise signal can be achieved using a touch electrode architecture with reduced pitch for the transmitter and receiver electrodes.

BRIEF DESCRIPTION OF THE DRAWINGS

FIGS. 8-10 illustrate different routing patterns for row electrodes according to examples of the disclosure.

DETAILED DESCRIPTION

Figure 1A:
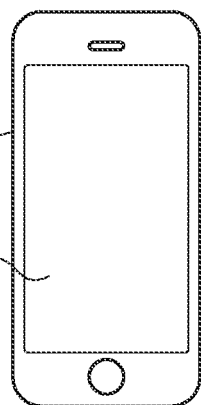
FIGS. 1A-1E illustrate example systems that can include a touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch sensor panels (or touch screens or touch-sensitive surfaces) with improved signal-to-noise ratio (SNR). In some examples, a touch sensor panel can include a two-dimensional array of touch nodes formed from a plurality of touch electrodes. For example, the two-dimensional array of touch nodes can be arranged in rows and columns. Each column (or row) of touch nodes can be driven with a plurality of drive signals. For example, a first drive signal can be applied to first column electrodes within a column of touch nodes and a second drive signal can be applied to second column electrode with the column of touch nodes. Each row (or column) of touch nodes can be sensed by sense circuitry (e.g., differentially). For example, a first row electrode within a row of touch nodes can be coupled to a first input and a second row electrode within the row of touch nodes can be coupled to a second input, such that a first input and second input can be differentially sensed. Differential driving (e.g., using complementary drive signals) and/or differential sensing can reduce noise in the touch and/or display systems of the touch screen.

The column electrodes can be routed vertically (e.g., overlapping the two-dimensional array of touch nodes) to a first edge of the touch sensor panel to couple the column electrodes to drive circuitry. In some examples, row electrodes can be routed from a second edge of the touch sensor panel (e.g., perpendicular to the first edge) in a border region around the two-dimensional array of touch nodes. In some examples, the row electrodes can also be routed vertically (e.g., overlapping the two-dimensional array of touch nodes) to the first edge of the touch sensor panel. In some examples, the routing traces can be formed from metal mesh.

In some examples, a touch sensor panel can be divided into three banks of rows (e.g., more generally for a plurality of banks of rows). In some examples, the routing traces for rows can be implemented using four routing tracks (also referred to herein as a set of one or more routing trace segments) per column for the three banks. In some examples, to improve optical characteristics (e.g., reduce visibility of the metal mesh), the four routing tracks can extend the vertical length of the touch sensor panel (e.g., the length of the column of touch nodes). In some examples, routing traces implemented in the four routing traces using electrical connections and/or discontinuities within the routing tracks can be used to improve characteristics of the routing. For example, a discontinuity in a routing track after an electrical connection to a row electrode can reduce the capacitive loading of a routing trace to the row electrode. The discontinuity can also allow for other routing trace segments within the routing track to be used for another routing trace to reduce the resistance of the routing trace. In some examples, the utilization of the routing tracks for routing traces can be optimized to reduce routing trace resistances.

In some examples, the interconnections between routing traces and row electrodes can have a chevron pattern to reduce maximum routing trace resistance and/or to balance routing trace resistance across the touch sensor panel. In some examples, the interconnections between routing traces and row electrodes can have an S-shape pattern (also referred to as diagonal or zigzag) to reduce row-to-row differences in resistance (and reduce discontinuities in bandwidth for the touch sensor panel). In some examples, the interconnections between routing traces and row electrodes can have a hybrid pattern, in which upper and lower rows can have the diagonal pattern similar to the S-shape pattern, and intermediate rows can have border area routing outside of the area of the two-dimensional array of touch nodes. The hybrid pattern can provide for increased usage of routing tracks for longer routing traces (e.g., most distant from the sensing circuitry).

In some examples, differential sense routing can be implemented to reduce cross-coupling within the touch sensor panel. For example, the routing traces for row electrodes that are used for a differential measurement can be routed in pairs such that cross-coupling becomes common mode and cancels out in the differential measurement. In some examples, staggering the differential drive signals and reduce parasitic signal loss for a differential drive and sense measurement. For example, rather than applying complimentary drive signals to different touch nodes within a column, complimentary drive signals can be applied in an adjacent column. In some examples, the complimentary drive signals can be applied to diagonally adjacent touch nodes.

In some examples, routing traces for a touch sensor panel can be implemented in an active area (at least partially). In some examples, the touch electrodes and routing traces can be implemented using metal mesh in a first metal layer and using bridges in a second metal layer to interconnect conductive segments of the metal mesh forming the touch electrodes. In some examples, the touch electrodes can be implemented using metal mesh in a first metal layer and using bridges in a second metal layer to interconnect conductive segments of the metal mesh forming the touch electrodes, and the routing traces can be implemented using metal mesh in the first metal layer and using metal mesh in the second metal layer. In some examples, the touch electrodes and/or routing traces can be implemented using metal mesh in a first metal layer and using metal mesh in a second metal layer.

In some examples, portions of metal mesh for a touch electrode and/or routing trace overlapping and in parallel between the first metal layer and the second metal layer. In some examples, to improve optical performance, the overlapping, parallel portions can be aligned. In some examples, to improve optical performance, the width of the metal mesh in the first layer can be greater than the width of the metal mesh in the second layer for the overlapping, parallel portions. In some examples, to improve optical performance, the metal mesh in the first metal layer and the metal mesh in the second metal layer for a touch electrode can be non-parallel (e.g., orthogonal), such that overlapping portions can have a substantially uniform area across the touch electrode (e.g., within a threshold such as 2 microns-squared or 1.5 microns-squared).

In some examples, to improve SNR and touch sensor panel bandwidth, a dielectric layer between the first metal layer and the second metal layer can reduce capacitive coupling therebetween (e.g., parallel plate capacitance). For example, the dielectric layer can have an increased thickness and/or a reduced dielectric constant to reduce the capacitive coupling. In some examples, to improve SNR and touch sensor panel bandwidth, the metal mesh in the first metal layer can be flooded, filled or otherwise augmented with a transparent conductive material electrically coupled to the metal mesh (optionally separated from the first metal layer by a dielectric layer).

In some examples, to reduce cross-talk in a non-differential operating mode (e.g., stylus or self-capacitance), routing traces can be disposed in a second metal layer beneath touch electrodes implemented in the first metal layer (and optionally also in the second metal layer). In some examples, to reduce cross-talk in a non-differential operating mode and to improve SNR and touch sensor panel bandwidth, the metal mesh for touch electrodes in the first metal layer can be flooded, filled or otherwise augmented with a transparent conductive material electrically coupled to the metal mesh, without flooding, filling or otherwise augmenting the metal mesh for routing in the first metal layer with the transparent conductive material. In some examples, the first metal layer can be flooded with transparent conductive material and the transparent conductive material can be etched away from the routing traces in the first metal layer.

In some examples, a touch electrode architecture for differential drive without differential sense can be implemented. Differential drive can still reduce the touch-to-display noise. The touch electrode architecture for differential drive can simplify the touch electrode architecture design because fewer routing traces and fewer bridges are required compared with some of the differential drive and differential sense touch electrode architectures described herein.

In some examples, one or more touch nodes in a touch electrode architecture each include a differential pair of row electrodes and a differential pair of column electrodes. For example, a touch node can include a portion of first row electrode Rx0+ and a portion of a second row electrode Rx0− (e.g., corresponding to differential inputs for touch sensing), and a portion of a first column electrode Tx0+ and a portion of a second column electrode Tx0− (e.g., corresponding to differential, complimentary outputs of touch driving). The arrangement of the first and second row electrodes and the first and second column electrodes can result in two dominant mutual capacitances that are in-phase. Additionally, because the touch node includes portions of the first and second row electrodes and the first and second column electrodes, the differential cancelation occurs on a per touch node basis rather than across two touch nodes. Additionally, the non-dominant (minor) parasitic capacitance can be reduced by reducing routing lengths and increasing separation between electrodes that generate parasitic mutual capacitances.

In some examples, the touch electrode architecture includes fully differentially interleaved row and column electrodes within a touch node. In some examples, the touch electrode architecture differential for row (or column) electrodes and pseudodifferential for column (or row) electrodes.

In some examples, common mode noise can be reduced using spatial separation and spatial filtering. The spatial separation between touch signal and common mode noise signal can be achieved using a touch electrode architecture with reduced pitch for the transmitter and receiver electrodes.

Figure 1B:
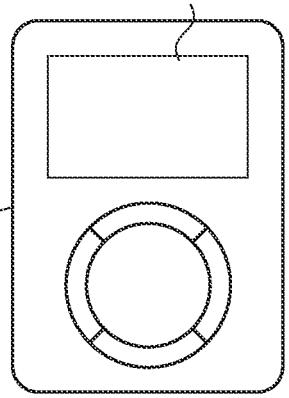
Figure 1C:
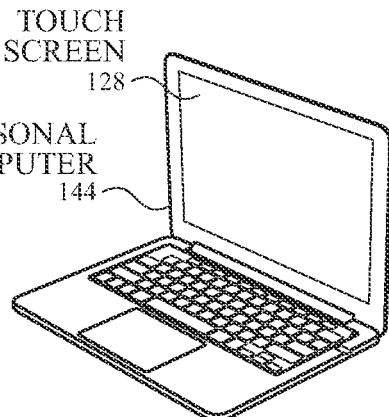
Figure 1D:
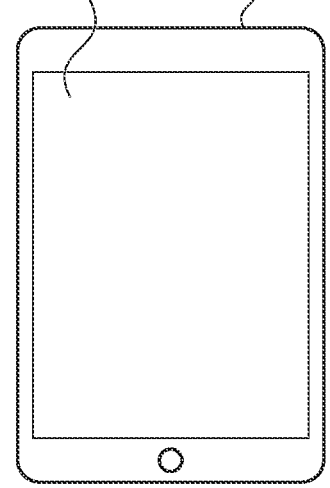
Figure 1E:
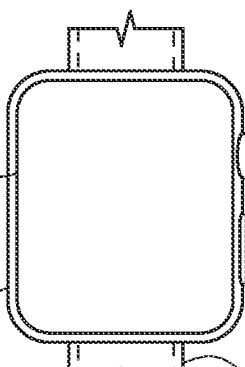

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
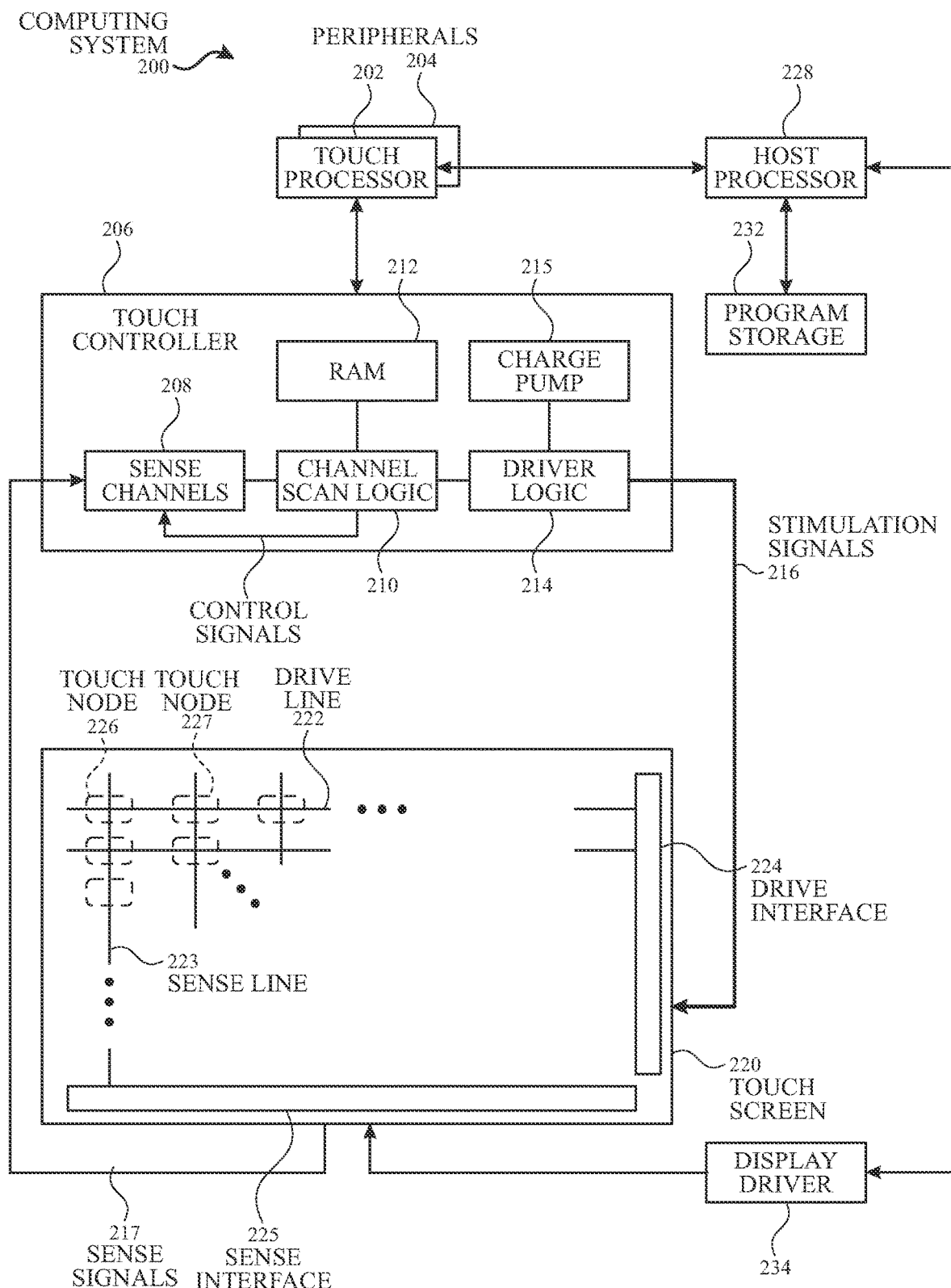
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (POLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
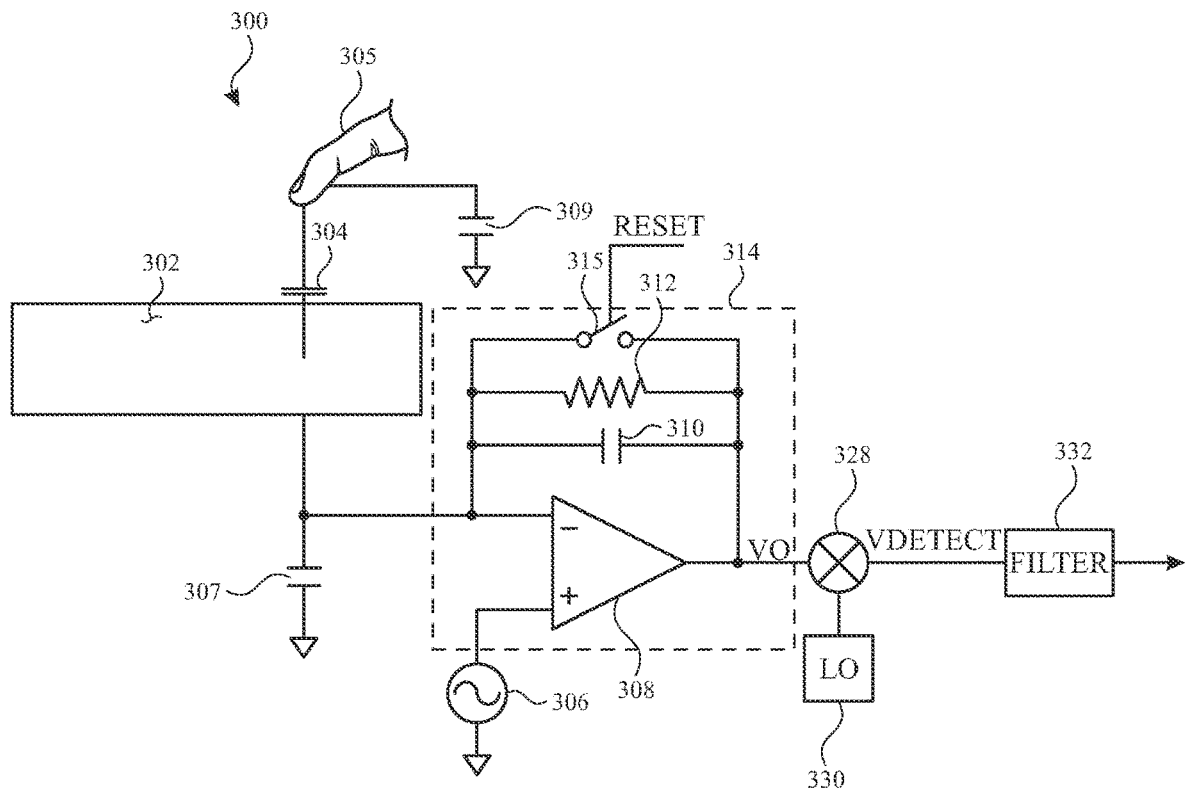
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
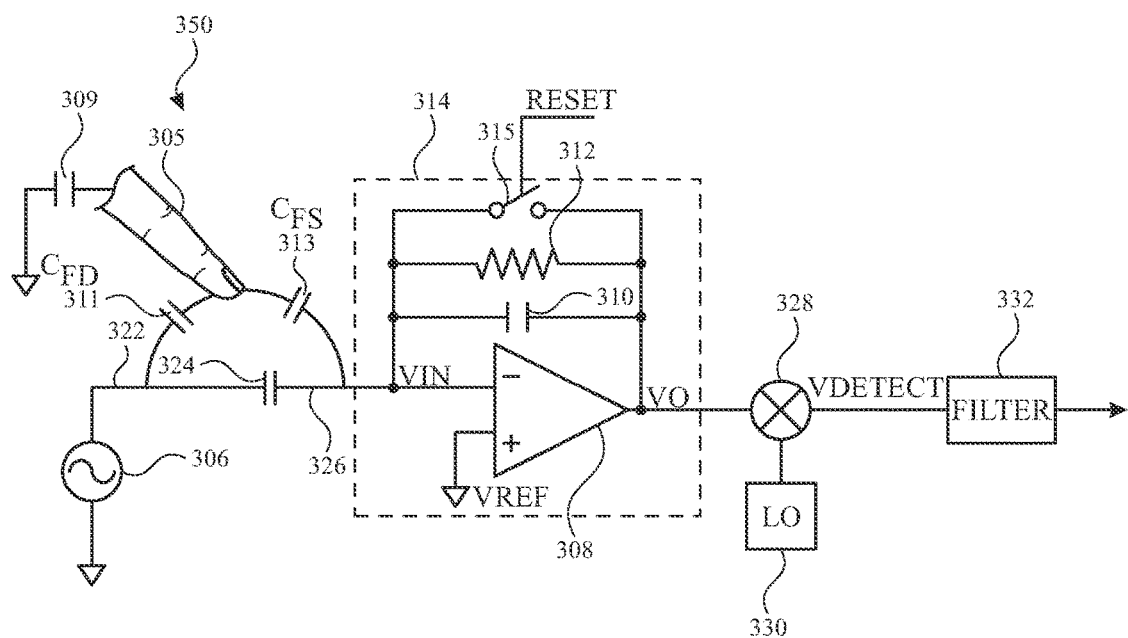
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease) (e.g., due to capacitive coupling indicated by capacitances $C_{FD}$ 311 and $C_{FS}$ 313, which can be formed between drive line 322, finger 305 and sense line 326). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
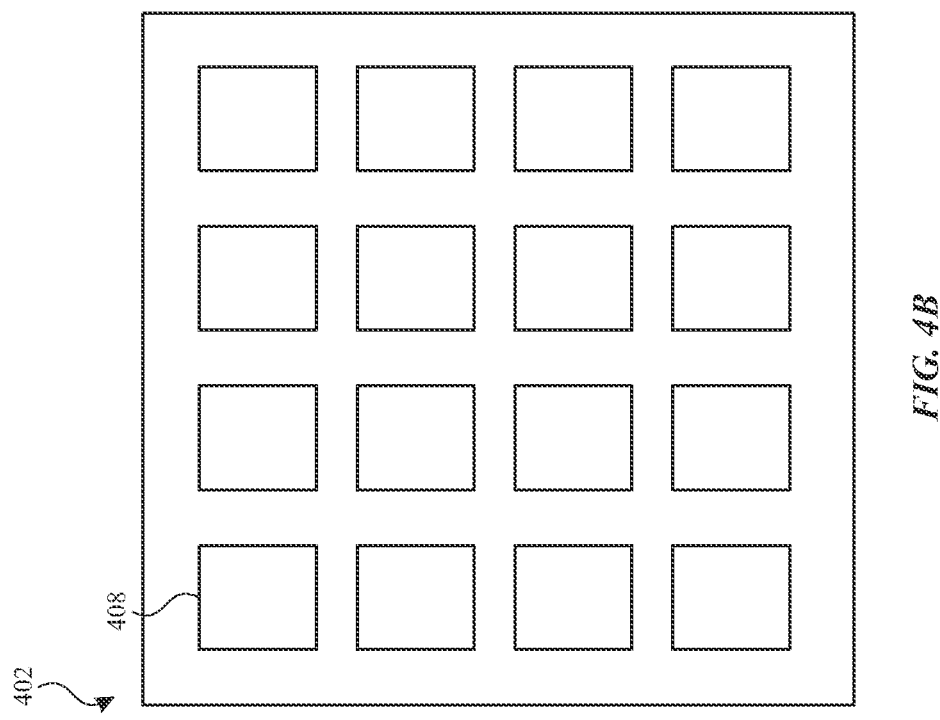
FIG. 4B illustrates touch screen with touch node electrodes arranged in a pixelated touch node electrode configuration according to examples of the disclosure.
Figure 4A:
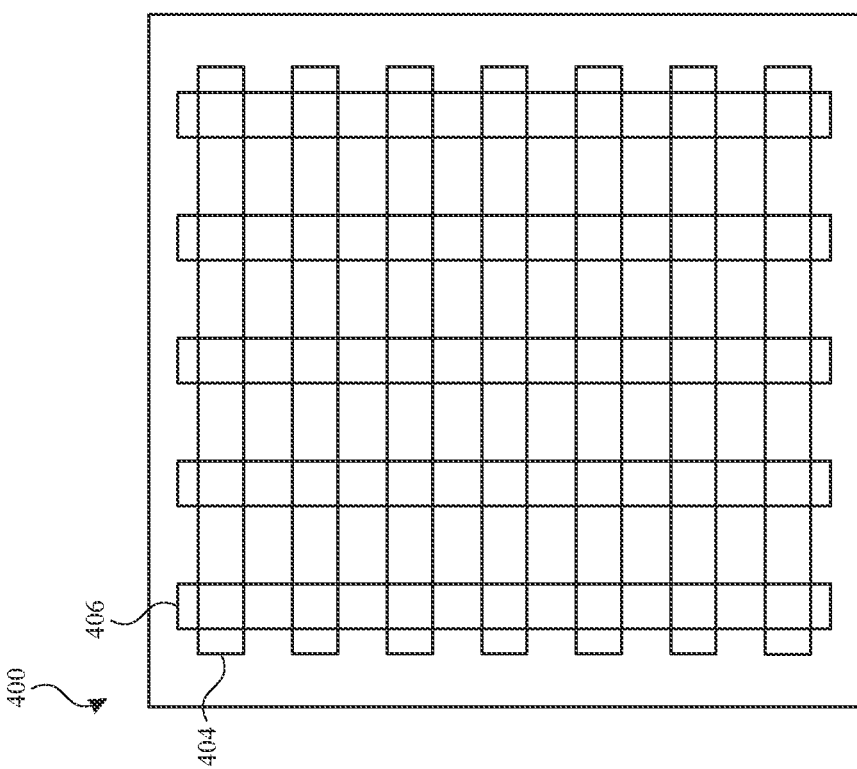
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

Although FIG. 4A illustrates touch electrodes 404 and touch electrodes 406 as rectangular electrodes, in some examples, other shapes and configurations are possible for row and column electrodes. For example, in some examples, some or all row and column electrodes can be formed from multiple touch electrodes formed on one side of substrate from a transparent (partially or fully) semiconductor material. The touch electrodes of a particular row or column can be interconnected by coupling segments and/or bridges. Row and column electrodes formed in a layer on the same side of a substrate can be referred to herein as a single-sided sensor. As described in more detail below, row and column electrodes can have other shapes. Additionally, although primarily described in terms of a row-column configuration, it is understood that in some examples, the same principles can be applied to two-axis array of touch nodes in a non-rectilinear arrangement.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Figure 5:
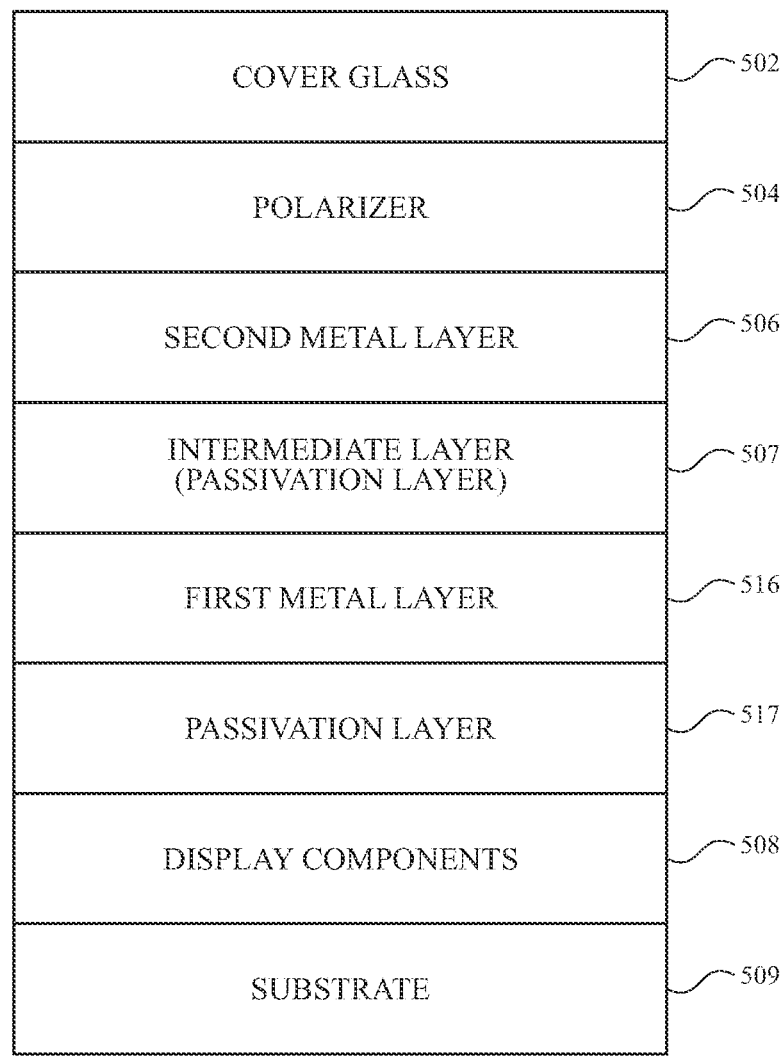
FIG. 5 illustrates an example touch screen stack-up including a metal mesh layer according to examples of the disclosure.

In some examples, some or all of the touch electrodes of a touch screen can be formed from a metal mesh in one or more layers. FIG. 5 illustrates an example touch screen stack-up including a metal mesh layer according to examples of the disclosure. Touch screen 500 can include a substrate 509 (e.g., a printed circuit board) upon which display components 508 (e.g., LEDs or other light emitting components and circuitry) can be mounted. In some examples, the display components 508 can be partially or fully embedded in substrate 509 (e.g., the components can be placed in depressions in the substrate). Substrate 509 can include routing traces in one or more layers to route the display components (e.g., LEDs) to display driving circuitry (e.g., display driver 234). The stack-up of touch screen 500 can also include one or more passivation layers deposited over the display components 508. For example, the stack-up of touch screen 500 illustrated in FIG. 5 can include an intermediate layer/passivation layer 507 (e.g., transparent epoxy), between first metal layer 516 and second metal layer 506, and passivation layer 517. Passivation layers 507 and 517 can planarize the surface for respective metal mesh layers. Additionally, the passivation layers can provide electrical isolation (e.g., between metal mesh layers and between the LEDs and a metal mesh layer). Metal mesh layer 516 (e.g., copper, silver, etc.) can be deposited on the planarized surface of the passivation layer 517 over the display components 508, and metal mesh layer 506 (e.g., copper, silver, etc.) can be deposited on the planarized surface of passivation layer 507. In some examples, the passivation layer 517 can include material to encapsulate the display components to protect them from corrosion or other environmental exposure. Metal mesh layer 506 and/or metal mesh layer 516 can include a pattern of conductor material in a mesh pattern. In some examples, metal mesh layer 506 and metal mesh layer 516 can be coupled by one or more vias (e.g., through intermediate layer/passivation layer 507. Additionally, although not shown in FIG. 5, a border region around the display active area can include metallization (or other conductive material) that may or may not be a metal mesh pattern. In some examples, metal mesh is formed of a non-transparent material, but the metal mesh wires are sufficiently thin and sparse to appear transparent to the human eye. The touch electrodes (and some routing) as described herein can be formed in the metal mesh layer(s) from portions of the metal mesh. In some examples, polarizer 504 can be disposed above the metal mesh layer 506 (optionally with another planarization layer disposed over the metal mesh layer 506). Cover glass (or front crystal) 502 can be disposed over polarizer 504 and form the outer surface of touch screen 500. It is understood that although two metal mesh layers (and two corresponding planarization layers) are illustrated, in some examples more or fewer metal mesh layers (and corresponding planarization layers) can be implemented. Additionally, it is understood that in some examples, display components 508, substrate 509 and/or passivation layer 517 can be replaced by a thin-film transistor (TFT) LCD display (or other types of displays), in some examples. Additionally, it is understood that polarizer 504 can include one or more transparent layers including a polarizer, adhesive layers (e.g., optically clear adhesive) and protective layers.

As described herein, in some examples, touch electrodes of the touch screen can be differentially driven and/or differentially sensed. Differential driving and differential sensing can reduce noise in the touch and/or display systems of the touch screen that may arise due to the proximity of the touch system to the display system. For example, the touch screen may include touch electrodes that are disposed partially or entirely over the display (e.g., a touch sensor panel laminated to a display, or otherwise integrated on or in the display stack-up), or otherwise in proximity to the display. For example, touch electrodes (e.g., formed of metal mesh) may capacitive couple with display electrodes (e.g., cathode electrodes), which can result in display operation injecting noise into the touch electrodes (e.g., reducing the touch sensing performance). Additionally, touch operation (e.g., stimulating touch electrodes) can result in injecting noise in the display (e.g., introducing image artifacts). Differential driving and differential sensing can cause most noise coupled into the sensing circuitry due to the display to be common mode and the common mode noise can be rejected by the differential sensing circuitry. Likewise, the differential driving can reduce local imbalance on display electrodes from touch electrodes. Thus, differential driving can cause the cathode of the display to shield the display from the touch operation, which can lower injected noise into the display system (and/or allow for more headroom to increase the amplitude of drive signals compared with a non-differential driving scheme).

As described herein, differential driving refers to concurrently driving a first of two drive electrodes with a first stimulation signal (e.g., a sine wave, a square wave, etc.) and a second of two drive electrodes with a second stimulation signal that is 180 degrees out of phase with the first stimulation signal (e.g., an inverted sine wave, an inverted square wave, etc.). In some examples, the first and second stimulation signals can be driven by a differential driving circuit. In some examples, the first and second stimulation signals can be driven by two single-ended driving circuits. Differential driving can be extended for more than two drive electrodes such that for N concurrently driven drive electrodes, one half of the drive electrodes can be concurrently driven with a first set of stimulation signals and the other half of the drive electrodes can be concurrently driven with a second set of stimulation signals complimentary to the first set (e.g., an inverted version of the first set). As described herein, differential sensing refers to sensing two sense electrodes differentially. For example, a first of the two sense electrodes can be input into a first terminal of a differential amplifier (e.g., the inverting input) and a second of the two sense electrodes can be input into a second terminal of the differential amplifier (e.g., the non-inverting input). In some examples, the differential sensing can be implemented with two single-ended amplifiers (e.g., sensing circuit 314) each sensing one sense electrode and two ADCs configured to convert the outputs of the two single-ended amplifier to a digital output. The differential can be computed between the digital outputs of the two amplifiers (e.g., in the analog or digital domain). In some examples, using differential amplifiers (rather than two single-ended amplifiers) may provide improved input referred noise for the differential part of the signal (removing common mode noise, and reducing the dynamic range). In some examples, using single-ended amplifiers (rather than a differential amplifiers) may provide output representative of common mode noise that may be useful for the system.

Figure 6A:
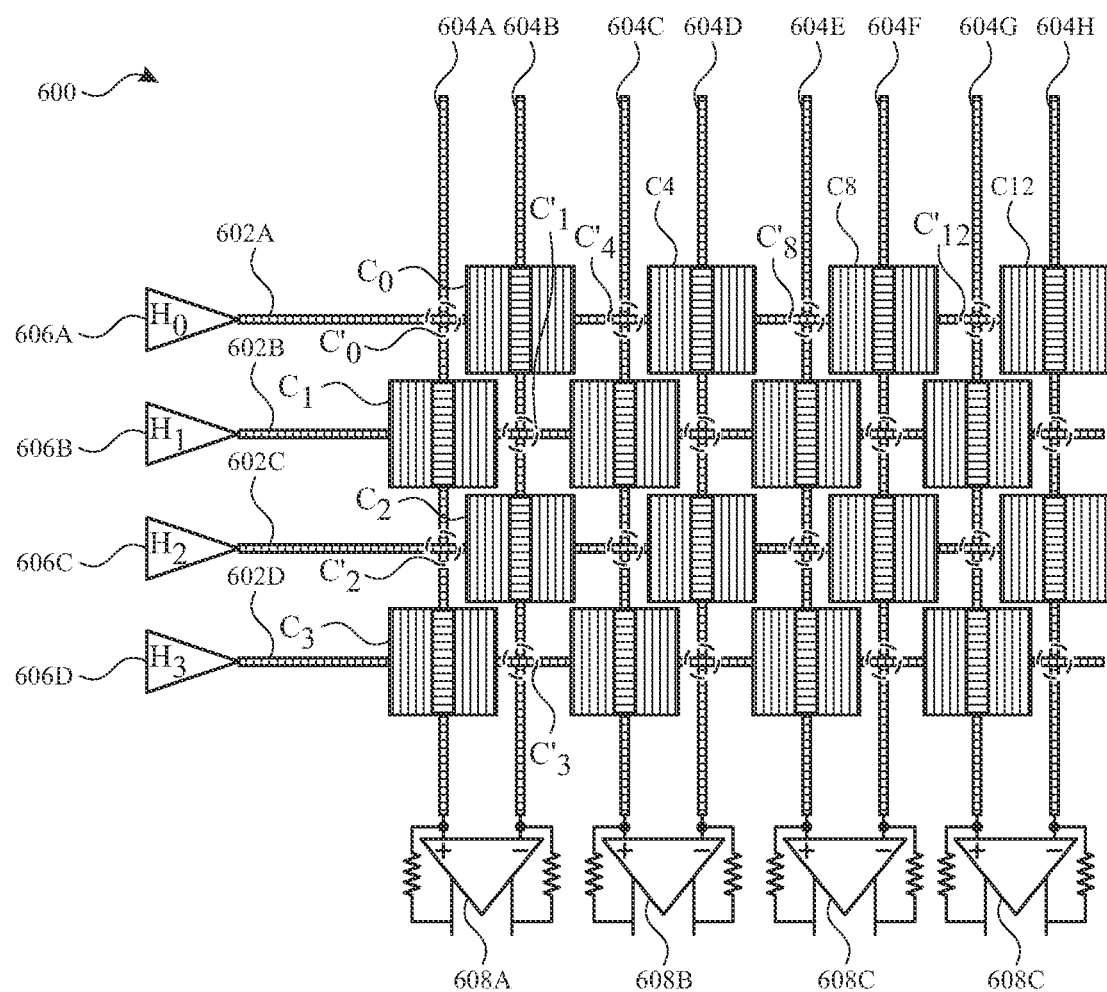
FIG. 6A illustrates a symbolic representation of a touch sensor panel implementing differential sensing according to examples of the disclosure.

FIG. 6A illustrates a symbolic representation of a touch sensor panel implementing differential sensing according to examples of the disclosure. FIG. 6A illustrates a touch sensor panel 600 including row electrodes 602A-602D (also referred to as drive electrodes or lines) and column electrodes 604A-604H (also referred to as sense electrodes or lines). Touch sensor panel 600 can also include drive circuitry (e.g., drivers/transmitters 606A-606D that can correspond to driver logic 214) configured to drive row electrodes 602A-602D and sense circuitry (e.g., differential amplifiers 608A-608D that can correspond to a part of sense channels 208) configured to sense column electrodes 604A-604H. It should be understood that although the terms "row" and "column" may be used throughout this disclosure in conjunction with figures showing row and column arrangements, these terms are used for convenience of explanation, and actual orientations can be interchanged in accordance with examples of the disclosure.

In particular, touch sensor panel 600 illustrates a touch sensor panel with four row electrodes 602A-602D and eight column electrodes 604A-604H. Each driver/transmitter 606A-606D can be coupled to a respective one of the row electrodes 602A-602D (e.g., driver/transmitter 606A can be coupled to row electrode 602A, driver/transmitter 606B can be coupled to row electrode 602B, etc.). Each differential amplifier 608A-608D can be coupled to a respective pair of the column electrodes 604A-604H (e.g., differential amplifier 608A can be coupled to column electrodes 604A-604B, differential amplifier 608B can be coupled to column electrodes 604C-604D, etc.). The differential amplifiers 608A-608D can each include a common mode feedback circuit (e.g., including resistive and/or capacitive circuit elements) to keep the inputs at virtual ground. A first column electrode of the respective pair of column electrodes can be coupled to an inverting terminal of corresponding differential amplifier and a second column electrode of the respective pair of column electrodes can be coupled to the non-inverting terminal of the corresponding differential amplifier.

Touch sensor panel 600 can be driven and sensed to detect sixteen capacitance values. Technically, a mutual capacitance (electrostatic fringe field) may be formed between the intersection (or adjacency) of each row electrode and each column electrode. For example, a first mutual capacitance, $C'_0$, can be formed between row electrode 602A and column electrode 604A and a second mutual capacitance, $C_0$, can be formed between row electrode 602A and column electrode 604B. However, as represented in FIG. 6A, the amount of conductive material at some of the intersections (or adjacencies) of row electrodes and column electrodes may be smaller than the amount of conductive material at the intersections (or adjacencies) of other row electrodes. For example, as represented in FIG. 6A, the amount of conductive material at the intersection of row electrode 602A and column electrode 604A can be less than the amount of conductive material at the intersection of row electrode 602A and column electrode 604B. As a result, the mutual capacitance (electrostatic fringe field) of the former can be relatively negligible with respect to the latter, such that the mutual capacitance of the former can be essentially ignored, in some examples. (In some examples, the relatively negligible capacitance can be reduced by increasing the distance between certain portions of the row and column electrodes and or electrically isolating certain portions of the row and column electrodes.) For example, the mutual capacitance between row electrode 602A and column electrode 604A ($C'_0$) can be relatively small compared with the mutual capacitance between row electrode 602A and column electrode 604B ($C_0$) or the mutual capacitance of row electrode 602B and column electrode 604A ($C_1$).

For each respective driver and a respective differential sense amplifier in FIG. 6A, one of the mutual capacitances can be a dominant (or major) mutual capacitance and one of the mutual capacitances can be a minor mutual capacitance (where the mutual capacitance/electrostatic fringe field can be a function of the amount of conductive material and arrangement of conductive material). In some examples, the dominant mutual capacitance can correspond to fringe field coupling above a threshold for the respective driver/differential amplifier (e.g., above 80%, 85%, 90%, 95%, etc.) and the minor mutual capacitance can correspond to fringe field coupling below a threshold for the respective driver/differential amplifier (e.g., below 20%, 15%, 10%, 5%, etc.). Thus, the sixteen values measured for touch sensor panel 600 can represent the dominant mutual capacitances by virtue of the pattern of conductive material for the row electrodes and column electrodes. For example, $C_0$ can represent a dominant mutual capacitance between row electrode 602A and column electrode 604B, $C_1$ can represent a dominant mutual capacitance between row electrode 602B and column electrode 604A, $C_2$ can represent a dominant mutual capacitance between row electrode 602C and column electrode 604B, and $C_3$ can represent a dominant mutual capacitance between row electrode 602D and column electrode 604A. Each of these dominant mutual capacitances can represent an effective touch node for the touch sensor panel. In some examples, the "effective touch node" described herein can be alternatively referred to as the "touch node" because it can represent the dominant mutual capacitance for the region of the touch sensor panel.

The dominant mutual capacitance (relatively high electrostatic fringe field) and minor mutual capacitances (relatively low electrostatic fringe field) can be spatially alternating, in some examples. The spatially alternating can appear along one or both dimensions. For example, for driver 606A/row electrode 602A, dominant capacitances $C_0$, $C_4$, $C_8$, $C_{12}$ (formed with column electrode 604B, 604D, 604F, 604H and the inverting terminal of differential amplifiers 608A-608D) can alternate spatially with minor capacitances $C'_0$, $C'_4$, $C'_8$, $C'_{12}$. For the remaining drivers/row electrodes, the dominant and minor capacitances can alternate spatially as well. For the inverting terminal of differential amplifier 608A/column electrode 604B, dominant capacitances $C_0$ and $C_2$ (formed with row electrode 602A and 602C and corresponding driver 606A and 606C) can alternate spatially with minor capacitances $C'_1$ and $C'_3$. For the non-inverting terminal of differential amplifier 608A/column electrode 604A, dominant capacitances $C_1$ and $C_3$ (formed with row electrode 602B and 602D and corresponding driver 606B and 606D) can alternate spatially with minor capacitances $C'_0$ and $C'_2$. For the remaining differential amplifier/column electrodes, the dominant and minor capacitances can alternate spatially as well.

During operation, row electrodes 602A-602D can be stimulated with a multi-stimulus pattern of drive signals (H0-H3), and column electrodes 604A-604D can be differentially sensed using differential amplifiers 608A-608D. For example, the multi-stimulus pattern can be a Hadamard matrix (e.g., a 4×4 matrix including "1" and "−1" values, indexed to driver and drive step) applied to a common stimulation signal (e.g., a sine wave, a square wave, etc.) to encode the drive signals. The multi-stimulus pattern can allow for the dominant mutual capacitances to be measured and decoded based on the multi-stimulus drive pattern. Differentially sensing the column electrodes can remove common mode noise from the touch measurements. It should be understood that although touch sensor panel 600 includes sixteen dominant capacitance values (e.g., corresponding to sixteen touch nodes in a 4×4 array), that the touch sensor panel can be scaled up or down to include fewer or more touch nodes.

Figure 6B:
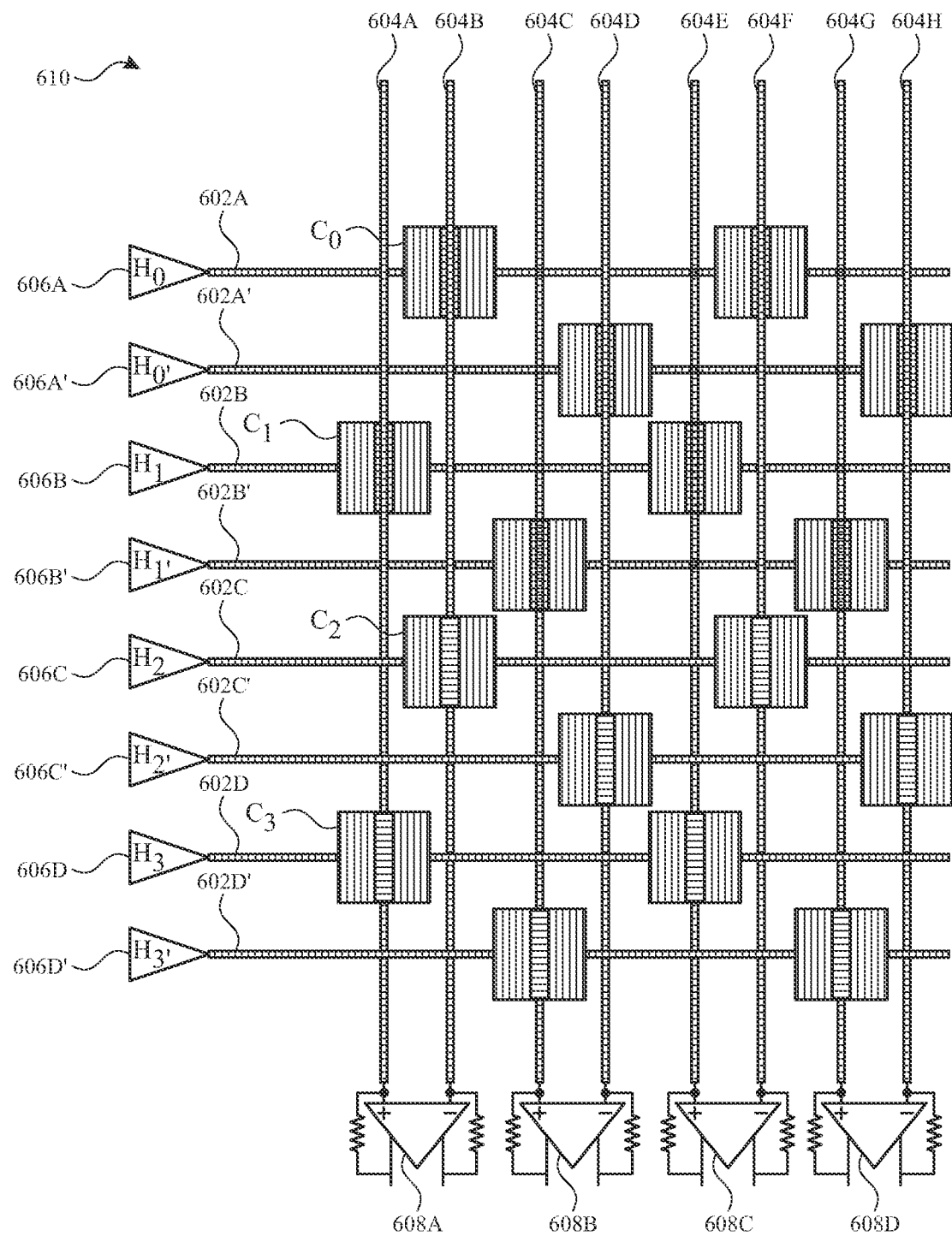
FIG. 6B illustrates a symbolic representation of a touch sensor panel implementing differential driving and differential sensing according to examples of the disclosure.

In some examples, to reduce noise and thereby improve signal-to-noise ratio (SNR), touch sensor panel 600 can be modified to implement differential driving. For example, rather than implementing one drive line per row of effective touch nodes, two drive lines can be used per row of effective touch nodes. FIG. 6B illustrates a symbolic representation of a touch sensor panel implementing differential driving and differential sensing according to examples of the disclosure. FIG. 6B illustrates a touch sensor panel 510 including row electrodes 602A-602D and row electrodes 602A'-602D' (eight row electrodes) and column electrodes 604A-604H (eight column electrodes). Touch sensor panel 600 can also include drive circuitry (e.g., drivers/transmitters 606A-606D and drivers/transmitters 606A'-606D') configured to drive row electrodes 602A-602D and 602A'-602D' and sense circuitry (e.g., differential amplifiers 608A-608D) configured to sense column electrodes 604A-604H.

Each driver/transmitter 606A-606D, 606A'-606D' can be coupled to a respective one of the row electrodes 602A-602D, 602A'-602D' and each differential amplifier 608A-608D can be coupled to a respective pair of the column electrodes 604A-604H. Despite doubling the row electrodes compared with touch sensor panel 600, touch sensor panel 510 can be driven and sensed to detect sixteen dominant mutual capacitance values (represented in FIG. 6A by the relatively large amount of conductive material of some row electrodes and column electrodes). The sixteen dominant mutual capacitance values can represent a 4×4 array of touch nodes for the touch sensor panel. During operation, row electrodes 602A-602D and row electrodes 602A'-602D' can be stimulated with a multi-stimulus pattern of drive signals (H0-H3 and H0'-H3'), and column electrodes 604A-604D can be differentially sensed using differential amplifiers 608A-608D. In some examples, the multi-stimulus pattern can be two orthogonal Hadamard matrices (e.g., each a 4×4 matrix including "1" and "−1" values, indexed to driver and drive step) applied to a common stimulation signal (e.g., a sine wave, a square wave, etc.) to encode the drive signals. In some examples, the multi-stimulus pattern can be one Hadamard matrix and its complimentary signals (180 degrees out of phase) applied to a common stimulation signal (e.g., a sine wave, a square wave, etc.) to encode the drive signals. The multi-stimulus pattern can allow for the dominant mutual capacitances to be measured and decoded based on the multi-stimulus drive pattern. Differentially sensing the column electrodes can remove common mode noise from the touch measurements. It should be understood that although touch sensor panel 510 includes sixteen dominant capacitance values (e.g., corresponding to sixteen touch nodes), that the touch sensor panel can be scaled up or down to include fewer or more touch nodes.

As described with respect to FIG. 6A, the dominant mutual capacitance (relatively high electrostatic fringe field) and minor mutual capacitances (relatively low electrostatic fringe field) can be spatially patterned in FIG. 6B. In some examples, the spatial alternating can appear along one or both dimensions. For example, for driver 606A/row electrode 602A, dominant capacitances can be formed at intersections with column electrodes 604B and 604F, with minor capacitances formed at the remaining intersections with columns electrodes 604A, 604C-604E, 604G and 604H. In a similar manner, driver 606B/row electrode 602A', dominant capacitances can be formed at intersections with column electrodes 604D and 604H, with minor capacitances formed at the remaining intersections with columns electrodes 604A-604C and 604E-604G. The spatial pattern of dominant and minor capacitances can repeat for the remaining rows. For the inverting terminal of differential amplifier 608A/column electrode 604B, dominant capacitances $C_0$ and $C_2$ can be formed at intersections with row electrode 602A and 602C and corresponding driver 606A and 606C, with minor capacitances at the remaining intersections for column electrode 604B. For the non-inverting terminal of differential amplifier 608A/column electrode 604A, dominant capacitances $C_1$ and $C_3$ can be formed at intersections with row electrode 602B and 602D, with minor capacitances at the remaining intersections for column electrode 604A. The spatial pattern of dominant and minor capacitances can repeat for the remaining columns. Thus, along the rows and along the columns, the dominant capacitances can be spatially separated from each other by three minor capacitances in the spatial pattern of FIG. 6B.

Figure 7A:
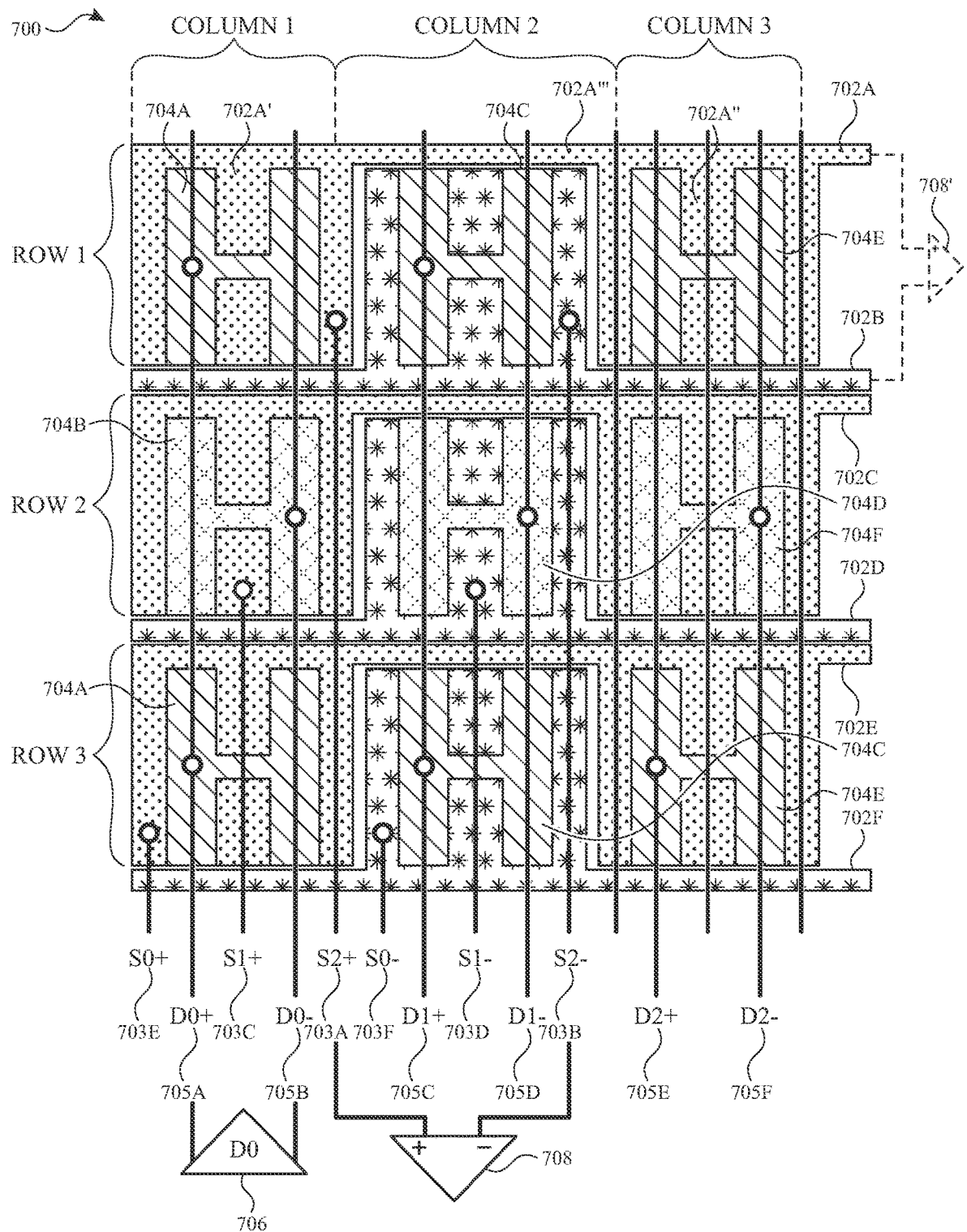
FIG. 7A illustrates a portion of a touch sensor panel that can be used to implementing differential driving and/or differential sensing according to examples of the disclosure.

FIG. 7A illustrates a portion of a touch sensor panel that can be used to implementing differential driving and/or differential sensing according to examples of the disclosure. Touch sensor panel 700 can have mutual capacitance/electrostatic fringe field coupling with a spatial pattern, in a manner similar to described above with respect to FIG. 5B. FIG. 7A illustrates a touch sensor panel 700 including row electrodes 702A-702F and column electrodes 704A-704F. Touch sensor panel 700 can also include drive circuitry (e.g., drivers/transmitter that can correspond to driver logic 214 or drivers/transmitter 606A-606D') configured to drive column electrodes 704A-704F and sense circuitry (e.g., differential amplifiers including common mode feedback circuits that can correspond to a part of sense channels 208 or differential amplifiers 608A-608D) configured to sense row electrodes 702A-702F. In particular, FIG. 7A illustrates touch sensor panel 700 with six row electrodes 702A-602F and six column electrodes 704A-704F. Each driver/transmitter can be coupled to a respective one of the column electrodes 704A-704F and each differential amplifier can be coupled to a respective pair of row electrodes 702A-702F. A first row electrode of the respective pair of row electrodes can be coupled to an inverting terminal of a corresponding differential amplifier and a second row electrode of the respective pair of row electrodes can be coupled to the non-inverting terminal of the corresponding differential amplifier. For simplicity of illustration, FIG. 7A illustrates differential driver 706 configured to output complimentary drive signals D0+ and D0− to routing traces for column electrodes 704A-704B, but it should be understood that additional drivers can be included to drive additional column electrodes. Likewise, for simplicity of illustration, FIG. 7A illustrates differential amplifier 708 (or 708') configured to receiving and differentially sensing signals from routing traces for row electrodes 702A-702B, but it should be understood that additional receivers can be included to sense additional row electrodes.

Column electrodes 704A-704F can include multiple conductive segments interconnected by routing. For example, column electrode 704A includes two conductive segments (e.g., each having a "H" shape) forming the effective touch nodes of touch sensor panel 700 that are connected by routing such as routing 705A. Likewise, row electrodes 702A-702F can include multiple conductive segments interconnected by routing. For example, row electrode 702A includes conductive segments 702A' and 702A" (e.g., with a shape of a rectangle with an "H" shaped cutout) forming the effective touch nodes of touch sensor panel 700 that are connected by routing such as routing 702A'''. In some examples, as illustrated in FIG. 7A, the sense electrodes be contiguous such that the multiple segments 702A' and 702A" and routing traces 702A''' can be considered one row electrode. It is understood although similar shading is used for the row electrode pairs in each row and similar shading is used for column electrodes within each row and an alternative row, that these shadings are for ease of illustration and do not necessarily indicate that the electrodes are coupled together. For example, each row electrode can be electrically isolated and coupled to a different input of the sensing circuitry. Column electrodes in alternating rows may be electrically connected, but each column of column electrodes may be coupled to different outputs of stimulation circuitry.

Touch sensor panel 700 can be viewed as including a two dimensional array (three rows and three columns) of effective touch nodes. Each effective touch node of touch sensor panel 700 can measure a capacitance dominated by the capacitance between the conductive segments of respective row and column electrodes (formed from interlocking conductive segments). For example, the mutual capacitance between segment 702A' of row electrode 702A and the upper segment of column electrode 704A can dominate for the effective touch node corresponding to the region of column 1 and row 1 of touch sensor panel 700. The capacitive contributions of the routing portions of nearby row or column electrodes can form minor mutual capacitances that can be negligible in comparison (e.g., the contribution from the routing portion 705A or 705B of column electrode 704A or 704B to segment 702A' of row electrode 702A). As a result of the pattern of the row and column electrodes, the dominant/minor mutual capacitance/electrostatic fringe field coupling can be spatially patterned, as described herein. For example, column electrode 704A can dominantly couple with row electrodes 702A and 702E, with minor coupling for row electrodes 702B, 702C, 702D and 702F. Row electrode 702A can dominantly couple with column electrode 704A and 704E, with minor coupling for column electrodes 704B, 704C, 704D and 704F. The spatial pattern of dominant/minor mutual capacitance/electrostatic fringe field coupling can continue in a similar manner. It should be noted that the size of the routing may be exaggerated for illustration purposes and the routings size relative to the conductive segments may be even smaller than shown. In some examples, the conductive segments of row and column electrodes are formed in a common layer (i.e., the same layer of the touch sensor panel), such as in second metal layer 506. In some examples, the routing of the row and column electrodes can be formed at least in part in the common layer. In some examples, some or all of the routing can be in a different layer, such as in first metal layer 516 (e.g., to allow for electrical separation where the electrodes overlap in the illustration, and to further reduce the contribution of the routing to the capacitance at the effective touch nodes).

As illustrated in FIG. 7A, touch sensor panel 700 can include three rows and three columns of touch nodes (e.g., effective touch nodes). For example, a first column of touch nodes can be formed primarily from the conductive segments of row electrodes 702A, 702C, 702E and the conductive segments of column electrodes 704A, 704B. As another example, a second column of touch nodes can be formed primarily from the conductive segments of row electrodes 702B, 702D, 702F and the conductive segments of column electrodes 704C, 704D. In a similar manner, a first row of touch nodes can be formed primarily from the conductive segments of row electrodes 702A and 702B and the conductive segments of column electrodes 704A, 704C, and 704E. As another example, a second row of touch nodes can be formed primarily from the conductive segments of row electrodes 702C and 702D and the conductive segments of column electrodes 704B, 704D, and 704F.

During operation, the drive circuitry coupled to the column electrodes can differentially drive the column electrodes and differential amplifiers can differentially sense the row electrodes. For example, column electrodes 704A-704F can be stimulated (e.g., concurrently) with a multi-stimulus pattern of complimentary drive signals (D0+/−, D1+/− and D2+/−) over multiple scan steps. Although a 3×3 array of touch nodes is shown for simplicity of illustration, it should be understood that the array can be expanded to a 4×4 array (or a larger sized array) using complimentary drive signals (D0+/−, D1+/−D2+/−, and D3+/−, for example (alternatively represented as D0-D3 and D0'-D3'). For example, the multi-stimulus pattern can be a Hadamard matrix including values of 1 (for phase of 0 degrees) and −1 (for phase of 180 degrees) applied to a common stimulation signal (e.g., a sine wave at frequency $f_1$) to encode the drive signals, allowing for the dominant mutual capacitances to be measured and decoded based on the multi-stimulus drive pattern. For example, for a 4×4 array, D0-D3 can be represented by the following Hadamard matrix:

$$\begin{bmatrix} 1 & -1 & -1 & -1 \\ -1 & 1 & -1 & -1 \\ -1 & -1 & 1 & -1 \\ -1 & -1 & -1 & 1 \end{bmatrix}$$

wherein each row in the matrix represents a step of the scan, and each column representing one of the drive signals D0-D3, such that the values of the matrix represent the phase applied to the common stimulation signal for D0, D1, D2, and D3 for each step. For each drive signal in the multi-stimulus pattern of drive signals, a complimentary signal can be applied concurrently (e.g., drive signals D0-D3 and D0'-D3'). For example, the first row corresponding to the first scan step indicates that drive signal D0 has a phase of 180 degrees. Drive signal D0 can be applied differentially to column electrodes 704A and 704B such that the signal applied to column electrode 704A is 180 degrees out of phase with the signal applied to column electrode 704B. According to the example Hadamard matrix above driver/buffer 706 outputs a drive signal with a phase of 0 and outputs a complimentary drive signal with a phase of 180 degree. In a similar manner, two complimentary drive signals can be applied to the touch sensor panel for each of the drive signals D0-D3 in a 4×4 array. The drive signals can be output for the drive lines according to the remaining rows of the Hadamard matrix for the subsequent three scan steps.

Considering an example receiver of differential amplifier 708 (or 708'), for drive signal D0 at the touch node for row 1, column 1, the minor coupling between column electrode 704B by virtue of routing trace 705B and row electrode 702A can be relatively small compared with the dominant coupling of between column electrode 704A and row electrode 702A (e.g., via fringe field coupling therebetween). The dominant coupling can be represented by capacitance C0 (for row 1, column 1) that is coupled to the non-inverting (positive) input terminal of differential amplifier 708. Thus, a current proportional to C0 can appear at the output of differential amplifier 708. In a similar manner, for drive signal D1, the dominant coupling between column electrode 704C and row electrode 702B can be represented by capacitance C1 (for row 1, column 2), that is coupled to the inverting (negative) input terminal of differential amplifier 708 and a current proportional to C1 can appear at the output of differential amplifier 708. The additional dominant couplings for differential amplifier 708 are similar for the remaining columns corresponding to the first row. Thus, the output of the measurement of the current by differential amplifier 708 for the first scan step can be proportional to C0-C1-C2-C3 for an array with four columns. Following the same procedure for the remaining three steps, the output for the four scan steps can be represented as a vector proportional to:

$$\begin{bmatrix} C_0 - C_1 - C_2 - C_3 \\ -C_0 + C_1 - C_2 - C_3 \\ -C_0 - C_1 + C_2 - C_3 \\ -C_0 - C_1 - C_2 + C_3 \end{bmatrix}$$

This vector encoding can be decoded or inverted by the matrix, extracting the individual capacitances, but with an effective integration time of the entire measurement, as shown by the equation below:

$$\begin{bmatrix} C_0 \\ C_1 \\ C_2 \\ C_3 \end{bmatrix} = \begin{bmatrix} 1/4 & -1/4 & -1/4 & -1/4 \\ -1/4 & 1/4 & -1/4 & -1/4 \\ -1/4 & -1/4 & 1/4 & -1/4 \\ -1/4 & -1/4 & -1/4 & 1/4 \end{bmatrix} \begin{bmatrix} C_0 - C_1 - C_2 - C_3 \\ -C_0 + C_1 - C_2 - C_3 \\ -C_0 - C_1 + C_2 - C_3 \\ -C_0 - C_1 - C_2 + C_3 \end{bmatrix}$$

Although FIG. 7A illustrates the drive circuitry as including three differential drivers 706A-706C outputting a signal and its compliment, it should be understood that other implementations are possible. For example, six discreet drivers can be used, where each of differential drivers outputs a signal or its compliment. In some examples, the complimentary drive signals can be applied to adjacent column electrodes such that the net electrical effect due to the drive signal can be zero (or within a threshold of zero) localized to the two column electrodes. For example, adjacent column electrodes 704A and 704B (or 704B and 704C) can be driven with the complimentary signals and result in a net zero (or near zero) electrical effect (e.g., to reduce noise from the touch system coupled into the display system). Although applying complimentary signals is shown in adjacent electrodes, it is understood that the complimentary signal can be applied to a non-adjacent column electrode such that the net electrical effect may be zero (or within a threshold of zero) for the touch sensor panel, but may not be zero at localized regions of the touch sensor panel.

For each column of touch nodes in touch sensor panel 700, a first drive signal and a second drive signal can be applied. For example, column 1 of touch sensor panel can be driven with a first drive signal on column electrode 704A (applied to two touch nodes in the column of touch nodes) and can be driven with a second drive signal on column electrode 704B (e.g., applied to two different touch nodes in the column of touch nodes for a 4×4 array). As shown in FIG. 7A, the first drive signal is applied to alternating touch nodes in the column and the second drive signal is applied to alternating touch nodes in the column.

Row electrodes can be differentially sensed using differential amplifiers. Differentially sensing the row electrodes can remove common mode noise from the touch measurements.

Although applying complimentary signals is shown in adjacent electrodes for each column (e.g., the complementary signals D0/D0' are applied to column 1, the complementary signals D1/D1' are applied to column 2, etc.), it is understood that the complimentary signal can be applied to different column electrodes such that the net electrical effect may be zero (or within a threshold of zero) over a larger localized region the touch sensor panel (e.g., across diagonal touch nodes), but may not be net zero within a column of the touch sensor panel (e.g., for adjacent touch nodes). In some examples, the cancelation of the complimentary signals can occur on diagonal touch nodes, as described in more detail with respect to FIGS. 13A-13B. For example, the drive circuitry can be configured to drive column electrode 704A with D0+, column electrode 704B with D1−, column electrode 704C with D1+ and column electrode 704D with D0−. As a result, the cancelation of the transmit signals can occur at diagonals. For example, the cancelation of D0+ and D0− can occur between the transmitter electrode for the touch node in row 1, column 1 of the array of FIG. 7A and the transmitter electrode for the touch node is row 2, column 2. In a similar manner, the cancelation of D1+ and D1− can occur between the transmitter electrode for the touch node in row 1, column 2 of the array of FIG. 7A and the transmitter electrode for the touch node is row 2, column 1. In some examples, due to the increased distance along the diagonal, diagonal cancelation of the complementary drive signals can result in increased sensed signal in response to a touching object (because there is less cancelation of signal) compared with the sensed signal for a touch sensor panel with cancelation of complementary drive signals within a column of touch nodes.

It should be understood that although touch sensor panel 700 includes a 3×3 array of nine dominant capacitance values (e.g., corresponding to nine effective touch nodes), that the touch sensor panel can be scaled up or down to include fewer or more touch nodes. For example, a touch sensor panel can be scaled to a 4×4 array of sixteen dominant capacitance values (e.g., corresponding to sixteen effective touch nodes), or scaled to an 8×8 array of touch nodes (e.g., 64 capacitance values for 64 effective touch nodes) by increasing the row electrodes, column electrodes, drivers/transmitters and differential amplifiers.

Additionally, it should be understood that although differential driving and sensing is described with reference to touch sensor panel 700 in FIG. 7A, that touch sensor panel 700 can, in some examples, be operated in a non-differential sensing configuration to sense stimulation from an input device (e.g., a stylus that provides stimulation) in contact or proximity to touch sensor panel 700. For example, in order to detect the input device stimulation, switching circuitry can be used to couple the two row electrodes for a row of touch nodes to the same input of a differential amplifier (e.g., inverting input), and couple another input of the differential amplifier (e.g., non-inverting input) to a ground or another reference potential (e.g., corresponding to the row electrodes being detected as one sense line using the touch circuitry in the configuration shown in FIG. 3B). In contrast, for differential driving and sensing described herein, the switching circuitry can couple the row electrodes to differential amplifiers (e.g., as represented by differential amplifiers 708. For example, switching circuitry (not shown) can be optionally included between two routing traces for row electrodes 702A and 702B and corresponding differential amplifier 708. The switching circuitry can include one or more switches including multiplexer(s) and/or switch(es) that can be controlled by a mode selection input. In a differential drive/sense mode of operation, the switching circuitry (can couple row electrode 702A to the non-inverting terminal (and can decouple row electrode 702A from the inverting terminal) and row electrode 702B can be coupled to the inverting terminal of differential amplifier 708. In a non-differential sensing configuration to sense stimulation from an input device (e.g., a stylus), row electrode 702A and row electrode 702B can be coupled to the inverting terminal of differential amplifier 708 and the non-inverting terminal of differential amplifier 708 can be coupled to ground (or a virtual ground) using the switching circuitry. In some examples, for the non-differential operation, the column electrodes in each column can use the same phase stimulation signals rather than complimentary signals (e.g., DO can be applied to column electrodes 704A-704B for the first column, D1 can be applied to column electrodes 704C-704D for the second column, etc.).

As shown in FIG. 7A, the column electrodes can be routed to drive circuitry using column routing traces that are vertical (e.g., column electrodes 704A-704F routed to drivers, such as driver 706, using vertical column routing traces 705A-705F). In some examples, the row electrodes can be routed to sensing circuitry using horizontal row rowing traces (e.g., row electrodes 702A-702F routed to sensing circuitry, such as differential amplifiers 708', using horizontal column routing traces). In some examples, both the column electrodes and the row electrodes can be routed to drive circuitry or sensing circuitry using vertical routing traces (e.g., using vertical column routing traces 705A-705F and using vertical row routing traces 703-703F). Using vertical routing traces for the row and column electrodes (or more generally routing the row and column electrodes to a same edge) can allow for routing the row and column electrodes to a common location (for connection to the drive circuitry and sensing circuitry) without requiring vertical routing traces in the border area, thereby enabling the device include touch sensor panel 700 to have reduced border.

FIG. 7A illustrates two vertical routing traces for complimentary drive signals per column of column electrodes and two vertical routing traces per row of row electrodes (e.g., two vertical routing traces per pair of row electrode). In some examples, additional routing traces can be used for rows and/or column electrodes. For example, rather than using one routing electrode per drive signal per column (e.g., two total for complimentary drive signals applied to a column) multiple routing traces can be used (e.g., four routing traces, two for each of the complimentary drive signals). In some examples, rather than using one routing electrode per column (e.g., two total for a differential amplifier for a row) multiple routing traces can be used. For example, FIGS. 7B-7C illustrate different configurations of routing traces for a touch node with two vertical routing traces for row electrodes and four vertical routing traces for column electrodes according to examples of the disclosure.

Figure 7B:
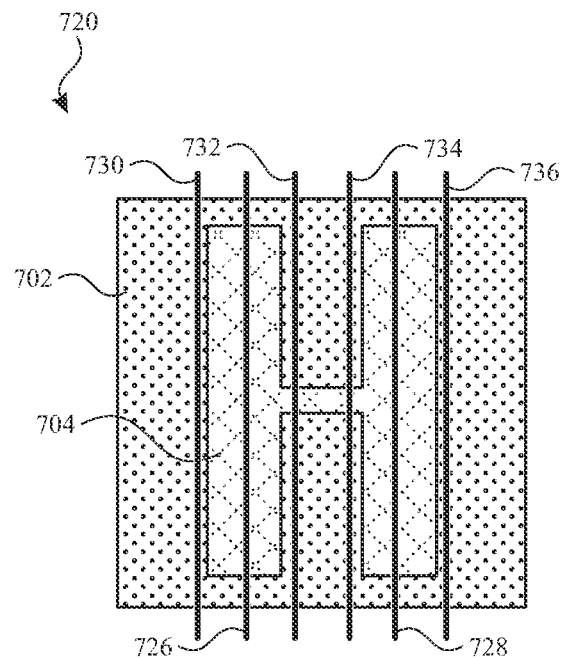
FIGS. 7B-7C illustrate different configurations of routing traces for a touch node with two vertical routing traces for row electrodes and four vertical routing traces for column electrodes according to examples of the disclosure.
Figure 7C:
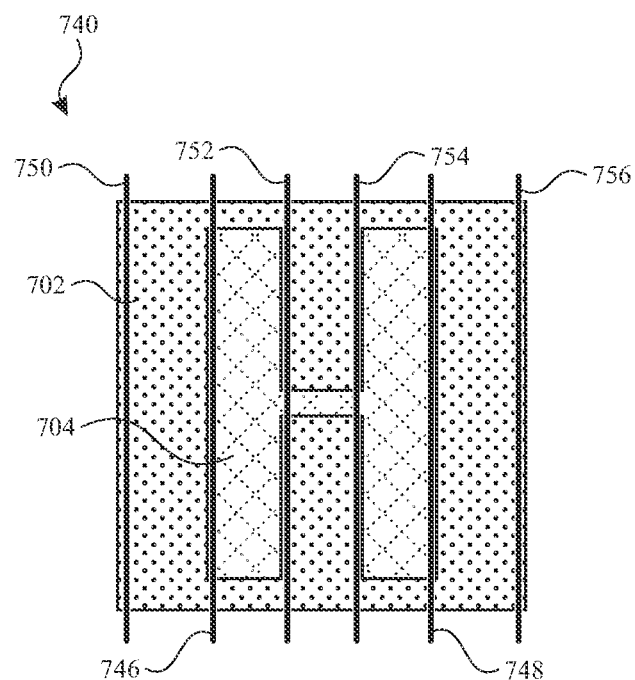

FIG. 7B illustrates a first configuration 720 of routing traces for a touch node with two vertical routing traces for row electrodes and four vertical routing traces for column electrodes. The touch node includes a segment of a row electrode 702 (e.g., with a shape of a rectangle with an "H" shaped cutout) and a segment of a column electrode 704 (e.g., having a "H" shape). Configuration 720 includes two vertical routing traces 726 and 728 used for routing complimentary drive signals for the column in which the touch electrode of FIG. 7B is located. One of the vertical routing traces—routing trace 726 or routing trace 728—can be electrically connected to the column electrode segment 704. In some examples, column electrode segment 704 can be formed in second metal layer 506, the routing traces can be formed in the first metal layer 516, and the electrical connection between the column electrode segment 704 and the routing trace can be made with a via through the intermediate layer 507. In some examples, routing traces 726 and 728 can extend from one edge of the touch sensor panel to the opposite edge (e.g., from the top to the bottom). In some such examples, the routing traces 726 and 728 make electrical connections with alternate column electrode segments in a column. For example, column electrode segments in the column can be connected to routing trace 726 for even rows of the touch sensor panel and column electrode segments in the column can be connected to routing trace 728 for odd rows of the touch sensor panel.

Configuration 720 also includes four vertical routing traces 730, 732, 734 and 736 used for routing a row electrode 702 (including one or more segments). One or more of the vertical routing traces—routing trace 730, 732, 734 and/or 736—can be electrically connected to the row electrode 702. As described in more detail herein, in some examples, a different number of routing traces can be electrically connected to a respective row electrode 702 depending on the position of the respective row relative to the sensing circuitry. In some examples, the further a respective row electrode is from the sensing circuitry, the more routing traces can be coupled to the respective row electrode. In some examples, the row electrode 702 can be formed in second metal layer 506, the routing traces can be formed in the first metal layer 516, and the electrical connection between the row electrode 702 and the routing trace can be made with one or more vias through the intermediate layer 507. In some examples, routing traces 730, 732, 734 and/or 736 can extend from one edge of the touch sensor panel to the opposite edge (e.g., from the top to the bottom), optionally with some breaks or interconnections, as described in more detail herein.

As shown in FIG. 7B, the vertical routing traces 726 and 728 for column electrodes can be disposed to overlap the arms of the H-shape column electrode segment (e.g., approximately at the middle of the arms) and the vertical routing traces 730, 732, 734 and 736 for row electrodes can be disposed on opposite sides of the vertical routing traces 726 and 728 for column electrodes. For example, vertical routing traces 726 can be sandwiched between the vertical routing traces 730 and 732 and vertical routing traces 728 can be sandwiched between the vertical routing traces 734 and 736. In some examples, vertical routing traces 726, 728, 730, 732, 734 and 736 can be equally spaced. In some examples, vertical routing traces 730 and 736 can be disposed so as not to overlap column electrode segment 704, whereas vertical routing traces 732 and 734 can partially overlap column electrode segment 704, but between the arms so as to minimize the overlap of the vertical routing traces for row electrodes with the column electrode.

FIG. 7C illustrates a second configuration 740 of routing traces for a touch node with two vertical routing traces for row electrodes and four vertical routing traces for column electrodes. Configuration 740 can be similar to configuration 720, but have different placement of the vertical routing traces 746 and 748 for column electrodes (e.g., corresponding to vertical routing traces 726 and 728) and vertical routing traces 750, 752, 754, and 756 for row electrodes (e.g., corresponding to vertical routing traces 730, 732, 734, and 736).

As shown in FIG. 7C, the vertical routing traces 746 and 748 for column electrodes can be disposed to overlap the arms of the H-shape column electrode segment (e.g., approximately at the outside edges of the arms) and the vertical routing traces 750, 752, 754 and 756 for row electrodes can be disposed on opposite sides of the vertical routing traces 746 and 748 for column electrodes. For example, vertical routing traces 746 can be sandwiched between the vertical routing traces 750 and 752 and vertical routing traces 748 can be sandwiched between the vertical routing traces 754 and 756. In some examples, vertical routing traces 746, 748, 750, 752, 754 and 756 can be equally spaced, with greater spacing than in the configuration of FIG. 720. In some examples, vertical routing traces 750 and 756 can be disposed so as not to overlap column electrode segment 704 (e.g., at or within a threshold distance of the outer edge of the segment of the row electrode shown in FIG. 7B-7C), whereas vertical routing traces 752 and 754 can partially overlap column electrode segment 704, but between the arms so as to minimize the overlap of the vertical routing traces for row electrodes with the column electrode. In some examples, vertical routing traces 752 and 754 can be at or within a threshold distance of the inner edge of the arms of the H-shaped column electrode segment 704.

Although described with reference to FIGS. 7B and 7C as vertical routing traces 746, 748, 750, 752, 754 and 756, it should be understood that these vertical routing traces can represent routing tracks (e.g., regions within the metal mesh) within which one or more routing traces can be implemented for a column. The routing tracks are sometimes referred to herein as a set of one or more routing trace segments, and electrically connected portions of one or more sets of the one or more routing traces segments can form a respective routing trace for a respective row electrode (or column electrode). In some examples, the routing tracks are simply referred to in shorthand as a routing trace in that conceptually the various routing segments in a vertical routing track extend the full length or substantially the full length of a column, despite the possibility that different routing segments may be electrically isolated from one another and may be used for routing more than one row electrode (or may be floating).

Figure 8:
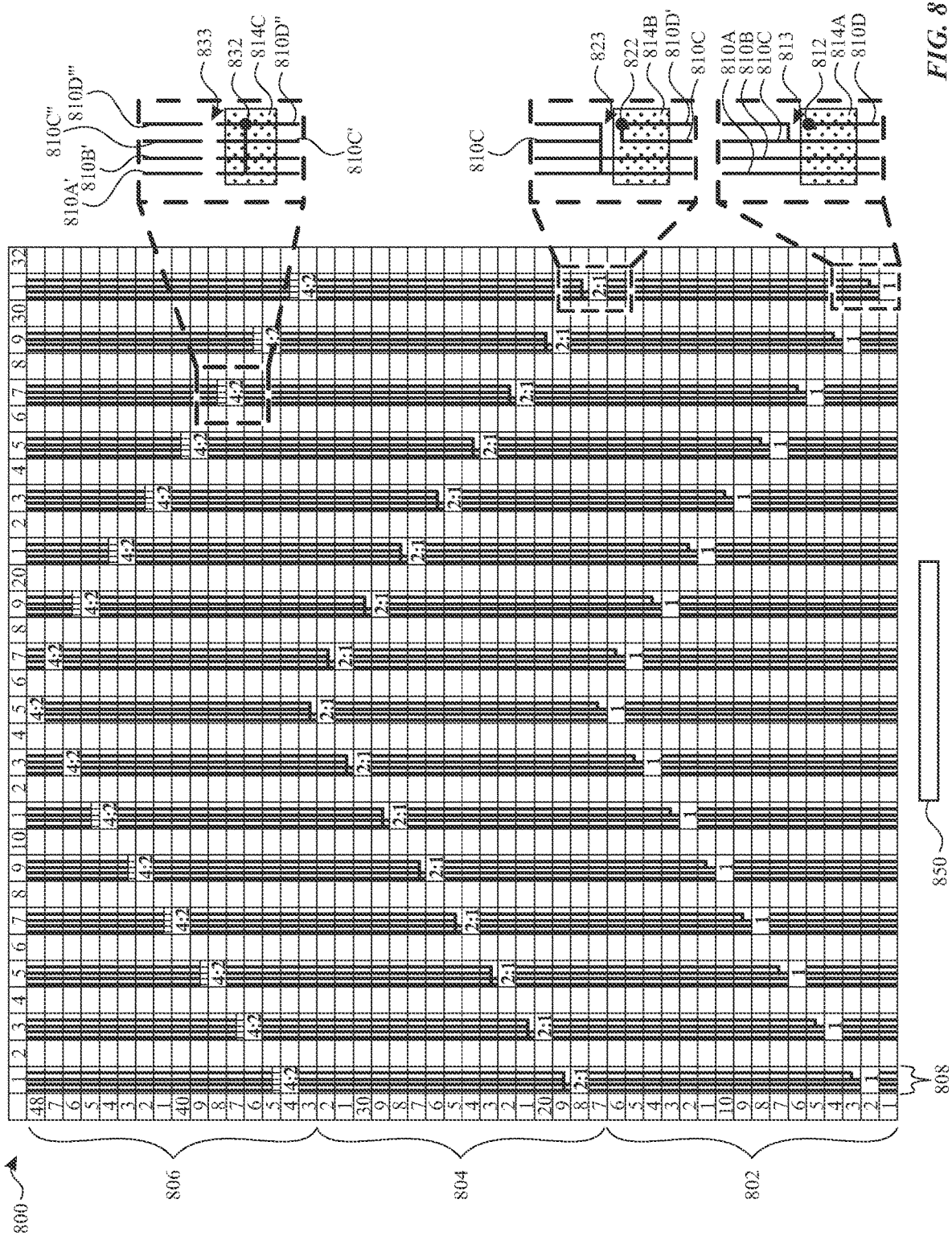
Figure 9:
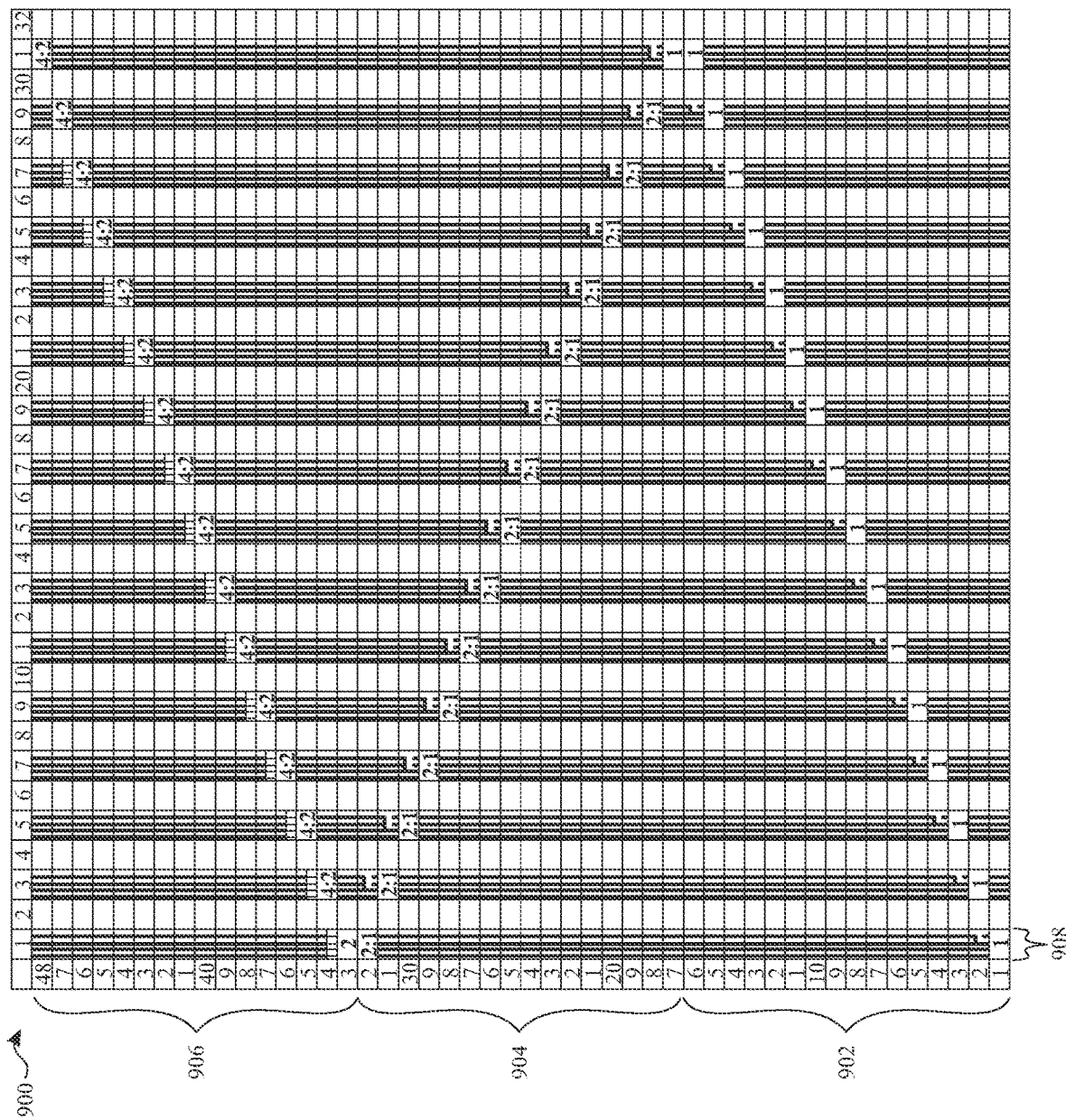

FIGS. 8-10 illustrate different routing patterns for row electrodes according to examples of the disclosure. FIG. 8 illustrates a chevron routing pattern according to examples of the disclosure. FIG. 8 illustrates a touch sensor panel 800 that includes a 48×32 array of touch nodes as indicated by the indexing on the left and top size of the array, with each box in the array representing a touch node formed from a row electrode and column electrode segment (e.g. corresponding to touch nodes shown in FIGS. 7A-7C). Each of the rows can include two row electrodes, for a total of 96 row electrodes to be routed to the sensing circuitry (e.g., to differential amplifiers). Touch sensor panel 800 can be divided into three banks, with each bank including 16 rows. For example, a first bank 802 can include rows 1-16, a second bank 804 can include rows 17-32, and a third bank 806 can include rows 33-48. It should be understood that a touch sensor panel can include a different size array or different number of banks than shown in FIG. 8.

Touch sensor panel 800 includes vertical routing tracks for row electrodes in groups 808 of four vertical routing tracks per column. Electrical connections between one or more of the routing traces implemented with the vertical routing tracks are indicated at touch nodes with a numerical text label ("1", "2:1", or "4:2"). A group 808 of four vertical routing tracks in one column of the touch sensor panel can be used to make electrical connections to one row electrode per bank (e.g., using three routing traces implemented within the four routing tracks). For example, the leftmost group 808 can be used to make electrical connections to a row electrode in rows 2, 18 and 34 in banks 802, 804 and 806 respectively as indicated by touch nodes with numerical text labels ("1", "2:1", or "4:2"). For each column in the chevron routing pattern, the location of the electrical connection for the rows in different banks can be equally spaced. For example, the connections in column 1 (at rows 2, 18 and 34) can be 16 rows apart, and that same spacing between connections can repeat for each of the columns in the chevron routing pattern of FIG. 8. This spacing can help balance bandwidth for the touch sensor panel because the uniform spacing can help equalize the resistance for the routing traces across the touch sensor panel. Although not shown in FIG. 8 for ease of illustration, each column of the touch sensor panel can include two vertical routing traces (and two vertical routing tracks) for routing column electrode segments to the drive circuitry.

For ease of illustration, FIG. 8 shows the groups 808 of four vertical routing tracks for odd-numbered columns, representing one of a pair of row electrodes in a row of the touch sensor panel (e.g., to be coupled to one terminal of a differential amplifier for the row or otherwise coupled to one terminal of an amplifier for a differential measurement), but it is understood that similar groups of vertical routing tracks can be used for even-numbered columns to make electrical connections to the other of the pair of row electrodes in a row of the touch sensor panel (e.g., to be coupled to the other terminal of the differential amplifier for the row). For example, vertical routing tracks of group 808 in column 1 can be used to make electrical connections to one of the row electrode in rows 2, 18 and 34 of the touch sensor panel, and another group of vertical routing tracks in adjacent column 2 can be used to make electrical connections to the other of the row electrodes in rows 2, 18 and 24. Thus, each bank can include one electrical connection per column for a total of 32 electrical connections per bank, and 96 electrical connections for the three banks.

Although described above as having the second row electrode for a row being electrically connected in the adjacent column, it is understood that in some examples, the connection for the second row electrode for a row can be made in a different column. For example, the connection for the even-numbered columns can occur at the touch nodes on the diagonal between two odd-numbered columns. For example, the electrical connection for one row electrode in row 48 can be made in column 15 and the electrical connection for the second row electrode in row 48 can be made in column 16; the electrical connection for one row electrode in row 47 can be made in column 17 and the electrical connection for the second row electrode in row 47 can be made in column 14; the electrical connection for one row electrode in row 46 can be made in column 13 and the electrical connection for the second row electrode in row 46 can be made in column 18; the electrical connection for one row electrode in row 45 can be made in column 19 and the electrical connection for the second row electrode in row 45 can be made in column 12, and so on.

As illustrated in FIG. 8, touch sensor panel 800 can have a chevron routing pattern because the locations of the electrical connections for each bank result in a chevron shaped pattern. For example, the electrical connections between routing traces and row electrodes for a bank can be positioned in an increasing slope arrangement when moving toward the center of the bank, and positioned in a decreasing slope arrangement when moving toward the left and right edges from the center of the bank. In some examples, the electrical connections on the left half of the bank can be for even rows, and those connections on the right half of the bank can be for odd rows (vice versa). For example, for bank 806, the electrical connections for rows can occur at those touch nodes labeled "4:2." The chevron pattern can point upward in FIG. 8 such that the electrical connections for row 48 at the top of bank 806 can be at the center of the 32 rows (e.g., at columns 15 and 16). The chevron pattern repeats in a similar manner for banks 802 and 804.

In some examples, having the chevron pattern point upward can help reduce the maximum length of a routing trace and therefore the maximum resistance. For example, the vertical routing traces can be routed to a center region 850 at the bottom of the panel (e.g., in a border region outside the active area of the touch sensor panel). The center region 850 can be a group of bond pads or other connections to enable connection to a touch sensing circuit including the differential amplifiers (or single-ended amplifier configured for differential measurements). As a result, groups 808 of routing track and routing traces implemented within the routing tracks at the left-most and right-most edges of the touch sensor panel can travel a greater horizontal distance to center region 850 (e.g., in the bottom border region) compared with a group of routing traces in the center of the touch sensor panel. To balance these trace lengths, the upward pointing chevron pattern can allow for routing traces in a group of routing tracks to travel a shorter vertical distance for the left-most and right-most edges of the touch sensor panel compared with routing traces in a group of routing tracks in the center of the touch sensor panel. As a result, the upward facing chevron pattern can reduce the maximum path length and thereby reduce the maximum routing trace resistance to increase the bandwidth of touch sensor panel 800. It should be understood, however, that in some examples, the chevrons may be oriented differently (e.g., pointing downward).

As shown in FIG. 8, the vertical routing tracks can extend substantially from one edge of the touch sensor panel (e.g., a bottom edge) to an opposite edge (e.g., a top edge) for improved optical performance. For example, rather than terminating a vertical routing trace withing a vertical routing track at the point of an electrical connection with a row electrode, the vertical routing track can include routing trace segments that can extend beyond the point of an electrical connection so that the vertical routing track may provide a more uniform pattern of metal mesh wire that may be less visible to a user (for improved optical performance). In some examples, the vertical routing tracks may include one or more breaks (e.g., discontinuities in the metal mesh) so that the remainder of the routing traces segment(s) in a vertical routing track beyond the touch node at which an electrical connection is made is not electrically connected to the sensing amplifier (e.g., floating or tied to a voltage potential). For example, FIG. 8 shows a break 813 in the metal mesh of a vertical routing track after vertical routing trace 810D makes an electrical connection to row electrode 814A, a break 823 in the metal mesh of two vertical routing tracks after vertical routing trace 810C makes an electrical connection to row electrode 814B, and a break 833 in the metal mesh of four vertical routing tracks after vertical routing traces 810A and 810B make electrical connection(s) to row electrode 814C. The breaks in the metal mesh beyond the electrical connection can de-load the traces.

Additionally, or alternatively, as explained in more detail below, in some examples, the effective resistance of routing can be different for different banks of the touch sensor panel 800. For example, after a portion of a routing trace electrically connected to a row electrode (and after a break in the routing track), some or all of the remainder of the routing trace segments within the routing track can be repurposed and interconnected to one or more of the remaining routing trace segments within one or more other routing tracks to increase the effective width of the routing trace and thereby reduce the effective resistance of the routing trace for routing traces connecting to touch nodes in the downstream banks. In this way, disconnections (breaks) and interconnections of the group of vertical routing tracks can be used to balance bandwidth for the touch sensor panel. In some examples, the routing trace utilization (the disconnections and interconnections of the vertical routing tracks) can be optimized on a per touch-node basis to reduce the maximum routing trace resistance or to reduce the variance in the total routing trace resistance.

For example, a first routing trace can include a portion (e.g., vertical routing trace 810D) of a first vertical routing track, and can be used to route a row electrode 814A in row 1, column 31 to the bottom of touch sensor panel 800. The electrical connection can be made by one or more vias 812 between the row electrode and the first routing trace (e.g., vertical routing trace 810D) at the location of row electrode 814A in the touch node at row 1, column 31. After a break 813, some or all of the remaining portions of the vertical routing track (represented by routing trace segments 810D', 810D", and 810D'"), can be used for reducing the routing trace resistance for upstream banks. For example, a second routing trace can include a second portion (e.g., routing trace segment 810D') of the first vertical routing track and a portion (e.g., routing trace 810C of a second vertical routing track). For example, segments of the first and second routing tracks can be coupled and one or more points between the electrical connection at row 1, column 31 (in bank 802) and the electrical connection at row 17, column 31 (in bank 804) to double the effective width (and thereby reduce the resistance) for the second routing trace between row 2 and 17 as compared with the width of the second routing trace between rows 1 and 2. The electrical connection can be made by one or more vias 822 between the row electrode and the second routing trace (e.g., with vertical routing trace 810C and/or interconnected trace segment 810D') at the location of row electrode 814B in the touch node at row 17, column 31.

After a break 823, some or all of the remaining portions of the first and second vertical routing tracks (represented by routing trace segments 810C', 810D", and 810D'"), can be used for reducing the routing trace resistance for the upstream bank. For example, a third routing trace can include a portion (e.g., vertical routing traces 810A and 810B) of a third vertical routing track and a fourth vertical routing track, a third portion of the first vertical routing track and a second portion of the second routing track. For example, segments of the third and fourth routing tracks can be interconnected at one or more points between the electrical connection to row electrode 814C and the differential amplifier circuit (e.g., in or outside of the active area of the touch sensor panel). Additionally, routing trace segments 810C' and 810D" in the first and second routing tracks can be coupled to vertical routing traces 810A and 810B at one or more points between the electrical connection at row 17, column 31 (in bank 804) and the electrical connection at row 33, column 31 (in bank 806) to double the effective width (and thereby reduce the resistance) of the third routing trace between rows 18 and 33 compared with the width of the third routing trace between rows 1 and 18 (and quadruple the effective width compared to a single vertical routing track) for the routing traces between rows 17 and 33. The electrical connection can be made by one or more vias 832 between the row electrode and the third routing trace (e.g., with vertical routing traces 810A-810B and/or interconnected routing trace segments 810C' and 810D") at the location of row electrode 814C in the touch node at row 33, column 31. After a break 833, the remaining routing segments 810A', 810B', 810C" and 810D'" can be decoupled for the routing traces and from the differential amplifiers.

The numerical text labels for the touch nodes with electrical connections provide an indication regarding the number of vertical routing tracks used for each routing trace and the effective width of the routing traces used for routing to the row electrode in each bank. For example, the numerical text label "1" for touch nodes with an electrical connection indicates that a portion of one of the four vertical routing tracks in a group 808 (with an effective width of one routing track) can be used for a routing trace (e.g., like the first routing trace including routing trace segment 810D). The numerical text label "2:1" for touch nodes with an electrical connection indicates that a portion of two of the four vertical routing tracks in a group 808 can be used to double the effective width for a portion of the routing length (e.g., second routing trace including routing trace segment 810C and interconnected routing trace segment 810D'). The numerical text label "4:2" for touch nodes with an electrical connection indicates that portions of the four vertical routing traces in a group 808 can be used to double the effective width for a portion of the routing length (e.g., third routing trace including routing trace segments 810A-810B and interconnected routing trace segments 810C' and 810D").

Alternatively, the numerical text label "2:1" can provide an indication of a transition point between an effective width of two routing tracks to an effective width of one routing track and the numerical text label "4:2" can provide an indication of a transition point between an effective width of four routing tracks to an effective width of two routing tracks.

It should be understood that the dimensions of the touch sensor panel, the number of banks, and the number of vertical routing tracks per group are exemplary. In some examples, the touch sensor panel can be doubled in size by to have 48 rows and 64 columns, and the chevron pattern shown in FIG. 8 can repeat for columns 33-64. In some such examples, each row can have two row electrodes, and the additional columns can be used to double the number of routing traces used to make an electrical connection. In some such examples, each row can have four row electrodes. For example, two row electrodes per row can be used for columns 1-32 and an additional two row electrodes per row can be used for columns 33-64. In some examples, more or fewer vertical routing tracks or banks can be used than shown in FIG. 8.

The chevron routing pattern can be used to maximize bandwidth for the touch sensor panel by reducing a maximum total routing trace length. However, in some examples, because routing for adjacent rows can be separated by a large number of columns. For example, the electrical connection for row 36 (at column 3) and row 35 (at column 29) can be separated by 26 columns and the electrical connection for row 32 (at column 15) and row 33 (at column 31) can be separated by 16 columns. In contrast, the electrical connection for row 48 (at column 15) and row 47 (at column 17) can be separated by 2 columns. As a result, the touch nodes of touch sensor panel 800 may have resistance differentials between adjacent touch nodes that can result in reduced accuracy for measuring a location of an object moving across the touch sensor panel. In some examples, the reduced accuracy can manifest in increased wobble for an active or passive stylus input device due to the resistance differential between adjacent touch nodes in a column (and/or in a row).

FIG. 9 illustrates an S-shaped or zig-zag routing pattern according to examples of the disclosure. The S-shaped routing pattern can reduce the resistance differential between adjacent touch nodes in a column (and/or in a row) compared with the chevron routing pattern illustrated in FIG. 8, but with a reduction in the bandwidth of the touch sensor panel due to a longer maximum routing trace resistance (e.g., a reduction in bandwidth between 5%-25%). FIG. 9 illustrates a touch sensor panel 900 that includes a 48×32 array of touch nodes similar to that of touch sensor panel 800, that can include banks 902, 904 and 906 (e.g., corresponding to banks 802, 804, and 806), but including a different pattern of electrical connections between the groups 908 of vertical routing tracks (e.g., corresponding to groups 808 of four vertical routing tracks).

Electrical connections between one or more of the row electrodes and routing traces using segments in the vertical routing tracks are indicated at touch nodes with a numerical text label ("1", "2:1", "2" or "4:2"). A group 908 of four vertical routing tracks in one column of the touch sensor panel can be used to make electrical connections to one row electrode per bank. For example, the leftmost group 908 can be used to make electrical connections to a row electrode in rows 1, 32 and 33 in banks 902, 904 and 906 respectively as indicated by touch nodes with numerical text labels ("1", "2:1", or "2"). Unlike the chevron routing pattern, the location of the electrical connection for the rows in different banks may not be equally spaced. For example, the connections in column 1 (at rows 1, 32 and 33), some of the connections can be 31 rows apart and other connections can be at adjacent rows, and the disparate spacing between connections can cause a decrease in bandwidth for the touch sensor panel due to non-uniform spacing and increased trace resistances for some of the routing traces of the touch sensor panel. Although not shown in FIG. 9 for ease of illustration, each column of the touch sensor panel can include two vertical routing tracks for routing column electrode segments to the drive circuitry.

For ease of illustration, FIG. 9 shows the groups 908 of four vertical routing tracks for odd-numbered columns, representing one of a pair of row electrodes in a row of the touch sensor panel (e.g., to be coupled to one terminal of a differential amplifier for the row), but it is understood that similar groups of vertical routing tracks can be used for even-numbered columns to make electrical connections to the other of the pair of row electrodes in a row of the touch sensor panel (e.g., to be coupled to the other terminal of the differential amplifier for the row). For example, vertical routing tracks of group 908 in column 1 can be used to make electrical connections to one of the row electrode in rows 1, 32 and 33 of the touch sensor panel, and another group of vertical routing tracks in adjacent column 2 can be used to make electrical connections to the other of the row electrodes in rows 1, 32 and 33. Thus, each bank can include one electrical connection per column for a total of 32 electrical connections per bank, and 96 electrical connections for the three banks. Although described above as having the second row electrode for a row being electrically connected in the adjacent column, it is understood that, in some examples, the connection for the second row electrode for a row can be made in a different column.

As illustrated in FIG. 9, touch sensor panel 900 can be said to have an S-shaped routing pattern because the locations of the electrical connections for each bank result in an S-shaped shaped pattern. For example, the electrical connections between routing traces and row electrodes for a bank can be positioned in a single slope arrangement between left and right edges of the bank. In some examples, adjacent banks (e.g., vertically adjacent) can have their electrical connections be arranged in opposite slopes (alternating from left to right or from right to left). Additionally, the electrical connections for the two adjacent rows at a boundary between two adjacent banks (e.g., an electronical connection between a first row in a first bank and an electrical connection between a second row in a second bank different than the first bank, the first row and the second row being adjacent) can be adjacent to one another (near a common edge of the touch sensor panel). For example, each sequential electrical connections between a bottom row of a first bank and a top row of an adjacent second bank can be located along a common edge of the touch sensor panel (e.g., along a right edge or a left edge). For example, for bank 906, the electrical connections for rows can occur at those touch nodes labeled "4:2" along a first diagonal descending from row 48, column 32 to row 33, column 1. The S-shaped pattern repeats in a similar manner for banks 902 and 904, with electrical connections along a second diagonal descending from row 32, column 1 to row 17 column 32 and along a third diagonal descending from row 16, column 32 to row 1, column 1. The electrical connections for row 33, column 1 and row 32, column 1 can be along the left edge of the touch sensor panel, and the electrical connections for row 17, column 32 and row 16, column 32 can be along the right edge of the touch sensor panel.

In some examples, having the S-shaped pattern can help reduce the change in resistance between adjacent rows and therefore reduce the row-to-row change in bandwidth. For example, the routing traces length and thereby the change in resistance for any two adjacent rows can be relatively small (e.g., less than 100Ω), whereas the chevron configuration of FIG. 8 may have some discontinuities in which the routing trace length and thereby the change in resistance can be relatively greater between some adjacent rows (e.g., greater than 500Ω). For example, in the chevron configuration of FIG. 8, the connections for row 32 and row 33 can occur in column 15 and column 1, respectively, which can result in a relatively large different in trace length and resistance. In some examples, reducing the row-to-row change in resistance can improve accuracy for touch sensing that can manifest in decreased wobble for an active or passive stylus input device due to the smaller resistance differential between adjacent touch nodes in a column (and/or in a row).

As shown in FIG. 9, the vertical routing tracks (and the trace segments therein) can extend substantially from one edge of the touch sensor panel (e.g., a bottom edge) to an opposite edge (e.g., a top edge) for improved optical performance. For example, rather than terminating a vertical routing trace at the point of an electrical connection with a row electrode, the segments in a vertical routing track can extend beyond the point of an electrical connection so that the vertical routing tracks may provide a more uniform pattern of metal mesh wire that may be less visible to a user (for improved optical performance). In some examples, the vertical routing tracks may include breaks so that the remainder of a vertical routing track beyond the touch node at which an electrical connection is made is not electrically connected to the sensing amplifier (e.g., floating or tied to a voltage potential), as described above with reference to FIG. 8 and not repeated here for brevity.

Additionally, or alternatively, as explained above with respect to FIG. 8, in some examples, the effective resistance of routing can be different for different banks of the touch sensor panel 900. For example, after a routing trace including a portion of a routing track electrically connects to a row electrode (and after a break in the routing track), some or all of the remainder of the routing track be repurposed and/or interconnected to one or more of the remaining routing traces to increase the effective width of the routing trace and thereby reduce the effective resistance of the routing trace for routing traces connecting to touch nodes in the downstream banks. In this way, disconnections (breaks) and interconnections of the group of vertical routing tracks can be used to better balance bandwidth for the touch sensor panel. In some examples, the routing track utilization (the disconnections and interconnections of the vertical routing tracks) can be optimized on a per touch-node basis to reduce the maximum routing trace resistance or to reduce the variance in the total routing trace resistance.

It should be understood that the dimensions of the touch sensor panel, the number of banks, and the number of vertical routing tracks per group are exemplary. In some examples, the touch sensor panel can be doubled in size by to have 48 rows and 64 columns, and the S-shaped pattern shown in FIG. 9 can repeat for columns 33-64 (e.g., mirrored across the boundary between columns 32 and 33). In some such examples, each row can have two row electrodes, and the additional columns can be used to double the number of routing traces used to make an electrical connection. In some such examples, each row can have four row electrodes. For example, two row electrodes per row can be used for columns 1-32 and an additional two row electrodes per row can be used for columns 33-64. In some examples, more or fewer vertical routing tracks or banks can be used than shown in FIG. 9.

In some examples, a hybrid routing pattern can be used. In a hybrid routing pattern some routing traces are disposed in the active area (e.g., overlapping row and/or column electrodes) and some routing traces are disposed outside the active area (e.g., in a border area). FIG. 10 illustrates hybrid routing pattern according to examples of the disclosure. The hybrid routing pattern can include features of the S-shaped or zig-zag routing pattern illustrated in FIG. 9 (e.g., row connections along a diagonal), but also includes some border-area routing traces. The hybrid routing pattern can reduce the resistance differential between adjacent touch nodes in a column (and/or in a row) in a similar manner as described above with respect to FIG. 9. However, the use of border-area routing traces can reduce the number of routing tracks required in the active area and/or reduce the maximum resistance of routing traces by repurposing more of the routing tracks for the longer routing traces.

FIG. 10 illustrates a touch sensor panel 1000 that includes a 48×32 array of touch nodes similar to that of touch sensor panel 900, that can include banks 1002, 1004 and 1006 (e.g., corresponding to banks 902, 904, and 906), but including a different pattern of electrical connections between the groups 1008 of vertical routing tracks (e.g., groups of two vertical routing tracks). Although two vertical routing tracks are shown per column, these routing tracks can be thicker (and therefore have improved resistance characteristics (e.g., reduced resistance per unit length of the routing trace)). Alternatively, the vertical routing tracks can include four vertical routing tracks (e.g., corresponding to groups 908 of four vertical routing tracks), where two of four vertical routing tracks can be routed with the same connections as one of the two illustrated vertical routing traces in FIG. 10 (or alternatively, some or all of the columns can use one of the four vertical routing tracks for interconnections in the first bank 1002 and three of the four vertical routing tracks for interconnections to the third bank 1006).

Electrical connections between one or more of the row electrodes and routing traces using segments in the vertical routing tracks are indicated at touch nodes with a numerical text label ("1" or "2:1"). A group 1008 of two vertical routing tracks in one column of the touch sensor panel can be used to make electrical connections to one row electrode in an upper bank and one row electrode in a lower bank. For example, the leftmost group 1008 can be used to make electrical connections to a row electrode in rows 16 and 33 in banks 1002 and 1006, respectively, as indicated by touch nodes with numerical text labels ("1" or "2:1"). In a similar manner, in vertical routing tracks in column 3 can be used to make electrical connections to a row electrode in rows 15 and 34 in banks 1002 and 1006. The electrical connection to each of the row electrodes in the middle bank 1004 can be made using a routing trace (e.g., routing trace 1010) in the border area (e.g., outside the active area). The routing traces in the border area may also be referred to herein as a border-area routing trace or a border routing trace. Like the routing S-shaped routing pattern of FIG. 9, the location of the electrical connection for the rows in different banks may not be equally spaced. For example, the connections in column 1 (at rows 16 and 33), the connections can be 17 rows apart and the connections in column 31 can be 47 rows apart. The disparate spacing between connections can cause a decrease in bandwidth for the touch sensor panel due to non-uniform spacing and increased trace resistances for some of the routing traces of the touch sensor panel. In some examples, as described herein, the increased trace resistances can be reduced using the hybrid routing configuration. Although not shown in FIG. 10 for ease of illustration, each column of the touch sensor panel can include two vertical routing tracks for routing column electrode segments to the drive circuitry.

For ease of illustration, FIG. 10 shows the groups 1008 of two vertical routing tracks for odd-numbered columns, representing one of a pair of row electrodes in a row of the touch sensor panel (e.g., to be coupled to one terminal of a differential amplifier for the row), but it is understood that similar groups of vertical routing tracks can be used for even-numbered columns to make electrical connections to the other of the pair of row electrodes in a row of the touch sensor panel (e.g., to be coupled to the other terminal of the differential amplifier for the row). For example, vertical routing tracks of group 1008 in column 1 can be used to make electrical connections to one of the row electrode in rows 1 and 33 of the touch sensor panel, and another group of vertical routing tracks in adjacent column 2 can be used to make electrical connections to the other of the row electrodes in rows 1 and 33. The electrical connections for the pair of row electrodes can be made in the border area (e.g., on the same side or on opposite sides of the touch sensor panel). Thus, each of the upper bank and the lower bank can include one electrical connection per column and the middle bank can include two electrical connections per row (one each for the pair of row electrodes in a row) for a total of 32 electrical connections per bank, and 96 electrical connections for the three banks. Although described above as having the second row electrode for a row being electrically connected in the adjacent column in the upper and lower banks, it is understood that, in some examples, the connection for the second row electrode for a row can be made in a different column.

As illustrated in FIG. 10, touch sensor panel 1000 can have routing pattern similar to the S-shaped routing pattern. For example, the electrical connections between routing traces and row electrodes for a bank can be positioned in a single slope arrangement between left and right edges of the bank. For example, for bank 1006, the electrical connections for rows can occur at those touch nodes labeled "2:1" along a first diagonal descending from row 48, column 32 to row 33, column 1. The electrical connections for bank 1002 follow in a similar manner, with electrical connections along a second diagonal descending from row 16, column 1 to row 1, column 32. The intermediate bank 1004 can be connected using border area routing, as described herein. In some examples, the first and third banks separated by the intermediate bank can have their electrical connections be arranged in opposite slopes (alternating from left to right or from right to left). Additionally, an electronical connection between a first row in a first bank adjacent to a row connected using border-area routing and an electrical connection between a second row in a second bank different than the first bank can be at or near a common edge of the touch sensor panel. For example, the electrical connections for row 33, column 1 and row 16, column 1 can be along the left edge of the touch sensor panel.

In some examples, having the diagonal pattern similar to the S-shaped pattern in the hybrid device can help reduce the change in resistance between adjacent rows within the upper and lower banks and therefore reduce the row-to-row change in bandwidth. In some examples, the border-area routing traces can also be designed to reduce the row-to-row change in resistance and provide relative continuity in resistance for the middle bank (e.g., between the resistance in the top row of the lower bank and the bottom row of the upper bank).

As shown in FIG. 10, the vertical routing tracks (and the trace segments therein) can extend substantially from one edge of the touch sensor panel (e.g., a bottom edge) to an opposite edge (e.g., a top edge) for improved optical performance. For example, rather than terminating a vertical routing trace at the point of an electrical connection with a row electrode, the vertical routing track can extend beyond the point of an electrical connection so that the vertical routing tracks may provide a more uniform pattern of metal mesh wire that may be less visible to a user (for improved optical performance). In some examples, the vertical routing tracks may include breaks so that the remainder of a vertical routing track beyond the touch node at which an electrical connection is made is not electrically connected to the sensing amplifier (e.g., floating or tied to a voltage potential), as described above with reference to FIG. 8 and not repeated here for brevity.

Additionally, or alternatively, as explained above with respect to FIG. 8, in some examples, the effective resistance of routing can be different for different banks of the touch sensor panel 1000. For example, after a routing trace including a portion of a routing track electrically connects to a row electrode (and after a break in the routing track), some or all of the remainder of the routing track be repurposed and/or interconnected to one or more of the remaining routing traces to increase the effective width of the routing trace and thereby reduce the effective resistance of the routing trace for routing traces connecting to touch nodes in the downstream banks. In this way, disconnections (breaks) and interconnections of the group of vertical routing tracks can be used to better balance bandwidth for the touch sensor panel. In some examples, the routing track utilization (the disconnections and interconnections of the vertical routing tracks) can be optimized on a per touch-node basis to reduce the maximum routing trace resistance or to reduce the variance in the total routing trace resistance.

It should be understood that the dimensions of the touch sensor panel, the number of banks, and the number of vertical routing tracks per group are exemplary. In some examples, the touch sensor panel can be doubled in size by to have 48 rows and 64 columns, and the hybrid pattern shown in FIG. 10 can repeat for columns 33-64 (e.g., mirrored across the boundary between columns 32 and 33). In some such examples, each row can have two row electrodes, and the additional columns can be used to double the number of routing traces used to make an electrical connection. In some such examples, each row can have four row electrodes. For example, two row electrodes per row can be used for columns 1-32 and an additional two row electrodes per row can be used for columns 33-64. In some examples, more or fewer vertical routing traces or banks can be used than shown in FIG. 10.

Although FIG. 10 shows the upper and lower banks 1002 and 1006 with routing traces in the active area and middle bank 1004 with routing traces in the border area, it is understood that the distribution of traces in the active area and in the border area can be different than shown in FIG. 10. For example, more or fewer of the electrical connections can be changed between the S-shaped pattern and the hybrid pattern (e.g., adding a partial third diagonal in the second bank by including some active area routing traces/tracks for the rows in the middle bank or reducing the length of the diagonal in the upper and/or lower bank by using more border routing traces for electrical connection).

Figure 11A:
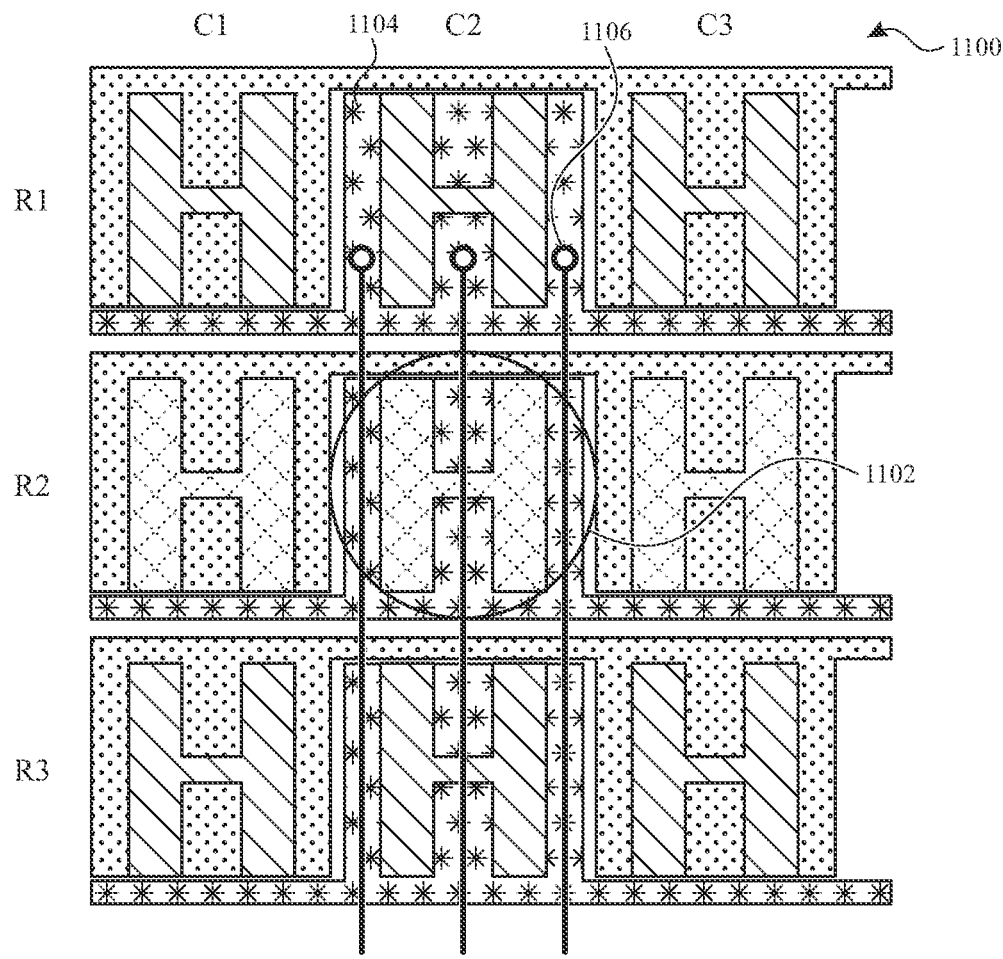
FIGS. 11A-11B illustrate an example touch sensor with vertical routing traces and corresponding signal levels with and without cross-talk according to examples of the disclosure.
Figure 11B:
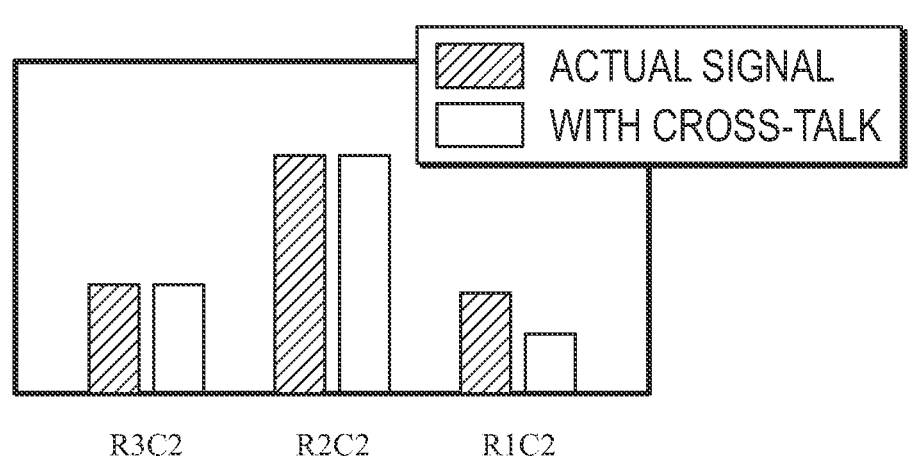

As described herein, in some examples, the electrical connections for a row to a differential sense amplifier can impact cross-talk between adjacent rows within a column. FIGS. 11A-11B illustrate an example touch sensor with vertical routing traces and corresponding signal levels with and without cross-talk according to examples of the disclosure. FIG. 11A illustrates a touch sensor panel 1100, which can correspond to the row and column electrodes of touch sensor panel 700 (but with different routing shown). Row electrode 1104 corresponding to the touch node at row 1, column 2 can be coupled to a sense amplifier using a routing trace implemented with segments in three routing tracks 1106 (with three routing trace connection points, such as vias, shown for row electrode 1104). The routing tracks 1106 can be vertical routing tracks that overlap with other touch nodes in the column (e.g., at row 2, column 2 and row 3, column 2). FIG. 11B illustrates a comparison of signal measurements at the touch electrodes in the second column with crosstalk and without cross-talk (e.g., actual or ideal signal) due to the presence of a finger 1102 finger touching or in proximity to the touch node at row 2, column 2. As shown in FIG. 11B, the presence of the finger 1102 in proximity to routing traces 1106 at row 2, column 2 can cause modulation of the measured signal at row 1, column 2. In some examples, the modulation can be on the order of 5%-30% depending on the size, number, and/or orientation of finger(s). This modulation can cause a distortion in the touch signal profile that results in inaccurate location detection and poorer touch performance. In some examples, as described with respect to FIG. 11D, differential routing traces can be used to mitigate the impact of cross-talk.

Figure 11C:
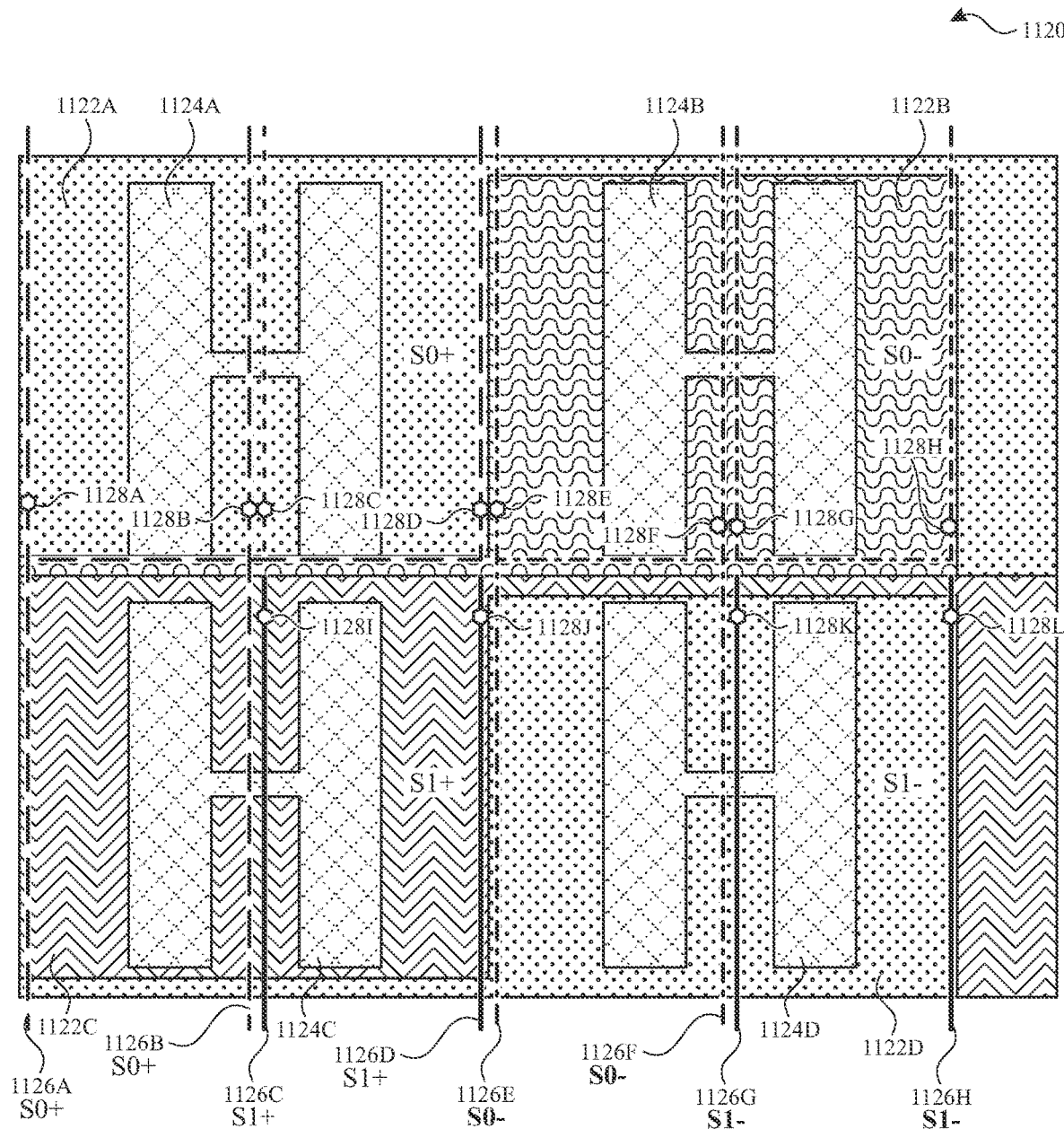
FIGS. 11C-11D illustrate portions of example touch sensor panels with non-differential routing traces or with differential routing traces according to examples of the disclosure.
Figure 11D:
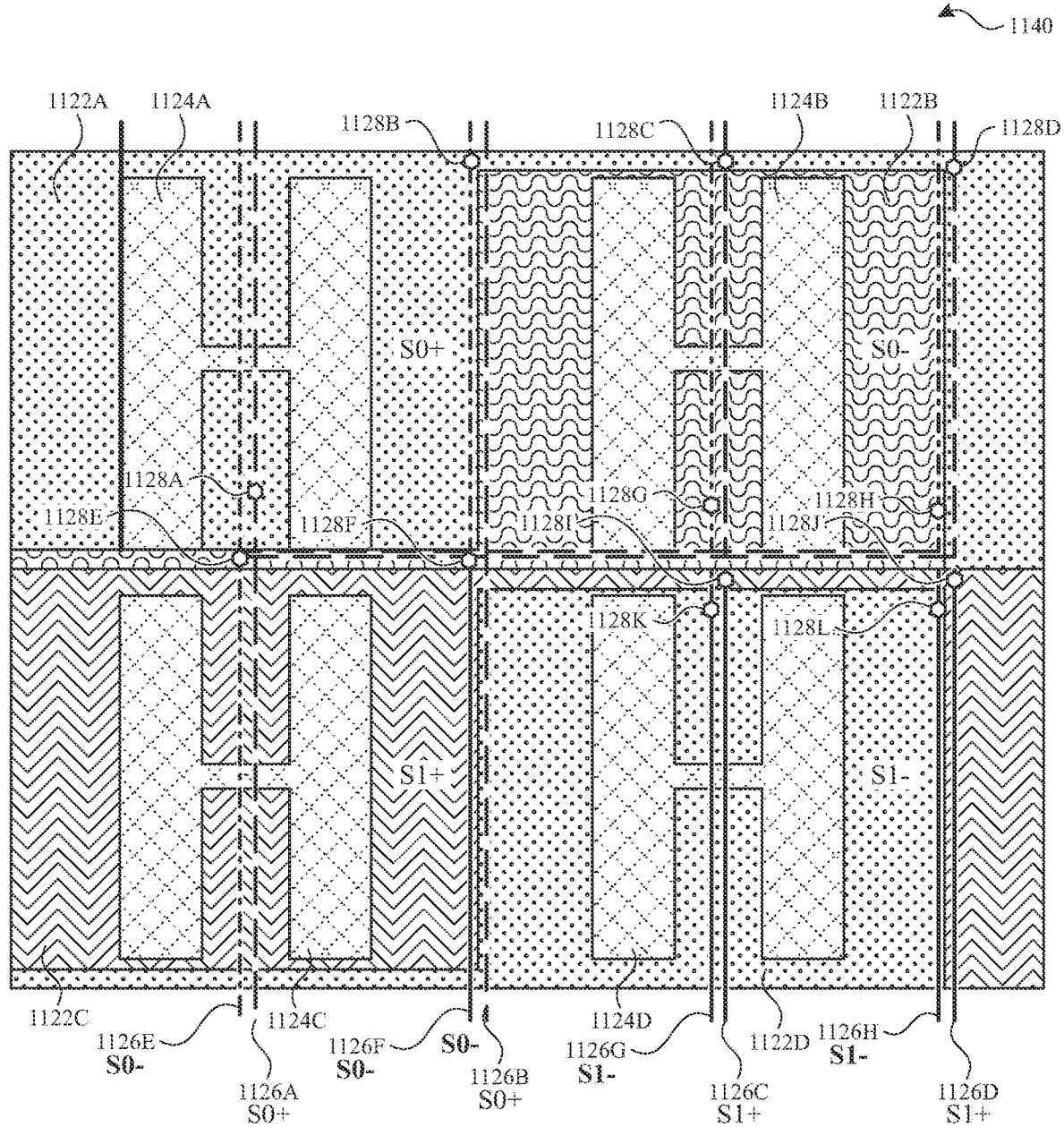

FIG. 11C and FIG. 11D illustrate portions of example touch sensor panels with non-differential routing traces or with differential routing traces according to examples of the disclosure. The respective portions of the touch sensor panel 1120 and 1140 each include a two-by-two array of touch nodes including four column electrodes 1124A-1124D (H-shaped electrodes) and four row electrodes labeled 1122A-1122D. The row electrodes 1122A-1122D can be routed to the sensing circuitry (e.g., single-ended or differential amplifiers) using routing traces 1126A-1126H. Electrical connections between the routing traces implemented in routing tracks 1126A-1126H and the row electrodes 1122A-1122D can be made using vias 1128A-1128L. For simplicity column routing is not shown in FIGS. 11C-11D. The four row electrodes can be coupled to four inputs of the sensing circuitry, referenced with labels S0+, S0, S1+, and S1− (e.g., which may be used for two differential measurement). Two row electrodes 1122A and 1122B (also labeled S0+ and S0−) can be routed to two inputs of the sensing circuitry (e.g., two terminals of a differential sense amplifier S0) for a differential measurement, and two row electrodes 1122C and 1122D (also labeled S1+ and S1−) can be routed to two inputs of the sensing circuitry (e.g., two terminals of a differential sense amplifier S1) for a differential measurement.

In some examples, as shown in non-differential configuration of FIG. 11C, the routing traces for a first input of a differential measurement can be disposed in one column and the routing traces for a second input of the differential measurement can be disposed in a second column. For example, a first routing trace can be implemented using routing trace segments in routing tracks 1126A and 1126B and using portions of routing trace segments in routing tracks 1126C and 1126D. The first routing trace can be electrically connected to row electrode 1122A using vias 1128A-1128D and can be routed vertically in the left column. Routing tracks 1126A and 1126B also overlap row electrode 1122C, but without electrical connection. In a similar manner, a second routing trace can be implemented using routing trace segments in routing tracks 1126E and 1126F and using portions of routing trace segments in routing tracks 1126G and 1126H. The second routing trace can be electrically connected to row electrode 1122B using vias 1128E-1128H and can be routed vertically in the right column. Routing tracks 1126E and 1126F also overlap row electrode 1122D, but without electrical connection. It should be understood that the routing for row electrodes 1122A and 1122B can correspond to two routing traces with a "4:2" electrical connection that includes a transition from using two vertical routing tracks to four vertical routing tracks (e.g., to double the effective width for a portion of the routing length and thereby reduce routing trace resistance). For example, routing trace segments in routing tracks 1126A and 1126B corresponding to one input of the sensing circuitry are shown to be connected and splitting into routing trace segments in four tracks over row electrode 1122A (e.g., with some horizontal interconnection between the tracks near the border between row electrode 1122A and row electrode 1122C). Likewise, routing trace segments in routing tracks 1126E and 1126F corresponding to another input of the sensing circuitry are shown to be connected and splitting into routing trace segments in four tracks over row electrode 1122B (e.g., with some horizontal interconnection between the tracks near the border between row electrode 1122B and row electrode 1122D). FIG. 11C also illustrates routing trace segments in routing tracks 1126C and 1126D that are electrically connected to row electrode 1122C using vias 1128I and 1128) and routing trace segments in routing tracks 1126G and 1126H that are electrically connected to row electrode 1122D using vias 1128K and 1128L. As described with reference to FIGS. 11A-11B, a finger touching or in proximity to the bottom right touch node including column electrode 1124C and row electrode 1122C can cause some cross-talk (e.g., modulation that distorts the touch signal) to be introduced in the measurement of the top right touch node including column electrode 1124A and row electrode 1122A due to the routing tracks 1126A and 1126B overlapping the bottom right touch node.

In some examples, the cross-talk can be mitigated using differential routing traces as illustrated in FIG. 11D. In the differential routing configuration, the routing traces for a first input of a differential measurement and the routing traces for a second input of the differential measurement can be disposed in the same column. For example, a first routing trace can be implemented using routing trace segments in routing tracks 1126A and 1126B and using portions of routing trace segments in routing tracks 1126C and 1126D, and a second routing trace can be implemented using routing trace segments in routing tracks 1126E and 1126F and using portions of routing trace segments in routing tracks 1126G and 1126H. The first routing trace is electrically connected to row electrode 1122A using vias 1128A-1128D and the second electrode is electrically connected to row electrode 1122B using vias 1128E-1128H. The segments of the first and second routing traces can be routed vertically in pairs of routing tracks (e.g., in left column, and also in the upper half of the right column). The first and second routing traces in routing tracks 1126A, 1126B, 1126E and 1126F also overlap row electrode 1122C, but without electrical connection. FIG. 11D also illustrates routing trace segments in routing tracks 1126C and 1126D that are electrically connected to row electrode 1122C using vias 11281 and 1128) and routing trace segments in routing tracks 1126G and 1126H that are electrically connected to row electrode 1122D using vias 1128K and 1128L. These segments can be routed vertically in pairs of routing tracks (e.g., in bottom right column), and these connections for row electrodes 1122C and 1122D can be made within the same column (e.g., rather than in different column as in FIG. 11C).

A finger touching or in proximity to the bottom left touch node including column electrode 1124C and row electrode 1122C can cause modulation to be introduced in the measurement of the top left touch node including column electrode 1124A and row electrode 1122A due to routing tracks 1126A and 1126B overlapping the bottom left touch node. However, the same (or similar) modulation can be introduced in due to overlapping routing tracks 1126E and 1126F overlapping the bottom left touch node. Thus a differential measurement of the inputs received from the first and second routing (e.g., including segments in at least routing tracks 1126A,1126B, 1126E, and 1126F) can cancel or reduce the cross-talk modulation (e.g., the cross-talk modulation becomes common mode). Although FIG. 11D illustrates cross-talk mitigation for a two-by-two array at 4:2 routing trace connected, it should be understood that this technique can be used for other routing traces to reduce cross-talk for regions of a larger touch sensor panel.

As described herein, a differential drive and differential sense architecture can reduce noise in the touch and/or display systems of a touch screen that may arise due to the proximity of the touch system to the display system. The use of differential drive and differential sense architecture, however, may result in a reduced signal-to-noise ratio for the sensed touch signals due to parasitic non-idealities of the implementation of the differential drive and differential sense architecture. In some examples, as described in more detail herein, staggering connections between the drive circuitry and column electrodes and/or between sense circuitry and row electrodes can reduce the parasitic effects and/or increase the signal-to-noise ratio for differential drive and differential sense architectures.

Figure 12A:
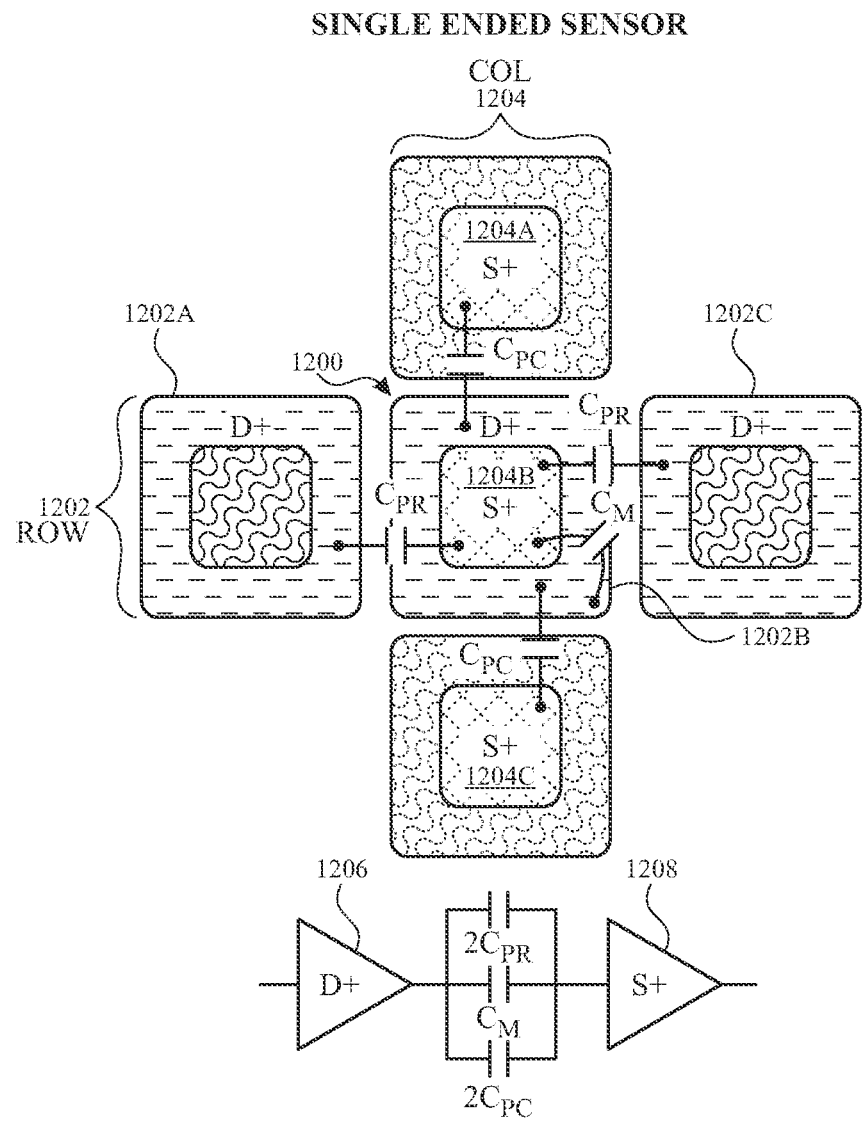
FIGS. 12A-12B illustrate an example touch node in a row-column architecture using single-ended capacitance measurements or differential capacitance measurements according to examples of the disclosure.
Figure 12B:
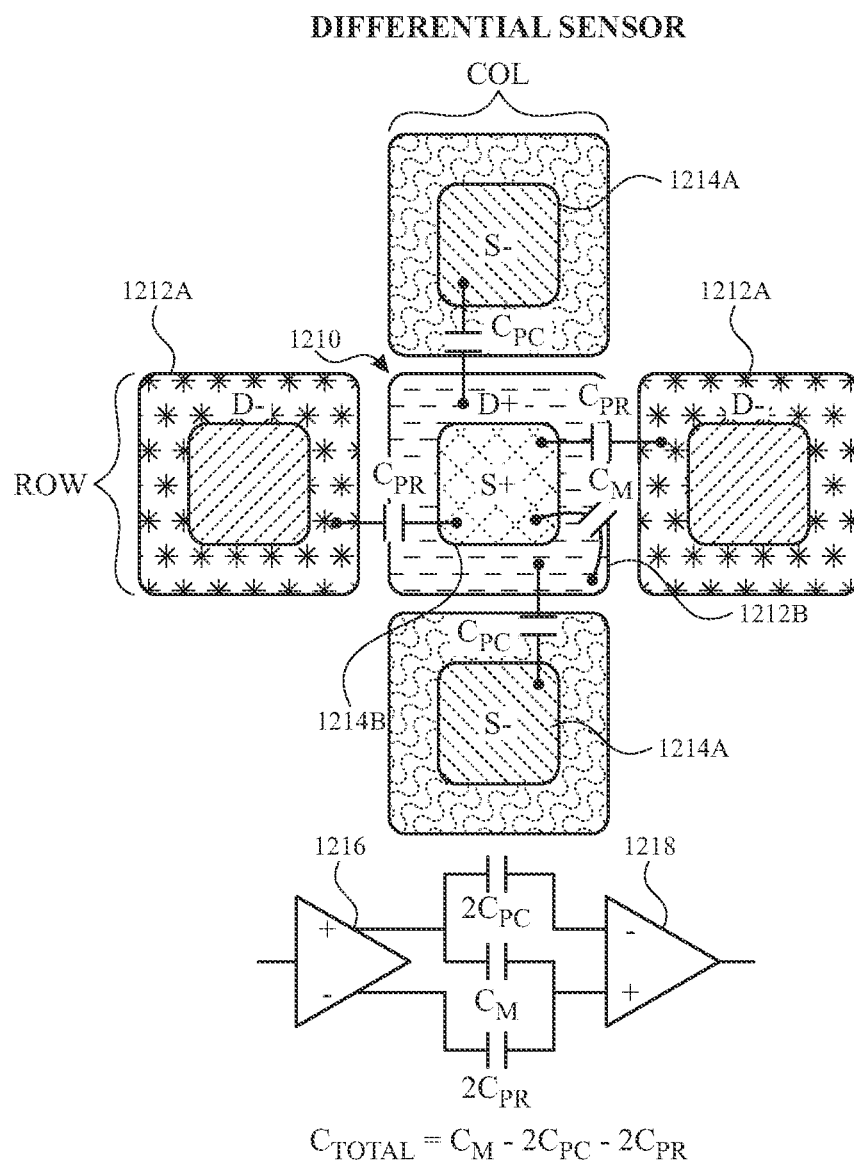

FIGS. 12A-12B illustrate an example touch node in a row-column architecture using single-ended capacitance measurements or differential capacitance measurements according to examples of the disclosure. FIG. 12A illustrates a row electrode 1202 and a column electrode 1204 of a touch sensor panel, with touch node 1200 corresponding to an adjacency between a portion of the row electrode 1202 and the column electrode 1204. As shown in FIG. 12A, the column electrode 1204 can include multiple coupled electrode segments 1204A-1204C, and the row electrode 1202 can include multiple coupled electrode segments 1202A-1202C (coupling of the segments is not shown for simplicity).

A driving circuit 1206 can stimulate the row electrode 1202 and a sensing circuit 1208 coupled to column electrode 1204 can measure a capacitance of touch node 1200. The capacitance measured by the sensing circuit can primarily measure capacitive coupling between row electrode segment 1202B and column electrode segment 1204B, illustrated by capacitance $C_M$ (main capacitance) in FIG. 12A. However, in addition to measuring $C_M$, the capacitance measurement can also include parasitic capacitances from coupled between other row electrode segments and column electrode segments of adjacent touch nodes. For example, parasitic couplings can include coupling between row electrode segments 1202A and column electrode segments 1204B ($C_{PR}$ or parasitic row coupling), coupling between row electrode segments 1202C and column electrode segments 1204B ($C_{PR}$), coupling between row electrode segments 1202B and column electrode segments 1204A ($C_{PC}$ or parasitic column coupling), and coupling between row electrode segments 1202B and column electrode segments 1204C ($C_{PC}$).

FIG. 12A illustrates a circuit diagram representing the drive circuit 1206 for row electrode 1202 and the sensing circuit 1208 for column electrode 1204, with the capacitances measured for touch node 1200 including the main capacitance, $C_M$, and the combined parasitic capacitance of two parasitic column couplings and two parasitic row couplings. Because the measurement is single-ended, these capacitances sum for a total measured capacitance of $C_M + 2C_{PC} + 2C_{PR}$.

FIG. 12B illustrates a portion of a touch sensor panel including a column with two column electrodes including a first column electrode 1214A (including two electrode segments illustrated in FIG. 12B) and a second column electrode 1214B, and a row with two row electrodes including a first row electrode 1212A (including two electrode segments illustrated in FIG. 12B) and a second column electrode 1212B. Touch node 1210 corresponding to an adjacency between column electrode 1214B and the row electrode 1212B. A driving circuit 1216 can stimulate the row electrode 1212B with a drive signal and row electrode 1212B with a complimentary drive signal (as indicated by the D+ and D− labels), and a sensing circuit 1218 coupled to column electrode 1214B and column electrode 1214A can differentially measure (as indicated by S+ and S− labels) a capacitance of touch node 1210. The capacitance measured by the sensing circuit can primarily measure capacitive coupling between row electrode 1212B and column electrode 1214B, illustrated by capacitance $C_M$ (main capacitance), and also measure the parasitic capacitances. The parasitic capacitances can include coupling between row electrode 1212A and column electrode segment 1214B ($C_{PR}$, doubled for the two adjacent segments shown in FIG. 12B), and coupling between row electrode 1202B and column electrode 1214A ($C_{PC}$, doubled for the two adjacent segments shown in FIG. 12B).

FIG. 12B illustrates a circuit diagram representing the drive circuit 1216 for the row electrodes 1212A-1212B and the sensing circuit 1218 for column electrodes 1214A-1214B, with the capacitances measured for touch node 1210 including the main capacitance, $C_M$, but attenuated by the combined parasitic capacitances. Because of the differential drive and different sense configuration, these parasitic capacitances are out of phase and sum for a total measured capacitance of $C_M - 2C_{PC} - 2C_{PR}$. The parasitic effects decrease the total measured signal, which reduces the SNR. In some examples, the parasitic effects can decrease the total measured signal by approximately 75%-80%, reducing the SNR for the touch sensor panel. Furthermore, the parasitic effects can reduce the effectiveness of differential cancelation of noise described herein, which can also increase the noise (e.g., by approximately 3-5 times) and further degrading SNR.

Figure 13A:
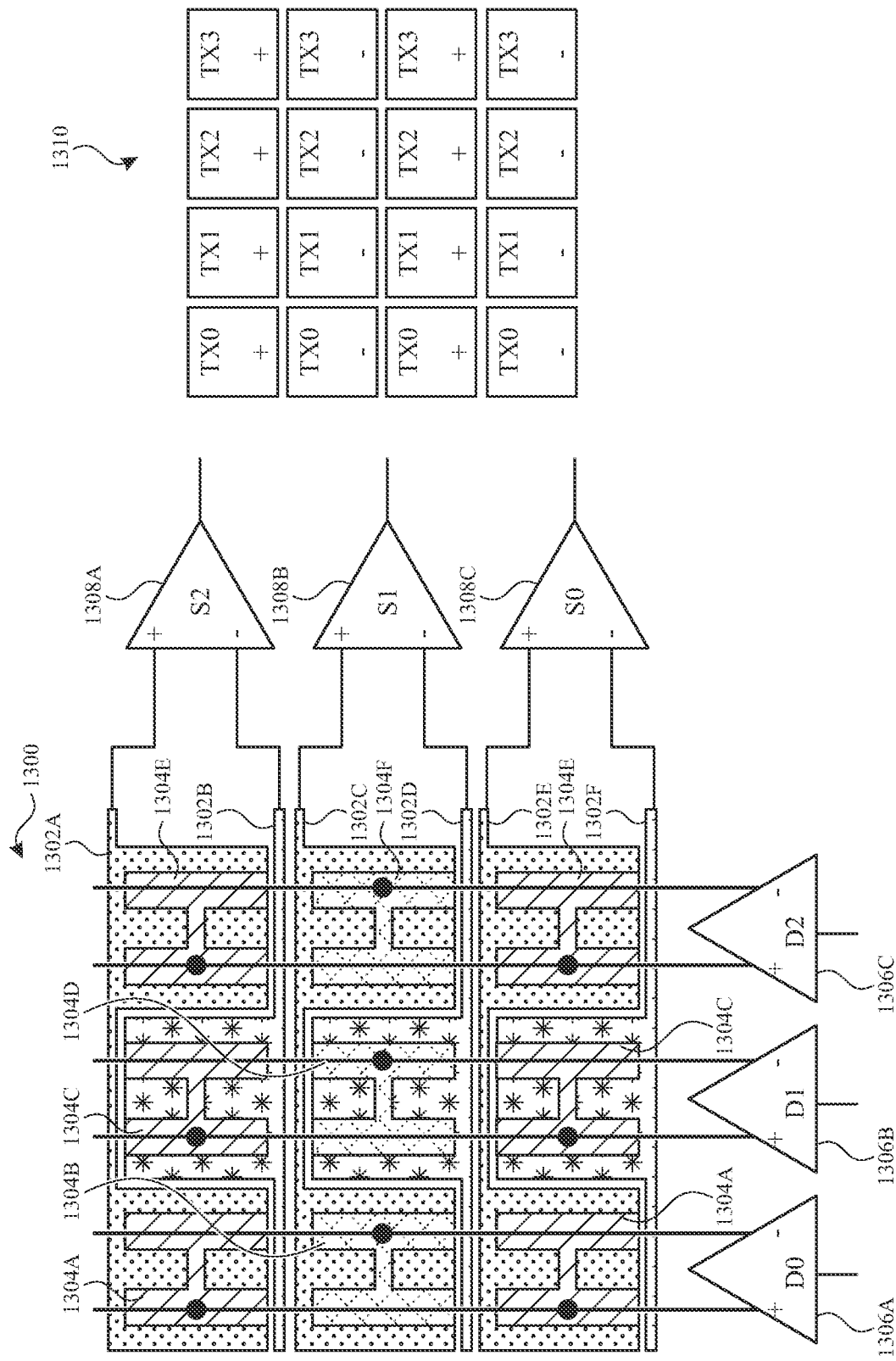
FIGS. 13A-13B illustrate portions of touch sensor panels and representations of stimulation applied the touch sensor panels according to examples of the disclosure.
Figure 13B:
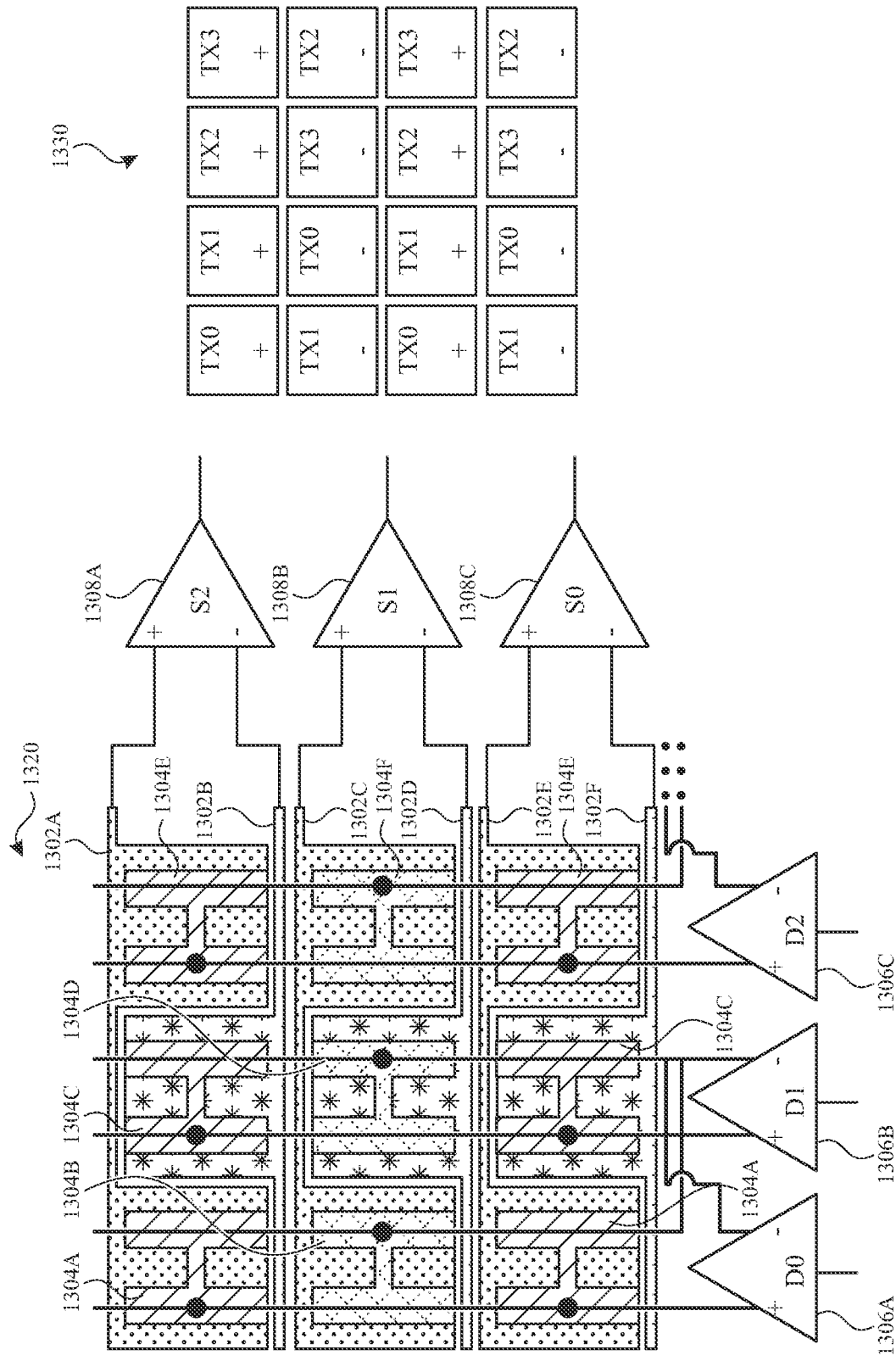

In some examples, the SNR can be approved by changing the pattern of stimulation applied to the touch sensor panel. The pattern can be changed by the coupling between routing traces and the drive circuitry (e.g., optionally using switches or alternatively by changing the codes used generate drive signals in the driver circuitry). FIGS. 13A-13B illustrate portions of touch sensor panels and representations of stimulation applied the touch sensor panels according to examples of the disclosure. Touch sensor panel 1300 can correspond to touch sensor panel 700. Touch sensor panel 1300 can include row electrodes 1302A-1302F (e.g., corresponding to row electrodes 702A-702F) and column electrodes 1304A-1304F (e.g., corresponding to row electrodes 704A-704F). Touch sensor panel can be viewed as including a two dimensional array (three rows and three columns) of effective touch nodes, with each of the touch nodes including one row electrode segment and one column electrode segment. The row electrodes can be coupled to sensing circuitry and the column electrodes can be coupled to driver circuitry (e.g., a driver/transmitter). For example, FIG. 13A illustrates a differential driver circuit 1305A (or two single-output driver circuits) coupled to column electrodes 1304A and 1304B, differential driver circuit 1305B coupled to column electrodes 1304C and 1304D, and differential driver circuit 1305C coupled to column electrodes 1304E and 1304F (e.g., generating coded, complimentary drive signals). Differential amplifiers 1308A-1308C (or multiple single-ended amplifiers) can be coupled to a respective pair of row electrodes 1302A-1302F.

Touch sensor panel 1300 can be viewed as an expansion of the view of a portion of a touch sensor panel presented in FIG. 12B (although the row/column conventions for driving and sensing are different between FIGS. 12B and 13A). For example, touch node 1210 can correspond to the touch node in the center of touch sensor panel 1300 corresponding to column electrode 1304D and row electrode 1302D. The polarity of the drive signal applied to adjacent column electrode 1304C is complimentary in a similar manner as shown by the complimentary phase of adjacent row electrode 1212A, and likewise the polarity for the differential amplifier terminal coupled to adjacent row electrode 1302C is opposite the polarity of row electrode 1302D as shown by the opposite polarity of adjacent column electrode 1214A.

FIG. 13A also illustrates a representation 1310 of the stimulation applied to a touch sensor panel. Representation 1310 shows stimulation of a 4×4 array of touch nodes though the portion of touch sensor panel 1300 shown in FIG. 13A only shows a 3×3 array. Representation 1310 shows that a set of complimentary drive signals is used within each column (e.g., with the drive signals labeled TX0, TX1, etc. using indexing corresponding to the driver circuits with labels D0, D1, etc.). For example, the leftmost column uses opposite phases of TX0 (alternating + and −), and each column to the right uses opposite phases of TX1, TX2, and TX3, respectively (where TX0, TX1, TX2 and TX3 can be orthogonal drive signals). In a similar manner, each row of row electrodes couples to the differential input of one corresponding differential amplifier. As described with respect to FIG. 12B, such a configuration can be susceptible to a reduction in SNR due to parasitic capacitances.

FIG. 13B illustrates touch sensor panel 1320 corresponding to touch sensor panel 1300, but having different coupling between the driver circuitry and the column electrodes. For example, as shown in FIG. 13B, the complimentary drive signals can be applied in different columns such that the complimentary drive signals are diagonally adjacent (staggered). For example, as shown in representation 1330 of the stimulation applied to a touch sensor panel, each drive signal can have its compliment applied to the touch node (using the column electrode) that is offset by one row and one column. For example, TX0+ is applied to the touch node at column 1, row 1 and its compliment is applied to the touch node at column 2, row 2. Similar relationships for the complimentary touch signals can be applied across the touch sensor panel. Staggering the complimentary drive signals can reduce the size of parasitic capacitances (e.g., $C_{PC}$ shown in FIG. 12B) because the diagonal distance between the electrodes is greater than non-diagonally adjacent electrodes, and thereby increase the signal (boosting SNR). In some examples, the boost in signal can be between 80%-100% (or more) compared with the non-staggered stimulation pattern of FIG. 13A. It should be understood that staggering increases the differential cancelation pitch (e.g., the distance between the complimentary signals), which increases the area over which the differential signals cancel. As a result, increasing the differential cancelation pitch can result in less cancelation of coexistence noise (e.g., an increase in touch-to-display noise). However, the reduction in cancelation of coexistence noise may be outweighed by the improved signal level to improve SNR. Although staggering is shown for diagonally adjacent touch nodes in pairs of columns that other staggering patterns are possible, with a tradeoff between the level of suppression of coexistence noise (which improves with a smaller differential cancelation pitch) with the signal level (which improves by increasing the distance between the drive electrodes with opposite phase). It should also be understood that because display-to-touch noise is primarily mitigated by differential sensing, that staggering the stimulation pattern should not impact (or have minimal impact on) the level of display-to-touch noise.

As shown in FIG. 13B, staggering can be implemented by changing the routing between the column electrodes and the driving circuitry. For example, the routing traces output by driver circuit 1306A can include one output to column electrode 1304A and the complimentary output to column electrode 1304D (rather than to 1304B as in FIG. 13A). Likewise, the routing traces output by driver circuit 1306B can include one output to column electrode 1304C and the complimentary output to column electrode 1304B (rather than to 1304D as in FIG. 13A). In some examples, the staggering can be implemented using the driver circuitry without changing the routing between the driver circuitry and the electrodes of the touch sensor panel. For example, switching circuitry can be implemented between the output of the driver circuitry and the routing traces to achieve the staggered pattern of drive signals. Alternatively, the driver circuitry can be configured to generate the staggered pattern using different control signals (e.g., output TX0− from the output of driver circuit 1305B coupled to column electrode 1304D in FIG. 13A and output TX1− from the output of driver circuit 1305A coupled to column electrode 1304B. Implementing the staggering pattern without changing the routing can provide improved flexibility for implementing differential and non-differential scans. For example, although the touch sensing may be implemented using a differential configuration, in some examples, stylus sensing can be implemented without using different driving or different sensing. For example, the plurality of first electrodes and the plurality of second electrodes can be configured as receiver electrodes in an active stylus sensing operation. The first row electrode and a second row electrode for each row of the two-axis array of touch nodes can be coupled together and to an input of a sensing circuit. Thus, implementing the staggering pattern without changing the routing allows for implementation of either differential or single-ended scanning modes.

In some examples, the differential driving and sensing can operate in different modes for touch sensing based on noise conditions. For example, the touch system may perform a touch sensing operation using staggering described herein under relatively more noisy conditions (e.g., above a threshold amount of noise, while a charger is plugged in, etc.) so that the sensed signal can be boosted (but with less cancelation of coexistence noise), but the touch system may perform a touch sensing operation without staggering under relatively less noisy conditions (e.g., less than the threshold amount of noise, while not plugged into the charger, etc.) so that the improved cancelation can occur, but the signal level may be relatively small (e.g., attenuated compared with staggering).

Although staggering is described primarily in the context of the stimulation applied to the column electrodes of FIG. 13B, it is understood that a similar principle can be additional or alternatively applied to staggering the connections between the row electrodes and sensing circuitry. For example, rather than sensing both row electrodes in a row differentially using one differential amplifier, in some examples, one row electrode can be coupled to a first input of a first differential amplifier and a second row electrode can be coupled to a first input of a second differential amplifier. It is understood that if staggering is implemented for both the stimulation and sensing sides of the touch sensor panel that care should be taken so that staggering applied to the stimulation side and the staggering applied to the sensing side do not interfere with the ability to measure the differential touch signal.

Figure 14A:
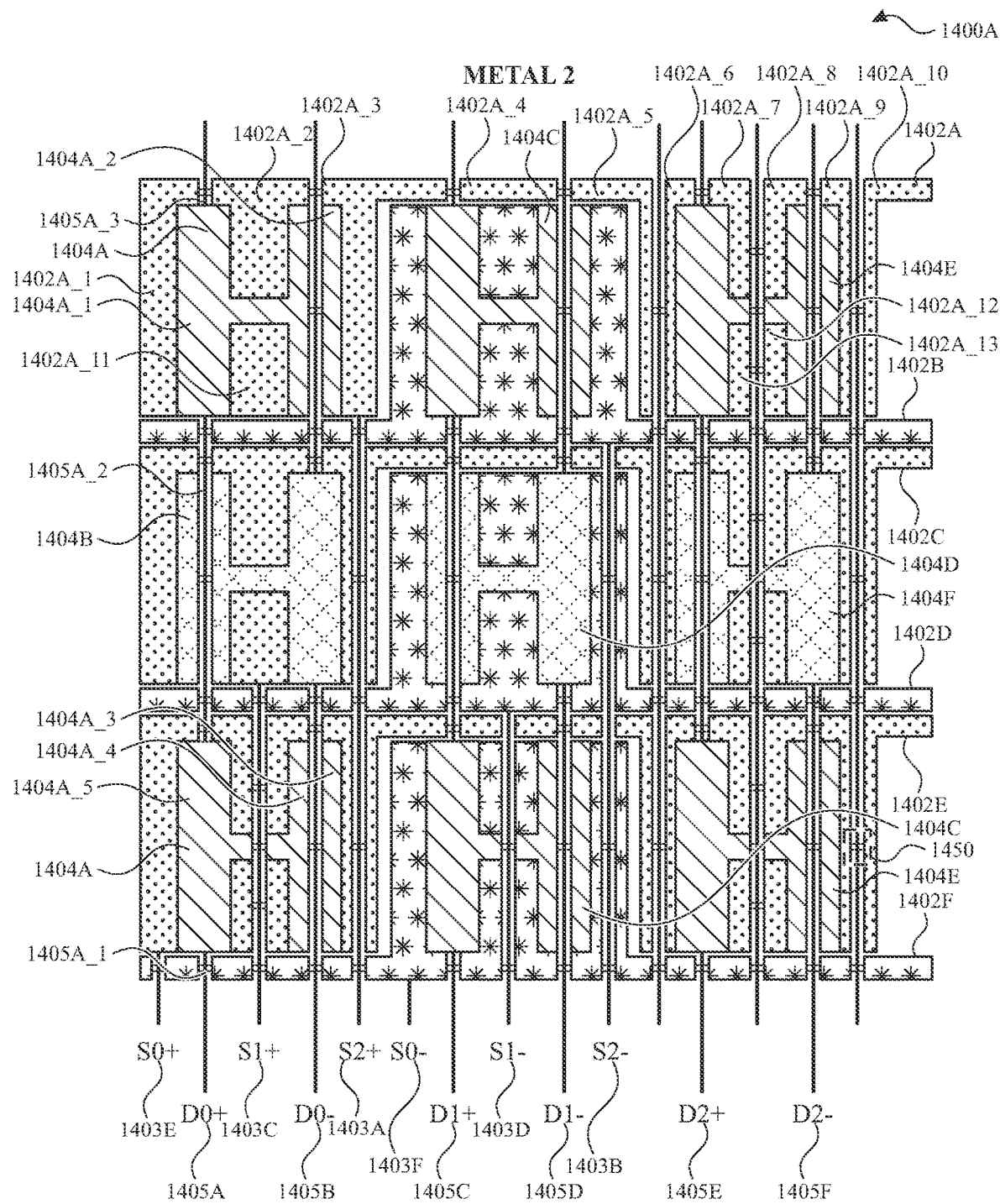
FIGS. 14A-14B illustrate a two-layer configuration including touch electrodes and routing traces in a first layer and bridges in a second layer according to examples of the disclosure.
Figure 14B:
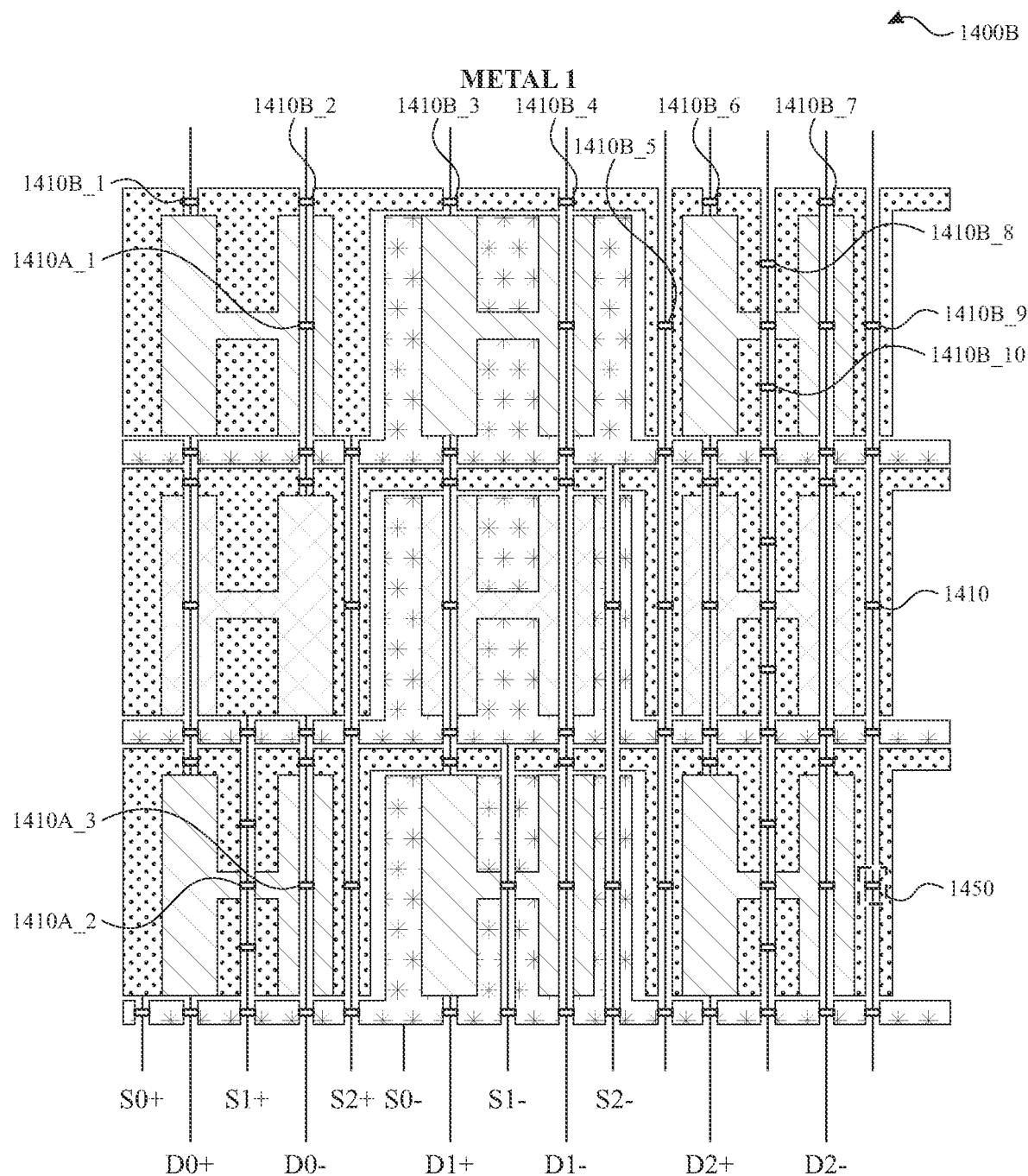

As described herein, in some examples, routing for including row electrodes and column electrodes of a touch sensor panel can be implemented at least partially in the active area. Active area routing can allow for a device with a reduced border area (e.g., around the active area). FIGS. 14A-14B illustrate a two-layer configuration (e.g., corresponding to touch sensor panel 700) including touch electrodes and routing traces in a first layer and bridges in a second layer according to examples of the disclosure. Specifically, FIG. 14A illustrates a first layer 1400A (also referred to herein a "metal 2" or "TM2") of the two-layer configuration and FIG. 14B illustrates a second layer 1400B (also referred to herein a "metal 1" or "TM1") of the two-layer configuration. The first layer 1400A and the second layer 1400B can both be metal mesh layers corresponding to metal layers 506 and 516. In some examples, the first layer including touch electrodes can be positioned relatively closer to the cover glass than the second layer. To show the overlapping contents of the layers, FIGS. 14A-14B each illustrate the touch electrodes, routing traces and bridges, but touch electrodes and routing traces in layer 1400A are emphasized and the bridges in layer 1400B are deemphasized in FIG. 14A, whereas bridges in layer 1400B are emphasized and touch electrodes and routing traces in layer 1400A are deemphasized in FIG. 14B. The emphasis is provided with darker/thicker lines compared with the lighter/thinner lines for deemphasized contents.

FIG. 14A illustrates row electrodes 1402A-1402F and column electrodes 1404A-1404F (e.g., corresponding to row electrodes 702A-702F and column electrodes 704A-704F). Additionally, FIG. 14A illustrates row routing traces 1403A-1403F and column routing traces 1405A-1405F (e.g., corresponding to row routing traces 703A-703F and column routing traces 705A-705F). FIG. 14B illustrates bridges 1410, which can be connected to the first layer using a pair of vias at opposite ends of the bridge (e.g., horizontal ends). Unlike in FIG. 7A, which illustrates the routing traces in a different layer than the touch electrodes, in FIGS. 14A-14B the routing traces are implemented in the same layer. As a result, the routing traces that may be used to interconnect segments of touch electrodes together (and to drive/sense circuitry) may also cause further segmentation of the metal mesh of the touch electrodes. In some examples, these segments of the touch electrodes can be electrically interconnected using bridges. For example, the column electrodes 1404A-1404F can include multiple conductive segments interconnected by routing and/or bridges. Likewise, row electrodes 1402A-1402F can include multiple conductive segments connected together and to sensing circuitry by routing and/or bridges.

As an illustrative example, column electrode 1404A can include conductive segments 1404A_1-1404A_5 (rather than two segments shown in FIG. 7 due to routing traces 1403C and 1405B) that are connected together and to driving circuitry by routing trace 1405A (including routing trace segments 1405A_1-1405A_3) and bridges 1410 (including bridges 1410A_1-1410A_3 that bridge the conductive segments over routing traces 1403C and 1405B). As another illustrative example, row electrode 1402A can include conductive segments 1402A_1-1402A_13 (rather than two segments 702A' and 702A" connected by routing 702A''' as shown in FIG. 7 due to routing traces including 1405A-1405F, additional row routing trace lines) that are connected together and to sensing circuitry by routing 1403A and bridges 1410 (including bridges 1410B_1-1410B_10 that bridge the conductive segments over routing traces including 1405A-1405F).

It is understood that FIG. 14A-14B show an exemplary representation of electrodes, routing and bridges, but that other arrangements of the electrodes, routing and bridges can be implemented. It is also understood that for simplicity of illustration some bridges between conductive segments may not be shown (e.g., conductive segment 1402A_1, conductive 1402A_3 and/or conductive segment 1402A_11 may extend beyond and be connected at the bottom edge(s) of conductive segment 1404A_1, including by one or more bridges over routing traces, such as over routing trace 1405A_2). Although FIGS. 14A-14B illustrate two vertical routing traces for complimentary drive signals per column of column electrodes and two vertical routing traces per row of row electrodes (e.g., two vertical routing traces per pair of row electrode), it should be understood that different numbers of vertical routing traces for rows and/or columns is possible. It should be understood that although touch sensor panel of FIGS. 14A-14B includes a 3×3 array of nine dominant capacitance values (e.g., corresponding to nine effective touch nodes), that the touch sensor panel can be scaled up or down to include fewer or more touch nodes.

Figure 14C:
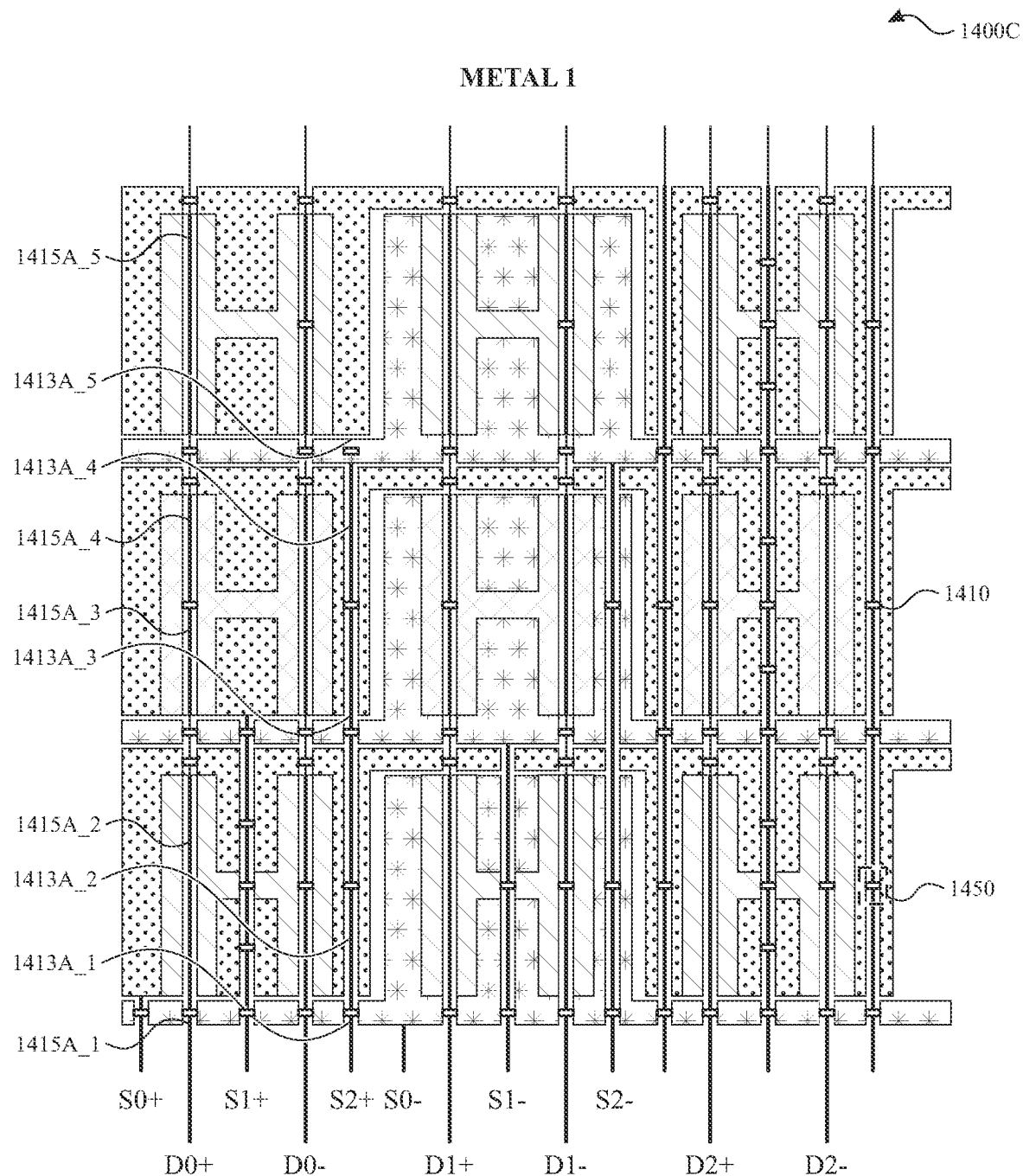
FIG. 14C illustrates bridges and stacked routing traces in a second layer of a two-layer configuration (including touch electrodes and routing traces in a first layer corresponding to FIG. 14A) according to examples of the disclosure.

FIGS. 14A and 14C illustrate a two-layer configuration (e.g., corresponding to touch sensor panel 700) including touch electrodes and routing traces in a first layer and bridges and stacked routing traces in a second layer according to examples of the disclosure. Stacking the routing traces can reduce the resistance of the routing traces and increase the bandwidth of the touch sensor panel compared with the two-layer configuration of FIGS. 14A-14B without the stacked routing traces. Specifically, FIG. 14A illustrates a first layer 1400A (also referred to herein a "metal 2" or "TM2") of the two-layer configuration and FIG. 14B illustrates a second layer 1400C (also referred to herein a "metal 1" or "TM1") of the two-layer configuration. The first layer 1400A and the second layer 1400C can both be metal mesh layers corresponding to metal layers 506 and 516. In some examples, the first layer including touch electrodes can be positioned relatively closer to the cover glass than the second layer. To show the overlapping contents of the layers, FIGS. 14A and 14C each illustrate the touch electrodes, routing traces and bridges, but touch electrodes and routing traces in layer 1400A are emphasized and the bridges in layer 1400C are deemphasized in FIG. 14A, whereas bridges and routing in layer 1400C are emphasized and touch electrodes and routing traces in layer 1400A are deemphasized in FIG. 14C. The emphasis is provided with darker/ thicker lines compared with the lighter/thinner lines for deemphasized contents.

As described herein, FIG. 14A illustrates row electrodes 1402A-1402F, column electrodes 1404A-1404F, row routing traces 1403A-1403F and column routing traces 1405A-1405F. FIG. 14C illustrates bridges 1410, row routing trace 1413A-1413F and column routing traces 1415A-14145F. Bridges 1410 can be connected to the first layer using a pair of vias at opposite ends of the bridge (e.g., horizontal ends) to connect segments that are otherwise electrically disconnected due to a routing trace. Unlike in FIG. 14B, which illustrates bridges without routing traces in the second layer, in FIG. 14C, the second layer can also include additional routing traces corresponding to the routing traces in the first layer (stacked routing traces). The routing traces in layers 1400A and 1400C can be coupled together outside the active area or using vias within the active area.

For example, in addition to coupling the segments of column electrode 1404A together and to driving circuitry using routing trace 1405A (including routing trace segments 1405A_1-1405A_3) in layer 1400A, additional routing trace segments 1415A_1-1415A_5 in the second layer 1400C can be used to reduce the effective resistance of the routing trace (e.g., by approximately half). For example, routing trace segment 1415A_1 can run parallel to routing trace segment 1405A_1 and routing trace segments 1415A_3 and 1415A_4 can run parallel to routing trace segment 1405A_2, and so on. Additionally, routing trace segments 1415A_2 and 1415A_5 can run parallel to routing trace segments 1404A_5 and 1404A_1, respectively, as well.

In a similar manner, stacked routing can be used for row routing traces. For example, in addition to coupling the segments of row electrode 1402A together using bridges 1410 (in layer 1400C) and to sensing circuitry using routing trace 1403A in layer 1400A, additional routing traces segments 1413A_1-1413A_5 in the second layer 1400C can be used to reduce the effective resistance of the routing trace (e.g., by approximately half). For example, routing trace segments 1415A_1-1415A_5 can run parallel to row routing trace 1403. The routing trace segments in layer 1400C can be interrupted by the bridges in layer 1400C.

It is understood that FIGS. 14A and 14C show an exemplary representation of electrodes, routing and bridges, but that other arrangements of the electrodes, routing and bridges can be implemented. It is also understood that for simplicity of illustration some bridges between conductive segments may not be shown (e.g., conductive segment 1402A_1, conductive 1402A_3 and/or conductive segment 1402A_11 may extend beyond and be connected at the bottom edge(s) of conductive segment 1404A_1, including by one or more bridges over routing traces, such as over routing trace 1405A_2). Although FIGS. 14A and 14C illustrate two vertical routing traces for complimentary drive signals per column of column electrodes and two vertical routing traces per row of row electrodes (e.g., two vertical routing traces per pair of row electrode), it should be understood that different numbers of vertical routing traces for rows and/or columns is possible. It should be understood that although touch sensor panel of FIGS. 14A and 14C includes a 3×3 array of nine dominant capacitance values (e.g., corresponding to nine effective touch nodes), that the touch sensor panel can be scaled up or down to include fewer or more touch nodes.

Figure 15A:
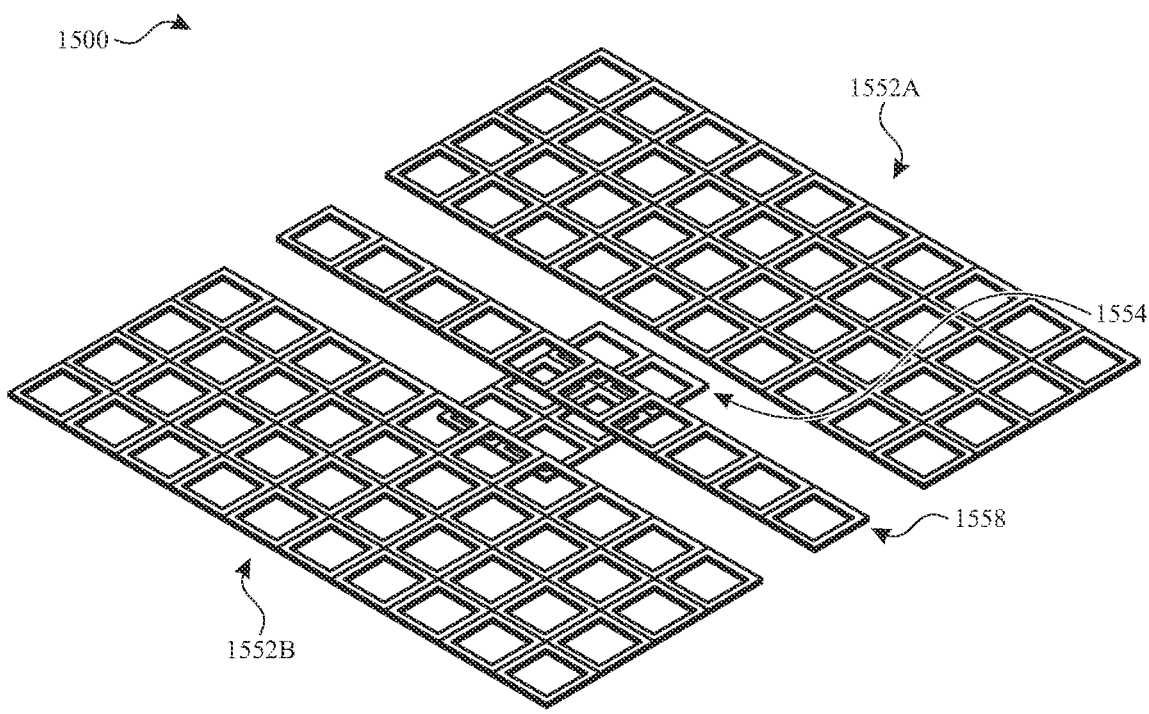
FIGS. 15A-15B illustrate partial views of the two-layer configuration of FIGS. 14A-14C according to examples of the disclosure.
Figure 15B:
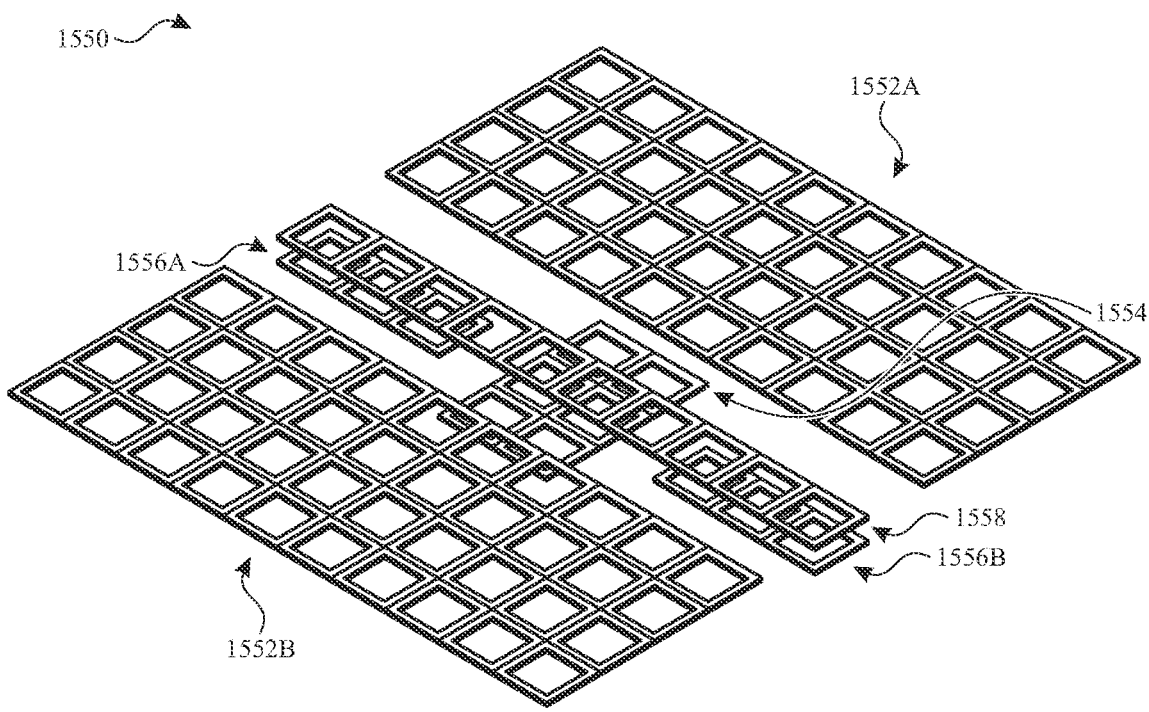

FIGS. 15A-15B illustrate partial views 1500 and 1550 of a region 1450 of the two-layer configuration of FIGS. 14A-14C including two touch electrode segments 1552A-1552B and a routing trace 1158 in the first layer (e.g., metal 2 layer) and a bridge 1554 and optionally stacked routing trace segments 1556A-1556B in the second layer (metal 1 layer) according to examples of the disclosure. Partial view 1500 corresponds to the two-layer configuration of FIGS. 14A and 14B, whereas partial view 1550 corresponds to the two-layer configuration of FIGS. 14A and 14C. Although not shown the first and second layers can be separated by an insulating layer (e.g., a dielectric layer). The electrodes, routing, and bridges in FIGS. 15A-15B are shown as a mesh representative of a metal mesh implementation of the electrodes. As described herein, one end of bridge 1554 can be coupled to touch electrode segments 1552A (e.g., using a via through an intermediate dielectric layer separating the first and second layers) and a second end of bridge 1554 can be coupled to touch electrode segment 1552B (e.g., using a via through an intermediate dielectric layer separating the first and second layers). Stacked routing trace segments 1556A-1556B in partial view 1550 (but not shown in partial view 1500 or in corresponding FIG. 14B) can each be coupled to routing trace 1558 (e.g., using vias through the intermediate dielectric layer).

Figure 16:
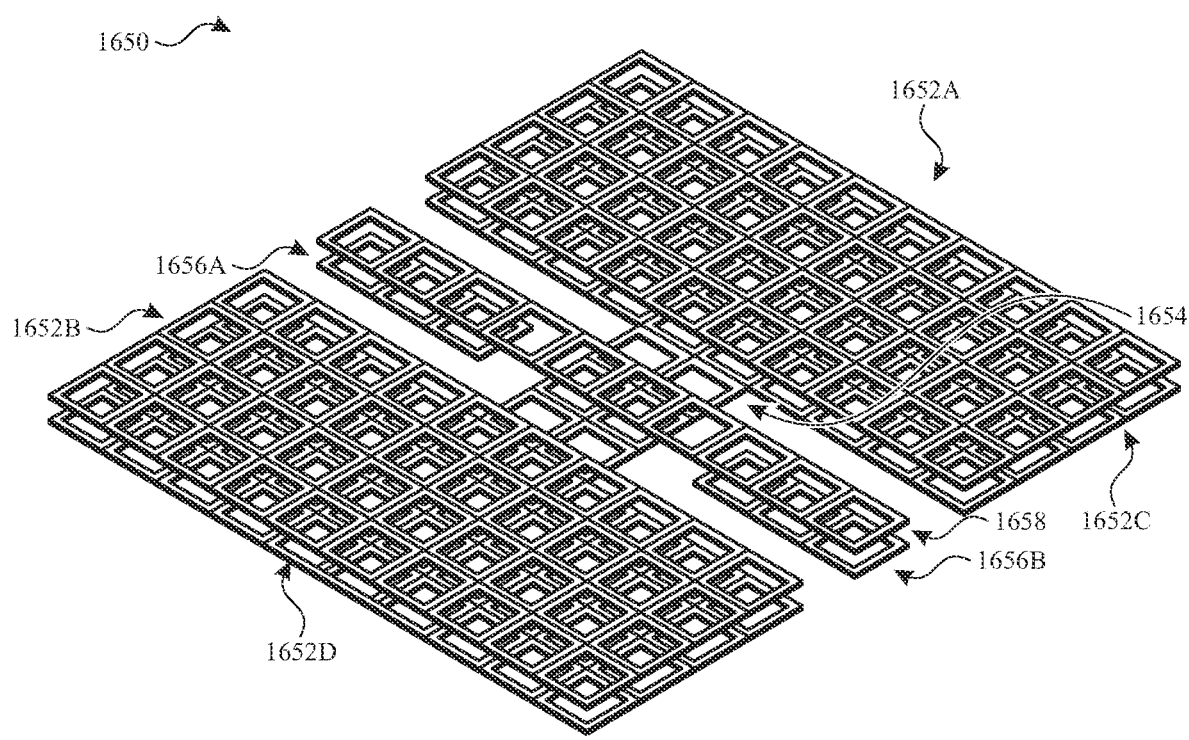
FIG. 16 illustrates a partial view of the two-layer configuration including stacked touch electrode segments in the first layer and the second layer, a routing trace in the first layer and stacked routing trace segments in the second layer according to examples of the disclosure.

FIG. 16 illustrates a partial view 1650 of the two-layer configuration including stacked touch electrode segments 1652A-1652D in the first layer and the second layer (including a bridging portion 1654), a routing trace 1658 in the first layer and stacked routing trace segments 1656A-1656B in the second layer according to examples of the disclosure. Stacking the routing traces and stacking the touch electrodes can increase the bandwidth of the touch sensor panel compared with the two-layer configuration of FIGS. 14A-14B without the stacked routing traces and without stacked electrodes and compared with the two-layer configuration of FIGS. 14A and 15A without the stacked touch electrodes. For example, in addition to reducing the resistance of the routing traces, the stacked touch electrodes can increase the capacitive signal coupling. FIG. 16 includes a partial view of for ease of illustration, but it is understood that stacked touch electrodes and stacked routing traces can be implemented throughout a touch sensor panel as described herein. Additionally, the stacked touch electrodes of FIG. 16 provide flexibility for placement of the via between touch electrode segments of the two layers in comparison to the configurations of FIGS. 14A-15B. For example, in FIG. 14B and FIG. 15B, the opposite ends of each bridge can be connected using two vias (e.g., one via per end) to interconnect the two segments using the bridge. However, as shown in FIG. 16, the stacked touch electrode including touch electrode segments 1652C-1652D and bridging portion 1654 are interconnected in the second layer, and can be interconnected with the touch electrode segments 1652A-1652B at any overlapping region between the touch electrode segments between the two layers.

Figure 17A:
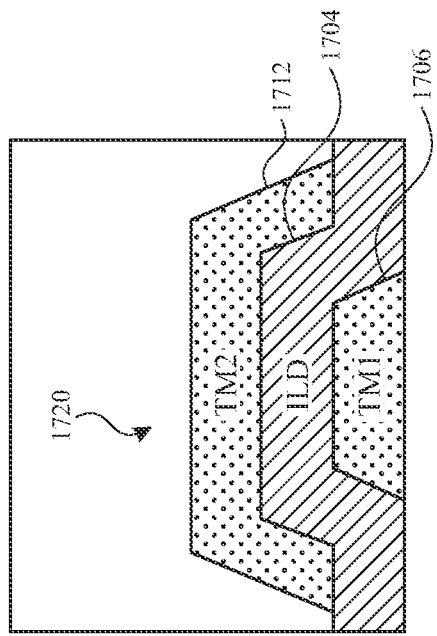
FIGS. 17A-17D illustrate cross-sectional views of a portion of example two-layer configurations according to examples of the disclosure.
Figure 17C:
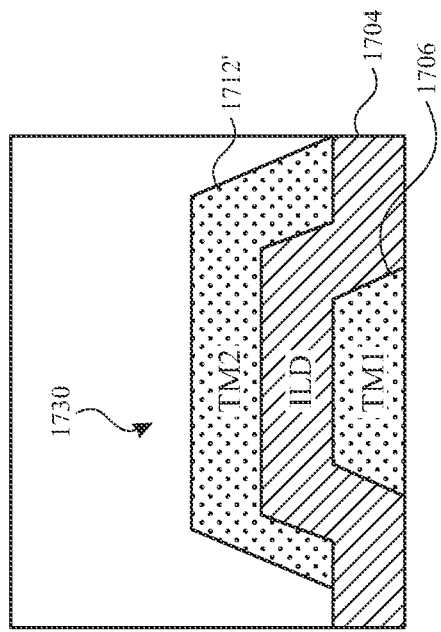
Figure 17B:
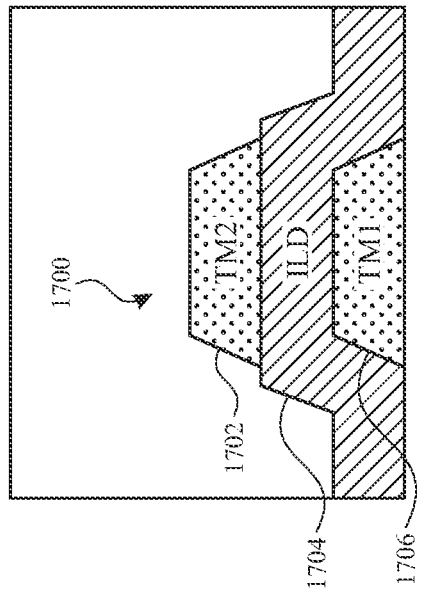

Stacking routing and/or touch electrodes as described herein can result in reduced optical performance (e.g., visibility of the metal mesh) for a device. In particular, misalignment between metal mesh between the first layer and the second layer can increase the visibility of metal mesh to a user. FIGS. 17A-17D illustrate cross-sectional views 1700, 1710, 1720 and 1730 of a portion of example two-layer configurations according to examples of the disclosure. FIGS. 17A-17B illustrate cross-sectional views of a portion of the two-layer configuration with metal mesh 1702/1702' in the first layer disposed on an inter-layer dielectric (ILD) 1704, which can be disposed on metal mesh 1706 in the second layer. The metal mesh can correspond to routing trace segments in the first and second layers corresponding to stacked routing. The metal mesh in the first layer the in the second layer can have equal widths (e.g., the trapezoid representing the metal mesh trace can have the same base width). In FIG. 17A, the metal mesh 1702 in the first layer and the metal mesh 1706 in the second layer can be aligned such that metal mesh 1706 in the second layer may not be visible to a user looking down at the top of the first layer. However, as shown in FIG. 17B, when the metal mesh 1702' in the first layer is not aligned with the metal mesh 1706 in the second layer (e.g., due to manufacturing limitations), metal mesh 1706 in the second layer can be visible to a user looking down at the top of the first layer.

Figure 17D:
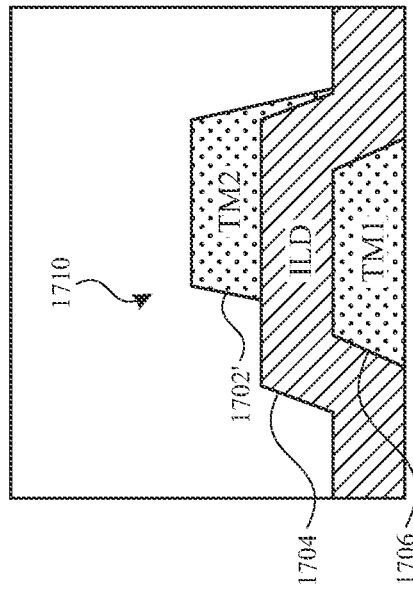

In some examples, increasing the width of metal mesh in the first layer and/or shrinking the width of the metal mesh in the second layer can improve the optical performance by ensuring that the metal mesh in the first layer overlaps the metal mesh in the second layer. FIGS. 17C-17D illustrate cross-sectional views of to portion of the two-layer configuration with metal mesh 1712/1712' in the first layer disposed on an inter-layer dielectric (ILD) 1704, which can be disposed on metal mesh 1706 in the second layer. The metal mesh can correspond to routing trace segments in the first and second layers corresponding to stacked routing. The metal mesh in the first layer the in the second layer can have unequal widths. In particular, the metal mesh 1712/1712' in the first layer ("TM2") can be wider than the metal mesh in the second layer ("TM1") to improve optical performance of the touch sensor panel. As shown in FIGS. 17C-17D, whether the metal mesh 1712 in the first layer aligns (e.g., is centered) with the metal mesh 1706 in the second layer or whether the metal mesh 1712' is offset (off-center) from that metal mesh 1706 in the second layer, metal mesh 1706 may not be visible to a user looking down at the top of the first layer, thereby reducing the visibility of the metal mesh overall.

In some examples, the visibility improvement can be achieved by increasing the width of the metal mesh 1712/1712' compared with the width of metal mesh 1702/1702'. In some examples, the visibility improvement can be achieved by decreasing the width of the metal mesh 1706 shown in FIGS. 17C-17D compared with the width of metal mesh 1706 shown in FIGS. 17A-17B. In some examples, the visibility improvement can be achieved by increasing the width of the metal mesh 1712/1712' compared with the width of metal mesh 1702/1702' and decreasing the width of the metal mesh 1706 shown in FIGS. 17C-17D compared with the width of metal mesh 1706 shown in FIGS. 17A-17B. For example, metal mesh 1702 and metal mesh 1706 can be 4 microns wide each in FIG. 17A, but metal mesh 1712 and metal mesh 1706 can be 5 microns and 3 microns wide, respectively.

Figure 18:
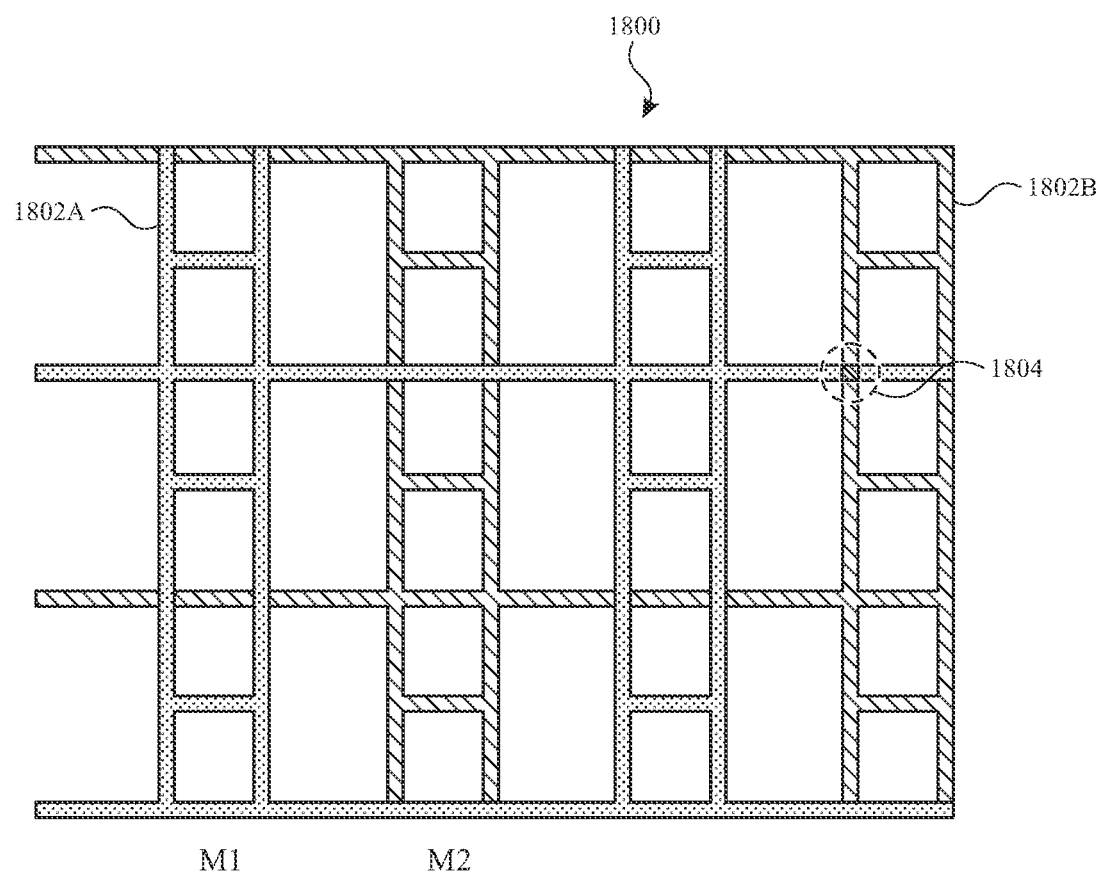
FIG. 18 illustrates a portion of a two-layer configuration including a touch electrode implemented partially in a first layer and partially in a second layer according to examples of the disclosure.

In some examples, optical performance of a touch sensor panel can be improved by implementing a touch electrode partially in two layers rather than fully stacking the touch electrodes (e.g., as shown in FIG. 16). FIG. 18 illustrates a portion of a two-layer configuration including a configuration 1800 of a touch electrode implemented partially in a first layer and partially in a second layer according to examples of the disclosure. For example, metal mesh 1802A can be implemented in a first layer and metal mesh 1802B can be implemented in a second layer. Referring back to FIG. 16, touch electrode segments 1652A and 1652C overlap and touch electrode segments 1652B and 1652D overlap. As a result, in order to reduce optical artifacts, the alignment of the metal mesh traces (e.g., described in FIG. 17A) must be maximized across relatively large area of the touch electrode. For example, FIG. 16 shows the horizontal and/or vertical portions of the metal mesh in parallel between the two layers. In contrast, in configuration 1800 of FIG. 18, the metal mesh 1802A can be implemented in a first layer and the metal mesh 1802B can be implemented in a second layer such that the overlap between the two layers is reduced. Furthermore, as shown in FIG. 18, when the metal mesh 1802A in the first layer and the metal mesh 1802B in the second layer overlap, the overlapping point is a non-parallel intersection (e.g., orthogonal crossing). For example, crossing point 1804 can represent a square or rectangular overlapping area at which the metal mesh 1802A and metal mesh 1802B overlap. This same square or rectangular overlapping area can appear at each crossing point shown in FIG. 18. As a result, the appearance of the metal mesh between the first and second layers can have relatively uniform appearance across the touch sensor panel (e.g., uniform area at crossing points and uniform width outside of the crossing points).

As with FIG. 16, the configuration 1800 of FIG. 18 also provides flexibility in terms of placement of vias (e.g., not limited to bridges as in the configurations of FIGS. 14A-15B). However, it should be understood that the bandwidth improvement from the configuration of FIG. 18 is relatively less than the bandwidth improvement from the configuration of FIG. 16 (e.g., because there is less metal mesh used to implement the touch electrode across the two layers), whereas the optical performance of the configuration of FIG. 18 may be greater than the optical performance of the configuration of FIG. 16.

As described herein (e.g., with respect to FIG. 11A-11D), in some examples, the routing traces for a row to a (differential) sense amplifier can impact cross-talk between adjacent rows within a column. In some examples, the cross-talk can be mitigated using differential routing traces as described with reference to FIG. 11D, for example, when performing differential measurements. However, some touch sensor panel operations may not include differential measurements. For example, a self-capacitance scan—in which the touch electrodes can be stimulated with the same phase drive signal simultaneously—or a stylus scan may not be performed differentially. In some examples, the cross-talk can be reduced by burying the routing trace (e.g., rather than stacking the routing trace as described with reference to FIG. 15A or FIG. 16).

Figure 19A:
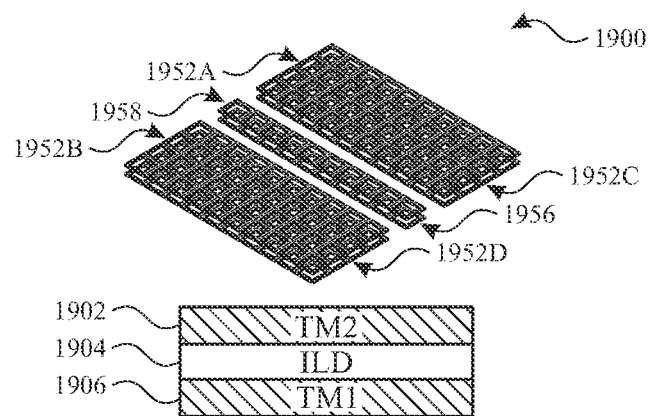
FIG. 19A illustrates a partial view of a two-layer configuration including stacked touch electrode segments in the first layer and the second layer and stacked routing traces in the first layer and the second layer according to examples of the disclosure.
Figure 19B:
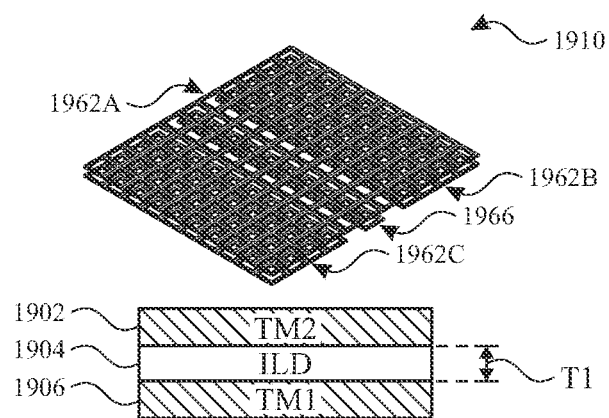
FIG. 19B illustrates a partial view of a two-layer configuration including stacked touch electrode segments in the first layer and the second layer and a buried routing trace in the second layer according to examples of the disclosure.

FIG. 19A illustrates a partial view 1900 of a two-layer configuration including stacked touch electrode segments 1952A-1952D in the first layer and the second layer and stacked routing traces 1956-1958 in the first layer and the second layer according to examples of the disclosure. FIG. 19A can correspond to FIG. 16 at a region without a bridging portion 1654. FIG. 19A also illustrates a corresponding cross-sectional view of a portion of the two-layer configuration with metal mesh 1902 in the first layer disposed on an inter-layer dielectric (ILD) 1904, which can be disposed on metal mesh 1906 in the second layer. FIG. 19B illustrates a partial view 1910 of a two-layer configuration including stacked touch electrode segments 1962A-1962C in the first layer and the second layer and buried routing trace 1966 in the second layer according to examples of the disclosure. FIG. 19A also illustrates a corresponding cross-sectional view of a portion of the two-layer configuration with metal mesh 1902 in the first layer disposed on an inter-layer dielectric (ILD) 1904, which can be disposed on metal mesh 1906 in the second layer. Unlike FIG. 19A, in FIG. 19B, the buried routing trace 1966 can be shielded at least partially from cross-talk due to an object (e.g., a finger or stylus) in proximity to the touch sensor panel. In some examples, the cross-coupling can be reduced from approximately 10% of the full-scale touch signal to approximately 2% of the full-scale touch signal.

Figure 19C:
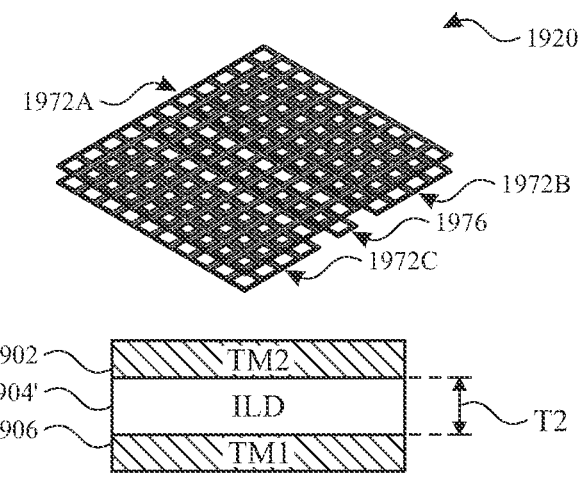
FIG. 19C illustrates a partial view of a two-layer configuration including stacked touch electrode segments in the first layer and the second layer and a buried routing trace in the second layer according to examples of the disclosure.

Although burying the routing trace can reduce cross-talk, the increase in metal mesh can also increase parallel plate capacitance between the first layer and the second layer, which can decrease the bandwidth of the touch sensor panel. In some examples, the increase in parallel plate capacitance can be mitigated by changing properties of the ILD. FIG. 19C illustrates a partial view 1920 of a two-layer configuration including stacked touch electrode segments 1972A-1972C in the first layer and the second layer and buried routing trace 1976 in the second layer according to examples of the disclosure. FIG. 19C also illustrates a corresponding cross-sectional view of a portion of the two-layer configuration with metal mesh 1902 in the first layer disposed on an inter-layer dielectric (ILD) 1904', which can be disposed on metal mesh 1906 in the second layer. The metal mesh touch electrodes and routing traces of FIG. 19C can be the same or similar to the touch electrodes and routing traces of FIG. 19B. However, the ILD can be modified to have a thickness T2 in FIG. 19C greater than the thickness T1 in FIG. 19B (and as shown the first and second layers in views 1920 are separated from one another more than the first and second layers in view 1910). In some examples, the thickness increase can be between 25%-500%. In some examples, the thickness increase can be between 100%-250%. In some examples, the thickness increase can be between 150%-200%. It should be understood that the above ranges are examples, and that thickness can be increased to achieve the desired bandwidth for the touch sensor panel.

Additionally or alternatively, the ILD can be modified to have a different dielectric constant in FIG. 19C less than the dielectric constant of the ILD in FIG. 19B. In some examples, the dielectric constant of the ILD in FIG. 19C can be between 25%-75% of the dielectric constant of the ILD in FIG. 19B. In some examples, the dielectric constant of the ILD in FIG. 19C can be between 25%-50% of the dielectric constant of the ILD in FIG. 19B. It should be understood that the above ranges are examples, and that dielectric can be decreased to achieve the desired bandwidth for the touch sensor panel. In some examples, the dielectric constant can be lowered by using an organic material such as a photo-patternable ultraviolet-cured acrylic or other suitable material.

Because parallel plate capacitance is proportional to the dielectric constant and inversely proportional to the separation distance between the plates, increasing the ILD thickness or decreasing the dielectric constant of the ILD can reduce the parallel plate capacitance and improve the touch sensor panel bandwidth.

As described herein, the SNR of the touch sensor panel using metal mesh touch electrodes can be relatively low compared with a touch sensor panel using a transparent conductor such as indium tin oxide. Conceptually, the source of the signal loss can be that the non-solid structure of metal mesh (e.g., gaps) permit some exposure of device ground (e.g., display cathodes) such that only a portion of the signal is coupled to the metal mesh. In some examples, the signal loss can be between 30-70% depending on the size of the object in proximity to the touch sensor panel. In some examples, to boost SNR (e.g., boost touch signal), the metal mesh in the first layer can be flooded or otherwise filled with a transparent conductive material (e.g., ITO).

Figure 20A:
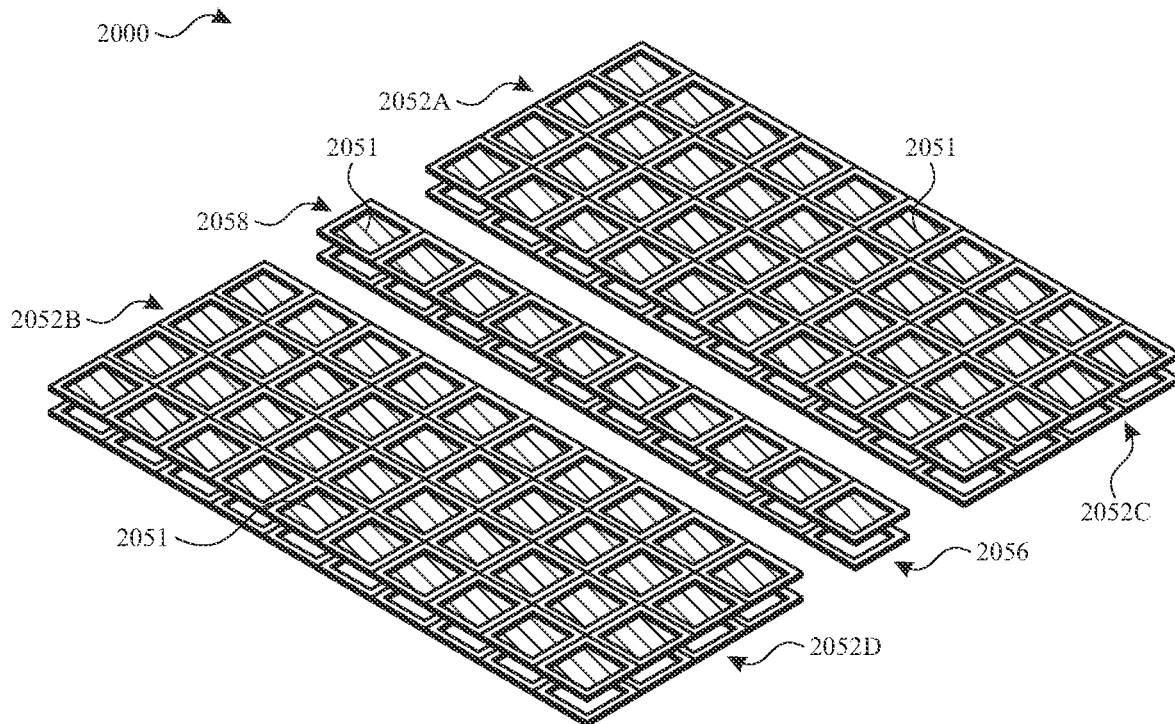
FIG. 20A illustrates a partial view of a two-layer configuration including stacked touch electrode segments in the first layer and the second layer and stacked routing traces in the first layer and the second layer according to examples of the disclosure.
Figure 20B:
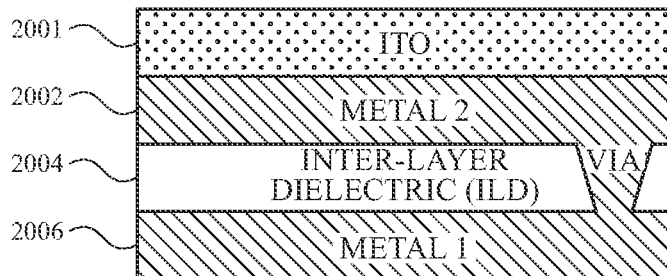
FIGS. 20B-20C illustrate example cross-sectional views of a portion of the two-layer configuration including a transparent conductive material flood according to examples of the disclosure.
Figure 20C:
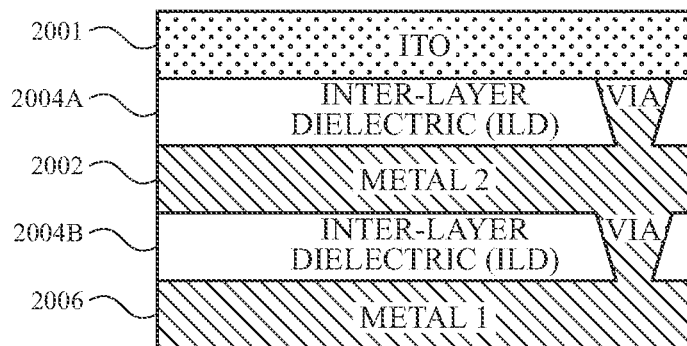

FIG. 20A illustrates a partial view 2000 of a two-layer configuration including stacked touch electrode segments 2052A-2052D in the first layer and the second layer and stacked routing traces 2056-2058 in the first layer and the second layer according to examples of the disclosure. FIGS. 20B-20C illustrate examples of corresponding cross-sectional views of a portion of the two-layer configuration including an ITO flood according to examples of the disclosure. As shown in FIG. 20A (and unlike FIG. 19A), the metal mesh of touch electrode segments 2052A-2052B and routing trace 2058 in the first layer can be filled (e.g., flooded) partially or fully with a transparent conductive material, such as ITO or any other suitable transparent or semi-transparent conductive material. The conductive material can fill the gaps in the metal mesh and boost the signal received at the touch electrodes (e.g., the signal is received by the ITO rather than passing through to ground electrodes within the device). In some examples, the metal mesh of the touch electrodes can have low resistance characteristics relative to the transparent conductor, so that the metal mesh can handle the conduction required for touch sensing. As a result, the requirements of the sheet resistance of the transparent conductor can be reduced. In some examples, a relaxed sheet resistance for the transparent conductor can allow for low-temperature deposition techniques to be used (e.g., low-temperature ITO deposition).

In some examples, as shown in FIG. 20B, the transparent conductor can be deposited on the metal mesh and be deposited directly on the metal mesh layer. For example, FIG. 20B illustrates a cross-sectional view of a portion of the two-layer configuration with metal mesh 2002 in the first metal mesh layer disposed on an inter-layer dielectric (ILD) 2004, which can be disposed on metal mesh 2006 in the second metal mesh layer. ITO 2001 (or another suitable transparent conductor) can be deposited on the metal mesh 2002. As described herein, connections between the first and second layers of metal mesh can be achieved using vias in the ILD. In some examples, as shown in FIG. 20C, the transparent conductor can be separated from the metal mesh layer by another ILD. For example, FIG. 20C illustrates a cross-sectional view of a portion of the two-layer configuration with metal mesh 2002 in the first metal mesh layer disposed on a first inter-layer dielectric (ILD) 2004B, which can be disposed on metal mesh 2006 in the second metal mesh layer. A second ILD 2004A can be deposited on the metal mesh 2002, and the ITO 2001 (or another suitable transparent conductor) can be deposited on second ILD 2004A. As described herein, connections between the first and second layers of metal mesh can be achieved using vias in the ILD. Additionally, the connections between the ITO 2001 and the metal mesh 2002 can be achieved using vias through the second ILD 2004A.

Figure 21:
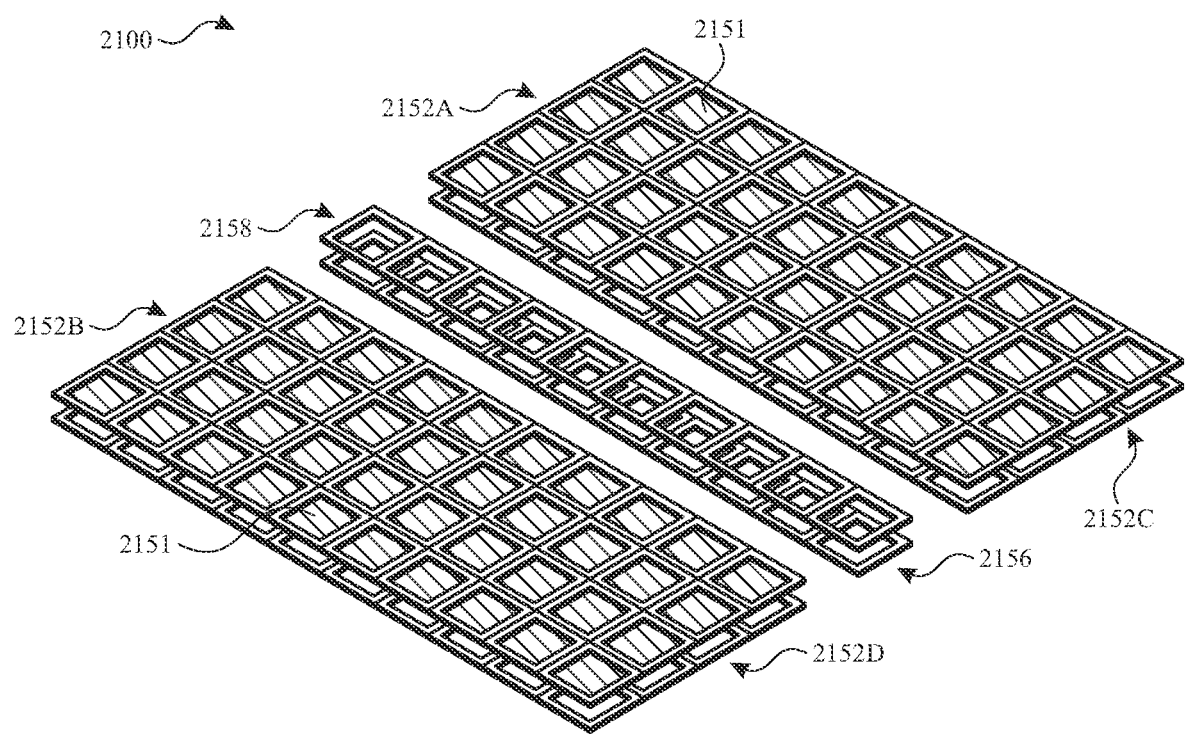
FIG. 21 illustrates a partial view of a two-layer configuration including stacked touch electrode segments in the first layer and the second layer and stacked routing traces in the first layer and the second layer according to examples of the disclosure.

Additionally or alternatively, in some examples, rather than burying the routing trace as described with reference to FIG. 19B-19C, cross-talk can be reduced by using a fill of a conductive material for selected portions of the metal mesh (e.g., a selective ITO fill). FIG. 21 illustrates a partial view 2100 of a two-layer configuration including stacked touch electrode segments 2152A-2152D in the first layer and the second layer and stacked routing traces 2156-2158 in the first layer and the second layer according to examples of the disclosure. As shown in FIG. 21 (and unlike FIG. 20A), the metal mesh of touch electrode segments 2152A-2152B in the first layer can be filled (e.g., flooded) partially or fully with a transparent conductive material, such as ITO or any other suitable transparent or semi-transparent conductive material, without filling routing trace 2158 with the conductive material (e.g., using a mask to prevent filling). In some examples, the routing trace 2058 can also be filled, but the fill of conductive material can be etched away. The conductive material can fill the gaps in the metal mesh touch electrodes and boost the signal received at the touch electrodes (e.g., the signal is received by the ITO rather than passing through to ground electrodes within the device). However, the cross-talk coupling through the routing trace 2158 can be un-boosted (e.g., reduced to 4-6% of the full scale touch signal at touch electrodes 2152A-2152B) without the fill for the routing trace 2158. As a result, the cross-talk can be reduced using selective ITO flooding, without burying the routing trace as described with reference to FIG. 19B-19C.

It should be understood that although described separately, the various features described herein can be used in combination. For example, burying of the routing trace described with reference to FIG. 19B can be combined with an improved ILD characteristic described with reference to FIG. 19C and/or with an improved signal characteristic of ITO flooding described with reference to FIGS. 20A-20C. As another example, the routing techniques described with reference to FIGS. 14A-21 can be applied to the touch sensor panels described with reference to FIGS. 7A-13B.

Figure 22:
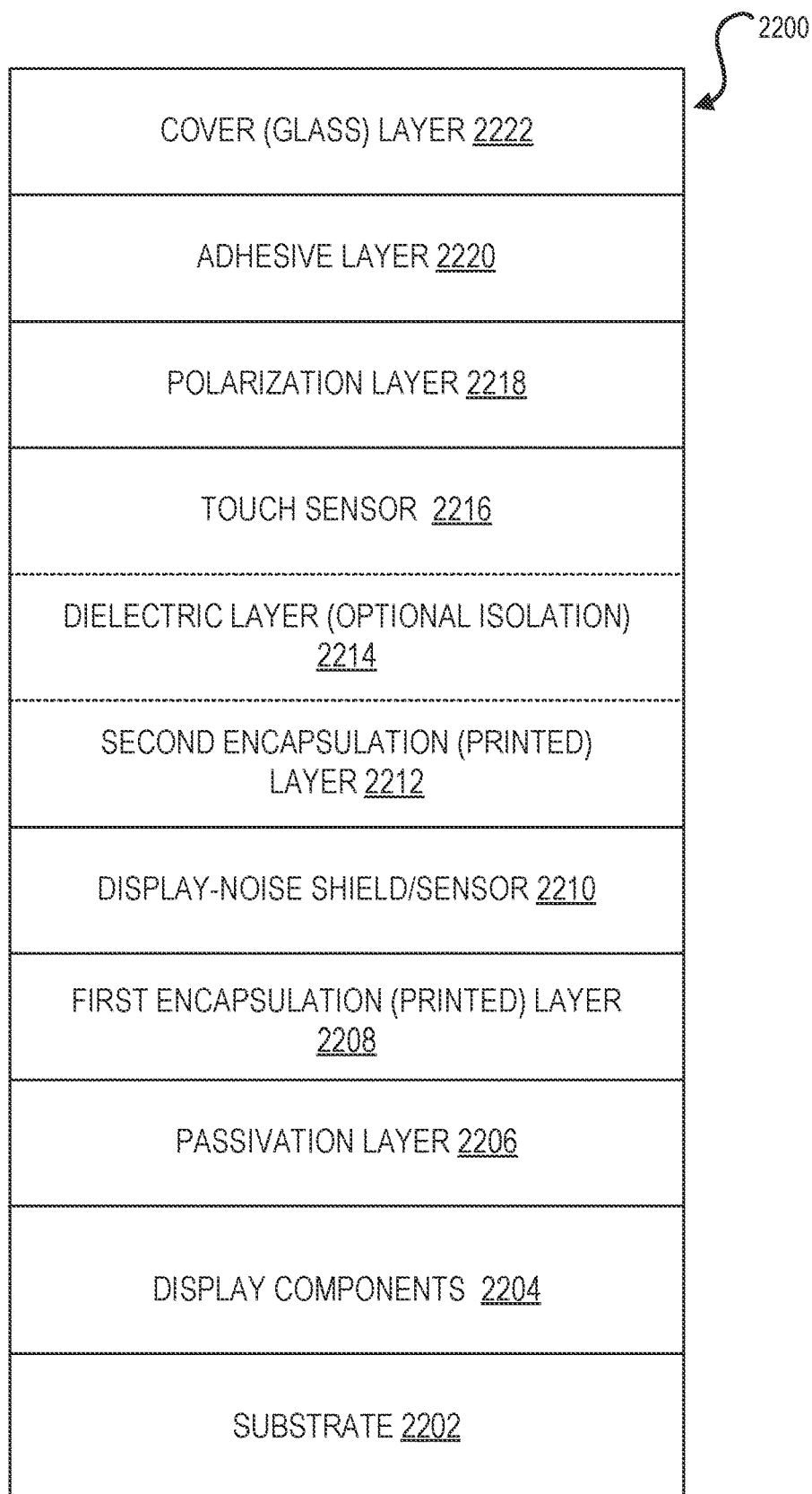
FIG. 22 illustrates an example touch screen stack-up including an encapsulation layer and optional dielectric layer for isolation according to examples of the disclosure.

As described herein, in some examples, noise from the display can couple to touch electrodes due at least in part to the proximity of the display to the touch electrodes of a touch sensor panel. In some examples, a shield layer or display-noise sensor can be disposed on a printed layer (e.g., an encapsulation layer) to reduce the noise from the display. FIG. 22 illustrates an example touch screen stack-up 2200 including an encapsulation layer 2208 and optional dielectric layer 2214 for isolation according to examples of the disclosure. In some examples, various layers of stack-up 2200 can be formed using a shared manufacturing process. In such examples, components are manufactured and disposed onto their respective locations within stack-up 2200 in a serial fashion (e.g., without relying on discrete components that are manufactured at a prior time, and then transferred to a location within stack-up 2200). In some examples, components that are both manufactured and disposed onto their respective locations within stack-up 2200, and not manufactured separately as discrete, or semi-discrete components, can be referred to as on-chip fabricated/manufactured components, or components fabricated using on-chip technologies for manufacturing. As discussed below, stack-up 2200 includes multiple such components that are fabricated using on-chip technologies for manufacturing, which offer several advantages over alternative "discrete" components that require being transferred to stack-up 2200.

Stack-up 2200 can be built or fabricated upon substrate 2202, in some examples. Substrate 2202 can be a printed circuit board substrate, a silicon substrate, or any other suitable base substrate material(s) for stack-up 2200. Display components 2204 (e.g., corresponding to display components 508) can be formed over substrate 2202, in some examples, and can include a plurality of display elements arranged in an array (e.g., in rows and columns). Each display element can comprise a display pixel, in some examples. A display pixel can correspond to light-emitting components capable of generating colored light, in some examples. Examples of display pixels can include a backlit Liquid-Crystal Display (LCD), or a Light-Emitting Diode (LED) display, including Organic LED (OLED), Active-Matrix Organic LED (AMOLED), and Passive-Matrix Organic LED (PMOLED) displays. In some examples, a display pixel can include a number of sub-pixels (e.g., one, two, three, or more sub-pixels). As an example, a display pixel can include a red sub-pixel, a green sub-pixel, and a blue sub-pixel, where the various sub-pixels have respective dimensions relative to each other, and relative to the dimensions of the entire display pixel. In some examples, red, green, and blue sub-pixels can have approximately, or substantially similar dimensions to one another (e.g., the sub-pixels are all within a 5% range of a target dimension or area for the sub-pixels). In other examples, a blue sub-pixel can occupy approximately 50% of the area of a display pixel, with red and green sub-pixels occupying the remaining 50% of the area (e.g., each occupying 25% of the display pixel area). In some examples, display components 2204 are formed over the entirety of substrate 2202. In other examples, display components 2204 are formed over portions of substrate 2202 (e.g., some portions of substrate 2202 do not have display components 2204 formed over them).

Passivation layer 2206 can be formed over display components 2204, in some examples. In some such examples, passivation layer 2206 can be in direct contact with display components 2204. Similar to layers 507 and 517 described in connection with FIG. 5, passivation layer 2206 can planarize the surface of display components 2204 and can provide electrical isolation to display components 2204 (e.g., isolation from components in other layers formed above passivation layer 2206). In some examples, passivation layer 2206 is formed after all of the display sub-pixels and pixels (e.g., of display components 2204) have been fabricated or formed over substrate 2202. In some examples, passivation layer 2206 is formed over the entirety of display components 2204. In some examples, additional passivation layers similar to passivation layer 2206 can be formed over any of the layers of stack-up 2200 whose manufacture can result in an uneven surface (e.g., a surface that is difficult to form additional layers over). In some examples, an additional passivation layer similar to passivation layer 2206 can be provided over first encapsulation layer 2208 such that it directly contacts the first encapsulation layer, and/or provided over second encapsulation layer 2212 such that it directly contacts the second encapsulation layer. In some such examples, forming a passivation layer over the first encapsulation layer and/or the second encapsulation layer can improve the accuracy and manufacturability of components/layers in stack-up 2200 formed above those layers.

A first encapsulation layer 2208 can be formed over passivation layer 2206, in some examples. In some such examples, first encapsulation layer 2208 can be in direct contact with passivation layer 2206. First encapsulation layer 2208 can be referred to as a "printed layer," when it is deposited over/onto passivation layer 2206 using a printing or deposition technique, in some examples. First encapsulation layer 2208 can be deposited onto passivation layer 2206 using an ink-jet printing technique, in some examples. Ink-jet printing techniques can cause layers to be selectively deposited (e.g., deposited over a portion of an underlying layer), or globally/blanket deposited (e.g., deposited over an entirety of the underlying layer), in some examples. In some examples, first encapsulation layer 2208 can be ink-jet printed selectively over regions of passivation layer 2206 under which display components 2204 are formed. In other examples, first encapsulation layer 2208 can be ink-jet printed over the entirety of passivation layer 2206 (e.g., a blanket deposition). First encapsulation layer 2208 can be an optically transmissive or transparent layer, through which light emitted from display components 2204 can pass. In some examples, a thickness of first encapsulation layer 2208 is less than a threshold thickness (e.g., 10 microns or less, 12 microns or less, or 14 microns or less, etc.).

A display-noise shield/sensor 2210 can be formed over the first encapsulation layer 2208, in some examples. In some such examples, a layer of display-noise shield/sensor 2210 can be in direct contact with first encapsulation layer 2208. During a manufacturing process of stack-up 2200, display-noise shield/sensor 2210 is manufactured over first encapsulation layer 2208 after layer 2208 has been ink-jet printed over passivation layer 2206. As discussed with respect to later drawings related to display-noise shield/sensor 2210, the shield/sensor can be formed from one or more metal layers, which can be directly formed and/or deposited over the first encapsulation layer 2208. Providing a display-noise shield/sensor 2210 in this way can sometimes be referred to herein as "manufacture by on-cell process," or an in situ manufacturing technique. The process of manufacturing display-noise shield/sensor using an on-cell process provides numerous advantages over alternative techniques, where a discrete, or semi-discrete component manufactured using a different process (e.g., at a different time, location, using different manufacturing equipment, etc.) from the process used to manufacture the prior layers (e.g., substrate 2202, display components 2204, passivation layer 2206, and first encapsulation layer 2208). In some examples, these advantages include the elimination of alignment and lamination steps associated with aligning the (semi-)discrete component associated with a display-noise shield/sensor to the already-manufactured layers 2202-2208 and using a laminate or adhesive to affix the component associated with the display-noise shield/sensor to the already-manufactured layers 2202-2208. These advantages of manufacturing display-noise shield/sensor using an on-cell process contribute to lower yield losses of the overall stack-up 2200, relative to alternative processes. Additionally or alternatively, in some examples, the thickness of the touch sensor panel can be reduced using the on-cell process compared with a discrete touch sensor laminated to the display, thereby reducing the overall thickness of the touch screen.

Display-noise shield/sensor 2210 can be either a shield and/or a sensor, depending on the implementation. Whether display-noise shield/sensor 2210 is a shield or a sensor, shield/sensor 2210 can be manufactured over first encapsulation layer 2208. As described above, layer 2208 can sometimes be selectively ink-jet printed onto portions of passivation layer 2206 under which display components 2204 are formed, in some examples. In such examples, display-noise shield/sensor 2210 is formed only on those selectively ink-jet printed portions of first encapsulation layer 2208. In some examples, where display-noise shield/sensor 2210 is a shield, the shield can include a single conductive layer (e.g., ITO layer, metal layer) or metal mesh layer. In some examples, the shield layer can be flooded with conductive material(s) (e.g., ITO, metal). In some examples, the shield layer can include with a global mesh pattern such that the footprint of the display-noise shield/sensor 2210 can be occupied by an electrically connected conductive metal mesh. In some examples, the shield layer can include a combination of the metal mesh flooded with a conductive material. The conductive materials can help mitigate noise signals generated by display components 2204 from interfering with components formed above display-noise shield/sensor 2210 in stack-up 2200. In some examples, a shield layer including a metal mesh in combination with a flood of conductive material can provide improved isolation compared with metal mesh alone and reduced resistivity compared with a flood of conductive material alone. In such examples, patches of the flood of conductive material can be disposed between the metal mesh, resulting in the layer associated with shield/sensor 2210 sometimes referred to as a layer with alternating metal mesh and conductive material portions (e.g., where the conductive material portions are formed or positioned between gaps in the metal mesh). In such examples, this combination can be formed by first forming a metal mesh layer (e.g., by depositing and/or patterning a first conductive material according to a mesh pattern), and then forming a flood of conductive material between the mesh pattern of the metal mesh layer (e.g., by depositing and/or patterning a second conductive material according to a patch pattern, aligned to the mesh pattern, where paths of material of the mesh pattern are aligned with open paths of the patch pattern). One alternative process to forming the combination can be first forming a flood of conductive material in patches (e.g., by depositing and/or patterning a second conductive material according to a patch pattern), and then forming a metal mesh pattern in spaces between the patches (e.g., by depositing and/or patterning a first conductive material according to a mesh pattern, aligned to the patch pattern, where patches of material of the patch pattern are aligned with open sections of the mesh pattern). Another alternative process to forming the combination can be forming the flood of conductive material as a solid layer first (e.g., directly over first encapsulation layer 2208), and then subsequently forming a metal mesh pattern over the solid layer of the conductive material.

When the shield layer is formed using two conductive materials in this way (e.g., a first material for the mesh pattern, and a second material for the patch pattern), a first conductive material for the mesh pattern can be different from a second conductive material for the patch pattern. As an example, the first conductive material for the mesh pattern can be aluminum (Al), copper (Cu), or any other suitable conductive material for forming a metal mesh in shield layer 2210. As another example, the material for the mesh pattern can be a combination of conductive materials deposited as multiple layers, such as a layer of titanium (Ti), onto which a layer of aluminum (Al) is deposited, onto which a layer of titanium (Ti) is deposited). In some such examples, the mesh pattern formed of layers of titanium, aluminum, and titanium can be above the second conductive material, or below the second conductive material. As an example, the second conductive material for the optional patch pattern can be ITO, silver (Ag) nanowire, or any other suitable transparent (or effectively transparent) conductive material for forming patches that can be formed above, below, or between the metal mesh in shield/sensor 2210 layer. Accordingly, in some examples, the layer associated with shield/sensor 2210 can be referred to as a metal mesh layer with patches of ITO, silver, or any other suitable conductive material for forming patches.

In some examples, instead of a contiguous conductive layer (or metal mesh pattern, or a combination of the two) spanning an entirety of the footprint of display-noise shield/ sensor 2210, a number of conductive segments can be electrically coupled (e.g., using the same metal or a different metal) to form the shield layer. In such examples, the segments can be aligned to sub-pixel elements of display components 2204.

In examples where display-noise shield/sensor 2210 is a sensor, the sensor can include multiple metal layers or metal mesh layers. Conductive segments with some correspondence to row and column touch electrodes (e.g., of touch sensor 2216) can be formed in one of the metal (mesh) layers of display-noise shield/sensor 2210 to form a sensor (e.g., electrodes of the sensor). In some examples, a contiguous column electrode can be formed in a first metal (mesh) layer of display-noise shield/sensor 2210, with non-contiguous row electrodes also formed in the first metal (mesh) layer. A second metal (mesh) layer can include bridges that connect the non-contiguous row electrodes in the first metal (mesh) layer, in some examples. In some examples, conductive segments within the metal (mesh) layers of display-noise shield/sensor 2210 can have a one-to-one correspondence to row and column touch electrodes of touch sensor 2216 (e.g., each conductive patch of display-noise sensor 2210 has a single corresponding touch electrode of touch sensor 2216 such that the patterning of the electrodes of the display-noise sensor and the touch electrodes of the touch sensor 2216 are the same). In some examples, conductive segments within the metal (mesh) layers of display-noise shield/sensor 2210 can have a size based on respective sizes of row and column touch electrodes of touch sensor 2216 (e.g., each conductive patch of display-noise sensor 2210 has the same or a proportional size to a corresponding touch electrode of touch sensor 2216). In examples where conductive segments within the metal (mesh) layers of display-noise shield/sensor 2210 are smaller than corresponding row and column touch electrodes of touch sensor 2216, conductive segments within layers of sensor 2210 can be centered about a center-point of a corresponding touch electrode of touch sensor 2216. In some examples, conductive segments within the metal (mesh) layers of display-noise shield/sensor 2210 are aligned to sub-pixel elements of display components 2204 and/or touch electrode of touch sensor 2216.

Second encapsulation layer 2212 can be formed over display-noise shield/sensor 2210, in some examples. In some such examples, second encapsulation layer 2212 can be in direct contact with a layer of display-noise shield/sensor 2210. Similar to first encapsulation layer 2208, second encapsulation layer 2212 can be printed using selective printing, or blanket printing. Second encapsulation layer 2212 can be referred to as a "printed layer," when it is deposited over/onto display-noise shield/sensor 2210 using a printing or deposition technique, in some examples. Second encapsulation layer 2212 can be deposited over/onto display-noise shield/sensor 2210 using an ink-jet printing technique, in some examples. Ink-jet printing techniques can cause layers to be selectively deposited (e.g., deposited over a portion of an underlying layer), or globally/blanket deposited (e.g., deposited over an entirety of the underlying layer), in some examples. In some examples, second encapsulation layer 2212 can be ink-jet printed selectively over regions of display-noise shield/sensor 2210 under which display components 2204 are formed. In other examples, second encapsulation layer 2212 can be ink-jet printed over the entirety of display-noise shield/sensor 2210 (e.g., a blanket deposition). Second encapsulation layer 2212 can be an optically transmissive or transparent layer, through which light emitted from display components 2204 can pass. In some examples, a thickness of second encapsulation layer 2212 is less than a threshold thickness (e.g., 10 microns or less, 12 microns or less, 14 microns or less, etc.).

Dielectric layer 2214 can optionally be formed over second encapsulation layer 2212 as an isolation layer to isolate display-noise shield/sensor 2210 from touch sensor 2216. In some examples, if one or more metal layers of display-noise shield/sensor 2210 is flooded or provided with a global metal mesh, a high parasitic capacitance can develop between row/column electrodes of touch sensor 2216 and display-noise shield/sensor 2210. In such examples, this high capacitance (referred to as $C_{M2\_M4}$ in the context of FIG. 29), can result in reduced bandwidth for touch signal sensing by touch sensor 2216. In some examples, a thickness of dielectric layer 2214 is less than a threshold thickness (e.g., 3 microns or less, 5 microns or less, 7 microns or less, etc.).

Touch sensor 2216 can be formed over second encapsulation layer 2212 and/or dielectric layer 2214 (e.g., when dielectric layer 2214 is included in stack-up 2200). Touch sensor 2216 can have metal patterns that are aligned to display components 2204 (and to display-noise shield/sensor 2210) so that the metal patterns of touch sensor 2216 do not interfere with, or obstruct light emitted by display components 2204. In some examples, touch sensor 2216 can be manufactured using an on-cell process over second encapsulation layer 2212 and/or dielectric layer 2214. In other examples, touch sensor 2216 can be manufactured separately (e.g., at a prior time to manufacturing stack-up 2200) as a discrete or semi-discrete component, and can subsequently be transferred to its position within stack-up 2200 after the manufacture of preceding layers (e.g., layers 2202-2214). In some examples, Polarization layer 2218 can be formed over touch sensor 2216, and can include a material that selectively filters light so that only a certain polarization of light can be transmitted through the material. In some examples, a thickness of polarization layer 2218 can be between 10 and 150 microns, or between 30 and 80 microns in other examples. In some examples, a thickness of polarization layer 2218 is less than a threshold thickness (e.g., 50 microns or less, 100 microns or less, etc.).

Adhesive layer 2220 can be formed over polarization layer, and can include an optically clear/transparent material that allows light to be transmitted through it. In some examples, a thickness of adhesive layer 2220 can be between 10 and 80 microns, or between 35 and 55 microns in other examples. In some examples, a thickness of adhesive layer 2220 is less than a threshold thickness (e.g., 30 microns or less, 50 microns or less, 70 microns or less, etc.).

Cover layer 2222 can be formed over adhesive layer 2220, and can include a glass or crystal layer. In some examples, a thickness of cover layer 2222 can be between 60 and 120 microns, or between 75 and 105 microns in other examples. In some examples a thickness of cover layer 2222 is less than a threshold thickness (e.g., 75 microns or less, 95 microns or less, 115 microns or less, etc.).

Figure 23:
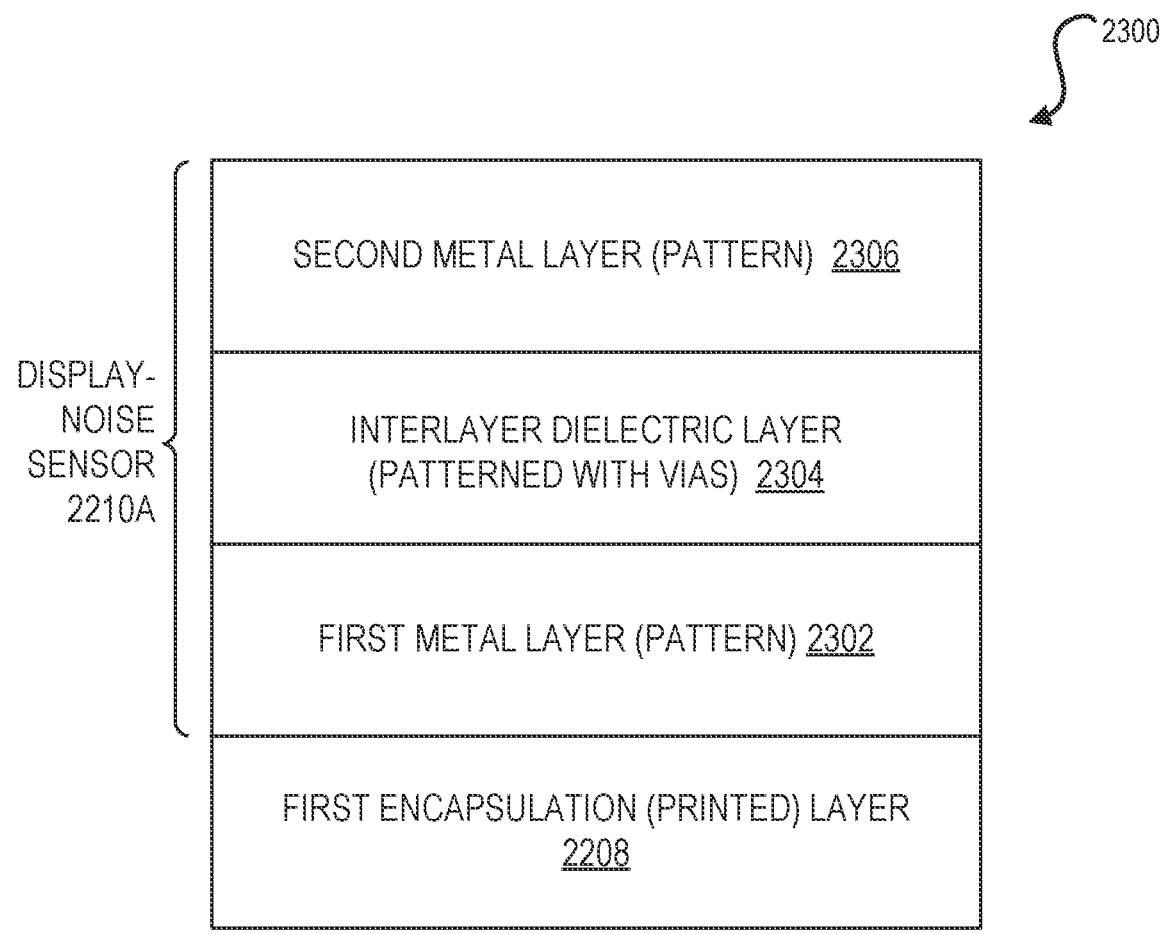
FIG. 23 illustrates example layers of a display-noise sensor formed on a printed layer of a touch screen stack-up according to examples of the disclosure.

FIG. 23 illustrates example layers of a display-noise sensor 2210A formed on a printed layer of a touch screen stack-up according to examples of the disclosure. As described in connection with the general display-noise sensor 2210 of FIG. 22, display-noise sensor 2210A can be formed on first encapsulation layer 2208. In some examples, first encapsulation layer 2208 is deposited using ink-jet printing and forms a substantially flat surface upon which metal layer(s) can be formed (e.g., points on the surface of first encapsulation layer 2208 are all within a 5% range of a target level height for the first encapsulation layer within stack-up 2200).

First metal layer 2302 can be formed over the first encapsulation layer 2208. In some examples, display-noise sensor 2210A can be formed using an on-cell manufacturing technique (e.g., by forming sensor 2210A directly on first encapsulation layer 2208 as part of the same manufacturing process). Forming a display-noise sensor can require forming multiple metal layers separated by an interlayer dielectric layer between them and connected by vias through the interlayer dielectric layer, in some examples (e.g., metal layers 2302 and 2306 separated by interlayer dielectric layer 2304 of FIG. 23).

In some examples, the on-cell manufactured display-noise sensor 2210A can be formed by first forming a first metal layer 2302 over the first encapsulation layer 2208, followed by forming an interlayer dielectric layer 2304, and finally forming a second metal layer 2306. In some examples, a thickness of first metal layer 2302 can be between 0.4 and 1 micron, or between 0.5 and 0.9 microns in other examples. In some examples, a thickness of first metal layer 2302 can be less than a threshold thickness (e.g., 0.4 microns or less, 0.6 microns or less, 0.8 microns or less, etc.). In some examples, a thickness of interlayer dielectric layer 2304 can be between 1 and 2.2 microns, or between 1.3 and 1.9 microns. In some examples, a thickness of interlayer dielectric layer 2304 can be less than a threshold thickness (e.g., 1.4 microns or less, 1.6 microns or less, 1.8 microns or less, etc.). In some examples, a thickness of second metal layer 2306 can be between 0.4 and 1 micron, or between 0.5 and 0.9 microns in other examples. In some examples, a thickness of second metal layer 2306 can be less than a threshold thickness (0.4 microns or less, 0.6 microns or less, 0.8 microns or less, etc.).

In some examples, the first and second metal layers 2302 and 2306 can be used to form row noise-sensor electrodes and column noise-sensor electrodes of display-noise sensor 2210A, corresponding to row and column touch electrodes of touch sensor 2216. As an example, row noise-sensor electrodes and column noise-sensor electrodes in first and second metal layers 2302 and 2306 can form a mutual-capacitance type touch sensor, or a self-capacitance type touch sensor. In such examples, interlayer dielectric layer 2304 between the two metal layers 2302/2306 can be patterned with vias, to allow interconnection between at least one portion of one metal layer with at least one portion of the other metal layer. As an example, row noise-sensor electrodes can be formed in first metal layer 2302, and column noise-sensor electrodes can be formed in second metal layer 2306. Alternatively, column noise-sensor electrodes can be formed in first metal layer 2302, and row noise-sensor electrodes can be formed in second metal layer 2306. As another example, both row noise-sensor electrodes and column noise-sensor electrodes can be formed in first metal layer 2302, and second metal layer 2306 can be used to form conductive bridges to connect any discontinuous noise sensor electrodes in the first metal layer. Alternatively, both row noise-sensor electrodes and column noise-sensor electrodes can be formed in second metal layer 2506, and first metal layer 2502 can be used to form conductive bridges to connect any discontinuous noise sensor electrodes in the second metal layer. In examples where both row noise-sensor electrodes and column noise-sensor electrodes are formed in a single metal layer of the first/second metal layers, the column noise-sensor electrodes may have a contiguous shape such as a solid bar (e.g., a contiguous metal mesh pattern), and the row noise-sensor electrodes may have a non-contiguous shape such as a plurality of segments (e.g., a stripe pattern of non-contiguous metal mesh segments, adjacent to one or more column electrodes). In such examples, dielectric layer 2304 can be patterned with vias, that allow for metal interconnections between the non-contiguous segments of row noise-sensor electrodes in one of the metal layers (e.g., first metal layer 2302), and conductive structures in the other metal layer (e.g., second metal layer 2306). In such examples, conductive structures in the other (e.g., second) metal layer can include conductive bridge structures, that extend at least the length of separation between non-contiguous row noise-sensor electrode segments in the metal layer containing the contiguous column noise-sensor electrodes and the non-contiguous row noise-sensor electrode segments (e.g., first metal layer). By way of the vias formed by patterning of interlayer dielectric layer 2304, bridge structures in the other metal layer can electrically couple the non-contiguous row noise-sensor electrode segments, and allow the segments to function similar to a continuous row electrode along their length.

Figure 24:
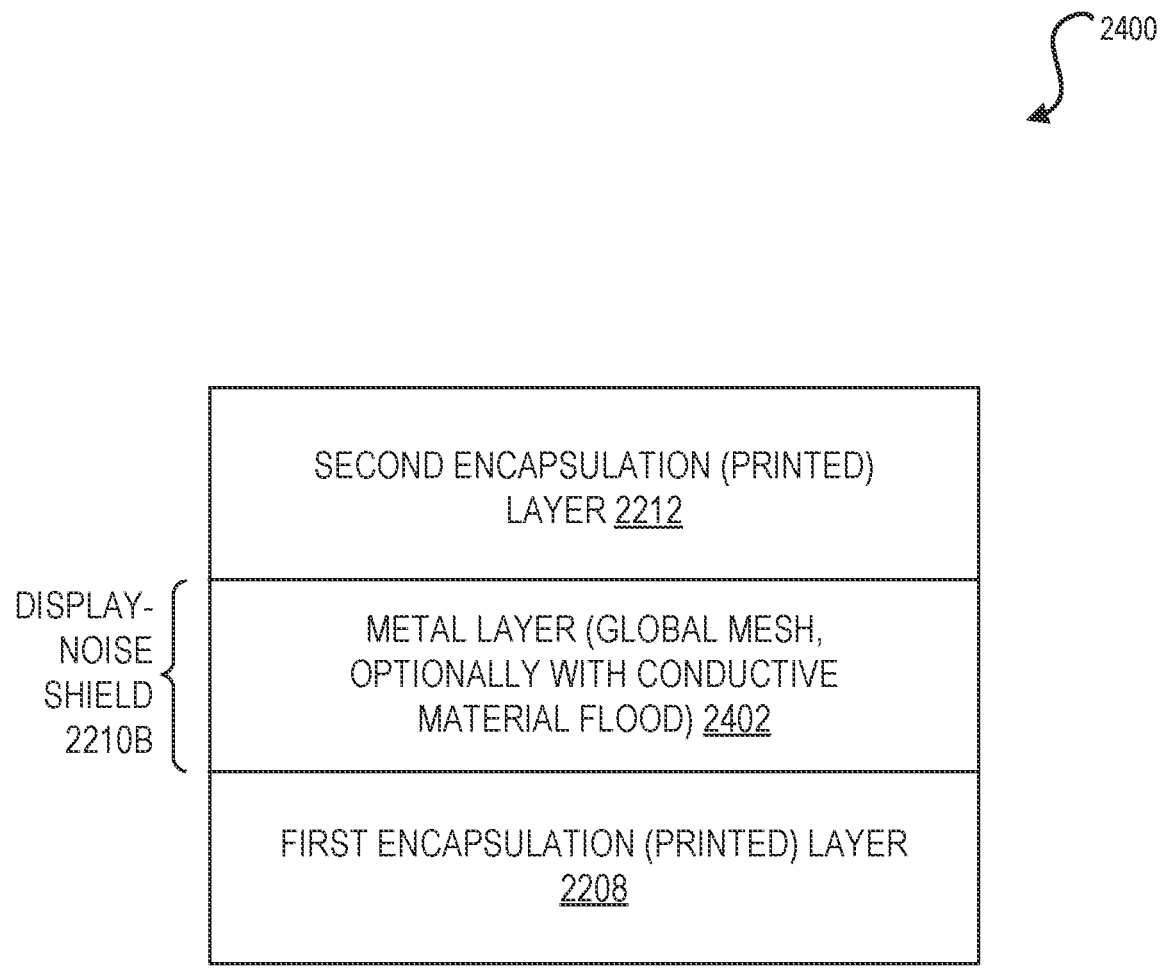
FIG. 24 illustrates an example display-noise shield formed on a printed layer of a touch screen stack-up according to examples of the disclosure.

FIG. 24 illustrates an example display-noise shield formed on a printed layer of a touch screen stack-up according to examples of the disclosure. As described in connection with the general display-noise sensor 2210 of FIG. 22, display-noise shield 2210B can be formed on first encapsulation layer 2208. In some examples, first encapsulation layer 2208 is deposited using ink-jet printing, and forms a substantially flat surface upon which metal layers can be formed.

Metal layer 2402 can be formed over the first encapsulation layer 2208. In some examples, display-noise shield 2210B can be formed using an on-cell manufacturing technique (e.g., by forming shield 2210B directly on first encapsulation layer 2208 as part of the same manufacturing process). Forming a display-noise shield can require forming a metal layer 2402 and including a dielectric shield within stack-up 2200 (e.g. dielectric layer 2214) to reduce parasitic capacitances with metal layer 2402.

In some examples, the on-cell manufactured display-noise shield 2210B can be formed by first forming a metal layer 2402 over the first encapsulation layer 2208, followed by forming a second encapsulation layer 2212 over metal layer 2402. In examples where metal layer 2402 is flooded or provided with a global metal mesh, a high parasitic capacitance can develop between row/column electrodes of touch sensor 2216 and display-noise shield/sensor 2210. In such examples, this high capacitance (sometimes referred to as $C_{M2\_M4}$ in the context of FIG. 29), can result in results in very low bandwidth for touch signal sensing by touch sensor 2216. An optional dielectric layer 2214 can be provided above second encapsulation layer 2212 to isolate touch sensor 2216 from parasitic capacitances with metal layer 2402. In some examples, a thickness of metal layer 2402 can be between 0.4 and 1 micron, or between 0.5 and 0.9 microns in other examples. In some examples, a thickness of metal layer 2402 can be less than a threshold thickness (0.4 microns or less, 0.6 microns or less, 0.8 microns or less, etc.).

Metal layer 2402 can be flooded with metal, or be filled with a global metal mesh pattern, such that the entire footprint of the display-noise shield/sensor 2210 can be occupied by a conductive metal (mesh), that can help mitigate noise signals generated by display components 2204 from interfering with components formed above display-noise shield/sensor 2210 in stack-up 2200. In some examples, metal layer 2402 can be filled with a combination of a flood of conductive material and a metal mesh to provide improved insulation (e.g., compared with mesh alone) and reduced resistivity (compared to a flood of conductive material alone). In some such examples, patches of the flood of conductive material can be disposed between the metal mesh. Sometimes metal layer 2402 can be referred to as having alternating metal mesh and conductive material portions (e.g., where the conductive material portions are formed or positioned between gaps in the metal mesh). In some such examples, the combination can be formed by first forming a metal mesh layer (e.g., by depositing and/or patterning a first conductive material according to a mesh pattern) and then forming a flood of conductive material between the mesh pattern of the metal mesh layer (e.g., by depositing and/or patterning a second conductive material according to a patch pattern, aligned to the mesh pattern, where paths of material of the mesh pattern are aligned with open paths of the patch pattern). Alternatively, the order of material formation can be reversed (e.g., as described above in connection with display-noise shield/sensor 2210 of FIG. 22). One alternative process to forming the combination can be first forming a flood of conductive material in patches, and then forming a metal mesh pattern in spaces between the patches. Another alternative process to forming the combination can be forming the flood of conductive material as a solid layer first, and then subsequently forming a metal mesh pattern over the solid layer of the conductive material.

Figure 25:
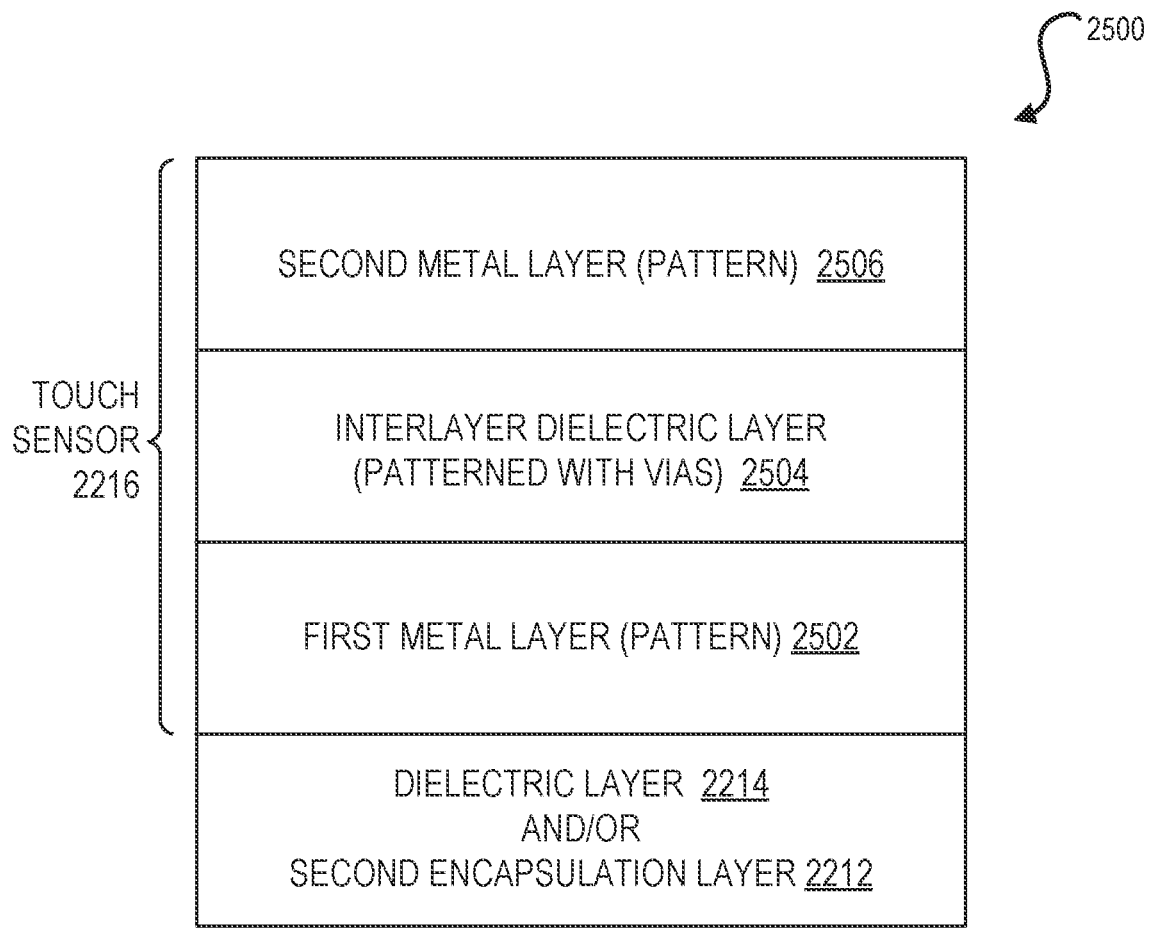
FIG. 25 illustrates an example touch sensor of a touch screen stack-up according to examples of the disclosure.

FIG. 25 illustrates an example touch sensor of a touch screen stack-up according to examples of the disclosure. In some examples, FIG. 25 can show a sub-stack 2500 of stack-up 2200 shown/described by FIG. 22. Specifically, FIG. 25 can show a sub-stack 2500 corresponding to touch sensor 2216 of FIG. 22, when touch sensor 2216 is manufactured/formed according to an on-cell process, or is manufactured in situ, according to some examples. As described above in connection with the manufacture of display-noise shield/sensor 2210, manufacturing touch sensor 2216 using an on-cell process provides similar advantages over alternative arrangements (e.g., arrangements where a discrete, or semi-discrete touch sensor manufactured using a different process is transferred to the manufacture process used to form layers 2202-2214 of FIG. 22). In some examples, these advantages include the elimination of alignment and lamination/adhesion steps associated with aligning the (semi-) discrete touch sensor to the already-manufactured layers 2202-2214 and using a laminate or adhesive to affix the (semi-)discrete touch sensor to said already-manufactured layers 2202-2214. These advantages of manufacturing the touch sensor using an on-cell process contribute to lower yield losses of the overall stack-up 2200, relative to alternative processes. Moreover, by eliminating alignment steps necessitated by merging different manufacturing processes (e.g., when transferring a semi-discrete touch sensor to on-cell manufactured layers 2202-2214), touch accuracy associated with sensed signals of touch sensor 2216 can be improved. Because touch sensor 2216 is aligned by virtue of being manufactured using an on-cell process (sometimes referred to as being "process-aligned"), row touch electrodes and column touch electrodes of touch sensor 2216 can be substantially aligned with corresponding row noise-sensing electrodes and column noise-sensing electrodes of display-noise shield/sensor 2210 (e.g., row and column touch electrodes may overlay corresponding row and column noise-sensing electrodes within a 5% deviation from a target centered/aligned position within stack-up 2200). Additionally, touch sensor 2216 being process-aligned can improve or optimize the alignment of row touch electrodes and column touch electrodes of the touch sensor with pixels and/or sub-pixels of display components 2204.

As illustrated in FIG. 25, touch sensor 2216 can be formed over dielectric layer 2214 and/or second encapsulation layer 2212. As described in connection with stack-up 2200 of FIG. 22, second encapsulation layer 2212 can be deposited according to a blanket deposition process, or according to a selective deposition process (e.g., ink-jet printing). In some examples, depositing second encapsulation layer 2212 according to a blanket deposition process can result in a surface of the second encapsulation layer being planar (e.g., level, or even). In some examples, the layers of touch sensor 2216 can be formed directly on the planar surface of second encapsulation layer 2212. In some examples, a dielectric layer 2214 may be formed over the second encapsulation layer 2212. Dielectric layer 2214 can sometimes be called an "isolation dielectric layer" or even a "thick dielectric layer," in reference to its separating touch sensor 2216 from display-noise shield/sensor 2210, and from display components 2204 (e.g., components formed below touch sensor 2216). In some examples, dielectric layer 2214 can be called "thick" because of its thickness being relatively larger than the thickness of other dielectric layers (such as those of display-noise sensor 2210A) in stack-up 2200 of FIG. 22. In some examples, a thickness of dielectric layer 2214 can be between 1 and 6 microns, or can be between 2 and 5 microns in other examples. In some examples, a thickness of dielectric layer 2214 can be less than a threshold thickness (e.g., 2 microns or less, 5 microns or less, 8 microns or less, etc.). Separating touch sensor 2216 from components formed below it (e.g., by the inclusion of dielectric layer 2214) reduces the impact of noise and/or interference from said components, and additionally reduces the parasitic capacitances between the touch sensor and said components, in some examples.

The on-cell manufactured touch sensor 2216 can be formed by first forming a first metal layer 2502 over the second encapsulation layer and/or dielectric layer 2214, followed by forming an interlayer dielectric layer 2504, and finally forming a second metal layer 2506. In some examples, the first and second metal layers 2502 and 2506 can be used to form row touch electrodes and column touch electrodes of a touch sensor. As an example, row touch electrodes and column touch electrodes in first and second metal layers 2502 and 2506 can form a mutual-capacitance type touch sensor, or a self-capacitance type touch sensor. In such examples, interlayer dielectric layer 2504 between the two metal layers 2502/2506 can be patterned with vias, to allow interconnection between at least one portion of one metal layer with at least one portion of the other metal layer. As an example, row touch electrodes can be formed in first metal layer 2502, and column touch electrodes can be formed in second metal layer 2506. Alternatively, column touch electrodes can be formed in first metal layer 2502, and row touch electrodes can be formed in second metal layer 2506. As another example, both row touch electrodes and column touch electrodes can be formed in first metal layer 2502, and second metal layer 2506 can be used to form conductive bridges to connect any discontinuous touch electrodes in the first metal layer. Alternatively, both row touch electrodes and column touch electrodes can be formed in second metal layer 2506, and first metal layer 2502 can be used to form conductive bridges to connect any discontinuous touch electrodes in the second metal layer. In examples where both row touch electrodes and column touch electrodes are formed in a single metal layer of the first/second metal layers, the column electrodes may have a contiguous shape such as a solid bar (e.g., a contiguous metal mesh pattern), and the row electrodes may have a non-contiguous shape such as a plurality of segments (e.g., a stripe pattern of non-contiguous metal mesh segments, adjacent to one or more column electrodes). In such examples, dielectric layer 2504 can be patterned with vias, that allow for metal interconnections between the non-contiguous segments of row electrodes in one of the metal layers (e.g., first metal layer 2502), and conductive structures in the other metal layer (e.g., second metal layer 2506). In such examples, conductive structures in the other (e.g., second) metal layer can include conductive bridge structures, that extend at least the length of separation between non-contiguous row touch electrode segments in the metal layer containing the contiguous column touch electrodes and the non-contiguous row touch electrode segments (e.g., first metal layer). By way of the vias formed by patterning of interlayer dielectric layer 2504, bridge structures in the other metal layer can electrically couple the non-contiguous row touch electrode segments, and allow the segments to function similar to a continuous row electrode along their length. In some examples, the touch sensor can be implemented according to the touch electrodes (and routing) patterns described with respect to FIGS. 5-21.

Figure 26:
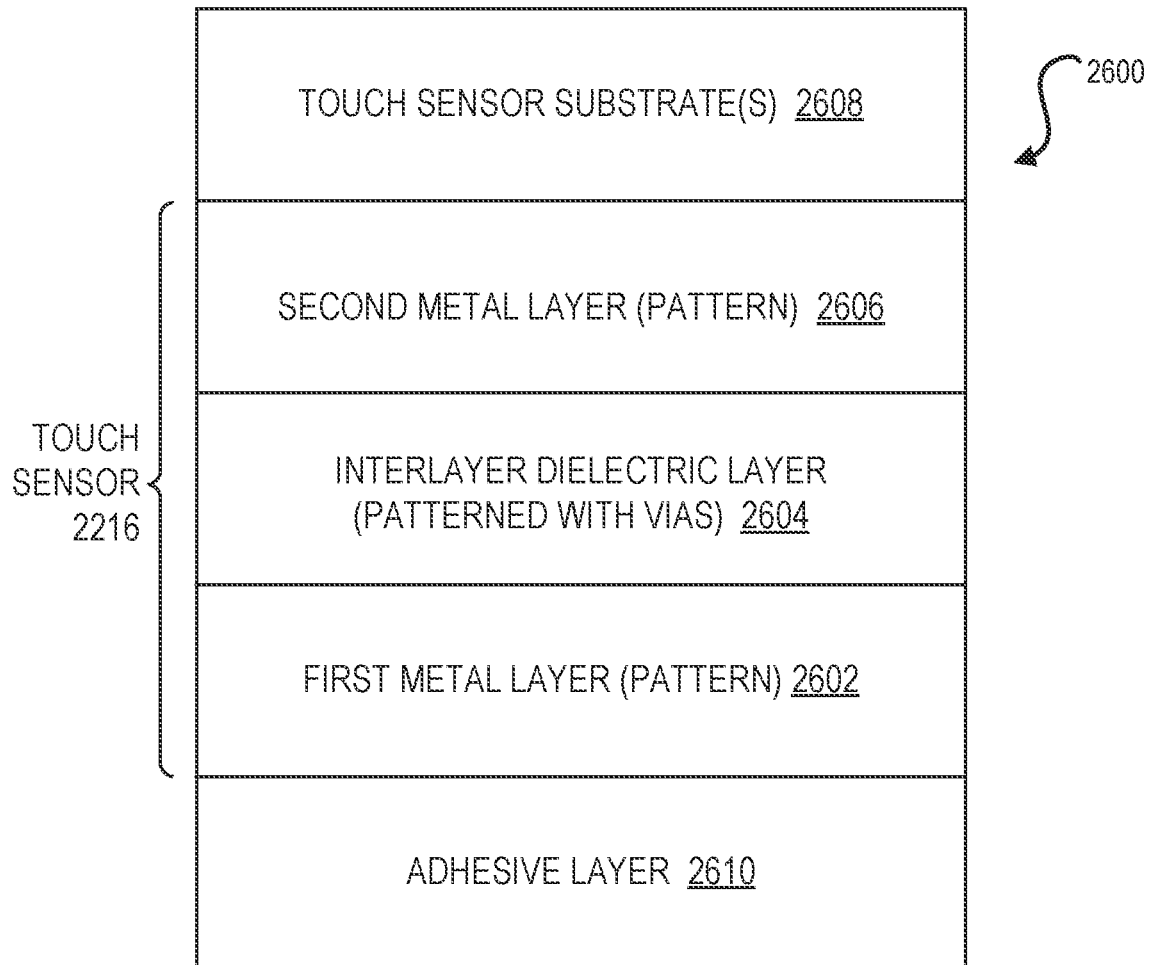
FIG. 26 illustrates an example transfer-type touch sensor of a touch screen stack-up according to examples of the disclosure.

FIG. 26 illustrates an example transfer-type touch sensor of a touch screen stack-up according to examples of the disclosure. In some examples, FIG. 26 can show a sub-stack 2600 of stack-up 2200 shown/described by FIG. 22. In contrast to the arrangement described above in connection with FIG. 25, touch sensor 2216 as illustrated by FIG. 26 is not manufactured using on-cell processes. Instead, touch sensor 2216 of FIG. 26 represents a discrete or semi-discrete component manufactured using a different process than the manufacturing process used to form layers 2202-2214 of FIG. 22. In other words, touch sensor 2216 represents a component that is manufactured at a different time, a different location, and/or using a different manufacturing process, relative to layers 2202-2214 of FIG. 22 (e.g., the preceding layers of stack-up 2200).

Similar to the arrangement of FIG. 25, touch sensor 2216 of FIG. 26 includes a first metal layer 2602, an interlayer dielectric layer 2604, and a second metal layer 2606. These layers may be equivalent to corresponding layers 2502, 2504, and 2506 of FIG. 25, except that the alignment from lamination may be reduced compared with the process-alignment with layers 2202-2214 of FIG. 22 resulting from on-cell processes. Because touch sensor 2216 of FIG. 26 is manufactured using a different process than preceding layers of a stack-up, the touch sensor can sometimes be referred to as a "transfer-type" touch sensor. With a transfer-type touch sensor, as illustrated by FIG. 26, some of the advantages of on-cell processes are not available, requiring careful alignment and lamination/adhesion steps to integrate touch sensor 2216 with layers 2202-2214 of stack-up 2200 of FIG. 22. These additional alignment and lamination/adhesion steps complicate the manufacture of stack-up 2200, and are prone to error, in some examples. Examples of error in alignment can include mis-aligning touch sensor 2216 relative to display-noise shield/sensor 2210 and/or display components 2204, such that rows and columns formed in the metal layers of touch sensor 2216 are not substantially aligned with corresponding structures in shield/sensor 2210 and/or display components 2204. Such an error can reduce touch sensor accuracy, and/or result in additional yield loss. Examples of error in lamination/adhesion can include partial/incomplete, or insufficient adhesion of touch sensor 2216 to the remainder of stack-up 2200 (e.g., preceding layers 2202-2214). Specifically, transfer-type touch sensor 2216 of FIG. 26 can be laminated/adhered to the remainder of stack-up 2200 by adhesive layer 2610. However, partial and/or incomplete adhesion between adhesive layer 2610 and dielectric layer 2214 or second encapsulation layer 2212 can result in insufficient anchoring of touch sensor 2216 to stack-up 2200. Insufficient anchoring of touch sensor 2216 to stack-up 2200 can result in future misalignment of touch sensor 2216 relative to stack-up 2200 (e.g., by movement of touch sensor 2216), or inconsistent performance of touch sensor 2216 during operation of a device containing stack-up 2200 (e.g., due to strain/force on touch sensor 2216 that causes it to move while the device is in use). Additionally, because touch sensor 2216 of FIG. 26 is not formed using on-cell processes, but is instead manufactured using a different process, touch sensor substrate(s) 2608 may be included within stack-up 2200 of FIG. 22, and can correspond to a base substrate upon which the layers 2602-2606 are formed (e.g., during the separate manufacture of transfer-type touch sensor 2216).

Figure 27:
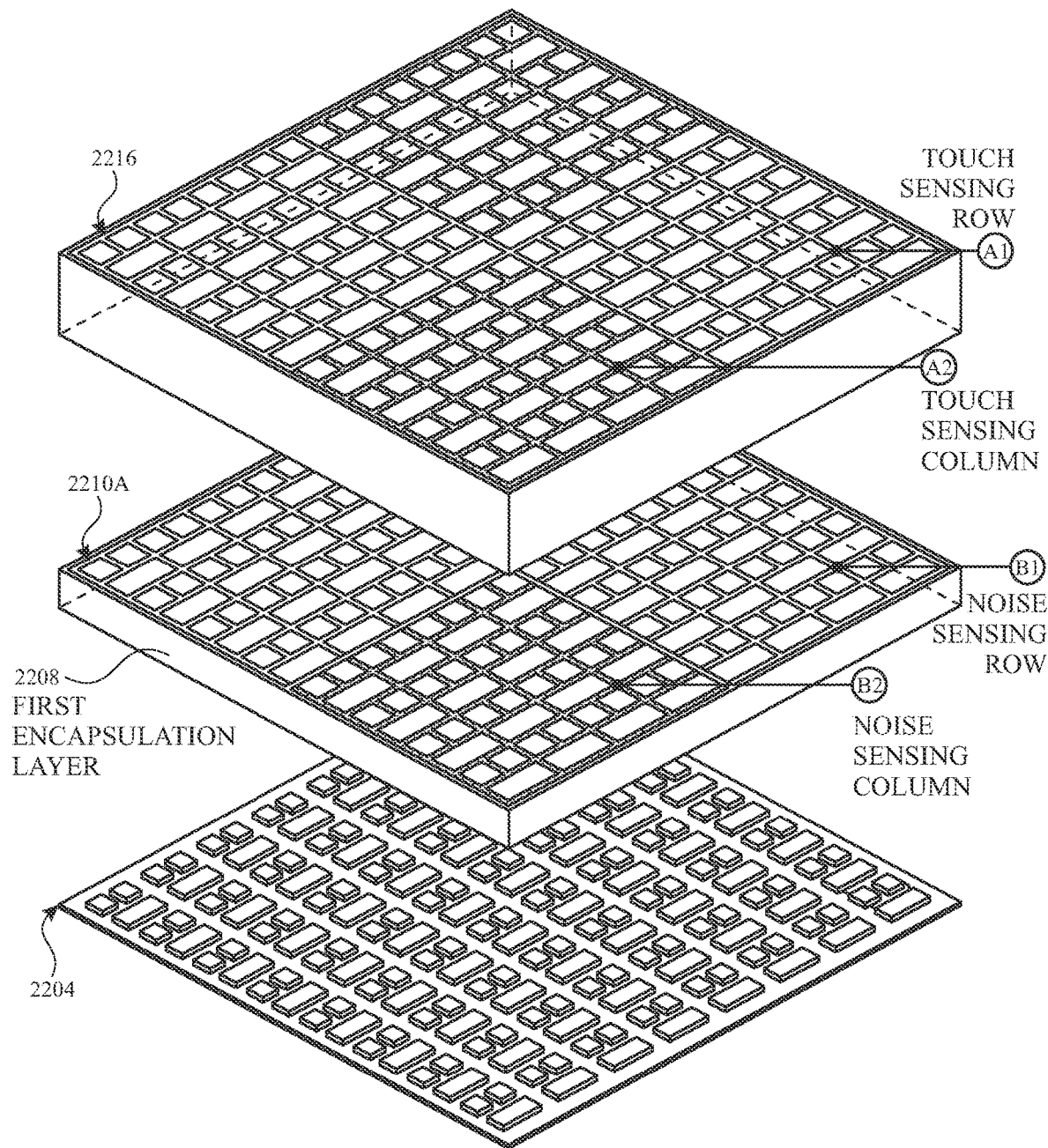
FIG. 27 illustrates exemplary readout terminals of a touch sensor and a pixel-aligned display-noise sensor of a touch screen stack-up according to examples of the disclosure.

FIG. 27 illustrates exemplary readout terminals of a touch sensor and a pixel-aligned display-noise sensor of a touch screen stack-up according to examples of the disclosure. FIG. 27 illustrates a simplified stack-up relative to 2200 of FIG. 22, only illustrating display components 2204 (represented here as pixels in an array, each with multiple sub-pixels), a metal layer of display-noise sensor 2210A (e.g., second metal layer 2306 of FIG. 23), and a metal layer of touch sensor 2216 (e.g., second metal layer 2506 of FIG. 25, or 2606 of FIG. 26). Starting from the bottom of the simplified stack-up, display components 2204 can be used to display text, images, videos, or other information to a user, and can do so by modifying signals input to the display to cause corresponding/desired changes to outputs of the display components 2204 themselves. When output values of pixels in display components 2204 change during normal operation of an electronic device, the changing pixel output values can generate associated noise signals that are usually localized to a vicinity of the display components 2204 that changed.

Display-noise sensor 2210A is illustrated above display components 2204, and can be formed over first encapsulation layer 2208, as described above in connection with FIGS. 22 and 23. FIG. 27 illustrates display-noise sensor 2210A as a single metal layer, corresponding to embodiments in which both row noise-sensor electrodes and column noise-sensor electrodes are formed in a single metal layer (e.g., second metal layer 2306 of FIG. 23). In such examples, another metal layer (e.g., first metal layer 2302) can be used to form interconnections between discontinuous row and/or column noise sensor electrode segments (e.g., in second metal layer 2306). However, this is merely illustrative, and display-noise sensor 2210A can also have row noise-sensor electrodes and column noise-sensor electrodes formed in different respective metal layers. Row noise-sensor electrodes that extend in a first direction over corresponding segments of display components 2204 can be sensitive to electrical noise generated by changes to output values of underlaying display components 2204 along the first direction. A connection point of a row noise-sensor electrode of display-noise sensor 2210A can be labeled by the terminal B1, and read out at a readout circuit (e.g., 2900 of FIG. 29). Similarly, column noise-sensor electrodes that extend in a second direction, different from the first direction, over corresponding segments of display components 2204 can be sensitive to electrical noise generated by changes to output values of underlaying display components 2204 along the second direction. A connection point of a column noise-sensor electrode of display-noise sensor 2210A can be labeled by the terminal B2, and read out at a readout circuit. Metal used to form row noise-sensor electrodes and column noise-sensor electrodes in display-noise sensor 2210A can be patterned to be substantially aligned with sub-pixel components of display components 2204, such that metal in display-noise sensor 2210A does not optically interfere with light transmitted from display components 2204 (e.g., pattern features of row and column noise-sensor electrodes may overlay corresponding sub-pixel display components within a 5% deviation from a target centered/aligned position within stack-up 2200).

Touch sensor 2216 is illustrated above display-noise sensor 2210A (opposite side of the display-noise sensor from the display), and can be formed over dielectric layer 2214 and/or second encapsulation layer 2212, as described above in connection with FIGS. 22 and 25. Touch sensor 2216 is illustrated as a single metal layer, corresponding to embodiments in which both row touch electrodes and column touch electrodes are formed in a single metal layer (e.g., second metal layer 2506 of FIG. 25). In such examples, another metal layer (e.g., first metal layer 2502) can be used to form interconnections between discontinuous row and/or column touch electrode segments (e.g., in second metal layer 2506). However, this is merely illustrative, and touch sensor 2216 can also have row noise-sensor electrodes and column noise-sensor electrodes formed in different respective metal layers. Row touch electrodes that extend in a first direction over corresponding segments of display components 2204 can be sensitive to electrical noise generated by changes to output values of underlaying display components 2204 along the first direction. These row touch electrodes can also extend over a corresponding row noise-sensor electrode of display-noise sensor 2210A. A connection point of a row touch electrode of touch sensor 2216 can be labeled by the terminal A1, and read out at a readout circuit in parallel with a corresponding signal from a row noise-sensor electrode labeled by the terminal B1. Similarly, column touch electrodes that extend in a second direction, different from the first direction, over corresponding segments of display components 2204 can be sensitive to electrical noise generated by changes to output values of underlaying display components 2204 along the second direction. These column touch electrodes can also extend over a corresponding column noise-sensor electrode of display-noise sensor 2210A. A connection point of a column touch electrode of touch sensor 2216 can be labeled by the terminal A2, and read out at a readout circuit in parallel with a corresponding signal from a column noise-sensor electrode labeled by the terminal B2. Metal used to form row/column touch electrodes in touch sensor 2216 can be patterned to be substantially aligned with sub-pixel components of display components 2204, such that metal in touch sensor 2216 does not optically interfere with light transmitted from display components 2204 (e.g., pattern features of row and column touch electrodes may overlay corresponding sub-pixel light-emitting display components within a 5% deviation from a target centered/aligned position within stack-up 2200).

Each row touch electrode of touch sensor 2216 can overlay a corresponding row noise-sensor electrode of display-noise sensor 2210A, in some examples. Each corresponding pair of row touch electrode and row noise-sensor electrode can overlay a corresponding row of display pixels of display components 2204, and can be sensitive to electrical noise generated by changes to output values of underlaying display components 2204, in some examples. To mitigate the influence of electrical noise from the display components 2204, display-noise signals from rows/columns of display-noise sensor 2210A (e.g., signals read out from terminals B1/B2) can be read out in parallel with corresponding touch detection signals from rows/columns of touch sensor 2216 (e.g., signals read out from terminals A1/A2), by a readout circuit, in some examples. In some examples, the signals B1/B2 read out from display-noise sensor 2210A and the signals A1/A2 read out from touch sensor 2216 can correspond to rows and/or columns of display-noise sensor 2210A that are aligned, and overlapping with rows and/or columns of touch sensor 2216. Reading out display-noise signals from B1/B2 in parallel with touch detection signals from A1/A2 allows a readout circuit to subtract display-noise signals from the touch detection signals, thereby generating noise-corrected touch detected signals with a mitigated contribution of display-noise signals to the touch detection signals. In some examples, such an arrangement can result in improved accuracy and repeatability in measuring touch input from a user based on the noise-corrected touch detection signals.

In some examples, particular rows and columns of display-noise sensor 2210A can be combined into larger regions that partition the area over display components 2204 (or the area under touch sensor 2216). In such examples, particular rows and columns can be combined by "ganging," or electrically connecting, outputs of the particular rows and columns so the larger region formed by the particular rows and columns in combination can be read out at a single time (or, at a single terminal). Alternatively, the particular rows and columns can be read out sequentially (or, at their respective terminals), and then combined, to produce an output corresponding to a noise signal at the larger region formed by the particular rows and columns in combination. When particular row noise-sensor electrodes and column noise-sensor electrodes of display-noise sensor 2210A are combined into larger regions in this way, each region of display-noise sensor 2210A can be sensitive to electrical noise generated by changes to output values of corresponding regions of display components 2204 below. In turn, the regions formed by combined row noise-sensor electrodes and column noise-sensor electrodes can be formed below corresponding regions of touch sensor 2216. In such examples, signals read out from a particular region of display-noise sensor 2210A can be read out in parallel with corresponding touch detection signals from rows/columns of touch sensor 2216 corresponding to signals within a corresponding region (e.g., a row touch electrode or column touch electrode above the particular region of display-noise sensor 2210A). In some examples, these signals (e.g., from a region of display-noise sensor 2210A, and a corresponding region of touch sensor 2216) can be read out by a common readout circuit (described below, in connection with FIG. 29). Similar to the approach when a single row/column noise-sensor electrode and a single row/column touch electrode are read out by a common readout circuit, when first signals from a region of noise-sensor electrodes of display-noise sensor 2210A and second signals from a corresponding region of touch sensor 2216 are read out, the first signals can be subtracted from the second signals to generate a readout value corresponding to the touch signals without the noise contribution/influence of display components 2204 (e.g., without display-noise).

This approach, of partitioning display-noise sensor 2210A into larger regions that extend beyond a single row or a single column, can be extended to combine all the row noise-sensor electrodes and column noise-sensor electrodes of display-noise sensor 2210A to generate a global readout, corresponding to a noise signal at the entire display-noise sensor 2210A. Similar to the approach when a region of multiple row/column noise-sensor electrodes and a corresponding region of row/column touch electrode are read out by a common readout circuit, when first signals corresponding to the entire display-noise sensor 2210A and second signals from any region of touch sensor 2216 are read out, the first signals can be subtracted from the second signals to generate a readout value corresponding to the touch signals without the noise contribution/influence of display components 2204 (e.g., without display-noise).

Figure 28:
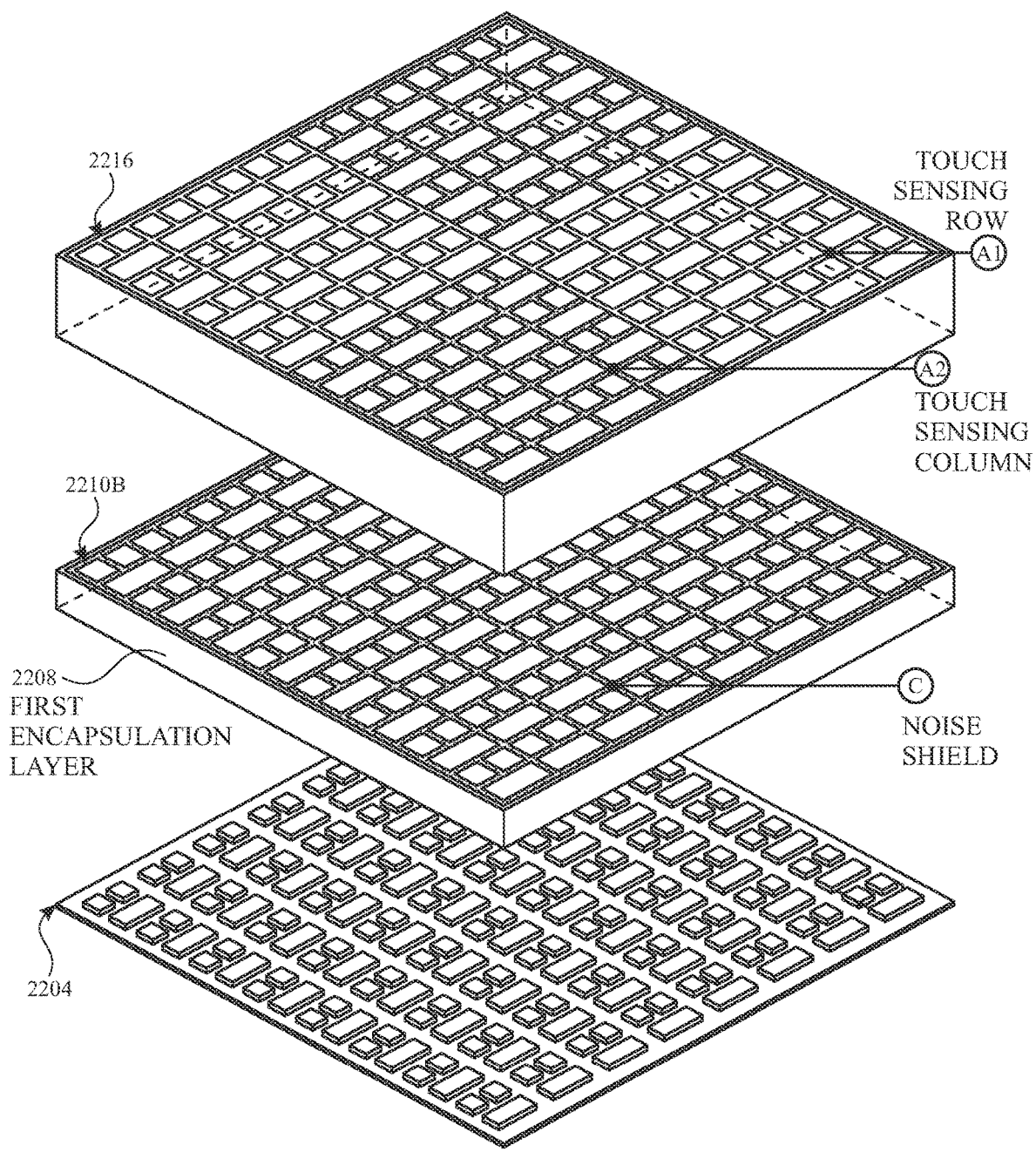
FIG. 28 illustrates exemplary readout terminals of a touch sensor and a display-noise shield of a touch screen stack-up according to examples of the disclosure.

FIG. 28 illustrates exemplary readout terminals of a touch sensor and a display-noise shield of a touch screen stack-up according to examples of the disclosure. FIG. 28 illustrates a simplified stack-up relative to 2200 of FIG. 22, only illustrating display components 2204 (represented here as pixels in an array, each with multiple sub-pixels), a metal layer of display-noise shield 2210B (e.g., metal layer 2402 of FIG. 24), and a metal layer of touch sensor 2216 (e.g., second metal layer 2506 of FIG. 25, or 2606 of FIG. 26). Similar to the description above in connection with FIG. 27, when output values of pixels in display components 2204 change during normal operation of an electronic device, the changing pixel output values can generate associated noise signals that are usually localized to a vicinity of the display components 2204 that changed.

Figure 30:
FIG. 30 illustrates an exemplary voltage bias for a display-noise shield of a touch screen stack-up according to examples of the disclosure.

Display-noise shield 2210B is illustrated above display components 2204, and can be formed over first encapsulation layer 2208, as described above in connection with FIGS. 22 and 23. FIG. 28 illustrates display-noise shield 2210B as a single metal layer, corresponding to embodiments in which a global mesh is formed across metal layer 2402 (of FIG. 24), thereby covering an entirety of the display components 2204. In some examples, the global mesh associated with display-noise shield 2210B can be partitioned into non-contiguous shield segments. In such examples, multiple connection points corresponding to the multiple shield segments can be provided. However, in the example illustrated by FIG. 28, a connection point of the entire display-noise shield 2210B can be labeled by the terminal C, and as illustrated by FIG. 30, the terminal C can be coupled to a ground voltage, thereby biasing the entire shield 2210B at a fixed voltage level. Metal used to form display-noise shield electrode(s) of display-noise shield 2210B can be patterned to be substantially aligned with sub-pixel components of display components 2204, such that metal in display-noise shield 2210B does not optically interfere with light transmitted from display components 2204 (e.g., pattern features of a display-noise shield may overlay corresponding sub-pixel display components within a 5% deviation from a target centered/aligned position within stack-up 2200).

Touch sensor 2216 is illustrated above display-noise shield 2210B, and can be formed over dielectric layer 2214 and/or second encapsulation layer 2212, as described above in connection with FIGS. 22 and 25. Due to the high capacitance between the global mesh of metal layer 2402 and touch sensor 2216, sometimes an optional dielectric layer 2214 is provided between display-noise shield 2210B and touch sensor 2216 in some examples. As mentioned above in connection with FIG. 22, including dielectric layer 2214 between display-noise shield 2210B and touch sensor 2216 can improve isolation between those layers of stack-up 2200, thereby improving touch sensing performance, accuracy, and repeatability. Touch sensor 2216 is illustrated as a single metal layer, corresponding to embodiments in which both row touch electrodes and column touch electrodes are formed in a single metal layer (e.g., second metal layer 2506 of FIG. 25). Similar to FIG. 27, touch sensor 2216 is illustrated having row and column touch electrodes. A connection point of a row touch electrode of touch sensor 2216 can be labeled by the terminal A1, and read out at a readout circuit. A connection point of a column touch electrode of touch sensor 2216 can be labeled by the terminal A2, and read out at a readout circuit. Metal used to form row/column touch electrodes in touch sensor 2216 can be patterned to be substantially aligned with sub-pixel components of display components 2204, such that metal in touch sensor 2216 does not optically interfere with light transmitted from display components 2204 (e.g., pattern features of row and column touch electrodes may overlay corresponding sub-pixel display components within a 5% deviation from a target centered/aligned position within stack-up 2200).

Each row touch electrode of touch sensor 2216 can overlay display-noise shield 2210B, in some examples. As signals are read out from rows/columns of touch sensor 2216, display-noise shield 2210B can be actively biased to a particular voltage level during touch sensing operations of touch sensor 2216, in some examples. In such examples, terminal C of display-noise shield 2210B can receive one or more stimulation signals (e.g., a voltage that varies in time) during the touch sensing operations of touch sensor 2216, or can be biased to a ground voltage (or, any other suitable fixed voltage level). In some examples, such an arrangement can result in improved accuracy and repeatability in measuring touch input from a user based on the noise-corrected touch detection signals, by applying one or more bias voltages to display-noise shield 2210B at least during touch sensing operations of touch sensor 2216, thereby shielding row/column touch electrodes of the touch sensor from electrical interference generated by display components 2204 (e.g., display-noise).

Figure 29:
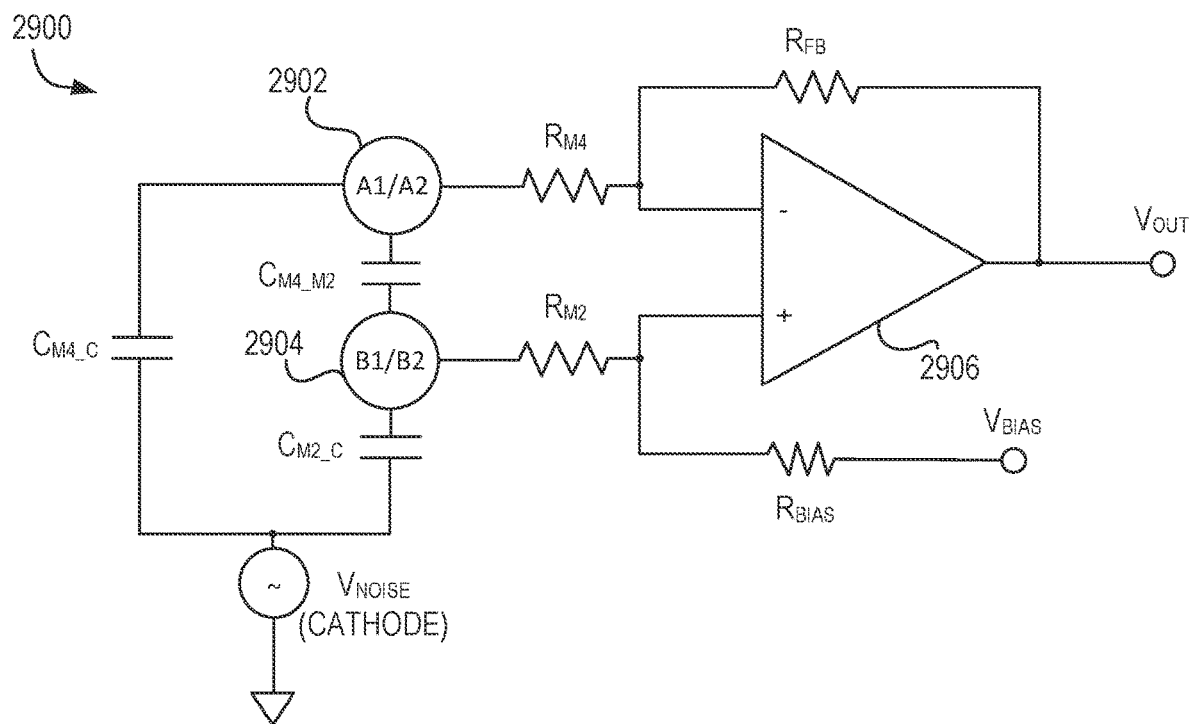
FIG. 29 illustrates exemplary readout circuitry for a touch sensor and a display-noise sensor of a touch screen stack-up according to examples of the disclosure.

FIG. 29 illustrates exemplary readout circuitry for a touch sensor and a display-noise sensor of a touch screen stack-up according to examples of the disclosure. Readout circuit 2900 (also referred to herein as sensing circuitry) can represent an exemplary circuit schematic that models parasitic/undesired capacitances between components of stack-up 2200 of FIG. 22 as well as terminal inputs corresponding to connection points for rows/columns of touch sensor 2216 (e.g., A1/A2), and rows/columns of display-noise sensor 2210A (e.g., B1/B2). An overall function of readout circuit 2900 can be to output a voltage $V_{OUT}$ proportional to a difference between a voltage at positive input 2904 and negative input 2902. $V_{OUT}$ is therefore proportional to a difference between a signal from connection points B1/B2 corresponding to rows/columns of display-noise sensor 2210A, and a signal from connection points A1/A2 corresponding to rows/columns of touch sensor 2216. $V_{OUT}$ therefore represents a signal based on the positive input 2904 and negative input 2902, that can be used to determine a value of the touch signal detected by touch sensor 2216 at connection points A1/A2, minus a noise signal detected by display-noise sensor 2210A at connection points B1/B2.

As described above in connection with FIGS. 27, display-noise sensor 2210A can sometimes be partitioned into regions by combining output values from particular row noise-sensor electrodes and/or column noise-sensor electrodes, in some examples. In other examples, display-noise sensor 2210A can be used to generate a global readout that combines output values from all the row noise-sensor electrodes and all the column noise-sensor electrodes. Though not illustrated by FIG. 29, these signals can also be provided at positive input 2904.

In some examples, readout circuit 2900 can perform similar functions to touch sensor circuits 300 and 350 of FIGS. 3A and 3B. As described above, touch sensor circuits 300/350 can produce an output Vo corresponding to a single-ended readout of a row/column of touch sensor 2216 (e.g., a touch electrode signal readout), in some examples. Similarly, touch sensor circuits 300/350 can be coupled to rows/columns of display-noise sensor 2210A to produce single-ended readouts of rows/columns of display-noise sensor 2210A, in some examples. In such examples, an output from a touch sensor circuit 300/350 coupled to a row/column of display-noise sensor 2210A can be subtracted from an output from a touch sensor circuit 300/350 coupled to a row/column of touch sensor 2216 to obtain a difference value comparable or proportional to the output voltage $V_{OUT}$ of readout circuit 2900.

A voltage source labeled $V_{NOISE}$ (CATHODE) represents a noise contribution from display components 2204 to other components of stack-up 2200 of FIG. 22, in some examples. Capacitor $C_{M2\_C}$ represents a parasitic or unwanted capacitance between the cathode (e.g., display components 2204) and a metal layer called M2 (e.g., a metal layer corresponding to display-noise shield/sensor 2210). In examples where display-noise shield/sensor 2210 is display-noise sensor 2210A, metal layer M2 can correspond to second metal layer 2306 of FIG. 23. In examples where display-noise shield/sensor 2210 is display-noise shield 2210B, metal layer M2 can correspond to metal layer 2402 of FIG. 24. Positive input 2904 is connected to display-noise shield/sensor 2210, and can therefore be subject to the $C_{M2\_C}$ capacitance (as illustrated by their connection in FIG. 29). Capacitor $C_{M4\_C}$ represents a parasitic or unwanted capacitance between the cathode (e.g., display components 2204) and a metal layer called M4 (e.g., a metal layer corresponding to row/column electrodes of touch sensor 2216). In examples where row and column electrodes are formed in a single layer, closest to the user (e.g., closest to cover layer 2222 of FIG. 22), metal layer M4 can correspond to second metal layer 2506. Negative input 2902 is connected to touch sensor 2216, and can therefore be subject to the $C_{M4\_C}$ capacitance (as illustrated by their connection in FIG. 29). Capacitance $C_{M4\_M2}$ represents a parasitic or unwanted capacitance between metal layers M2 and M4, and is shown connected between positive input 2904 and negative input 2902 because it can subject the two layers those input can be connected to, in some examples.

Positive input 2904 is shown connected to differential amplifier 2906 via resistor $R_{M2}$, which can represent an inherent resistance associated with the metal layer called M2 described above. Alternatively, $R_{M2}$ can represent an input resistor to a positive terminal of differential amplifier 2906, and can have a particular, pre-defined value. Negative input 2902 is shown connected to differential amplifier 2906 via resistor $R_{M4}$, which can represent an inherent resistance associated with the metal layer called M4 described above. Alternatively, $R_{M4}$ can represent an input resistor to a negative terminal of differential amplifier 2906, and can have a particular, pre-defined value. $R_{BIAS}$ can represent a resistor connecting a bias voltage $V_{BIAS}$ to a positive terminal of differential amplifier 2906, and $R_{FB}$ can represent a feedback resistor connecting output voltage $V_{OUT}$ to a negative terminal of differential amplifier 2906, in some examples.

FIG. 30 illustrates an exemplary voltage bias for a display-noise shield of a touch screen stack-up according to examples of the disclosure. In some examples, connection point C, representing a connection to the global mesh of display-noise shield 2210B, is grounded. Grounding display-noise shield 2210B can mitigate noise, in some examples. Alternatively, display-noise shield 2210B can be biased to any fixed, non-zero voltage, in some examples (e.g., also to mitigate noise). In some examples, display-noise shield 2210B is only biased to a ground, or other fixed voltage during touch sensing operations of touch sensor 2216. In some examples (not illustrated by FIG. 30), display-noise shield 2210B can be provided stimulation signals during touch sensing operations that correspond to, or are based on stimulation signals 216 of FIG. 2, provided to drive lines 222 through drive interface 224.

Figure 31:
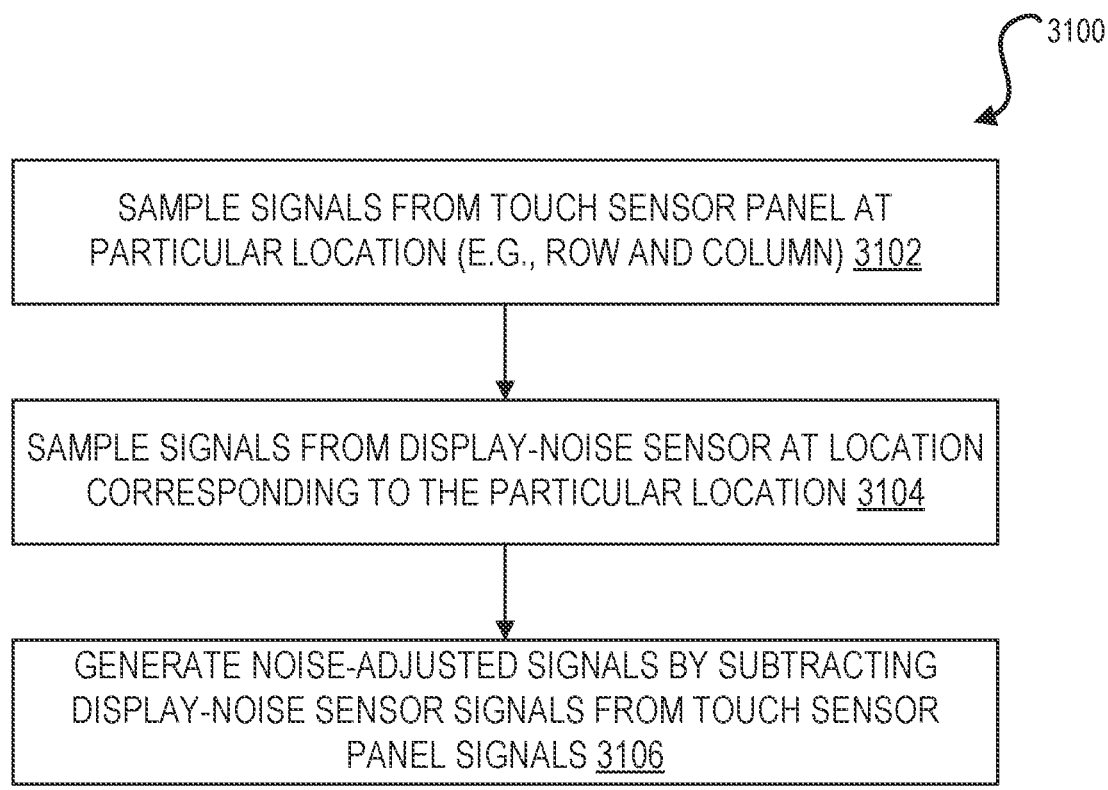
FIG. 31 illustrates an example process for operating a touch screen stack-up with a touch sensor and a display-noise sensor between the touch sensor and display pixels according to examples of the disclosure.

FIG. 31 illustrates an example process 3100 for operating a touch screen stack-up with a touch sensor and a display-noise sensor between the touch sensor and display pixels according to examples of the disclosure. In some examples, process 3100 describes operations for operating a touch screen stack-up with a touch sensor and a display-noise shield between the touch sensor and the display pixels, as well. In some examples, process 3100 can describe operations for operating readout circuit 2900 of FIG. 29, whether the positive input 2904 is connected to a display-noise sensor electrode (e.g., inputs B1/B2) or connected to a display-noise shield electrode (e.g., input C).

Process 3100 begins with readout circuitry (e.g., 2900 of FIG. 29) sampling signals from a touch sensor 2216 at a particular location (e.g., row and/or column), at 3102. As an example, 3102 can describe sampling signals from touch sensor 2216, particularly sampling a particular location of the touch sensor where a touch event can be detected (e.g., by touch controller 206). In such an example, a touch event can be detected at a particular row (e.g., row two) and a particular column (e.g., column three) of a display, and can correspond to a user interacting or selecting a user interface element displayed by display components 2204 at the particular row and the particular column. Signals read out via terminals A1/A2 of FIG. 27 can be sampled and/or read out at negative input 2902 of readout circuit 2900 of FIG. 29, at 3102 of process 3100.

Process 3100 continues by the readout circuitry sampling signals from display-noise sensor at location corresponding to the particular location, at 3104. As an example, 3104 can describe sampling signals from display-noise sensor 2210A at the same particular location that the touch event was detected on the touch sensor. In such an example, display-noise sensor 2210A can be sampled at the particular row (e.g., row two) and the particular column (e.g., column three) corresponding to the location within display-noise sensor 2210A underneath the location of the detected touch event on touch sensor 2216. Signals read out via terminal B1/B2 of FIG. 27 can be sampled and/or read out at positive input 2904 of readout circuit 2900 of FIG. 29, at 3104 of process 3100. In some examples, signals read out via terminal C of FIG. 28 can be sampled and/or read out at positive input 2904 of readout circuit 2900 of FIG. 29, at 3104 of process 3100. In some examples, signals read out at positive input 2904 of readout circuit correspond to electrical noise signals based on display components 2204, or changes in output values of display components 2204.

Process 3100 concludes by the readout circuitry generating noise-adjusted touch readout signals, by subtracting display-noise sensor signals from touch sensor panel signals, at 3106. As an example, 3106 can describe differential amplifier 2906 generating an output voltage $V_{OUT}$ corresponding to a difference of a signal at the positive input 2904 and a signal at the negative input 2902. As an example, \Tom' can be proportional to the signal at the positive input 2904 minus (or, subtracted by) the signal at the negative input 2902, which is in turn proportional to the signal at the negative input 2902 minus (or, subtracted by) the signal at the positive input 2904. By determining the signal at the negative input 2902 minus the signal at the positive input 2904, a noise-corrected touch readout signal can be generated, at least because the signal at positive input 2904 read out from display-noise sensor 2210A can correspond to an electrical noise contribution at the particular location (e.g., where a touch event was detected).

Figure 32:
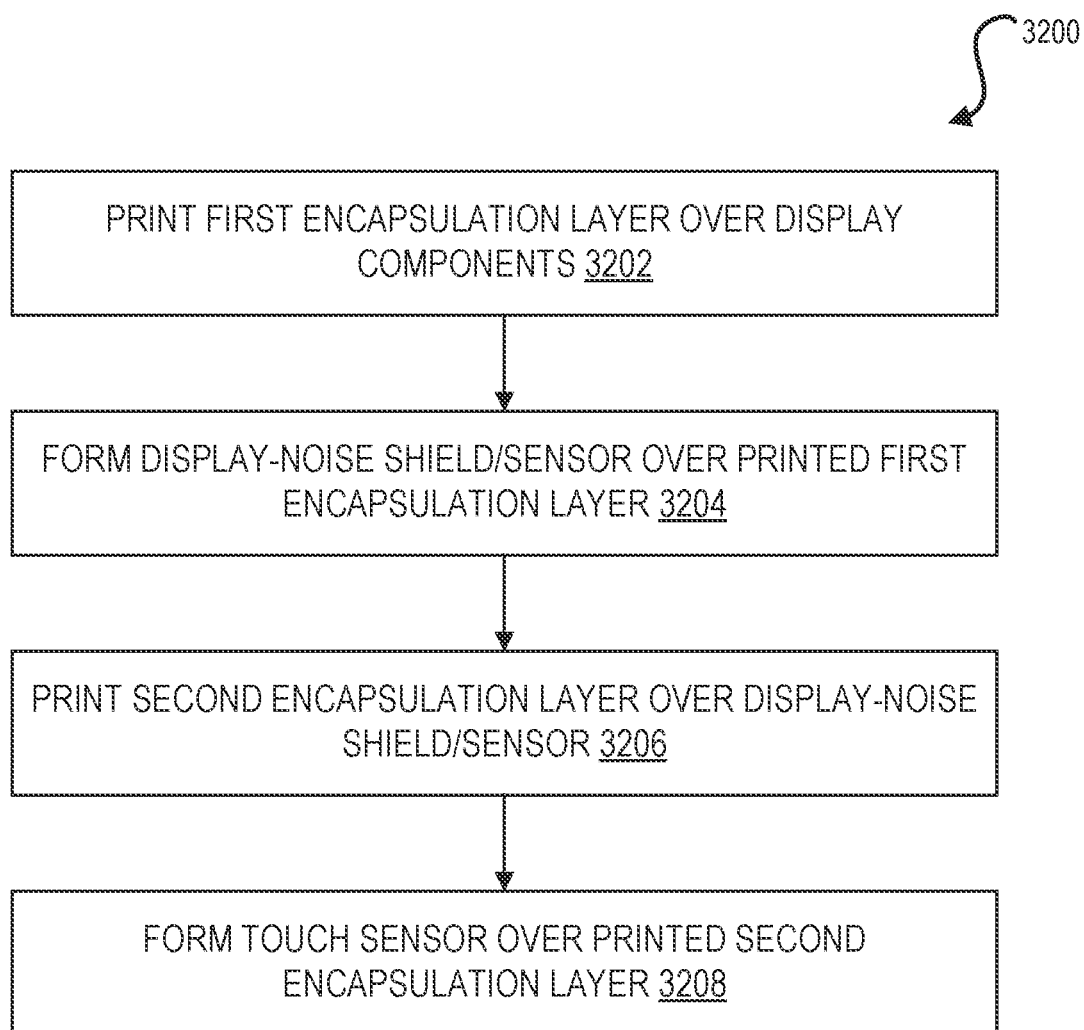
FIG. 32 illustrates an example process for forming a touch screen stack-up with a display-noise shield/sensor formed on a first printed layer and a touch sensor formed on a second printed layer according to examples of the disclosure.

FIG. 32 illustrates an example process 3200 for forming a touch screen stack-up with a display-noise shield/sensor formed on a first printed layer and a touch sensor formed on a second printed layer according to examples of the disclosure. In some examples, process 3200 describes operations for manufacturing first encapsulation layer 2208, display-noise shield/sensor 2210, second encapsulation layer 2212, and touch sensor 2216 of stack-up 2200 of FIG. 22, using an on-cell manufacturing process. In some examples, on-cell manufacturing described in the process 3200 can be alternatively descried as manufacturing first encapsulation layer 2208, display-noise shield/sensor 2210, second encapsulation layer 2212, and touch sensor 2216 in situ (e.g., in the same place), as display components 2204. As described above in connection with FIG. 22, on-cell manufacturing processes can provide advantages over alternative techniques of using discrete, and semi-discrete components to form display-noise shield/sensor 2210 and/or touch sensor 2216. In some examples, these advantages include the elimination of alignment and lamination steps associated with aligning the (semi-)discrete component associated with a display-noise shield/sensor to the already-manufactured layers 2202-2208 and using a laminate or adhesive to affix the component associated with the display-noise shield/sensor to the already-manufactured layers 2202-2208. These advantages of manufacturing display-noise shield/sensor using an on-cell process contribute to lower yield losses of the overall stack-up 2200, relative to alternative processes.

Process 3200 begins by printing a first encapsulation layer (e.g., layer 2208) over display components (e.g., display components 2204), at 3202. As mentioned above in connection with stack-up 2200 of FIG. 22, first encapsulation layer 2208 can be formed on top of passivation layer 2206, which covers an entirety of the light-emitting display pixels/elements of display components 2204, and which sometimes covers portions of the layer for display components 2204 where no light-emitting display pixels/elements are formed. In some examples, printing first encapsulation layer 2208 involves selective deposition (e.g., by ink-jet printing methods) of the encapsulation layer material only over portions of passivation layer 2206 formed over light-emitting display pixels/elements of display components 2204. In such examples, first encapsulation layer 2208 can be an optically transparent material that can be suitably deposited using selective deposition techniques (e.g., an ink-jet printing process).

Process 3200 continues by forming display-noise shield/sensor over printed first encapsulation layer, at 3204. As described above in connection with FIG. 22, display-noise shield/sensor 2210 can either be a shield, or a sensor, in some examples. Forming a display-noise shield can require forming a metal layer over the first encapsulation printed at 3202, in some examples (e.g., metal layer 2402 of FIG. 24). Forming a display-noise sensor can require forming multiple metal layers separated by an interlayer dielectric layer between them, in some examples (e.g., metal layers 2302 and 2306 separated by interlayer dielectric layer 2304 of FIG. 23).

Process 3200 continues by printing a second encapsulation layer over the display-noise shield/sensor, at 3206. As described above in connection with FIG. 22, second encapsulation layer 2212 can be selectively or blanket deposited over display-noise shield/sensor 2210. In some examples, second encapsulation layer 2212 can be deposited over an entirety of display-noise shield/sensor 2210 (e.g., blanket deposition), or over only a portion of display-noise shield/sensor 2210 (e.g., selective deposition). As an example, using blanket deposition, second encapsulation layer 2212 can be deposited over an entirety of display-noise shield/sensor 2210 (e.g., blanket deposition), such that the surface of the second encapsulation layer is substantially flat (e.g., points on the surface of second encapsulation layer 2212 are all within a 5% range of a target level height for the second encapsulation layer within stack-up 2200). As another example, using selective deposition, second encapsulation layer 2212 can be deposited over only a portion of display-noise shield/sensor 2210 such that the surface of the second encapsulation is uneven (e.g., at a height in deposition regions, and at a different height in non-deposition regions).

Process 3200 can conclude by forming a touch sensor over the printed second encapsulation layer, at 3208. As detailed in the description of touch sensor 2216 in connection with FIG. 22, a thick dielectric layer 2214 can be formed over the second encapsulation layer 2212, to improve isolation of touch sensor 2216 from display-noise shield/sensor 2210 (e.g., by reducing stray/parasitic capacitances between the two). In some examples, touch sensor 2216 can be formed over the thick dielectric layer 2214. In other examples, touch sensor 2216 can be formed directly over second encapsulation layer 2212. Touch sensor 2216 of FIG. 22, when formed over the printed second encapsulation layer 2212 in this way (and/or over dielectric layer 2214 for additional isolation), has layers illustrated by FIG. 25.

At 3208, a first metal layer (e.g., layer 2502 of FIG. 25) can be formed over the second encapsulation layer, followed by an interlayer dielectric layer (e.g., layer 2504 of FIG. 25), and a second metal layer (e.g., layer 2506 of FIG. 25). In some examples, the first and second metal layers can be used to form row touch electrodes and column touch electrodes of a touch sensor. In such examples, the interlayer dielectric layer between the two metal layers can be patterned with vias, to allow interconnection between at least one portion of one metal layer with at least one portion of the other metal layer. As an example, row touch electrodes can be formed in the first metal layer, and column touch electrodes can be formed in the second metal layer. As another example, both row touch electrodes and column touch electrodes can be formed in the first metal layer, and the second metal layer can be used to form conductive bridges to connect any discontinuous touch electrodes in the first metal layer.

Figure 33:
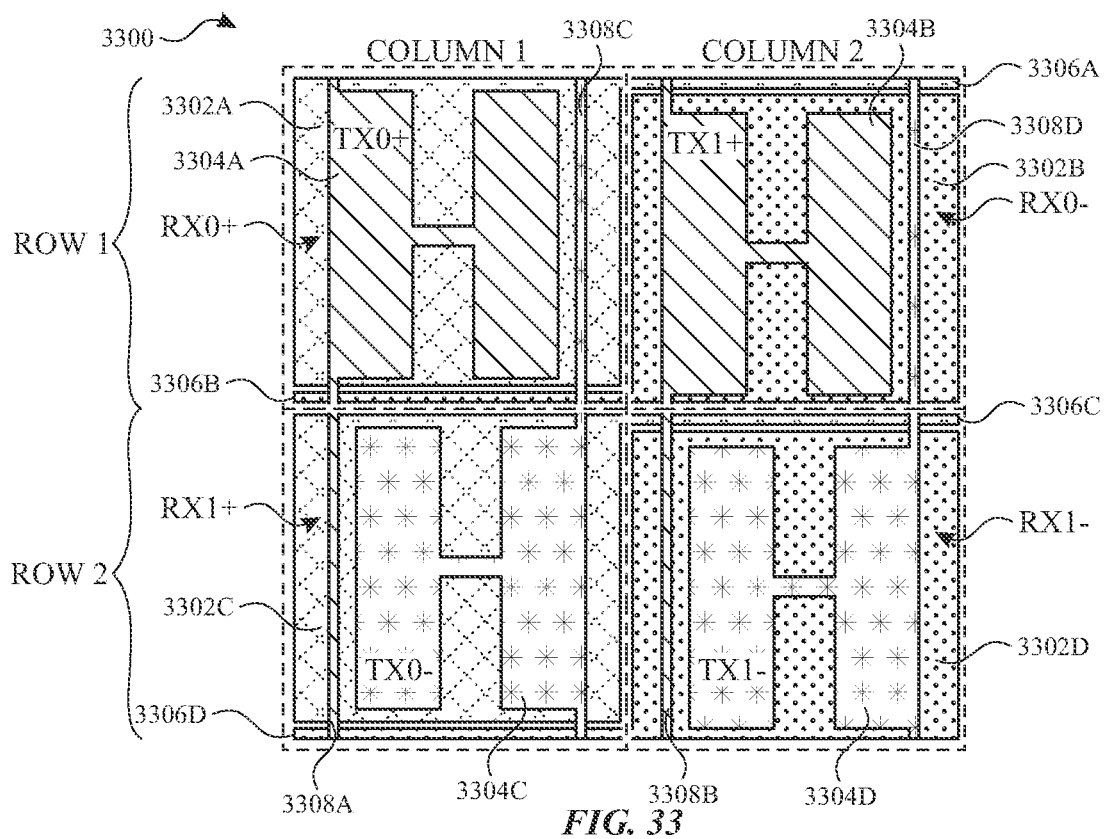
FIG. 33 illustrates a portion of an example touch sensor panel according to examples of the disclosure.

FIG. 33 illustrates a portion of an example touch sensor panel according to examples of the disclosure. The portion of the touch sensor panel 3300 (e.g., corresponding to touch sensor panel 700, 1100, 1300, etc.) includes a two-by-two array of touch nodes including four column electrodes 3304A-3304D (H-shaped electrodes) and four row electrodes labeled 3302A-3302D. Some row routing traces 3306A-3306D and column routing traces 3308A-3308D are also shown. The row electrodes 3302A-3302D can be routed to the sensing circuitry (e.g., single-ended amplifiers used for single-ended or differential measurements or differential amplifiers) using routing traces 3306A-3306D. The column electrodes 3304A-3304D can be routed to drive circuitry using routing traces 3308A-3308D. The row and column routing traces can additionally or alternatively connect to other portions of the row and column electrodes for other portions of the touch sensor panel outside the two-by-two array. The four row electrodes can be coupled to four inputs of the sensing circuitry, referenced with labels Rx0+, Rx0−, Rx1+, and Rx1−(e.g., which may be used for two differential measurements). The four column electrodes can be coupled to four outputs of the drive circuitry, referenced with labels Tx0+, Tx0−, Tx1+, and Tx1−.

As described herein, common mode noise from the display can be rejected using differential sensing (e.g., display-to-touch noise is common mode) and differential driving can reduce local imbalance on display electrodes from touch electrodes (e.g., the net touch drive signal is approximately zero, thereby reducing touch-to-display noise). However, the noise reduction benefits of differential drive and sense techniques apply to the two-by-two array of touch nodes (e.g., across the pitch of two touch nodes), whereas each touch node primarily corresponds to a single-ended measurement touch signal of a respective row and column. For example, a first touch node (touch node A, upper left corner) measures the dominant mutual capacitance between column electrode 3304A and row electrode 3302A, a second touch node (touch node B, upper right corner) measures the dominant mutual capacitance between column electrode 3304B and row electrode 3302B, a third touch node (touch node C, lower left corner) measures the dominant mutual capacitance between column electrode 3304C and row electrode 3302C, and a fourth touch node (touch node D, lower right corner) measures the dominant mutual capacitance between column electrode 3304D and row electrode 3302D. The non-dominant (minor) mutual capacitances, however, can degrade the differential touch signal for each of the touch nodes.

In some examples, a touch electrode architecture for differential drive without differential sense can be implemented. Differential drive can still reduce the touch-to-display noise (without differential sensing to reduce display-to-touch noise). The touch electrode architecture for differential drive can simplify the touch electrode architecture design because fewer routing traces and fewer bridges are required compared with some of the differential drive and differential sense touch electrode architectures described herein (e.g., touch electrode architecture of FIG. 33).

Figure 34:
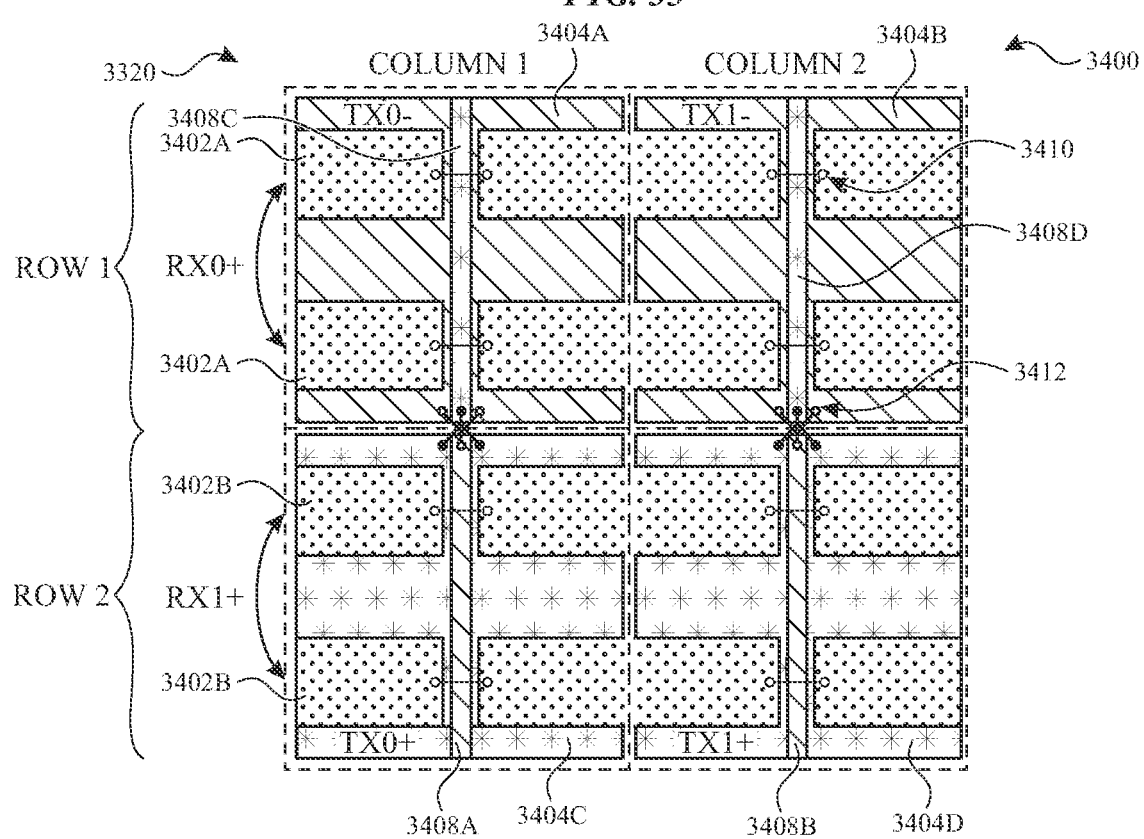
FIG. 34 illustrates a portion of an example touch sensor panel configured for differential drive according to examples of the disclosure.

FIG. 34 illustrates a portion of an example touch sensor panel configured for differential drive according to examples of the disclosure. The portion of the touch sensor panel 3400 includes a two-by-two array of touch nodes including four column electrodes 3404A-3404D and two row electrodes labeled 3402A-3402B. The row touch electrodes can be formed from a two-dimensional array of touch electrode segments, which are horizontally interconnected using bridges 3410, and which can be vertically interconnected in a border region (e.g., outside of the touch sensor panel area) and/or by additional bridges (not shown). As shown, each of the touch electrode segments for a row electrode is rectangular, but other shapes are possible. Six touch electrode segments and four bridges are shown for each row electrode (e.g., two groups of three touch electrode segments and two bridges) for the two-by-two array of touch nodes, but it is understood that different numbers of touch electrode segments and bridges can be used. Although not shown, the row electrodes can be routed to sensing circuitry at the left or right edges of the touch sensor panel (or optionally vertically as described with reference to FIGS. 7A-14C). Additionally, as shown in FIG. 34, the row electrodes are nearly entirely continuous across the touch sensor panel (but for the bridges over column routing traces and relatively small portions of column electrodes), which improves the consistency of touch signal sensing when an object moves horizontally across the touch sensor panel (e.g., relative to the interleaved row electrodes of FIG. 33).

Each column electrode includes a plurality of touch electrode segments that are connected by bridges 3412 and/or column routing traces 3408A-3408D. As shown, each of the touch electrode segments for a column electrode are E-shaped (e.g., union of five rectangles, three of which are parallel and the other two of which are orthogonal to and interconnect the three), but other shapes are possible. A pair of the E-shaped touch electrode segments of a first column electrode for a first touch node in a column are connected to a first column routing segment and by a first three-way bridge 3412 (or by a three-way routing trace in the same layer as the touch electrode segments). A pair of the E-shaped touch electrode segments of a second column electrode for a second touch node in a column are connected to a first column routing segment and by a second three-way bridge 3412 (or by a three-way routing trace in the same layer as the touch electrodes segments). The first column routing trace 3408A for the first column electrode can bisect the pair of E-shaped column electrode segments of a second column electrode interleaved with the first column electrode. Similarly, the second column routing trace for the second column electrode can bisect a pair of E-shaped column electrode segments of the first column electrode interleaved with the second column electrode. It is understood that at the transition from column routing trace 3408A to column routing trace 3408B that one of the column routing traces can couple to corresponding column touch electrode segments in the same layer as the column touch electrode segments (e.g., using a three-way routing trace) and the other of the column routing traces can couple to corresponding column touch electrode segments using a three-way bridge 3412. In some examples, however, as illustrated, connections between each column routing trace and corresponding touch electrode segments can each be made using bridges (but that this increases the number of bridges and require some adjustment to avoid the bridges intersecting one another). This pattern described for two touch nodes in one column can be repeated for the second column shown in FIG. 34 (and extended to a larger portion of the touch sensor panel beyond the two-by-two array).

As shown, the pairs of E-shaped touch electrode segments are connected by three-way bridge 3412 from each E-shaped touch electrode segment to a column routing trace. Although three-way bridges 3412 are illustrated to provide a three-way connection between a column routing trace and a pair of E-shaped touch electrode segments, it is understood that different bridge connections are possible. For example, a pair of bridges can be used instead of a three-way bridge or the pair of E-shaped touch electrode segments can be connected by one or more horizontal bridges and one or more additional bridges can connect from one or more of the pair of E-shaped touch electrode segments to the corresponding column routing trace.

As shown, the E-shaped electrodes can include a center bar that is thicker than the upper and lower bars. The dimensions of the E-shaped electrodes can be optimized to improve total touch signal measured at the touch nodes.

Each touch node includes a differential pair of column electrodes and single-ended row electrodes. For example, a first touch node (touch node A, upper left corner) includes a portion of row electrode 3402A (e.g., corresponding to a single-ended input for touch sensing), a portion of column electrode 3404A, and a portion of column routing trace 3408C (e.g., corresponding to differential, complimentary outputs of touch driving). Similarly, a second touch node (touch node B, upper right corner) includes a portion of row electrode 3402A (e.g., corresponding to a single-ended input for touch sensing), a portion of column electrode 3404B, and a portion of column routing trace 3408F (e.g., corresponding to differential, complimentary outputs of touch driving); a third touch node (touch node C, lower left corner) includes a portion of row electrode 3402B (e.g., corresponding to a single-ended input for touch sensing), a portion of column electrode 3404C, and a portion of column routing trace 3408A (e.g., corresponding to differential, complimentary outputs of touch driving); and a fourth touch node (touch node D, lower right corner) includes a portion of row electrode 3402B (e.g., corresponding to a single-ended input for touch sensing), a portion of column electrode 3404D, and a portion of column routing trace 3408B (e.g., corresponding to differential, complimentary outputs of touch driving). The differential cancelation of the drive signals occurs across the two touch nodes in each column.

The touch electrode architecture of FIG. 34 can provide a simplified design in the form of fewer traces and bridges. For example, the touch electrode architecture of FIG. 34 includes four column electrodes, but only two row electrodes, thereby reducing the number of routing traces from eight to six compared with the touch electrode architecture of FIG. 33. The simplified architecture can also reduce the number of bridges required.

Although FIG. 34 provides some simplifications to the touch electrode architecture (e.g., fewer routing traces and bridges), it may be desirable to have an improved cancelation resolution (e.g., cancelation that occurs in a smaller area for better cancelation performance). In some examples, a touch electrode architecture for differential drive and differential sense can be implemented in which the row electrodes are interleaved and the column electrodes are not, or in which the column electrodes are interleaved and the row electrodes are not. Although one set of touch electrodes are not interleaved, the touch signal processing algorithm can be adjusted to achieve a pseudodifferential result (e.g., mimicking the result from physically interleaving).

Figure 35A:
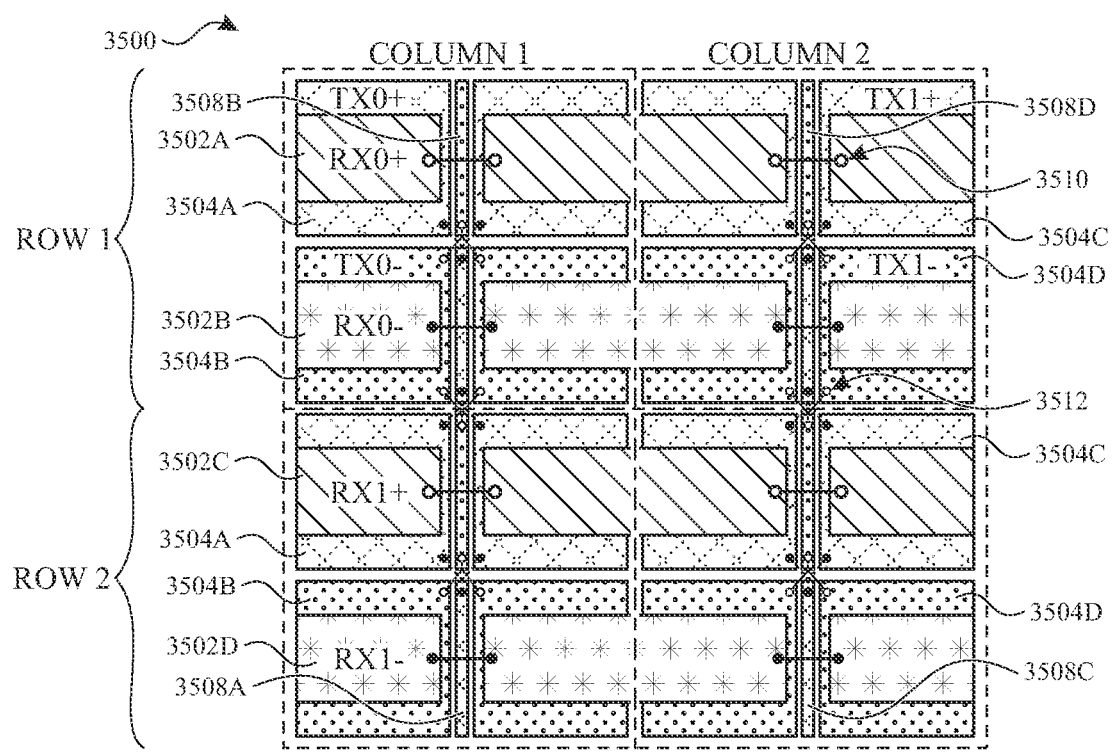
FIGS. 35A-35B illustrate example touch electrode architectures according to examples of the disclosure.
Figure 35B:
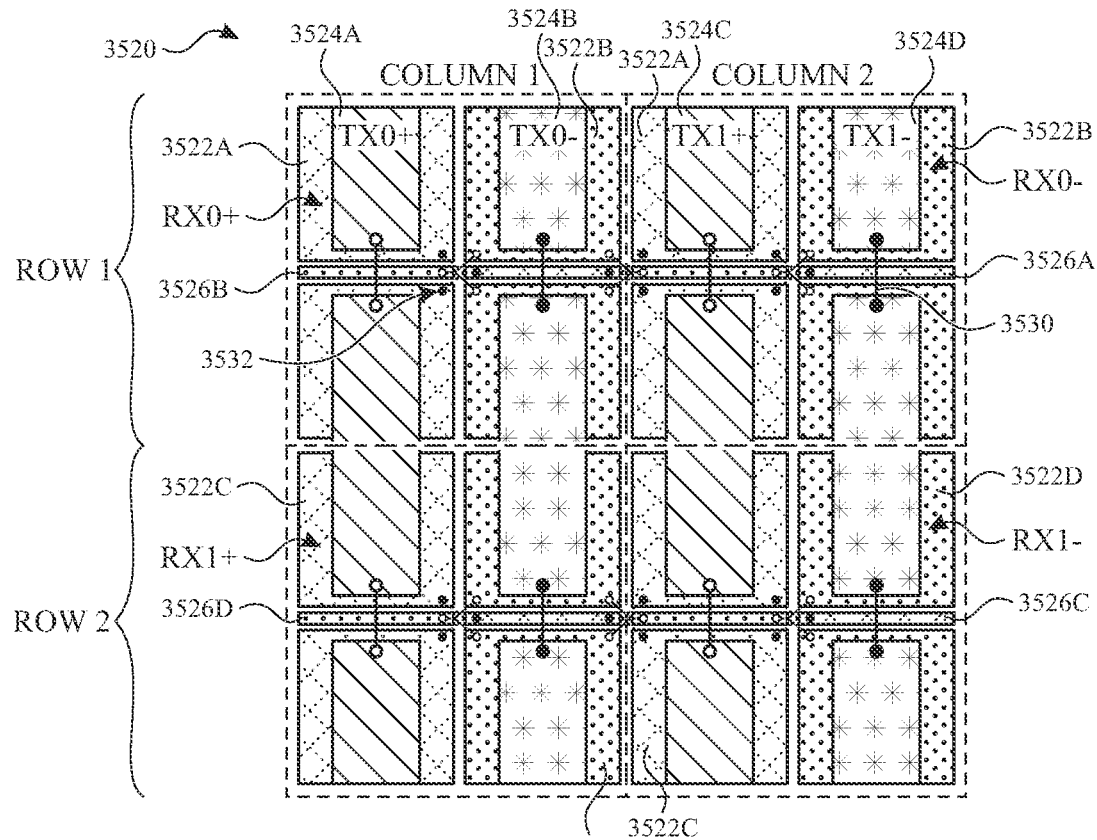

FIGS. 35A-35B illustrate example touch electrode architectures according to examples of the disclosure. The touch electrode architectures of FIGS. 35A-35B include the same number of electrodes (and corresponding routing traces to drive and sensing circuitry) as the touch electrode architecture of FIG. 33. However, unlike the touch electrode architecture of FIG. 33, the touch electrode architectures of FIGS. 35A-35B reduce the distance over which the differential effects are achieved. For example, assuming the same dimensions for the two-by-two array of touch nodes in FIGS. 33 and 35A or 35B, the differential cancelation occurs over half the distance (e.g., over half the touch electrode pitch) for the touch electrode architectures of FIGS. 35A-35B compared with the touch electrode architecture of FIG. 33.

The portion of the touch sensor panel 3500 illustrated in FIG. 35A includes a two-by-two array of touch nodes including four column electrodes 3504A-3504D and four row electrodes labeled 3502A-3502D. Each row electrode includes a plurality of touch electrode segments that are connected by bridges 3510 over column routing traces. As shown, each of the touch electrode segments for a row electrode is rectangular, but other shapes are possible. Three touch electrode segments and two bridges are shown for each row electrode in the two-by-two touch node array, but it is understood that different numbers of touch electrode segments and bridges can be used. Although not shown, the row electrodes can be routed to sensing circuitry at the left or right edges of the touch sensor panel (or optionally vertically as described with reference to FIGS. 7A-14C). Additionally, as shown in FIG. 35A, the row electrodes are nearly entirely continuous across the touch sensor panel (but for the bridges over column routing traces and relatively small portions of column electrodes), which improves the consistency of touch signal sensing when an object moves horizontally across the touch sensor panel (e.g., relative to the interleaved row electrodes of FIG. 33).

Each column electrode includes a plurality of touch electrode segments that are connected by three-way bridges 3512 and column routing traces 3508A-3508D. As shown, each of the touch electrode segments for a column electrode are U-shaped (e.g., union of three rectangles, two of which are parallel, and the third of which is orthogonal to and interconnects the two), but other shapes are possible. A pair of the U-shaped touch electrode segments of a first column electrode for a first touch node in a column and a pair of U-shaped touch electrode segments of the first column electrode for a second touch node in the column are connected by a first column routing segment and by a first three-way bridge 3512 (or a three-way routing connection in the same layer as the touch electrode segments). The first column routing trace for the first column electrode can bisect a pair of U-shaped column electrode segments of a second column electrode interleaved with the first column electrode. Similarly, a pair of the U-shaped touch electrode segments of a second column electrode for the first touch node in the column and a pair of U-shaped touch electrode segments of the second column electrode for a second touch node in the column are connected by second column routing segment and by a second three-way bridge 3512 (or a three-way routing connection in the same layer as the touch electrode segments). The second column routing trace for the second column electrode can bisect a pair of U-shaped column electrode segments of the first column electrode interleaved with the second column electrode. This pattern can be repeated for the second column shown in FIG. 35A (and extended to a larger portion of the touch sensor panel beyond the two-by-two array). Each pair of U-shaped touch electrode segments can be view as forming a split H-shape (e.g., the U-shaped touch electrode segments are mirrored over the bisecting column routing trace for the interleaved column electrode).

As shown, the pairs of U-shaped touch electrode segments are connected by three-way bridges 3512 (or three-way routing connections in the same layer as the touch electrode segments) from each U-shaped touch electrode segment to a column routing trace. Although a pair of three-way bridges 3512 are illustrated to provide a three-way connection between a column routing trace and a pair of U-shaped touch electrode segments, it is understood that different bridge connections are possible. For example, a pair of bridges can be used instead of a three-way bridge or the pair of U-shaped touch electrode segments can be connected by one or more horizontal bridges and one or more bridges can connect from one or more of the pair of U-shaped touch electrode segments to the corresponding column routing trace. Four touch electrode segments and four bridges are shown for each column electrode in FIG. 35A, but it is understood that different numbers of touch electrode segments and bridges can be used.

Each touch node includes a differential pair of row electrodes and a differential pair of column electrodes. For example, a first touch node (touch node A, upper left corner) includes a portion of row electrode 3502A and a portion of a second row electrode 3502B (e.g., corresponding to differential inputs for touch sensing), and a portion of column electrode 3504A and a portion of column electrode 3504B (e.g., corresponding to differential, complimentary outputs of touch driving). Thus, the differential cancelation occurs on a per touch node basis rather than across two touch nodes. Similarly, a second touch node (touch node B, upper right corner) includes a portion of row electrode 3502A and a portion of a second row electrode 3502B (e.g., corresponding to differential inputs for touch sensing), and a portion of column electrode 3504C and a portion of column electrode 3504D (e.g., corresponding to differential, complimentary outputs of touch driving); a third touch node (touch node C, lower left corner) includes a portion of row electrode 3502C and a portion of a second row electrode 3502D (e.g., corresponding to differential inputs for touch sensing), and a portion of column electrode 3504A and a portion of column electrode 3504B (e.g., corresponding to differential, complimentary outputs of touch driving); and a fourth touch node (touch node D, lower right corner) includes a portion of row electrode 3502C and a portion of a second row electrode 3502D (e.g., corresponding to differential inputs for touch sensing), and a portion of column electrode 3504C and a portion of column electrode 3504D (e.g., corresponding to differential, complimentary outputs of touch driving). Thus, the differential cancelation occurs on a per touch node basis for each touch node in the two-by-two array of touch nodes.

The touch signal level can be improved and parasitic losses reduced for touch electrode architecture of FIG. 35A relative to the touch electrode architecture of FIG. 33. For example, unlike the touch electrode architecture of FIG. 33, two dominant and complimentary mutual capacitance are represented at each touch node in FIG. 35A. For example, a first touch node (touch node A, upper left corner) measures the dominant mutual capacitance between column electrode 3504A (Tx0+) and row electrode 3502A (Rx0+) and the complimentary dominant mutual capacitance between column electrode 3504B (Tx0−) and row electrode 3502B (Rx0−); a second touch node (touch node B, upper right corner) measures the dominant mutual capacitance between column electrode 3504C (Tx1+) and row electrode 3502A (Rx0+) and the complimentary dominant mutual capacitance between column electrode 3504D (Tx1−) and row electrode 3502B (Rx0−); a third touch node (touch node C, lower left corner) measures the dominant mutual capacitance between column electrode 3504A (Tx0+) and row electrode 3502C (Rx1+) and the complimentary dominant mutual capacitance between column electrode 3504B (Tx0−) and row electrode 3502D (Rx1−); and a fourth touch node (touch node D, lower right corner) measures the dominant mutual capacitance between column electrode 3504C (Tx1+) and row electrode 3502C (Rx1+) and the complimentary dominant mutual capacitance between column electrode 3504D (Tx1−) and row electrode 3502D (Rx1−). The two dominant mutual capacitances in each node sum due to the fact that they are in-phase with one another.

Additionally, the non-dominant (minor) parasitic capacitance can be reduced in touch electrode architecture of FIG. 35A compared with the touch electrode architecture of FIG. 33. For example, for the first touch node (touch node A), there is still some parasitic capacitance due to the mutual capacitance between column routing trace 3508B (Tx0−) and row electrode 3502A (Rx0+) (and there is still some parasitic capacitance due to the mutual capacitance between column routing trace 3508A (Tx0+) and row electrode 3502B (Rx0−)), but separation is increased between column electrode 3504B (Tx0−) and row electrode 3502A (Rx0+), and between column electrode 3504A (Tx0+) and row electrode 3502B (Rx0−), and the row routing is reduced compared with the touch electrode architecture of FIG. 33 (e.g., the length and proximity of column routing trace 3308C to row electrode 3302A is eliminated), thereby reducing the parasitic signal loss due to the mutual capacitance therebetween.

In some examples, the touch electrode architecture of FIG. 35A can be used for single-ended sensing. For example, switching circuitry (not shown) can be implemented to enable either a pair of row electrodes to be differentially sensed (e.g., row electrode 3502A is coupled to one differential input and row electrode 3502B is coupled to a second differential input of the sensing circuitry), or to be sensed in a single-ended fashion (e.g., row electrodes 3502A and 3502B are coupled together and to one single-ended input of the sensing circuitry). In some examples, switching circuitry can enable single-ended sensing at a smaller pitch (e.g., row electrode 3502A is coupled to one single-ended input and row electrode 3502B is coupled to another single-ended input of the sensing circuitry). As described herein, the touch electrode architecture of FIG. 33 can also be used for single-ended sensing, but due to the interleaving of the row electrodes, the measurements may be offset between adjacent rows.

FIG. 35B illustrates a variation on FIG. 35A, but with the row electrodes interleaved and the column electrodes not interleaved (e.g., pseudo-interleaved due to modifications of the touch sensing algorithm). For example, the portion of the touch sensor panel 3520 illustrated in FIG. 35B includes a two-by-two array of touch nodes including four column electrodes 3524A-3524D and four row electrodes labeled 3522A-3522D. Each column electrode includes a plurality of touch electrode segments that are connected by bridges 3530 over row routing traces. As shown, each of the touch electrode segments for a column electrode is rectangular, but other shapes are possible. Three touch electrode segments and two bridges are shown for each column electrode in the two-by-two array of touch nodes, but it is understood that different numbers of touch electrode segments and bridges can be used. Although not shown, the column electrodes can be routed to drive circuitry at the top or bottom edges of the touch sensor panel (or optionally horizontally in a similar manner as described herein for row electrodes used for sensing).

Each row electrode includes a plurality of touch electrode segments that are connected by three-way bridges 3532 and row routing traces 3526A-3526D. As shown, each of the touch electrode segments for a row electrode are U-shaped (e.g., union of three rectangles, two of which are parallel and the third of which is orthogonal to and interconnects the two), but other shapes are possible. A pair of the U-shaped touch electrode segments of a row electrode for a first touch node in a row and a pair of U-shaped touch electrode segments of the first row electrode for a second touch node in the row are connected by a first row routing segment and by a first three-way bridge 3532 (or a three-way routing connection in the same layer as the touch electrode segments). The first row routing trace for the first row electrode can bisect a pair of U-shaped row electrode segments of a second row electrode interleaved with the first row electrode. Similarly, a pair of the U-shaped touch electrode segments of a second row electrode for the first touch node in the row and a pair of U-shaped touch electrode segments of the second row electrode for a second touch node in the row are connected by second row routing segment and by a second three-way bridge 3532 (or a three-way routing connection in the same layer as the touch electrode segments). The second row routing trace for the second row electrode can bisect a pair of U-shaped row electrode segments of the first row electrode interleaved with the second row electrode. This pattern can be repeated for the second row of touch nodes shown in FIG. 35B (and extended to a larger portion of the touch sensor panel beyond the two-by-two array). Each pair of U-shaped touch electrode segments can be view as forming a split H-shape (e.g., the U-shaped touch electrode segments are mirrored over the bisecting row routing trace for the interleaved row electrode).

As shown, the pairs of U-shaped touch electrode segments are connected by three-way bridges 3532 (or a three-way routing connection in the same layer as the touch electrode segments) from each touch electrode segment to a row routing trace. Although a pair of three-way bridges 3532 are illustrated to provide a three-way connection between a row routing trace and a pair of U-shaped touch electrode segments, it is understood that different bridge connections are possible. For example, a pair of bridges can be used instead of a three-way bridge or the pair of U-shaped touch electrode segments can be connected by vertical bridges and one or more bridges can connect from one or more of the pair of U-shaped touch electrode segments to the corresponding row routing trace. Four touch electrode segments and four bridges are shown for each row electrode in FIG. 35B, but it is understood that different numbers of touch electrode segments and bridges can be used.

Each touch node includes a differential pair of row electrodes and a differential pair of column electrodes. For example, a first touch node (touch node A, upper left corner) includes a portion of row electrode 3522A and a portion of a second row electrode 3522B (e.g., corresponding to differential inputs for touch sensing), and a portion of column electrode 3524A and a portion of column electrode 3524B (e.g., corresponding to differential, complimentary outputs of touch driving). Thus, the differential cancelation occurs on a per touch node basis rather than across two touch nodes. Similarly, a second touch node (touch node B, upper right corner) includes a portion of row electrode 3522A and a portion of a second row electrode 3522B (e.g., corresponding to differential inputs for touch sensing), and a portion of column electrode 3524C and a portion of column electrode 3524D (e.g., corresponding to differential, complimentary outputs of touch driving); a third touch node (touch node C, lower left corner) includes a portion of row electrode 3522C and a portion of a second row electrode 3522D (e.g., corresponding to differential inputs for touch sensing), and a portion of column electrode 3524A and a portion of column electrode 3524B (e.g., corresponding to differential, complimentary outputs of touch driving); and a fourth touch node (touch node D, lower right corner) includes a portion of row electrode 3522C and a portion of a second row electrode 3522D (e.g., corresponding to differential inputs for touch sensing), and a portion of column electrode 3524C and a portion of column electrode 3524D (e.g., corresponding to differential, complimentary outputs of touch driving).

Thus, the differential cancelation occurs on a per touch node basis for each touch node in the two-by-two array of touch nodes.

The touch signal level can be improved and parasitic losses reduced for touch electrode architecture of FIG. 35B relative to the touch electrode architecture of FIG. 33. For example, unlike the touch electrode architecture of FIG. 33, two dominant and complimentary mutual capacitance are represented at each touch node in FIG. 35B. For example, a first touch node (touch node A, upper left corner) measures the dominant mutual capacitance between column electrode 3524A (Tx0+) and row electrode 3522A (Rx0+), and the complimentary dominant mutual capacitance between column electrode 3524B (Tx0−) and row electrode 3522B (Rx0−); a second touch node (touch node B, upper right corner) measures the dominant mutual capacitance between column electrode 3524C (Tx1+) and row electrode 3522A (Rx0+), and the complimentary dominant mutual capacitance between column electrode 3524D (Tx1−) and row electrode 3522B (Rx0−); a third touch node (touch node C, lower left corner) measures the dominant mutual capacitance between column electrode 3524A (Tx0+) and row electrode 3522C (Rx1+), and the complimentary dominant mutual capacitance between column electrode 3524B (Tx0−) and row electrode 3522D (Rx1−); and a fourth touch node (touch node D, lower right corner) measures the dominant mutual capacitance between column electrode 3524C (Tx1+) and row electrode 3522C (Rx1+), and the complimentary dominant mutual capacitance between column electrode 3524D (Tx1−) and row electrode 3522D (Rx1−). The two dominant mutual capacitances in each node sum due to the fact that they are in-phase with one another.

Additionally, the non-dominant (minor) parasitic capacitance can be reduced due to increased separation column electrode 3524B (Tx0−) and row electrode 3522A (Rx0+), and between column electrode 3524A (Tx0+) and row electrode 3522B (Rx0−), and due to the reduced column routing.

Figure 36:
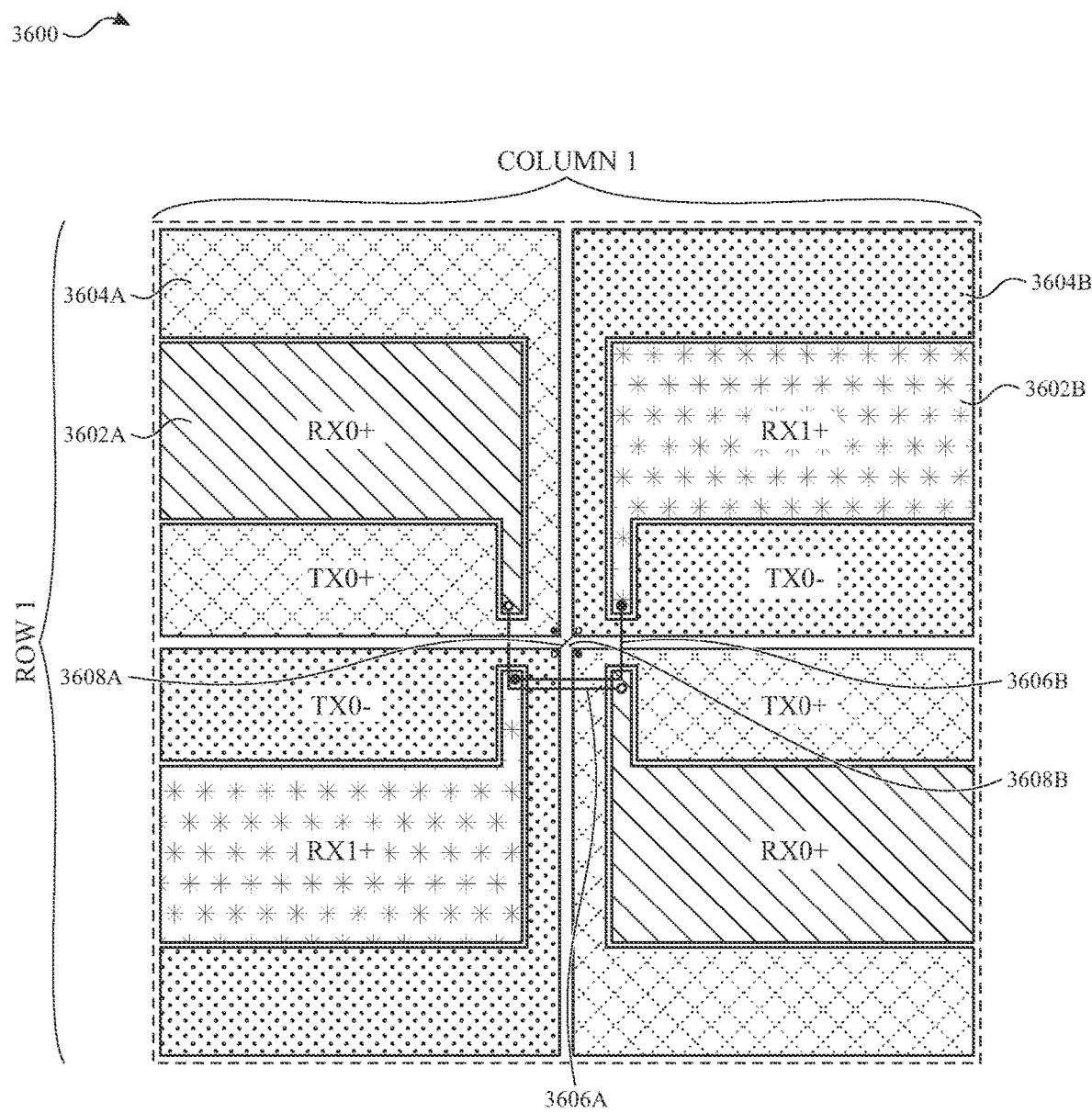
FIG. 36 illustrates an example touch electrode architecture that is fully differential within a touch node according to examples of the disclosure.

FIG. 36 illustrates an example touch electrode architecture that is fully differential within a touch node according to examples of the disclosure. In the touch electrode architecture of FIG. 36, both the row and the column electrodes can be differentially interleaved within a touch node. The portion of the touch sensor panel 3600 illustrated in FIG. 36 corresponds to a single touch node and could be applied as a modification of each of the touch nodes in the touch electrode architectures of FIG. 35A or FIG. 35B (or across a larger touch sensor panel). The touch electrodes illustrated includes two column electrodes 3604A-3604B and two row electrodes 3602A-3602B (extended to four column electrodes and four row electrodes for a two-by-two array of touch nodes). Each row electrode includes a plurality of touch electrode segments that are connected by bridges 3606A-3606B. As shown, each of the touch electrode segments for a row electrode is rectangular (with a rectangular routing extension to reduce the bridge length), but other shapes are possible. Two touch electrode segments and one bridge are shown for each row electrode, but it is understood that different numbers of touch electrode segments and bridges can be used.

Each column electrode includes a plurality of touch electrode segments that are connected by a bridge (e.g., bridges 3608A-3608B) or a routing traces. As shown, each of the touch electrode segments for a column electrode are complimentary to the shape of the touch electrode segments for a row electrode. The shape of the touch electrode segments for a column electrode is approximately U-shaped (apart from the modification to allow for the routing extension for the row touch electrode segment), but other shapes are possible. Two touch electrode segments and one bridge (or a routing trace) are shown for each column electrode, but it is understood that different numbers of touch electrode segments and bridges can be used.

As shown, the touch node includes a differential pair of row electrodes and a differential pair of column electrodes. For example, the touch node of FIG. 36 includes a portion of a first row electrode 3602A and a portion of a second row electrode 3602B (e.g., corresponding to differential inputs for touch sensing), and a portion of column electrode 3604A and a portion of column electrode 3604B (e.g., corresponding to differential, complimentary outputs of touch driving). Thus, the differential cancelation occurs on a per touch node basis. The improved touch signal from two (or four if each quadrant of the touch node is viewed separately) dominant capacitances can be applied in a similar fashion to other touch nodes.

The touch signal level can be improved and parasitic losses reduced for touch electrode architecture of FIG. 36 relative to the touch electrode architecture of FIG. 33. For example, unlike the touch electrode architecture of FIG. 33, two (or four if each quadrant of the touch node is viewed separately) dominant and complimentary mutual capacitance are represented at the touch node in FIG. 36. For example, the touch node measures the dominant mutual capacitance between column electrode 3604A (Tx0+) and row electrode 3602A (Rx0+), and the complimentary dominant mutual capacitance between column electrode 3604B (Tx0−) and row electrode 3602B (Rx0−). The two (or four) dominant mutual capacitances in each node sum due to the fact that they are in phase with one another.

Additionally, the non-dominant (minor) parasitic capacitance can be reduced. For example, there is still some parasitic capacitance due to the mutual capacitance between column electrode 3604B (Tx0−) and row electrode 3602A (Rx0+), and between column electrode 3604A (Tx0+) and row electrode 3602B (Rx0−), but separation is mainly increased (outside of the small row extension) and limited by the short routing, thereby reducing the parasitic signal loss due to the mutual capacitance therebetween. The reduced parasitic loss from two non-dominant capacitances can be applied in a similar fashion to other touch nodes.

Referring back to the discussion of FIG. 34, in some examples, a touch electrode architecture for differential drive without differential sense can be implemented. Differential drive can still reduce the touch-to-display noise (without differential sensing to reduce display-to-touch noise). Additionally, common mode noise can be reduced using spatial separation and spatial filtering. The spatial separation between touch signal and common mode noise signal can be achieved using a touch electrode architecture with reduced pitch for the transmitter and receiver electrodes.

Figure 37:
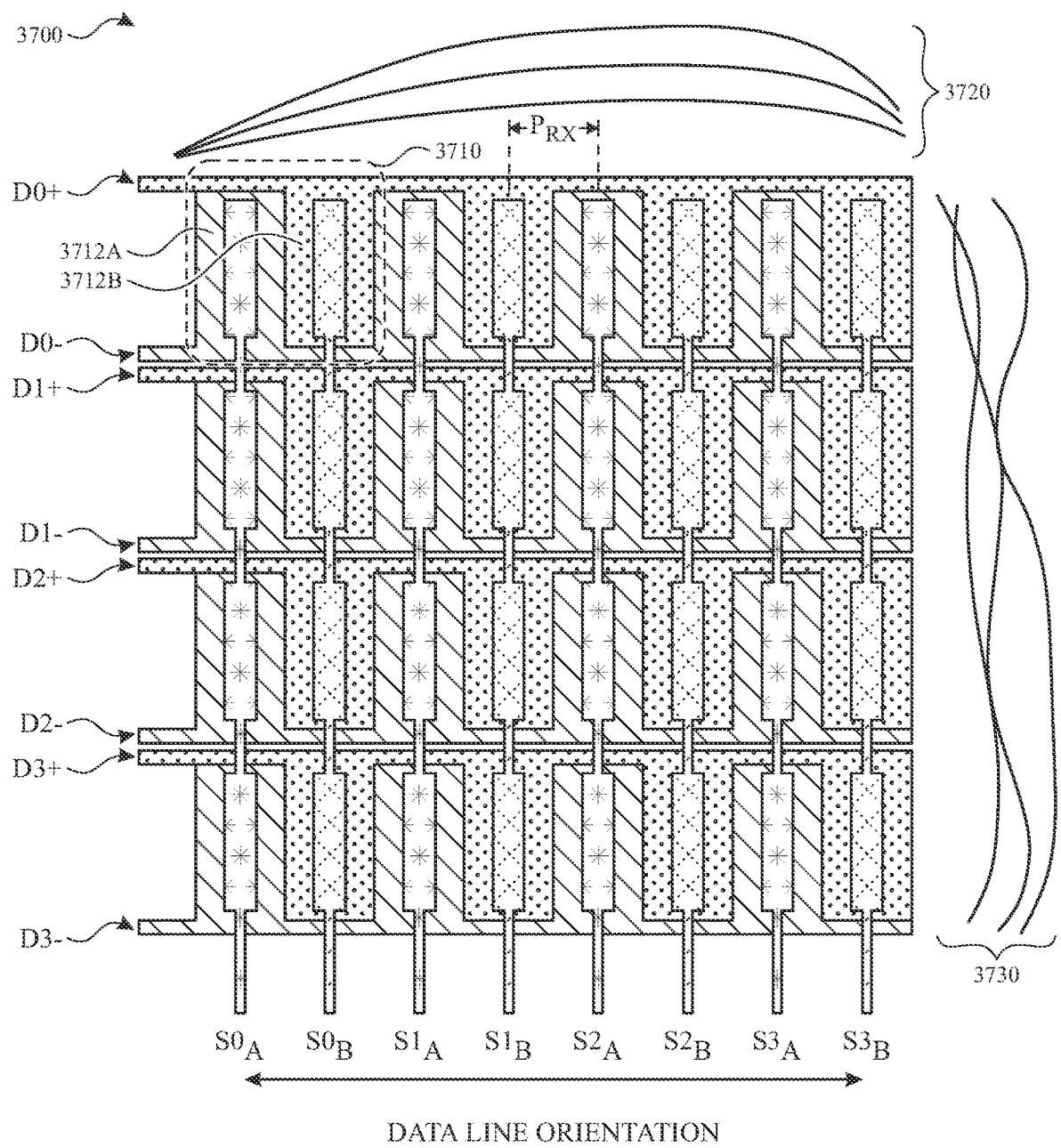
FIG. 37 illustrates a portion of an example touch sensor panel configured for differential drive according to examples of the disclosure.

FIG. 37 illustrates a portion of an example touch sensor panel configured for differential drive according to examples of the disclosure. The portion of the touch sensor panel 3700 includes a four-by-four array of touch nodes including eight transmitter electrodes interleaved in four rows of touch nodes and eight receiver electrodes in four columns of touch nodes. To simplify illustration, bridges are not shown in FIG. 37, but it is understood that most of the touch electrodes in FIG. 37 are implemented in a first metal mesh layer with bridges in a second metal mesh layer.

As shown in touch sensor panel 3700, the first row includes a first pair of interleaved transmitter electrodes labeled D0+ and D0− representing the complimentary drive signal applied to this row during touch sensing operation; the second row includes a second pair of interleaved transmitter electrodes labeled D1+ and D1− representing the complimentary drive signal applied to this row during touch sensing operation; the third row includes a third pair of interleaved transmitter electrodes labeled D2+ and D2− representing the complimentary drive signal applied to this row during touch sensing operation; and the fourth row includes a fourth pair of interleaved transmitter electrodes labeled D3+ and D3− representing the complimentary drive signal applied to this row during touch sensing operation. Additionally touch sensor panel 3700 shows the first column includes a first pair of non-interleaved receiver electrodes labeled $S0_A$ and $S0_B$ representing two singled-ended sense lines for this column during touch sensing operation; the second column includes a second pair of non-interleaved receiver electrodes labeled $S1_A$ and $S1_B$ representing two singled-ended sense lines for this column during touch sensing operation; the third column includes a third pair of non-interleaved receiver electrodes labeled $S2_A$ and $S2_B$ representing two singled-ended sense lines for this column during touch sensing operation; and the fourth column includes a fourth pair of non-interleaved receiver electrodes labeled $S3_A$ and $S3_B$ representing two singled-ended sense lines for this column during touch sensing operation.

FIG. 37 illustrates a touch node 3710 corresponding to a unit cell of the touch electrode architecture, which can be repeated for the four-by-four array of touch nodes (or beyond for a larger touch sensor panel). During touch sensing operation, the first pair of interleaved transmitter electrodes labeled D0+ and D0− can be stimulated, and resultant mutual capacitance(s) can be measured by the corresponding first pair of receiver electrodes labeled $S0_A$ and $S0_B$. The touch signal for touch node 3710 can be represented as a sum of the touch signal measured from the pair of receiver electrodes.

FIG. 37 also indicates a data line orientation for touch sensor panel 3700. As shown in FIG. 37, the data line is oriented orthogonal to the receiver electrodes (e.g., such that the receiver electrodes receive an average of the display data line noise) and parallel to the transmitter electrodes. As described herein, the data lines of the display represent a source of noise for the touch sensing system, also referred to herein as "cathode noise." FIG. 37 illustrates representative spatial shapes 3720 of cathode noise along the direction of the touch transmitter electrodes and representative spatial shapes 3740 of the cathode noise along the direction (e.g., orthogonal) of the touch receiver electrodes. The spatial shapes of cathode noise can be similar in along the direction of the touch transmitter electrodes (e.g., similar RC characteristics), with the amplitude of the shape generally scaling with gray levels of different display images (e.g., a nearly constant noise spatial spectrum). In contrast, the spatial shapes of cathode noise can be varied and image dependent along the direction of the touch receiver electrodes. Additionally, the spatial shapes of cathode noise along the direction of the touch transmitter electrodes can be measured in a correlated manner with the analog front ends (sensing circuitry) for the receiver electrodes, whereas the spatial shapes of cathode noise along the direction of the touch receiver electrodes can be measured in a temporarily uncorrelated manner.

Accordingly, the touch electrode architecture can achieve spatial noise removal by encoding the stimulation of the transmitter electrodes along the direction of the correlated and shape consistent cathode noise along the direction of the interleaved transmitter electrodes. Additionally, as described herein with respect to FIGS. 38-39, the spatial separation and spatial noise removal can be improved by reducing the pitch of the touch electrodes.

Figure 39:
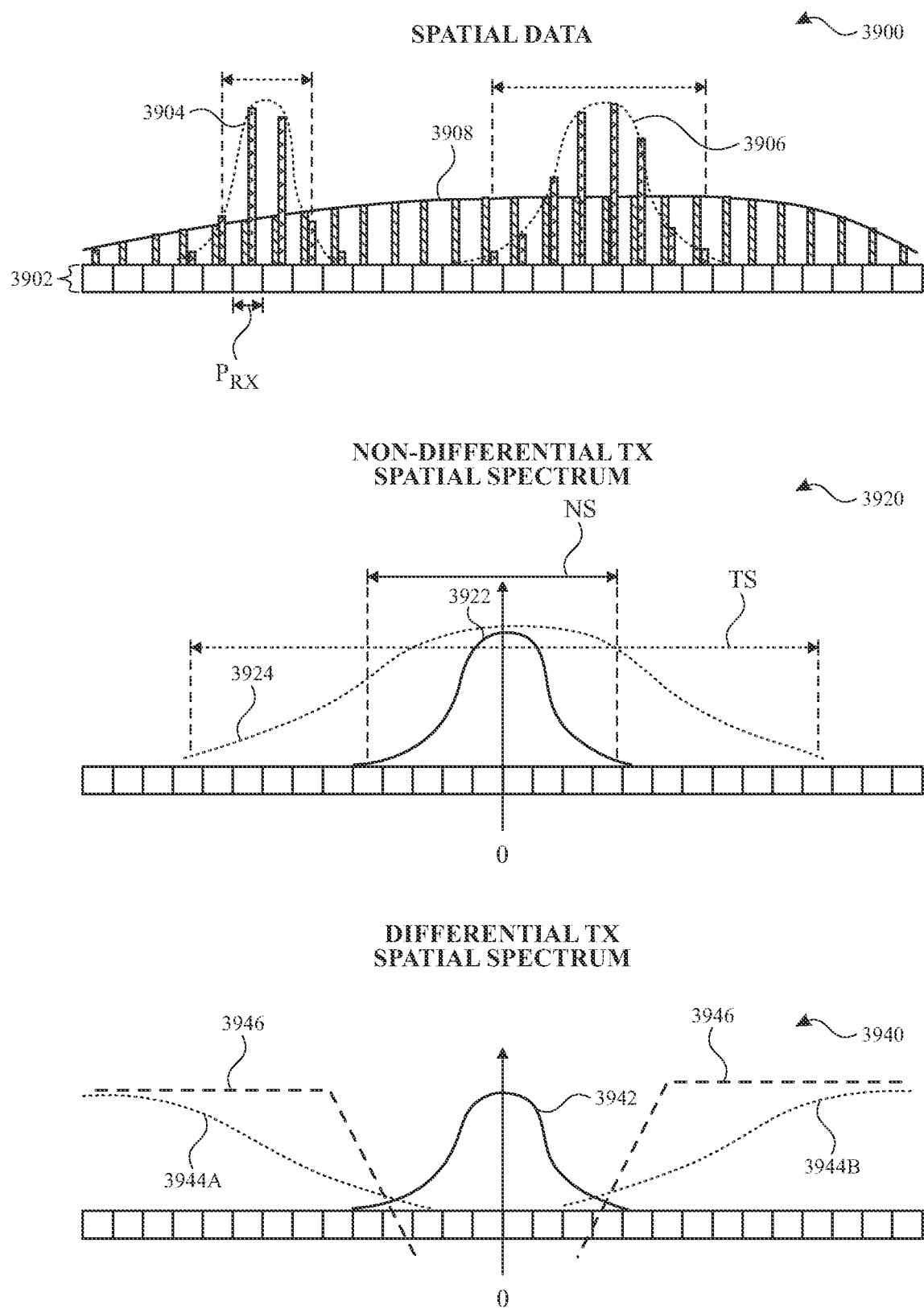
FIG. 39 illustrates plots of spatial touch signal and noise according to examples of the disclosure.

FIG. 39 illustrates three plots of spatial touch signal and noise according to examples of the disclosure. Plot 3900 show a spatial data corresponding to different touches and to noise along an axis of a touch sensor panel (e.g., corresponding to touch sensor panel 3700 or 3800). The axis of the touch sensor panel is represented by an array 3902 of receiver electrodes with a receiver electrode pitch $P_{RX}$. The bars above the array 3902 of receiver electrodes represent the touch signal and/or noise signal at the corresponding receiver electrodes. As shown, a first profile 3904 corresponds to a first touching object (e.g., a small finger) and a second profile 3906 corresponds to a second touching object (e.g., a larger finger or multiple small fingers). Profile 3908 represents the cathode noise. The data represented in plot 3900 is spatial data, and as shown the profile of the cathode noise has a spatial shape corresponding to the spatial shapes 3720 of cathode noise along the direction of the touch transmitter electrodes. As shown, the shape of the cathode noise is spatially wide relative to the spatial width of the first or second touching objects (e.g., extends across the panel), and has a low frequency (e.g., relative to the noise along the orthogonal axis).

Plot 3920 shows a spatial spectrum corresponding to the spatial data in plot 3900. Profile 3922 represents the spatial spectral domain corresponding to the cathode noise of profile 3908 in the spatial data. The relatively wide noise signal has a low-frequency and therefore appears near the center of the spatial spectrum in the spatial spectral domain (e.g., at low spatial frequencies, centered around zero). In contrast, profile 3924 represents the spatial spectral domain corresponding to profiles 3904 and/or 3906 of the touch signal(s) in the spatial data. The relatively narrow touch signals in the spatial data appear wider in the spatial spectral domain compared with the noise. However, plot 3920 corresponds to a non-differential transmit electrode configuration (e.g., without the interleaving and stimulation with complementary drive signals).

Plot 3940 shows a spatial spectrum corresponding to the spatial data in plot 3900, but when using a differential transmit electrode configuration. In plot 3940, the cathode noise from the display is not coded, and therefore the profile 3942 of the spectrum of the cathode noise remains the same as profile 3922 in plot 3920. However, using the differential transmitter configuration to encode the spectrum for touch signal causes an up-conversion of the touch signal in the spatial spectral domain that results in two half-lobes 3944A and 3944B. The two half-lobes 3944A and 3944B resulting from the up-conversion can, in some examples, at least partially overlap. For example, plot 3940 illustrates some overlap between profiles 3942 and half-lobes 3944A or 3944B. In some examples, with enough up-conversion through decreasing the transmitter and/or receiver pitch the separation between the profiles in the spatial spectral domain can be improved or eliminated. The spatially separated signals can be filtered using a spatial high pass filter to remove the noise (and possibly some of the touch signal when some overlap remains).

In some examples, a no-overlap condition between the cathode noise and the touch signal spatial spectra can be expressed as $Ts+Ns<1/P_{RX}$, where Ts represents the touch signal spatial spectrum width, Ns represents the noise signal spatial spectrum width, and $P_{RX}$ represents the receiver electrode pitch.

In some examples, the coding can be viewed as causing the touch signal to have a sawtooth shape or other relatively-high frequency shape (e.g., due to the coded differential stimulation) that is easier to resolve from the flatter, common mode shape of the cathode noise. In particular, as described herein, the flatter, common mode shape of the cathode noise (having relatively low-frequency, and correlated shape) for transmitter electrodes parallel to the data lines.

Figure 38:
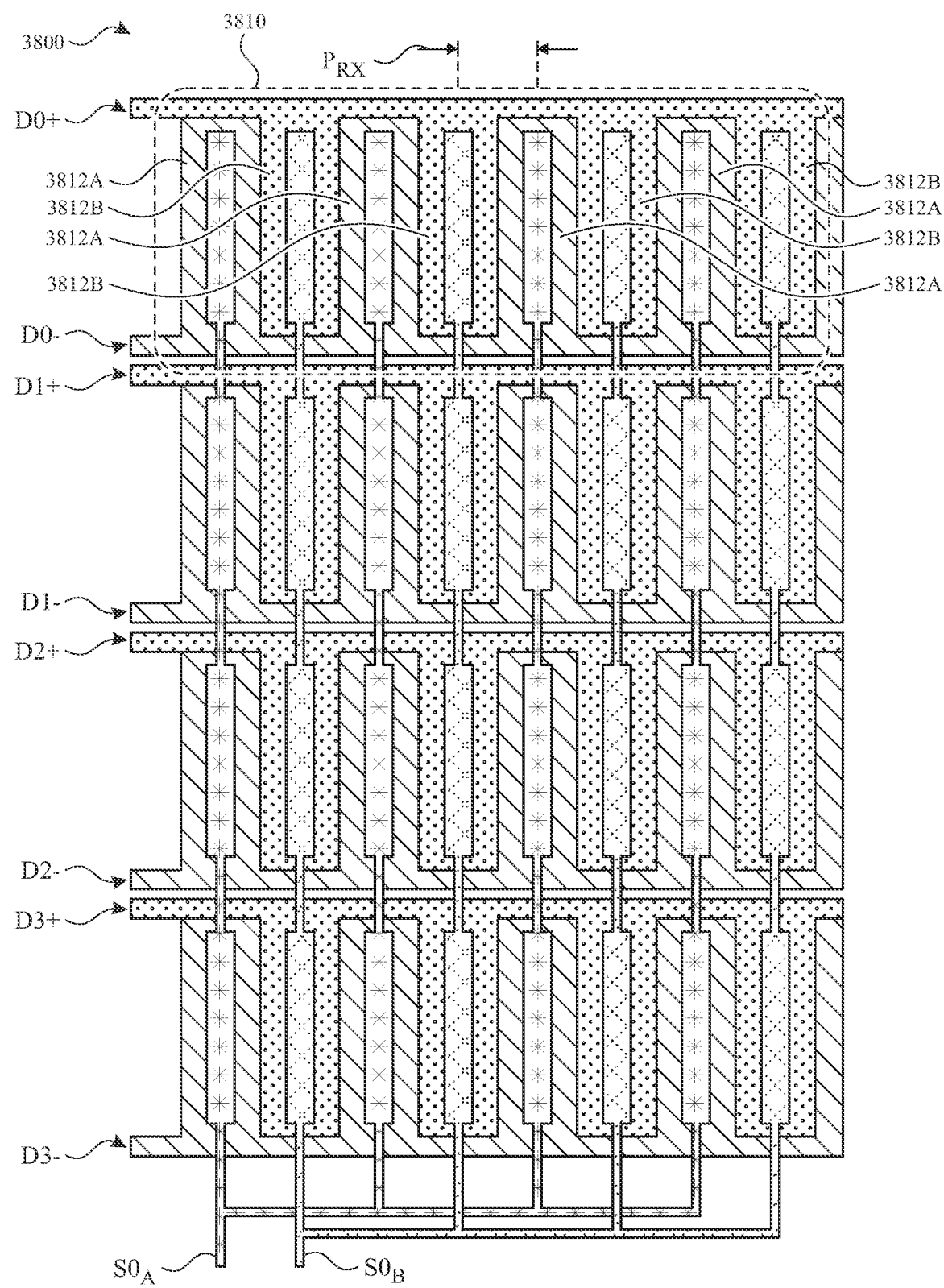
FIG. 38 illustrates a portion of an example touch sensor panel configured for differential drive according to examples of the disclosure.

FIG. 38 illustrates a portion of an example touch sensor panel configured for differential drive according to examples of the disclosure. The portion of the touch sensor panel 3800 includes a one-by-four array of touch nodes including eight transmitter electrodes (labeled D0+, D0−, D1+, D1, D2+, D2−, D3+, and D3−) interleaved in four rows of touch nodes and two receiver electrodes (labeled $S0_A$ and $S0_B$) in one columns of touch nodes. To simplify illustration, bridges are not shown in FIG. 38, but touch node 3810 (corresponding to the overall dimensions of touch node 3710) is included for reference. Additionally, for ease of illustration, the dimensions of the portion of touch sensor panel 3800 are exaggerated (e.g., width is exaggerated relative to length to show the details of the features), but it is understood that touch nodes 3810 and 3710 can have the same overall dimensions.

Unlike FIG. 37, which includes two interleaved transmitter electrodes each with one primary rectangular segment (e.g., primary rectangular segment 3712A and 3712B for transmitter electrodes D0+ and D0− in touch node 3710) and one interleaving transition between the transmitter electrodes within a touch node, in FIG. 38, the two interleaved transmitter electrodes each with include multiple primary rectangular segments (e.g., four primary rectangular segments 3812A and four primary rectangular segments 3812B for transmitter electrodes D0+ and D0− in touch node 3810) and seven interleaving transition between the transmitter electrodes within a touch node.

As described herein, encoding the touch signals to higher spatial frequencies compared with cathode noise enables separation of the touch and noise spatial spectra for noise removal. The separation can be improved by reducing the receiver electrode pitch. Comparing FIGS. 37 and 38, the receiver electrode pitch, $P_{RX}$, can be reduced by approximately a factor of four (e.g., with touch nodes 3710 and 3810 having the same dimensions). It is understood that although FIG. 37 illustrates one primary rectangular segment per transmitter electrode and FIG. 38 illustrates four primary rectangular segments per transmitter electrode, that different numbers of primary rectangular segment per transmitter electrode are possible (e.g., two, three, five, etc.).

Although reducing the receiver electrode pitch can provide better separation, it is understood that there are tradeoffs. For example, comparing FIGS. 37 and 38, two receiver electrodes of FIG. 37 are replaced with eight narrower receiver electrodes of FIG. 38. As a result, the touch sensing circuitry potentially requires a four-fold multiplication in number of receiver channels which increases the size, cost, and power consumption of the touch sensing circuitry (or requires a reduced integration time if the channels are multiplexed between receiver electrodes). In some examples, the above sensing circuitry (or integration time) penalties can be mitigated by interconnecting (e.g., grouping/ganging) the increased number of narrower receiver electrodes. For example, as shown in FIG. 38, four receiver electrodes are interconnected and can be connected to one single-ended sensing channel of the touch sensing circuitry and another four receiver electrodes are interconnected and can be connected to another single-ended sensing channel of the touch sensing circuitry. The interconnections avoid the need for additional sensing circuitry and the touch node resolution of the touch sensor panel is unchanged between touch sensor panels 3700 and 3800. In some examples, the interconnection between multiple receiver electrodes occurs at the touch sensor panel boundary (e.g., in a border region) to reduce the number of in-panel jumper and/or vias. However, it is understood that in some examples, the interconnection can additionally or alternatively be performed within the touch sensor panel area.

The grouping of receiver electrodes may avoid the touch sensing circuitry penalty, but reducing the receiver electrode can entail other tradeoffs. For example, narrower receiver electrodes can result in increased resistance, which thereby reduces touch sensor panel bandwidth (although the impact on bandwidth may be somewhat mitigated by the reduced load of the narrower receiver electrodes). Additionally or alternatively, the narrower receiver electrodes and the corresponding reduction in the transmitter electrode pitch can reduce the reach of mutual capacitance fringing fields. If the fringing fields are reduced too much, they may not be able to extend far enough beyond the touch sensor panel surface (e.g., a cover glass or other material) to be able to interact with objects (e.g., fingers).

It is understood that the spatial noise removal techniques described herein with respect to FIGS. 37-39 can be applied to other touch electrode architectures. For example, the pitch of the receiver electrodes and the corresponding pitch of the interleaved transmitter electrodes can be applied to the interleaved transmitter electrodes (e.g., column electrodes) and non-interleaved receiver electrodes (e.g., row electrodes) in the touch electrode architecture of FIGS. 34 and 35A.

Therefore, according to the above, some examples of the disclosure are directed to a touch sensor panel. The touch sensor panel can comprise: a plurality of touch electrodes including a plurality of first electrodes and a plurality of second electrodes in a first layer, the plurality of touch electrodes forming a two-axis array of touch nodes; a plurality of first routing traces in a second layer, different from the first layer, the plurality of first routing traces coupled to the first electrodes using a plurality of first electrical interconnections between the first layer and the second layer; and a plurality of second routing traces in the second layer, the plurality of the second routing traces coupled to the second electrodes using a plurality of second electrical interconnections between the first layer and the second layer. Additionally or alternatively to one or more of the examples disclosed above, in some examples, the plurality of first routing traces can be routed along a first axis of the two-axis array and can at least partially overlap the two-axis array of touch nodes. Additionally or alternatively to one or more of the examples disclosed above, in some examples, the plurality of second traces can be routed along the first axis of the two-axis array and can at least partially overlap the two-axis array of touch nodes.

Additionally or alternatively to one or more of the examples disclosed above, in some examples, the first electrodes can include column electrodes, the second electrodes can include row electrodes, and the two-axis array of touch nodes can include a row-column arrangement of touch nodes. Additionally or alternatively to one or more of the examples disclosed above, in some examples, the second layer can comprises, for a first column of the row-column arrangement of touch nodes, a plurality of sets of one or more routing trace segments, the plurality of sets of one or more routing trace segments including a first set of one or more routing trace segments, a second set of one or more routing trace segments, a third set of one or more routing trace segments, and a fourth set of one or more routing trace segments.

Additionally or alternatively to one or more of the examples disclosed above, in some examples, the second layer can comprise, for a first column of the row-column arrangement of touch nodes, a plurality of sets of one or more routing trace segments, the plurality of sets of one or more routing trace segments including a first set of one or more routing trace segments, a second set of one or more routing trace segments, a third set of one or more routing trace segments, a fourth set of one or more routing trace segments, a fifth set of one or more routing trace segments, and a sixth set of one or more routing trace segments.

Additionally or alternatively to one or more of the examples disclosed above, in some examples, the first column can include a first column electrode and a second column electrode, the first set of one or more routing trace segments can comprise a first routing trace of the plurality of first routing traces, the second set of one or more routing trace segments can comprise a second routing trace of the plurality of first routing traces are disposed in the first column, the first routing trace of the plurality of first routing traces can be coupled to the first column electrode, and the second routing trace of the plurality of first routing traces can be coupled to the second column electrode.

Additionally or alternatively to one or more of the examples disclosed above, in some examples, a first routing trace of the plurality of second routing traces, a second routing trace of the plurality of second routing traces, and a third routing trace of the plurality of second routing traces can be disposed in the first column. The first routing trace of the plurality of second routing traces can comprise a first portion of the first set of one or more routing trace segments, a first portion of the second set of one or more routing trace segments, a first portion of the third set of one or more routing trace segments, and a first portion of the fourth set of one or more routing trace segments. The second routing trace of the plurality of second routing traces can comprise a second portion of the first set of one or more routing trace segments and a second portion of the second set of one or more routing trace segments. The third routing trace of the plurality of second routing traces can comprise a third portion of the first set of one or more routing trace segments. The first routing trace of the plurality of second routing traces can be coupled to a first row electrode, the second routing trace of the plurality of second routing traces can be coupled to a second row electrode, and the third routing trace of the plurality of second routing traces can be coupled to a third row electrode in the first column.

Additionally or alternatively to one or more of the examples disclosed above, in some examples, the first set of one or more routing trace segments can include a first electrical discontinuity along the first axis and a second electrical discontinuity along the first axis. The second set of one or more routing trace segments can include a third electrical discontinuity along the first axis. The first electrical discontinuity can be within a threshold distance along the first axis from an electrical interconnection between the third routing trace of the plurality of second routing traces and the third row electrode; the second electrical discontinuity can be within the threshold distance along the first axis from an electrical interconnection between the second routing trace of the plurality of second routing traces and the second row electrode; and the third discontinuity can be within the threshold distance along the first axis from the electrical interconnection between the second routing trace of the plurality of second routing traces and the second row electrode.

Additionally or alternatively to one or more of the examples disclosed above, in some examples, the first set of one or more routing trace segments can include a fourth electrical discontinuity along the first axis, the second set of one or more routing trace segments can include a fifth electrical discontinuity along the first axis, the third set of one or more routing trace segments can include a sixth electrical discontinuity along the first axis, and the fourth set of one or more routing trace segments can include a seventh electrical discontinuity along the first axis. The fourth electrical discontinuity, the fifth electrical discontinuity, the sixth electrode discontinuity, and the seventh electrode discontinuity can be within the threshold distance along the first axis from an electrical interconnection between the first routing trace of the plurality of second routing traces and the first row electrode. Additionally or alternatively to one or more of the examples disclosed above, in some examples, the threshold distance can be a length of one row of the row-column arrangement of touch nodes along the first axis.

Additionally or alternatively to one or more of the examples disclosed above, in some examples, a fourth portion of the first set of one or more routing trace segments can comprise a first floating segment, the fourth portion of the first set of one or more routing trace segments separated from the third portion of the first set of one or more routing trace segments by the fourth electrical discontinuity; a third portion of the second set of one or more routing trace segments can comprise a second floating segment, the third portion of the second set of one or more routing trace segments separated from the second portion of the second set of one or more routing trace segments by the fifth electrical discontinuity; a second portion of the third set of one or more routing trace segments can comprise a third floating segment, the second portion of the third set of one or more routing trace segments separated from the first portion of the third set of one or more routing trace segments by the sixth electrical discontinuity; and a second portion of the fourth set of one or more routing trace segments can comprise a fourth floating segment, the second portion of the fourth set of one or more routing trace segments separated from the first portion of the fourth set of one or more routing trace segments by the seventh electrical discontinuity. Additionally or alternatively to one or more of the examples disclosed above, in some examples, the first set of one or more routing trace segments and the second set of one or more routing trace segments can overlap one or more column electrodes within the first column. The third set of one or more routing trace segments and the fourth set of one or more routing trace segments can not overlap the one or more column electrodes within the first column.

Additionally or alternatively to one or more of the examples disclosed above, in some examples, the first set of one or more routing trace segments, the second set of one or more routing trace segments, the third set of one or more routing trace segments, and the fourth set of one or more routing trace segment can be coupled to row electrodes; the fifth set of one or more routing trace segments and the sixth set of one or more routing trace segments can be coupled to column electrodes overlap one or more column electrodes within the first column; the fifth set of one or more routing trace segments can be disposed adjacent to and between the first set of one or more routing trace segments and the second set of one or more routing trace segments; the sixth set of one or more routing trace segments can be disposed adjacent to and between the third set of one or more routing trace segments and the fourth set of one or more routing trace segments; the second set of one or more routing trace segments can be deposed adjacent to and between the fifth set of one or more routing trace segments and the third set of one or more routing trace segments; and the third set of one or more routing trace segments can be disposed adjacent to and between the second set of one or more routing trace segments and the sixth set of one or more routing trace segments.

Additionally or alternatively to one or more of the examples disclosed above, in some examples, the row-column arrangement of touch nodes can be divided into a plurality of banks of rows; the first row electrode can be disposed in a first bank of the plurality of banks of rows; the second row electrode can be disposed in a second bank of the plurality of banks of rows; and the third row electrode can be disposed in a third bank of the plurality of banks of rows.

Additionally or alternatively to one or more of the examples disclosed above, in some examples, the first row electrode and the second row electrode can be separated by a first number of rows in the row-column arrangement of touch nodes along the first axis and the second row electrode and the third row electrode can be separated by the first number of rows in the row-column arrangement of touch nodes along the first axis.

Additionally or alternatively to one or more of the examples disclosed above, in some examples, each row of the row-column arrangement of touch nodes can include a pair of row electrodes. The second layer can comprise, for a second column of the row-column arrangement of touch nodes adjacent to the first column, a second plurality of sets of one or more routing trace segments forming a fourth routing trace of the plurality of second routing traces, a fifth routing trace of the plurality of second routing traces, and a sixth routing trace of the plurality of second routing traces; the fourth routing trace of the plurality of second routing traces can be coupled to a fourth row electrode, the fifth routing trace of the plurality of second routing traces can be coupled to a fifth row electrode, and the sixth routing trace of the plurality of second routing traces can be coupled to a sixth row electrode in the second column; and the first row electrode and the fourth row electrode can be a first respective pair of row electrode disposed in a first respective row, the second row electrode and the fifth row electrode can be a second respective pair of row electrode disposed in a second respective row, and the third row electrode and the sixth row electrode can be a third respective pair of row electrode disposed in a third respective row.

Additionally or alternatively to one or more of the examples disclosed above, in some examples, the row-column arrangement of touch nodes can be divided into a plurality of banks of rows. The plurality of second routing traces can be coupled to the second electrodes using the plurality of second electrical connections in a chevron pattern. Additionally or alternatively to one or more of the examples disclosed above, in some examples, for each bank of the plurality of banks of rows in the chevron pattern: even rows of the row-column arrangement of touch nodes can be interconnected within a first set of consecutive columns of the row-column arrangement of touch nodes; odd rows of the row-column arrangement of touch nodes can be interconnected within a second set of consecutive columns of the row-column arrangement of touch nodes; and a respective distance along a second axis, different from the first axis, between a respective interconnection for a respective row and a line along the first axis separating the first set of consecutive columns from the second set of consecutive columns, can decrease for ascending rows within the bank.

Additionally or alternatively to one or more of the examples disclosed above, in some examples, the row-column arrangement of touch nodes can be divided into a plurality of banks of rows; the plurality of second routing traces can be coupled to the second electrodes using the plurality of second electrical connections in an S-shaped pattern. Additionally or alternatively to one or more of the examples disclosed above, in some examples, for each bank of the plurality of banks of rows in the S-shaped pattern, adjacent rows of the row-column arrangement of touch nodes can be interconnected within adjacent pairs of columns of the row-column arrangement of touch nodes; and adjacent rows between adjacent banks can be interconnected within common pairs of columns.

Additionally or alternatively to one or more of the examples disclosed above, in some examples, the row-column arrangement of touch nodes can be divided into a plurality of banks of rows including a first bank, a second bank, and a third bank, the third bank between the first bank and the second bank. Adjacent rows of the row-column arrangement of touch nodes of the first bank can be interconnected within adjacent pairs of columns of the row-column arrangement of touch nodes; adjacent rows of the row-column arrangement of touch nodes of the second bank can be interconnected within adjacent pairs of columns of the row-column arrangement of touch nodes; and a plurality of third routing traces in a border area outside the two-axis array can be coupled to row electrodes in the rows of the third bank.

Additionally or alternatively to one or more of the examples disclosed above, in some examples, the second layer can comprises, for a second column of the row-column arrangement of touch nodes, a second plurality of sets of one or more routing trace segments, the plurality of sets of one or more routing trace segments including a fifth set of one or more routing trace segments, a sixth set of one or more routing trace segments, a seventh set of one or more routing trace segments, and an eighth set of one or more routing trace segments.

Additionally or alternatively to one or more of the examples disclosed above, in some examples, a first routing trace of the plurality of second routing traces and a second routing trace of the plurality of second routing traces can be disposed in the first column and in the second column; a third routing trace of the plurality of second routing traces, a fourth routing trace of the plurality of second routing traces, a fifth routing trace of the plurality of second routing traces, and a sixth routing trace of the plurality of second routing traces can be disposed in the second column. The first routing trace of the plurality of second routing traces can comprise a first portion of the first set of one or more routing trace segments, a first portion of the third set of one or more routing trace segments, a first portion of the fifth set of one or more routing trace segments, and a first portion of the seventh set of one or more routing trace segments; the second routing trace of the plurality of second routing traces can comprise a first portion of the second set of one or more routing trace segments, a first portion of the fourth set of one or more routing trace segments, a first portion of the sixth set of one or more routing trace segments, and a first portion of the eighth set of one or more routing trace segments; the third routing trace of the plurality of second routing traces can comprise a second portion of the fifth set of one or more routing trace segments and a second portion of the seventh set of one or more routing trace segments; the fourth routing trace of the plurality of second routing traces can comprise a second portion of the sixth set of one or more routing trace segments and a second portion of the eighth set of one or more routing trace segments; the fifth routing trace of the plurality of second routing traces can comprise a third portion of the sixth set of one or more routing trace segments; and the sixth routing trace of the plurality of second routing traces can comprise a third portion of the eighth set of one or more routing trace segments. The first routing trace of the plurality of second routing traces can be coupled to a first row electrode in a first row in the first column and/or in the second column; the second routing trace of the plurality of second routing traces can be coupled to a second row electrode in the first row in the first column and/or in the second column; the third routing trace of the plurality of second routing traces can be coupled to a third row electrode of a second row in the second column; the fourth routing trace of the plurality of second routing traces can be coupled to a fourth row electrode of the second row in the second column; the fifth routing trace of the plurality of second routing traces can be coupled to a fifth row electrode of a third row in the second column; and the sixth routing trace of the plurality of second routing traces can be coupled to a sixth row electrode of the third row in the second column.

Additionally or alternatively to one or more of the examples disclosed above, in some examples, the second layer can comprise, for a second column of the row-column arrangement of touch nodes, a second plurality of sets of one or more routing trace segments, the plurality of sets of one or more routing trace segments including a fifth set of one or more routing trace segments, a sixth set of one or more routing trace segments, a seventh set of one or more routing trace segments, and an eighth set of one or more routing trace segments. A first routing trace of the plurality of second routing traces, a second routing trace of the plurality of second routing traces, and a third routing trace of the plurality of second routing traces can be disposed in the first column; a fourth routing trace of the plurality of second routing traces, a fifth routing trace of the plurality of second routing traces, and a sixth routing trace of the plurality of second routing traces can be disposed in the second column. The first routing trace of the plurality of second routing traces can comprise a first portion of the first set of one or more routing trace segments, a first portion of the second set of one or more routing trace segments, a first portion of the third set of one or more routing trace segments, and a first portion of the fourth set of one or more routing trace segments; the second routing trace of the plurality of second routing traces can comprise a second portion of the first set of one or more routing trace segments and a second portion of the second set of one or more routing trace segments; the third routing trace of the plurality of second routing traces can comprise a third portion of the first set of one or more routing trace segments. The first routing trace of the plurality of second routing traces can be coupled to a first row electrode of a first row, the second routing trace of the plurality of second routing traces can be coupled to a second row electrode of a second row, and the third routing trace of the plurality of second routing traces can be coupled to a third row electrode of a third row in the first column. The fourth routing trace of the plurality of second routing traces can comprise a first portion of the fifth set of one or more routing trace segments, a first portion of the sixth set of one or more routing trace segments, a first portion of the seventh set of one or more routing trace segments, and a first portion of the eight set of one or more routing trace segments; the fifth routing trace of the plurality of second routing traces can comprise a second portion of the fifth set of one or more routing trace segments and a second portion of the sixth set of one or more routing trace segments; the sixth routing trace of the plurality of second routing traces can comprise a third portion of the fifth set of one or more routing trace segments. The fourth routing trace of the plurality of second routing traces can be coupled to a fourth row electrode of the first row, the fifth routing trace of the plurality of second routing traces can be coupled to a fifth row electrode of the second row, and the sixth routing trace of the plurality of second routing traces can be coupled to a sixth row electrode of the third row in the second column.

Additionally or alternatively to one or more of the examples disclosed above, in some examples, the first electrodes can be configured as transmitter electrodes and the second electrodes can be configured as receiver electrodes in a differential drive and differential sense mutual capacitance sensing operation. Additionally or alternatively to one or more of the examples disclosed above, in some examples, drive circuitry can be coupled to the first electrodes and can be configured to drive the plurality of transmitter electrodes with a plurality of drive signals. For a first column in the two-axis array of touch nodes, the plurality of drive signals can include a first drive signal applied to one or more first touch nodes of the first column and a second drive signal applied to one or more second touch nodes of the first column of touch nodes. For a second column in the two-axis array of touch nodes, the plurality of drive signals can include a third drive signal applied to one or more first touch nodes of the second column and a fourth drive signal applied to one or more second touch nodes of the second column. The first drive signal, the second drive signal, the third drive signal, and the fourth drive signal can be applied at least partially concurrently. The first drive signal and the third drive signal can be complimentary drive signals, and the second drive signal and the fourth drive signal can be complimentary drive signals. The one or more first touch nodes of the first column and the one or more first touch nodes of the second column can be diagonally adjacent touch nodes; and the one or more second touch nodes of the first column and the one or more second touch nodes of the second column can be diagonally adjacent touch nodes.

Additionally or alternatively to one or more of the examples disclosed above, in some examples, the plurality of sets of one or more routing trace segments can extend from a first touch node at one end of the first column to a second touch node at a second end, opposite the first end, of the first column. Additionally or alternatively to one or more of the examples disclosed above, in some examples, a length of each of the plurality of sets of one or more routing trace segments along the first axis can be within a threshold percentage of a length of the first column along the first axis. Additionally or alternatively to one or more of the examples disclosed above, in some examples, the threshold percentage of the length of the first column along the first axis is 1%. Additionally or alternatively to one or more of the examples disclosed above, in some examples, the threshold percentage of the length of the first column along the first axis is 5%. Additionally or alternatively to one or more of the examples disclosed above, in some examples, the threshold percentage of the length of the first column along the first axis is 10%.

Additionally or alternatively to one or more of the examples disclosed above, in some examples, the plurality of sets of one or more routing trace segments can be spaced equally along a second axis of the two-axis array, different from the first axis of the two-axis array. Additionally or alternatively to one or more of the examples disclosed above, in some examples, the plurality of touch electrodes can be formed from metal mesh and the plurality of first routing traces and the plurality of second routing traces are formed from metal mesh.

Some examples of the disclosure are directed to an electronic device. The electronic device can include an energy storage device; communication circuitry; and a touch screen. The touch screen can comprise: a display having an active area; and a touch screen as described herein.

Some examples of the disclosure are directed to a touch sensor panel. The touch sensor panel can comprise: a plurality of touch electrodes including a plurality of column electrodes and a plurality of row electrodes in a first layer, the plurality of touch electrodes forming a row-column arrangement of touch nodes; a plurality of first routing traces in a second layer, different from the first layer, the plurality of first routing traces coupled to the column electrodes using a plurality of first electrical interconnections between the first layer and the second layer; and a plurality of second routing traces in the second layer, the plurality of the second routing traces coupled to the row electrodes using a plurality of second electrical interconnections between the first layer and the second layer. The plurality of first routing traces can be routed along columns of the row-column arrangement and can at least partially overlap the row-column arrangement of touch nodes; and the plurality of second traces can be routed along the columns of the row-column arrangement and can at least partially overlap the row-column arrangement of touch nodes. A pair of columns can include six routing traces of the plurality of second routing traces including: a first routing trace and a second routing trace disposed in a first column and in a second column of the pair of columns; and a third routing trace, a fourth routing trace, a fifth routing trace, and a sixth routing trace disposed in the second column of the pair of columns.

Some examples of the disclosure are directed to a touch sensor panel. The touch sensor panel can comprise: a plurality of touch electrodes including a plurality of column electrodes and a plurality of row electrodes in a first layer, the plurality of touch electrodes forming a row-column arrangement of touch nodes; a plurality of first routing traces in a second layer, different from the first layer, the plurality of first routing traces coupled to the column electrodes using a plurality of first electrical interconnections between the first layer and the second layer; and a plurality of second routing traces in the second layer, the plurality of the second routing traces coupled to the row electrodes using a plurality of second electrical interconnections between the first layer and the second layer. The plurality of first routing traces can be routed along columns of the row-column arrangement and can at least partially overlap the row-column arrangement of touch nodes; and the plurality of second traces can be routed along the columns of the row-column arrangement and can at least partially overlap the row-column arrangement of touch nodes. A pair of columns can include six routing traces of the plurality of second routing traces including: a first routing trace, a second routing trace, and a third routing trace disposed in a first column of the pair of columns; and a fourth routing trace, a fifth routing trace, and a sixth routing trace disposed in a second column of the pair of columns.

Some examples of the disclosure are directed to a touch screen. The touch screen can comprise: a display having an active area; a first metal layer and a second metal layer disposed over the display; and an intermediate dielectric layer, disposed between the first metal layer and the second metal layer. The plurality of touch electrodes of the touch screen can be formed in the active area of the display, the plurality of touch electrodes can include a touch electrode formed from first metal mesh in the first metal layer and first metal mesh in the second metal layer. Additionally or alternatively to one or more of the examples disclosed above, in some examples, the first metal mesh of the first metal layer can align with the first metal mesh of the second metal layer. Additionally or alternatively to one or more of the examples disclosed above, in some examples, a width of the first metal mesh of the second metal layer is less than a width of the first metal mesh of the first metal layer. Additionally or alternatively to one or more of the examples disclosed above, in some examples, the touch screen can comprise a plurality of routing traces formed in the active area of the display and coupled to the plurality of touch electrodes. The plurality of routing traces can include a routing trace formed from second metal mesh in the second metal layer and second metal mesh in the first metal layer.

Additionally or alternatively to one or more of the examples disclosed above, in some examples, the second metal mesh of the first metal layer can align with the second metal mesh of the second metal layer. Additionally or alternatively to one or more of the examples disclosed above, in some examples, a width of the second metal mesh of the second metal layer is less than a width of the second metal mesh of the first metal layer.

Additionally or alternatively to one or more of the examples disclosed above, in some examples, the plurality of touch electrodes can be formed using bridges in the active area of the display formed of the first mesh metal in the second layer. Additionally or alternatively to one or more of the examples disclosed above, in some examples, the touch screen can further comprise a plurality of routing traces formed in the active area of the display and coupled to the plurality of touch electrodes. The plurality of routing traces can include a routing trace formed from second metal mesh in the second metal layer. The routing trace can be disposed beneath the touch electrode formed from the first metal mesh in the first metal layer. Additionally or alternatively to one or more of the examples disclosed above, in some examples, the plurality of routing of the touch screen can be formed from the second metal mesh in the second metal layer without metal mesh in the first metal layer.

Additionally or alternatively to one or more of the examples disclosed above, in some examples, each of the plurality of touch electrodes of the touch screen can be formed from the first metal mesh in the first metal layer and the first metal mesh in the second metal layer.

Additionally or alternatively to one or more of the examples disclosed above, in some examples, the touch electrode formed from the first metal mesh in the first metal layer and the first metal mesh in the second metal layer can comprise non-overlapping regions and overlapping regions. The first metal mesh in the first metal layer and the first metal mesh in the second metal layer can be non-parallel in the overlapping regions. Additionally or alternatively to one or more of the examples disclosed above, in some examples, the first metal mesh in the first metal layer and the first metal mesh in the second metal layer can be orthogonal in the overlapping regions of the touch electrode. Additionally or alternatively to one or more of the examples disclosed above, in some examples, the area of each of the overlapping regions of the touch electrode can be uniform.

Additionally or alternatively to one or more of the examples disclosed above, in some examples, the touch screen can further comprise transparent conductive material filling gaps in the first metal mesh in the first metal layer and/or can filling gaps in the second metal mesh in the first metal layer. Additionally or alternatively to one or more of the examples disclosed above, in some examples, the touch screen can further comprise transparent conductive material filling gaps in the first metal mesh in the first metal layer without filling gaps in the second metal mesh in the first metal layer.

Additionally or alternatively to one or more of the examples disclosed above, in some examples, the touch screen can further comprise a second intermediate dielectric layer disposed between the first transparent conductive material and the first metal layer and/or between the second transparent conductive material and the first metal layer. Additionally or alternatively to one or more of the examples disclosed above, in some examples, the intermediate dielectric layer can have a thickness greater than 0.5 micron. Additionally or alternatively to one or more of the examples disclosed above, in some examples, the intermediate dielectric layer can have a thickness between 1-2.5 micron. Additionally or alternatively to one or more of the examples disclosed above, in some examples, the intermediate dielectric layer can comprise an organic material. Additionally or alternatively to one or more of the examples disclosed above, in some examples, the intermediate dielectric layer can have a dielectric constant less than 5. Additionally or alternatively to one or more of the examples disclosed above, in some examples, the intermediate dielectric layer can have a dielectric constant between 2.5-4.

Some examples of the disclosure are directed to a touch screen. The touch screen can comprise: a display having an active area; a first metal layer and a second metal layer disposed over the display; and an intermediate dielectric layer, disposed between the first metal layer and the second metal layer. A plurality of touch electrodes of the touch screen can be formed in the active area of the display from first metal mesh in the first metal layer. The plurality of touch electrodes can include a touch electrode comprising a first segment formed from the first metal mesh in the first layer and a second segment formed from the first metal mesh in the first layer. The first segment and the second segment can be interconnected by a bridge electrode formed by first metal mesh in the second metal layer. Additionally or alternatively to one or more of the examples disclosed above, in some examples, the touch screen can further comprise a plurality of routing traces of the touch screen coupled to the plurality of touch electrodes are formed in the active area of the display from second metal mesh in the first metal layer and second metal mesh the second metal layer.

Some examples of the disclosure are directed to an electronic device. The touch screen can comprise: an energy storage device; communication circuitry; and a touch screen. The touch screen can comprise: a display having an active area; a first metal layer and a second metal layer disposed over the display; and an intermediate dielectric layer, disposed between the first metal layer and the second metal layer. A plurality of touch electrodes of the touch screen can be formed in the active area of the display, the plurality of touch electrodes including a touch electrode formed from first metal mesh in the first metal layer and first metal mesh in the second metal layer. Additionally or alternatively to one or more of the examples disclosed above, in some examples, the touch screen can further comprise a plurality of routing traces of the touch screen coupled to the plurality of touch electrodes are formed in the active area of the display from second metal mesh in the first metal layer or second metal mesh in the second metal layer.

Some examples are directed to a touch screen. The touch screen can comprise a first substrate, a plurality of display pixels disposed on the first substrate, a first encapsulation layer formed over the plurality of display pixels, the plurality of display pixels between the first encapsulation layer and the first substrate, one or more first electrodes formed in one or more metal layers disposed on the first encapsulation layer, a touch sensor panel including one or more second electrodes formed in one or more layers, and a dielectric layer disposed between the one or more first electrodes and the touch sensor panel.

Additionally or alternatively to one or more of the examples disclosed above, in some examples, one or more first electrodes of the touch screen can comprise a display-noise shield between the plurality of display pixels and the touch sensor panel. Additionally or alternatively to one or more of the examples disclosed above, in some examples, one or more metal layers on the first encapsulation layer can comprise a metal mesh layer including metal mesh, and the display-noise shield can extend over the plurality of display pixels. Additionally or alternatively to one or more of the examples disclosed above, in some examples, the display-noise shield can comprise indium tin oxide (ITO) deposited in openings of the metal mesh in the metal mesh layer. Additionally or alternatively to one or more of the examples disclosed above, in some examples, the display-noise shield can comprise a conductive material deposited in openings of the metal mesh in the metal mesh layer.

Additionally or alternatively to one or more of the examples disclosed above, in some examples, the one or more first electrodes of the touch screen can comprise a display-noise sensor between the plurality of display pixels and the touch sensor panel, where the one or more metal layers on the first encapsulation layer can comprise a first metal layer, a second metal layer, and an inter-layer dielectric layer between the first metal layer and the second metal layer. Additionally or alternatively to one or more of the examples disclosed above, in some examples, each of the one or more first electrodes of the display-noise sensor can corresponds to a respective one of the one or more second electrodes of the touch sensor panel. Additionally or alternatively to one or more of the examples disclosed above, in some examples, the touch screen can further comprise a plurality of vias between the first metal layer and the second metal layer through the inter-layer dielectric layer. Additionally or alternatively to one or more of the examples disclosed above, in some examples, the touch screen further comprises sensing circuitry coupled to the display-noise sensor and coupled to the touch sensor panel, where the sensing circuitry can remove noise from touch signal measurements of the one or more second electrodes based on measurements of the one or more first electrodes.

Additionally or alternatively to one or more of the examples disclosed above, in some examples, the first encapsulation layer of the touch screen can comprise an ink-jet printed layer of transparent material. Additionally or alternatively to one or more of the examples disclosed above, in some examples, the ink-jet printed layer can comprise a first ink-jet printed layer, and the dielectric layer can comprise a second ink-jet printed layer. Additionally or alternatively to one or more of the examples disclosed above, in some examples, the first ink-jet printed layer can have a thickness less than 25 microns, where the second ink-jet printed layer has a thickness less than 25 microns, and where the one or more first electrodes have a thickness less than 1 micron. Additionally or alternatively to one or more of the examples disclosed above, in some examples, the one or more metal layers on the first encapsulation layer can each have a thickness less than 1 micron, and the dielectric layer can have a thickness less than 10 microns. Additionally or alternatively to one or more of the examples disclosed above, in some examples, the one or more layers of the touch sensor panel can comprise a first metal layer, a second metal layer, and an inter-layer dielectric layer between the first metal layer and the second metal layer, where the first metal layer and the second metal layer are both indium tin oxide (ITO) layers.

Additionally or alternatively to one or more of the examples disclosed above, in some examples, the touch screen can further comprise a polarization layer formed over the touch sensor panel, a cover layer, and an adhesive layer between the cover layer and the touch sensor panel. Additionally or alternatively to one or more of the examples disclosed above, in some examples, the touch screen can further comprise one or more sensing circuits, each sensing circuit comprising a first input coupled to the one or more first electrodes, a second input coupled to the one or more second electrodes, and a differential amplifier that produces an output proportional to the first input subtracted from the second input.

Some examples of the disclosure are directed to a touch sensor panel. The touch sensor panel can comprise a plurality of touch nodes including a first touch node. The first touch node can correspond to a first differential sensing pair of touch electrodes comprising a first touch electrode formed of a first plurality of segments in a first layer and a second touch electrode formed of a second plurality of segments in the first layer; and a first differential driving pair of touch electrodes comprising a third touch electrode formed of a third plurality of segments with a first routing trace in the first layer and a fourth touch electrode formed of a fourth plurality of segments with a second routing trace in the first layer. The first routing trace can be disposed between a pair of the fourth plurality of segments and between a first pair of the second plurality of segments; and the second routing trace can be disposed between a pair of the third plurality of segments and between a first pair of the first plurality of segments. Additionally or alternatively to one or more of the examples disclosed above, in some examples, the touch sensor panel can further comprise a plurality of bridges including a first bridge and a second bridge. The first bridge over the second routing trace can connect the first pair of the first plurality of segments and the second bridge over the first routing trace can connect the first pair of the second plurality of segments.

Additionally or alternatively to one or more of the examples disclosed above, in some examples, the first routing trace and the second routing trace can be parallel and can be interleaved (e.g., aligned horizontally and alternative vertically). Additionally or alternatively to one or more of the examples disclosed above, in some examples, an area of the first plurality of segments for the first touch node is equal to an area of the second plurality of segments for the first touch node. Additionally or alternatively to one or more of the examples disclosed above, in some examples, an area of the third plurality of segments for the first touch node is equal to an area of the fourth plurality of segments for the first touch node. Additionally or alternatively to one or more of the examples disclosed above, in some examples, one of the pair of the third plurality of segments is disposed on three sides of one of the first pair of the first plurality of segments, and another one of the pair of the third plurality of segments is disposed on three sides of another one of the first pair of the first plurality of segments. Additionally or alternatively to one or more of the examples disclosed above, in some examples, one of the pair of the fourth plurality of segments is disposed on three sides of one of the first pair of the second plurality of segments, and another one of the pair of the fourth plurality of segments is disposed on three sides of another one of the first pair of the second plurality of segments. Additionally or alternatively to one or more of the examples disclosed above, in some examples, the first plurality of segments and the second plurality of segments are rectangular. Additionally or alternatively to one or more of the examples disclosed above, in some examples, the third plurality of segments and the fourth plurality of segments are rectangular.

Additionally or alternatively to one or more of the examples disclosed above, in some examples, the plurality of touch nodes includes a second touch node (e.g., horizontally adjacent to the first touch node) corresponding to the first differential sensing pair of touch electrodes comprising the first touch electrode and the second touch electrode; and a second differential driving pair of touch electrodes comprising a fifth touch electrode formed of a fifth plurality of segments with a third routing trace in the first layer and a sixth touch electrode formed of a sixth plurality of segments with a fourth routing trace in the first layer. Additionally or alternatively to one or more of the examples disclosed above, in some examples, Additionally or alternatively to one or more of the examples disclosed above, in some examples, the third routing trace can be disposed between a pair of the sixth plurality of segments and between a second pair of the second plurality of segments; and the fourth routing trace can be disposed between a pair of the fifth plurality of segments and between a second pair of the first plurality of segments. Additionally or alternatively to one or more of the examples disclosed above, in some examples, the plurality of bridges includes a third bridge and a fourth bridge. The third bridge over the fourth routing trace can connect the second pair of the first plurality of segments; and the fourth bridge over the third routing trace can connect the second pair of the second plurality of segments.

Additionally or alternatively to one or more of the examples disclosed above, in some examples, the plurality of touch nodes includes a second touch node (e.g., vertically adjacent to the first touch node) corresponding to a second differential sensing pair of touch electrodes comprising a fifth touch electrode formed of a fifth plurality of segments and a sixth touch electrode formed of a sixth plurality of segments in the first layer; and the first differential driving pair of touch electrodes comprising the third touch electrode formed of the third plurality of segments with a third routing trace in the first layer and a fourth touch electrode formed of the fourth plurality of segments with a fourth routing trace in the first layer. Additionally or alternatively to one or more of the examples disclosed above, in some examples, the third routing trace can be disposed between a pair of the sixth plurality of segments and between a second pair of the fourth plurality of segments; and the fourth routing trace can be disposed between a pair of the fifth plurality of segments and between a second pair of the third plurality of segments. Additionally or alternatively to one or more of the examples disclosed above, in some examples, the plurality of bridges includes a third bridge and a fourth bridge. The third bridge over the fourth routing trace can connects the pair of the fifth plurality of segments; and the fourth bridge over the third routing trace can connect the pair of the sixth plurality of segments.

Some examples of the disclosure are directed to a touch sensor panel. The touch sensor panel can comprise a plurality of touch nodes including a first touch node. The first touch node can correspond to: a differential sensing pair of touch electrodes comprising a first touch electrode formed of a first plurality of segments in a first layer and a second touch electrode formed of a second plurality of segments in the first layer; and a differential driving pair of touch electrodes comprising a third touch electrode formed of a third plurality of segments with a first routing trace in the first layer and a fourth touch electrode formed of a fourth plurality of segments with a second routing trace in the first layer. A pair of the first plurality of segments can be connected by a first bridge in a second layer, a pair of the second plurality of segments can be connected by a second bridge in the second layer, a pair of the third plurality of segments can be connected by a third bridge in a second layer, and a pair of the fourth plurality of segments can be connected by a fourth bridge in a second layer or by a routing trace in the first layer.

Additionally or alternatively to one or more of the examples disclosed above, in some examples, the first touch electrode and the second touch electrode are interleaved in the first touch node, and the third touch electrode and the fourth touch electrode are interleaved in the first touch node. Additionally or alternatively to one or more of the examples disclosed above, in some examples, an area of the first plurality of segments for the first touch node is equal to an area of the second plurality of segments for the first touch node. Additionally or alternatively to one or more of the examples disclosed above, in some examples, an area of the third plurality of segments for the first touch node is equal to an area of the fourth plurality of segments for the first touch node. Additionally or alternatively to one or more of the examples disclosed above, in some examples, one of the pair of the third plurality of segments is disposed on three sides of one of the pair of the first plurality of segments, and another one of the pair of the third plurality of segments is disposed on three sides of another one of the pair of the first plurality of segments. Additionally or alternatively to one or more of the examples disclosed above, in some examples, one of the pair of the fourth plurality of segments is disposed on three sides of one of the pair of the second plurality of segments, and another one of the pair of the fourth plurality of segments is disposed on three sides of another one of the pair of the second plurality of segments. Additionally or alternatively to one or more of the examples disclosed above, in some examples, the first plurality of segments and the second plurality of segments are rectangular. Additionally or alternatively to one or more of the examples disclosed above, in some examples, the third plurality of segments and the fourth plurality of segments are rectangular. Additionally or alternatively to one or more of the examples disclosed above, in some examples, the first plurality of segments includes a first extension and a second extension, and the second plurality of segments includes a third extension and a fourth extension. Additionally or alternatively to one or more of the examples disclosed above, in some examples, the first bridge connects the first extension to the second extension and the second bridge connects the third extension to the fourth extension. Additionally or alternatively to one or more of the examples disclosed above, in some examples, the third touch electrode is disposed between the first touch electrode and the fourth touch electrode and the fourth touch electrode is disposed between the second touch electrode and the third touch electrode. Additionally or alternatively to one or more of the examples disclosed above, in some examples, the first touch node is sensed to measure a sum of a mutual capacitance between the first touch electrode and the third touch electrode and a mutual capacitance between the second touch electrode and the fourth touch electrode.

Some examples of the disclosure are directed to a touch sensor panel. The touch sensor panel can comprise a plurality of touch nodes including a first touch node and a second touch node. The first touch node can correspond to a first touch electrode comprising a first plurality of segments in a first layer and a second touch electrode comprising a second plurality of segments and a first routing trace in the first layer. The second touch node can correspond to a third touch electrode comprising a third plurality of segments in the first layer and a fourth touch electrode comprising a fourth plurality of segments and a second routing trace in the first layer. The first routing trace can be disposed between a pair of the fourth plurality of segments and can separate a pair of the third plurality of segments. The second routing trace can be disposed between a pair of the second plurality of segments and can separate between a pair of the first plurality of segments.

Additionally or alternatively to one or more of the examples disclosed above, in some examples, a first bridge over the second routing trace connects the pair of the first plurality of segments, and a second bridge over the first routing trace connects the pair of the third plurality of segments. Additionally or alternatively to one or more of the examples disclosed above, in some examples, the second touch electrode and the fourth touch electrodes are a differential driving pair of touch electrodes, and the first touch electrode and the third touch electrode are non-differential (e.g., single-ended sensing). Additionally or alternatively to one or more of the examples disclosed above, in some examples, the second touch electrode and the fourth touch electrodes are interleaved, and the first touch electrode and the third touch electrode are non-interleaved. Additionally or alternatively to one or more of the examples disclosed above, in some examples, an area of the first plurality of segments for the first touch node is equal to an area of the third plurality of segments for the second touch node. Additionally or alternatively to one or more of the examples disclosed above, in some examples, an area of the second plurality of segments for the first touch node is equal to an area of the fourth plurality of segments for the second touch node. Additionally or alternatively to one or more of the examples disclosed above, in some examples, one of the pair of the fourth plurality of segments is disposed on three sides of one of the pair of the first plurality of segments, and another one of the pair of the fourth plurality of segments is disposed on three sides of another one of the pair of the first plurality of segments. Additionally or alternatively to one or more of the examples disclosed above, in some examples, one of the pair of the second plurality of segments is disposed on three sides of one of the pair of the third plurality of segments, and another one of the pair of the second plurality of segments is disposed on three sides of another one of the pair of the third plurality of segments. Additionally or alternatively to one or more of the examples disclosed above, in some examples, the first plurality of segments and the third plurality of segments are rectangular. Additionally or alternatively to one or more of the examples disclosed above, in some examples, the second plurality of segments and the fourth plurality of segments are rectangular.

Some examples of the disclosure are directed to a touch screen. The touch screen can comprise a plurality of display data lines along a first axis, a plurality of differential driving pairs of touch electrodes along the first axis, and a plurality of sensing touch electrodes along a second axis, different from the first axis. A respective differential driving pair (or, in some examples, each of the differential driving pair) comprises a first touch electrode formed of a first plurality of segments in a first layer and a second touch electrode formed of a second plurality of segments in the first layer. The first plurality of segments and the second plurality of segments are interleaved along the first axis. The plurality of sensing touch electrodes comprising a third touch electrode formed of a third plurality of segments in the first layer and a fourth touch electrode formed of a fourth plurality of segments in the first layer. A first touch node can comprise: multiple of the first plurality of segments interleaved with multiple of the second plurality of segments; and multiple of the third plurality of segments interleaved along the first axis with multiple of the fourth plurality of segments.

Additionally or alternatively to one or more of the examples disclosed above, in some examples, a portion of each of the multiple of the first plurality of segments for the first touch node are disposed around a portion of each of the multiple of the third plurality of segments for the first touch node; and a portion of each of the multiple of the second plurality of segments for the first touch node are disposed around a portion of each of the multiple of the fourth plurality of segments for the first touch node. Additionally or alternatively to one or more of the examples disclosed above, in some examples, the first axis and the second axis are orthogonal. Additionally or alternatively to one or more of the examples disclosed above, in some examples, a pitch a first segment of the third plurality of segments and a first segment of the fourth plurality of segments closest to the first segment of the third plurality of segments is less than a quarter of the pitch of the first touch node. Additionally or alternatively to one or more of the examples disclosed above, in some examples, the third plurality of are interconnected at a border region at an edge or outside an active area of the touch screen. Additionally or alternatively to one or more of the examples disclosed above, in some examples, the plurality of sense electrodes is coupled to sensing circuitry in a sensed single-end configuration. Additionally or alternatively to one or more of the examples disclosed above, in some examples, the first plurality of segments is interconnected in an active area of the touch screen and the second plurality of segments are interconnected in the active area of the touch screen. Additionally or alternatively to one or more of the examples disclosed above, in some examples, the first touch node includes at least a pair of the first plurality of segments interleaved with a pair of the second plurality of segments, and at least a pair of the third plurality of segments interleaved with a pair of the fourth plurality of segments.

Some examples of the disclosure are directed to an electronic device comprising an energy storage device, communication circuitry, and a touch screen as described by some of the examples presented above. Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A touch screen comprising:
a display having an active area;
a first metal layer and a second metal layer disposed over the display; and an intermediate dielectric layer, disposed between the first metal layer and the second metal layer;

wherein a plurality of touch electrodes of the touch screen is formed in the active area of the display, the plurality of touch electrodes including a touch electrode formed from first metal mesh in the first metal layer and first metal mesh in the second metal layer; and wherein a plurality of routing traces is formed in the active area of the display and coupled to the plurality of touch electrodes, the plurality of routing traces including a routing trace formed from second metal mesh in the second metal layer and second metal mesh in the first metal layer.

2. The touch screen of claim 1, wherein the first metal mesh of the first metal layer aligns with the first metal mesh of the second metal layer.

3. The touch screen of claim 1, wherein a width of the first metal mesh of the second metal layer is less than a width of the first metal mesh of the first metal layer.

4. The touch screen of claim 1, wherein the second metal mesh of the first metal layer aligns with the second metal mesh of the second metal layer.

5. The touch screen of claim 1, wherein a width of the second metal mesh of the second metal layer is less than a width of the second metal mesh of the first metal layer.

6. The touch screen of claim 1, wherein the plurality of touch electrodes is formed using bridges in the active area of the display formed of the first metal mesh in the second metal layer.

7. The touch screen of claim 1,
wherein a portion of the routing trace formed from the second metal mesh in the second metal layer is disposed beneath a portion of the touch electrode formed from the first metal mesh in the first metal layer.

8. The touch screen of claim 1, wherein each of the plurality of touch electrodes of the touch screen is formed from the first metal mesh in the first metal layer and the first metal mesh in the second metal layer.

9. The touch screen of claim 1, further comprising:
transparent conductive material filling gaps in the first metal mesh in the first metal layer without filling gaps in the second metal mesh in the first metal layer.

10. The touch screen of claim 1, wherein the intermediate dielectric layer comprises an organic material.

11. The touch screen of claim 1, wherein the intermediate dielectric layer has a thickness greater than 0.5 micron.

12. The touch screen of claim 1, wherein the intermediate dielectric layer has a thickness between 1-2.5 micron.

13. The touch screen of claim 1, wherein the intermediate dielectric layer has a dielectric constant less than 5.

14. The touch screen of claim 1, wherein the intermediate dielectric layer has a dielectric constant between 2.5-4.

15. The touch screen of claim 1, wherein the touch electrode formed from the first metal mesh in the first metal layer and the first metal mesh in the second metal layer comprises non-overlapping regions and overlapping regions, wherein the first metal mesh in the first metal layer and the first metal mesh in the second metal layer are non-parallel in the overlapping regions.

16. The touch screen of claim 15, wherein the first metal mesh in the first metal layer and the first metal mesh in the second metal layer are orthogonal in the overlapping regions of the touch electrode.

17. The touch screen of claim 16, wherein the area of each of the overlapping regions of the touch electrode is uniform.

18. The touch screen of claim 1, further comprising:
transparent conductive material filling gaps in the first metal mesh in the first metal layer and filling gaps in the second metal mesh in the first metal layer.

19. The touch screen of claim 18, further comprising:
a second intermediate dielectric layer disposed between a first transparent conductive material and the first metal layer and between a second transparent conductive material and the first metal layer.

20. An electronic device comprising:
an energy storage device;
communication circuitry; and
a touch screen comprising:
a display having an active area;
a first metal layer and a second metal layer disposed over the display; and
an intermediate dielectric layer, disposed between the first metal layer and the second metal layer;
wherein a plurality of touch electrodes of the touch screen is formed in the active area of the display, the plurality of touch electrodes including a touch electrode formed from first metal mesh in the first metal layer and first metal mesh in the second metal layer; and
wherein a plurality of routing traces is formed in the active area of the display and coupled to the plurality of touch electrodes, the plurality of routing traces including a routing trace formed from second metal mesh in the second metal layer and second metal mesh in the first metal layer.

* * * * *